US012750750B2

(12) United States Patent
Kim et al.

(10) Patent No.: US 12,750,750 B2
(45) Date of Patent: Sep. 29, 2026

(54) METHOD AND APPARATUS FOR HANDOVER OF WIRELESS BACKHAUL NODE, WHICH MINIMIZES DATA DOWNTIME IN NEXT-GENERATION MOBILE COMMUNICATION SYSTEM

(71) Applicant: Samsung Electronics Co., Ltd., Suwon-si (KR)

(72) Inventors: Donggun Kim, Suwon-si (KR); June Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 18/553,147

(22) PCT Filed: Mar. 21, 2022

(86) PCT No.: PCT/KR2022/003905
§ 371 (c)(1),
(2) Date: Sep. 28, 2023

(87) PCT Pub. No.: WO2022/211340
PCT Pub. Date: Oct. 6, 2022

(65) Prior Publication Data

US 2024/0187950 A1 Jun. 6, 2024

(30) Foreign Application Priority Data

Mar. 31, 2021 (KR) ........................ 10-2021-0042082

(51) Int. Cl.
*H04W 36/18* (2009.01)
*H04W 36/00* (2009.01)
*H04W 36/08* (2009.01)

(52) U.S. Cl.
CPC ..... *H04W 36/185* (2023.05); *H04W 36/0055* (2013.01); *H04W 36/08* (2013.01)

(58) Field of Classification Search
CPC ............... H04W 84/047; H04W 40/36; H04W 36/0055; H04W 36/08; H04W 36/185; H04W 36/0064; H04W 36/0079
See application file for complete search history.

(56) References Cited

U.S. PATENT DOCUMENTS

| | | | |
|---|---|---|---|
| 11,252,624 | B2 | 2/2022 | Kim et al. |
| 2021/0058826 | A1 | 2/2021 | Mao et al. |

(Continued)

FOREIGN PATENT DOCUMENTS

| | | | |
|---|---|---|---|
| EP | 4181600 | A1 | 5/2023 |
| KR | 10-2020-0114994 | A | 10/2020 |

(Continued)

OTHER PUBLICATIONS

International Search Report and Written Opinion of the International Searching Authority dated Jun. 27, 2022, in connection with International Application No. PCT/KR2022/003905, 11 pages.

(Continued)

*Primary Examiner* — Allahyar Kasraian

(57) ABSTRACT

The disclosure relates to: a communication technique for merging an IoT technology with a 5G communication system for supporting a higher data transmission rate than a 4G system; and a system therefor. The disclosure can be applied to intelligent services (for example, smart homes, smart buildings, smart cities, smart cars or connected cars, healthcare, digital education, retail businesses, security- and safety-related services, and the like) on the basis of a 5G communication technology and an IoT-related technology. The disclosure discloses a method and apparatus for handover of a wireless backhaul node.

11 Claims, 16 Drawing Sheets

(56) References Cited

U.S. PATENT DOCUMENTS

| | | | | |
|---|---|---|---|---|
| 2023/0171651 A1* | 6/2023 | Liu | H04W 76/12 370/331 |
| 2023/0247501 A1* | 8/2023 | Kim | H04L 5/0023 370/331 |
| 2023/0413149 A1* | 12/2023 | Teyeb | H04W 36/30 |
| 2024/0056927 A1* | 2/2024 | Kim | H04W 36/185 |

FOREIGN PATENT DOCUMENTS

| | | |
|---|---|---|
| KR | 10-2022-0136727 A | 10/2022 |
| WO | 2022211570 A1 | 10/2022 |

OTHER PUBLICATIONS

Ericsson, "Summary of [AT113-e][030][eIAB] Reply LS DAPS-like solution (Ericsson)," Tdoc R2-2102288, 3GPP TSG-RAN WG2 #113e, Electronic meeting, Jan. 25-Feb. 5, 2021, 13 pages.
Intel Corporation, "Discussion on RAN3 Ls of DAPS-like solution," R2-2100360, 3GPP TSG RAN WG2 Meeting #113e, Electronic meeting, Jan. 25-Feb. 5, 2020, 3 pages.
ZTE, "Discussion on reduction of service interruption in intra-donor migration and RLF recovery scenario," R3-210716, 3GPP TSG-RAN WG3 Meeting #111-e, Jan. 25-Feb. 4, 2021, 9 pages.
3GPP TS 36.331 V16.3.0 (Dec. 2020), Technical Specification, 3rd Generation Partnership Project; Technical Specification Group Radio Access Network; Evolved Universal Terrestrial Radio Access (E-UTRA); Radio Resource Control (RRC); Protocol specification (Release 16) Dec. 2020, 1084 pages.
Supplementary European Search Report dated Jul. 23, 2024, in connection with European Application No. 22781460.5, 14 pages.
QUALCOMM (Rapporteur), "CR to 38.300 on Integrated Access and Backhaul for NR," R2-2006303, 3GPP TSG-RAN WG2 Meeting #110e, E-meeting, Jun. 1012, 2020, 22 pages.
RAN3, "LS on DAPS-like solution for service interruption reduction in Rel-17 IAB," R2-2100038, 3GPP TSG RAN WG2#113-e, e-Meeting, Jan. 25- Feb. 5, 2021, 1 page.
Samsung, "Discussion on inter-donor IAB node migration," R3-205411, 3GPP TSG-RAN WG3 #109-e, Online, Aug. 17-28, 2020, 6 pages.
Samsung, "Discussion on inter-donor IAB node migration procedure for REL-17 IAB," R3-210216, 3GPP TSG-RAN WG3 Meeting #111e, Online, Jan. 25-Feb. 4, 2021, 11 pages.
Office Action dated Jun. 15, 2026, in connection with Korean Patent Application No. 10-2021-0042082, 12 pages.

* cited by examiner

METHOD AND APPARATUS FOR HANDOVER OF WIRELESS BACKHAUL NODE, WHICH MINIMIZES DATA DOWNTIME IN NEXT-GENERATION MOBILE COMMUNICATION SYSTEM

TECHNICAL FIELD

The disclosure relates to a method and apparatus for performing an efficient handover method without interruption of data transmission and reception during handover (or migration) of a wireless backhaul node (e.g., integrated access and backhaul (IAB) node, IAB mobile termination (MT), or IAB distributed unit (DU)) in a next-generation mobile communication system.

BACKGROUND ART

To meet the demand for wireless data traffic having increased since deployment of 4G communication systems, efforts have been made to develop an improved 5G or pre-5G communication system. For this reason, a 5G communication system or pre-5G communication system is called a Beyond 4G Network communication system or a post long term evolution (LTE) system. The 5G communication system defined by the 3rd generation Partnership Project (3GPP) is called a new radio (NR) system.

To achieve a high data transmission rate, the implementation of 5G communication systems in an ultra-high-frequency (mmWave) band (for example, a 60 GHz band) is being considered. To reduce path loss of radio waves and increase a transfer distance of radio waves in an ultra-high-frequency band, in 5G communication systems, technologies for beamforming, massive multiple input multiple output (massive MIMO), full dimensional MIMO (FD-MIMO), array antenna, analog beam-forming, and large-scale antenna are being discussed, and applied to the NR system. Also, to improve the network of the system, various technologies, such as advanced small cell, cloud radio access network (cloud RAN), ultra-dense networks, device to device communication (D2D), wireless backhaul, moving networks, cooperative communication, coordinated multi-points (COMP), and interference cancellation, have been developed for 5G communication systems.

In addition, other technologies, such as hybrid frequency-shift keying (FSK) and quadrature amplitude modulation (QAM) modulation (FQAM) and sliding window superposition coding (SWSC) based on advanced coding modulation (ACM), and filter bank multi carrier (FBMC), non-orthogonal multiple access (NOMA), and sparse code multiple access (SCMA) based on enhanced access technology have been developed for 5G communication systems.

Meanwhile, the Internet is evolving from a human-centered network in which humans generate and consume information to an Internet of Things (IOT) network in which distributed components such as objects transmit, receive, and process information. Internet of Everything (IoE) technology resulting from combining IoT technology with big data processing technology, etc. through a connection to a cloud server or the like is on the rise. To implement the IoT, various technical factors, such as sensing technology, wired/wireless communication, network infrastructure, service interface technology, and security technology, are required. Recently, technologies including a sensor network, machine to machine (M2M) communication, and machine type communication (MTC) for connections between objects have been studied. In an IoT environment, an intelligent Internet technology (IT) service is provided to collect and analyze data generated by connected objects to create new value for human life. The IoT may be applied to various fields, such as smart homes, smart buildings, smart cities, smart cars/connected cars, smart grids, health care, smart appliances, and advanced medical services, through convergence and combination between existing information technology (IT) and various industries.

Accordingly, various attempts to apply a 5G communication system to an IoT network are being made. For example, 5G communication, such as sensor networks, M2M communication, and MTC, is implemented by technologies, such as beam forming, MIMO, and array antenna. Applying the above described cloud radio access network (cloud RAN) as big data processing technology is also an example of the convergence of 5G technology and IoT technology.

Meanwhile, with the development of a mobile communication system, there is a growing demand for improvement in the operation of wireless backhaul nodes.

DISCLOSURE OF INVENTION

Technical Problem

In the next-generation mobile communication system, an efficient handover method of a wireless backhaul node (or radio node) is required to support a service without data interruption with low transmission delay. In addition, in case of handover failure, a method for performing a fallback while minimizing data interruption time is required.

Solution to Problem

According to an embodiment for solving the above problems, a method performed by a first integrated access and backhaul (IAB) node is provided. The method may comprise receiving, from a second IAB node, a message related to handover of an IAB node and including target backhaul adaptation protocol (BAP) configuration information: performing handover from a source node to a target node based on source BAP configuration information and the message: and performing communication with the target node based on the target BAP configuration information when random access with the target node is completed, wherein downlink data may be received from each of the source node and the target node until connection with the source node is released.

According to an embodiment for solving the above problems, a method performed by a second integrated access and backhaul (IAB) node is provided. The method may comprise transmitting, to a first IAB node, a message related to handover of an IAB node and including target backhaul adaptation protocol (BAP) configuration information: wherein handover from a source node to a target node may be performed based on source BAP configuration information and the message, and when random access with the target node is completed, the target BAP configuration information may be applied for communication with the target node, and the source node and the target node may transmit downlink data to the first IAB node, respectively, until connection between the first IAB node and the source node is released.

According to an embodiment for solving the above problems, a first integrated access and backhaul (IAB) node is provided. The first IAB node may comprise a transceiver configure to transmit or receive a signal and a controller connected to the transceiver, wherein the controller may be configured to receive, from a second IAB node, a message related to handover of an IAB node and including target backhaul adaptation protocol (BAP) configuration information, perform handover from a source node to a target node based on source BAP configuration information and the message, and perform communication with the target node based on the target BAP configuration information when random access with the target node is completed, wherein downlink data may be received from each of the source node and the target node until connection with the source node is released.

According to an embodiment for solving the above problems, a second integrated access and backhaul (IAB) node is provided. The second IAB node may comprise a transceiver configure to transmit or receive a signal and a controller connected to the transceiver, wherein the controller may be configured to transmit, to a first IAB node, a message related to handover of an IAB node and including target backhaul adaptation protocol (BAP) configuration information, wherein handover from a source node to a target node may be performed based on source BAP configuration information and the message, and when random access with the target node is completed, the target BAP configuration information may be applied for communication with the target node, and the source node and the target node may transmit downlink data to the first IAB node, respectively, until connection between the first IAB node and the source node is released.

Advantageous Effects of Invention

The disclosure proposes various efficient handover methods for preventing data interruption time due to handover when performing handover in a next-generation mobile communication system. Through these methods, it is possible to support a service without data interruption even during handover of a wireless backhaul node. In addition, in case of handover failure, an efficient method for quickly falling back to a source base station is also proposed.

MODE FOR THE INVENTION

Figure 1:
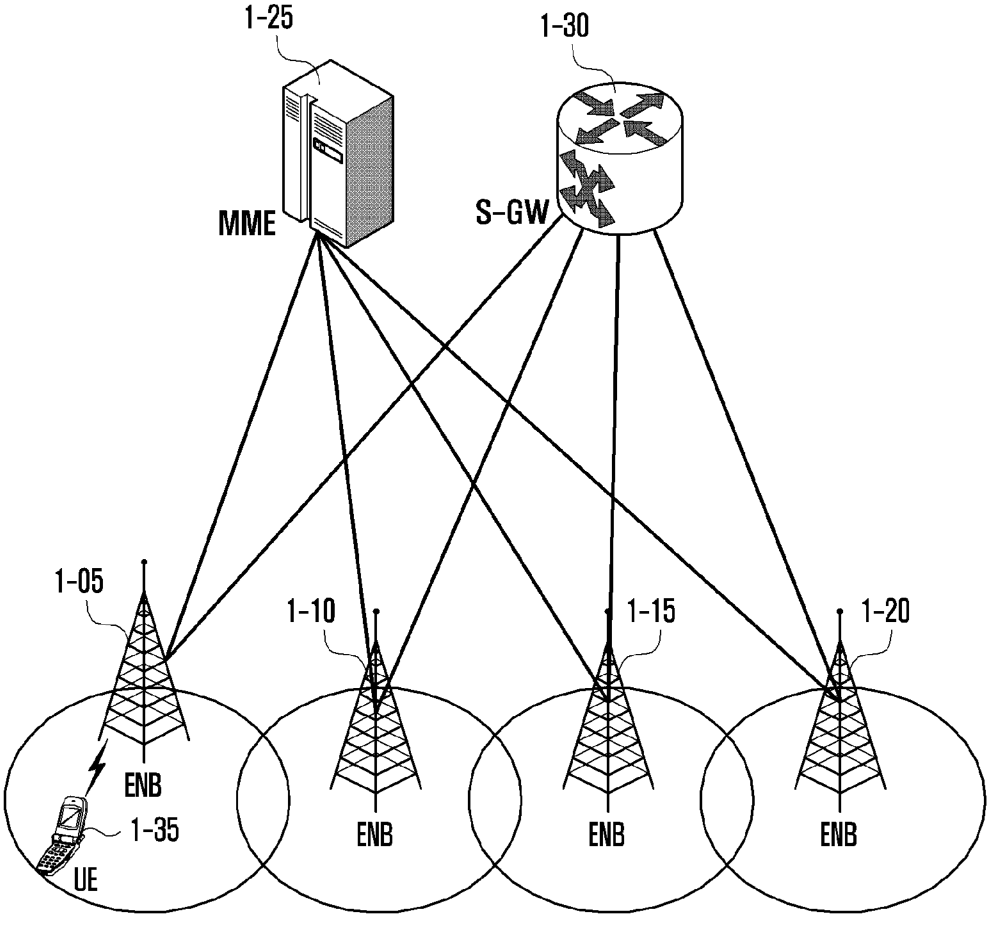
FIG. 1 is a diagram illustrating a structure of an LTE system to which the disclosure can be applied.

Hereinafter, exemplary embodiments of the disclosure will be described in detail with reference to the accompanying drawings. In this case, it is to be noted that like reference numerals denote like components in the accompanying drawings. Further, detailed descriptions related to well-known functions or constitutions will be ruled out in order not to unnecessarily obscure the subject matter of the disclosure.

In this specification, in describing the embodiments, a description of technology contents that are well known in the art to which the disclosure pertains and that are not directly related to the disclosure is omitted in order to clearly deliver the gist of the disclosure without obscuring the gist of the disclosure by omitting an unnecessary description.

For the same reason, in the accompanying drawings, some components are enlarged, omitted or schematically depicted. Furthermore, the size of each component does not accurately reflect its real size. In the drawings, the same or similar components are assigned the same reference numerals.

Advantages and characteristics of the disclosure and a method for achieving the advantages and characteristics will become apparent from the embodiments described in detail in conjunction with the accompanying drawings. However, the disclosure is not limited to the disclosed embodiments, but may be implemented in various different forms. The embodiments are provided to only complete the disclosure and to fully notify a person having ordinary knowledge in the art to which the disclosure pertains of the category of the disclosure. The disclosure is defined by the category of the claims. Throughout the specification, the same reference numerals denote the same elements.

In this case, it will be understood that each of the blocks of the flowchart drawings and combinations of the blocks of the flowchart drawings can be executed by computer program instructions. These computer program instructions may be mounted on the processor of a general purpose computer, a special purpose computer or other programmable data processing apparatus, so that the instructions executed by the processor of the computer or other programmable data processing apparatus create means for executing the functions specified in the flowchart block(s). These computer program instructions may also be stored in a computer-usable or computer-readable memory that can direct a computer or other programmable data processing equipment to implement function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable data processing apparatus to produce a computer-executed process, so that the instructions performing the computer or other programmable data processing apparatus may provide steps for executing the functions described in the flowchart block(s).

Furthermore, each block of the flowchart drawings may represent a portion of a module, a segment or code, which includes one or more executable instructions for implementing a specified logical function(s). It should also be noted that in some alternative implementations, the functions noted in the blocks may be performed out of order. For example, two blocks shown in succession may in fact be executed substantially concurrently or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. However, the meaning of "˜unit" is not limited to software or hardware. The "unit" may be constituted to reside on an addressable storage medium and constituted to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card.

A term for identifying an access node used in the following description, a term for indicating network entities, a term for indicating messages, a term for indicating an interface between network objects, a term for indicating various identification information and the like are exemplified for convenience of description. Accordingly, the disclosure is not limited to terms described below, and other terms referring to objects having an equivalent technical meaning may be used.

Hereinafter, for convenience of description, the disclosure may use terms and names defined in the 3rd generation partnership project long term evolution (3GPP LTE) standard. However, the disclosure is not limited by the above terms and names, and may be equally applied to systems according to other standards. In the disclosure, an evolved node B (eNB) may be used together with a next generation node B (gNB) for convenience of description. That is, a base station described as an eNB may represent a gNB.

The disclosure proposes methods for expanding handover methods without interruption capable of minimizing or reducing a data interruption time due to handover to Oms in a next generation mobile communication system to handover methods to wireless backhaul nodes.

Specifically, efficient handover methods proposed in the disclosure may have one or two or more of the following plurality of features. In addition, in the efficient handover methods proposed in the disclosure, different handover methods may be applied to different bearers (RLC bearers or backhaul RLC channel identifiers or backhaul RLC logical channel identifiers). In the disclosure, a bearer may indicate an RLC bearer or a backhaul RLC channel identifier or a backhaul RLC logical channel identifier. Also, in the disclosure, the bearer identifier may indicate an RLC bearer (RLC bearer or backhaul RLC channel identifier or backhaul RLC logical channel identifier) or a backhaul RLC channel identifier or a backhaul RLC logical channel identifier.

When a radio node (or UE) that performs data transmission and reception (uplink or downlink data transmission and reception) with a source base station and performs routing through each protocol layer entity (physical (PHY) layer entity, medium access control (MAC) layer entity. RLC layer entity, or BAP layer entity) of a first plurality of bearers (RLC bearers, backhaul RLC channel identifiers, backhaul RLC logical channel identifiers) or configuration information on the each protocol layer entity receives a handover command message (e.g., handover command message or RRC Reconfiguration message) from the source base station (e.g., highest radio node (IAB donor), parent radio node (parent IAB node), or currently connected parent radio node, the radio node (wireless backhaul node or UE) configures protocol layer entities of a new second plurality of bearers (RLC bearers, backhaul RLC channel identifiers, or backhaul RLC logical channel identifiers) corresponding to the protocol layer entities of the first plurality of bearers (RLC bearers, backhaul RLC channel identifiers, or backhaul RLC logical channel identifiers) (e.g., having the same bearer (RLC bearer, backhaul RLC channel identifier, or backhaul RLC logical channel identifier) identifier). Also, the radio node (wireless backhaul node or UE) may continue to maintain data transmission or reception (uplink or downlink data transmission and reception) without interruption with the source base station through the first plurality of bearers (RLC bearers, backhaul RLC channel identifiers, or backhaul RLC logical channel identifiers), perform data transmission and reception (uplink or downlink data transmission and reception), and perform routing. As another method, the radio node (wireless backhaul node or UE) may continue to maintain data transmission or reception (uplink or downlink data transmission or reception) without interruption with the source base station through the bearer (RLC bearer, backhaul RCL channel identifier, or backhaul RCL logical channel identifier), backhaul RLC channel identifier or backhaul RLC logical channel identifier configured or indicated with the handover method (e.g., DAPS handover method or DAPS-like migration) proposed in the disclosure via the RRC message, among the first plurality of bearers (RLC bearers, backhaul RLC channel identifiers, or backhaul RLC logical channel identifiers), and perform data transmission and reception (uplink or downlink data transmission and reception), and performs routing. The radio node (wireless backhaul node or UE) may perform RLC reestablishment procedure, bearer (RLC bearer, backhaul RCL channel identifier, backhaul RLC logical channel identifier) suspension procedure with the source base station through the bearer (RLC bearer, backhaul RCL channel identifier, or backhaul RCL logical channel identifier) not configured or indicated with the handover method (e.g., DAPS handover method or DAPS-like migration) proposed in the disclosure via the RRC message, among the first plurality of bearers (RLC bearers, backhaul RLC channel identifiers, or backhaul RLC logical channel identifiers).

In the above, after the handover command message is received or a random access procedure is successfully completed to a target base station, the configuration information of the protocol layer entities (PHY layer entity, MAC layer entity, RLC layer entity, or BAP layer entity) of the second plurality of bearers (RLC bearers, backhaul RLC channel identifiers, or backhaul RLC logical channel identifiers) that are newly established or protocol layer entities may be configured for data transmission and reception with the target base station (highest radio node or new parent radio node) based on bearer configuration information or protocol layer entity information included in the handover command message.

In the above, the radio node (or UE) may perform a random access procedure to the target base station through the protocol layer entity (e.g., MAC layer entity) of the second plurality of bearers (RLC bearers, backhaul RLC channel identifiers, or backhaul RLC logical channel identifiers) while performing data transmission and reception (uplink or downlink data transmission and reception) with the source base station through the protocol layer entities of the first plurality of bearers (RLC bearers, backhaul RLC channel identifiers, or backhaul RLC logical channel identifiers). In the above, the random access procedure may include transmission of a preamble, reception of a random access response, transmission of a message 3, or reception of message 4 (e.g., reception of contention resolution MAC CE or uplink transmission resource).

In the above, the radio node (or UE) may complete a random access procedure to the target base station using the protocol layer entity (e.g., MAC layer entity) of the second plurality of bearers (RLC bearers, backhaul RLC channel identifiers, or backhaul RLC logical channel identifiers) while performing data transmission and reception with the source base station using the protocol layer entities of the first plurality of bearers (RLC bearers, backhaul RLC channel identifiers, or backhaul RLC logical channel identifiers), and transmit a handover completion message to the target base station using the protocol layer entities of the second plurality of bearers (RLC bearers, backhaul RLC channel identifiers, or backhaul RLC logical channel identifiers).

In the above, the radio node (UE) may complete a random access procedure to the target base station using the protocol layer entity (e.g., MAC layer entity) of the second plurality of bearers (RLC bearers, backhaul RLC channel identifiers, or backhaul RLC logical channel identifiers) while performing data transmission or reception with the source base station using the protocol layer entities of the first plurality of bearers (RLC bearers, backhaul RLC channel identifiers, or backhaul RLC logical channel identifiers), and transmit a handover completion message to the target base station using the protocol layer entities of the second plurality of bearers (RLC bearers, backhaul RLC channel identifiers, or backhaul RLC logical channel identifiers) and performs data transmission and reception (uplink or downlink).

In the above, when the radio node (UE) successfully completes the random access procedure to the target base station or when the radio node (UE) receives uplink transmission resource from the target base station for the first time, the radio node (or UE) may suspend to transmit (or route) the uplink data to the source base station using the protocol layer entities of the first plurality of bearers (RLC bearers, backhaul RLC channel identifiers, or backhaul RLC logical channel identifiers), switches uplink transmission and transmit (or route) the uplink data to the target base station through the second plurality of bearers (RLC bearers, backhaul RLC channel identifiers, or backhaul RLC logical channel identifiers). Even if the uplink data transmission procedure or routing procedure is switched to the target base station in the above, BAP control data to be transmitted to the source base station (e.g., flow control feedback for congestion control, backhaul radio link failure (RLF) indicator, or congestion control polling indicator) may be continuously transmitted to the source base station.

In the above, when the handover command message was received, the radio node (or UE) may continue to transmit and receive data (uplink or downlink data transmission and reception) to and from the source base station using the protocol layer entities of the first plurality of bearers (RLC bearers, backhaul RLC channel identifiers, or backhaul RLC logical channel identifiers), and perform a random access procedure to the target base station using the protocol layer entities of the second plurality of bearers (RLC bearers, backhaul RLC channel identifiers, or backhaul RLC logical channel identifiers), and when the random access procedure is successfully completed or when the uplink transmission resource is received from the target base station for the first time, the radio node (or UE) may suspend transmitting uplink data to the source base station using the protocol layer entities of the first plurality of bearers (RLC bearers, backhaul RLC channel identifiers, or backhaul RLC logical channel identifiers) and transmit uplink data to the target base station only using the protocol layer entities of the second plurality of bearers (RLC bearers, backhaul RLC channel identifiers, or backhaul RLC logical channel identifiers). Also, the radio node (or UE) may continue to receive downlink data from the source base station using the protocol layer entities of the first plurality of bearers (RLC bearers, backhaul RLC channel identifiers, or backhaul RLC logical channel identifiers), and continue to receive downlink data from the target base station using the protocol layer entities of the second plurality of bearers (RLC bearers, backhaul RLC channel identifiers, or backhaul RLC logical channel identifiers).

In the above, a first bearer (RLC bearer, backhaul RLC channel identifier, or backhaul RLC logical channel identifier) and a second bearer (RLC bearer, backhaul RLC channel identifier, or backhaul RLC logical channel identifier) may be constituted with the structure of a second BAP layer entity. In addition, in the second BAP layer entity structure, the first bearer (RLC bearer, backhaul RLC channel identifier, or backhaul RLC logical channel identifier) for the source base station (e.g., RLC layer entity, MAC layer entity, or PHY layer entity) and the second bearer (RLC bearer, backhaul RLC channel identifier, or backhaul RLC logical channel identifier) for the target base station (e.g. RLC layer entity, MAC layer entity, or PHY layer entity) are both connected to one BAP layer entity, and uplink data transmission is performed via the BAP layer entity through one bearer (RLC bearer, backhaul RLC channel identifier, or backhaul RLC logical channel identifier) of the first bearer (RLC bearer, backhaul RLC channel identifier, or backhaul RLC logical channel identifier) and the second bearer (RLC bearer, backhaul RLC channel identifier, or backhaul RLC logical channel identifier). That is, according to the structure of the second BAP layer entity, the radio node (or UE) performs a random access procedure to the target base station and transmits the uplink data through the first bearer (RLC bearer, backhaul RLC channel identifier, or backhaul RLC logical channel identifier) until the random access procedure is successfully completed or uplink transmission resource is received from the target base station for the first time. If the random access procedure to the target base station is performed, the random access procedure is successfully completed, and the uplink transmission resource is received from the target base station for the first time, the radio node (or UE) may suspend the data transmission through the first bearer (RLC bearer, backhaul RLC channel identifier, or backhaul RLC logical channel identifier), perform switching and transmit the uplink data to the target through the second bearer (RLC bearer, backhaul RLC channel identifier, or backhaul RLC logical channel identifier). However, in the second BAP layer entity structure, the radio (or UE) may receive downlink data from the source base station or the target base station through the first bearer (RLC bearer, backhaul RLC channel identifier, or backhaul RLC logical channel identifier) or the second bearer (RLC bearer, backhaul RLC channel identifier, or backhaul RLC logical channel identifier).

As another method, in the above, the radio node (or UE) may continuously transmit (or route) uplink data to each source base station or each target base station without switching.

In the disclosure, the BAP layer entity may receive or process or process or transmit (deliver) or route data. In the above, data processing or transmitting (delivering) may mean that a backhaul adaptation protocol (BAP) service data unit (SDU) is constituted with a BAP header (header of BAP DATA protocol data unit (PDU)) or BAP CONTROL PDU based on configuration information of the BAP layer entity to process BAP SDU data, and BAP PDU is created and transmitted. In addition, in the above, data reception or processing may mean that BAP PDU data is received, a BAP header (header of BAP DATA PDU) or BAP CONTROL PDU is read, and the BAP header (header of BAP DATA PDU) or BAP CONTROL PDU is removed, and the BAP SDU is delivered to a corresponding upper layer entity. In addition, in the above, data routing may mean that BAP PDU data is received, a BAP header (header of BAP DATA PDU) or BAP CONTROL PDU is read, data for the BAP PDU is not processed based on the configuration information of the BAP layer entity, and the BAP PDU data as received (or as is) is delivered to a corresponding lower layer entity or bearer (RLC bearer, backhaul RLC channel identifier, or backhaul RLC logical channel identifier), backhaul RLC channel identifier, or backhaul RLC logical channel identifier) for transmission, which may be referred to as routing. In the disclosure, a procedure for transmitting or receiving data in the BAP layer entity may refer to routing. In the disclosure, the meaning of re-routing may mean performing routing again on data that has been routed once. In addition, the meaning of re-routing may include updating, changing, or reconfiguring and routing the BAP header (the header of the BAP DATA PDU) or BAP CONTROL PDU information of the BAP PDU based on the BAP layer entity configuration information (for example, the configuration information received and configured from the RRC message or information received and configured from F1AP message).

In the disclosure, a procedure for routing or re-routing in the BAP layer entity may mean a procedure of determining a transmission link (egress link) or a reception link (ingress link) based on BAP layer entity configuration information (for example, routing identifier, BAP address or path identifier (path id), reception link (ingress link), reception backhaul RLC channel identifier, or reception backhaul RLC logical channel identifier) for the data (e.g., BAP PDU or BAP SDU) received in the BAP layer entity, or determining transmission backhaul RLC channel identifier or transmission backhaul RLC logical channel identifier based on BAP layer entity configuration information and reception link (ingress link) or reception backhaul RLC channel identifier or reception backhaul RLC logical channel identifier, and performing transmission to a corresponding backhaul RLC layer entity.

In the following description of the disclosure, efficient handover procedures without a data interruption time based on the above characteristics may be proposed.

In addition, when the radio node (or UE) performs an efficient handover method without data interruption time proposed in the disclosure, if the radio node (or UE) fails in handover, a method for re-establishing a connection by quickly falling back to a source base station using the characteristics of an efficient handover method proposed in the disclosure is proposed. The characteristic of the efficient handover method proposed in the disclosure above is to maintain connection with the source base station even during the handover procedure, and to fall back using the wireless connection connected to the original source base station even if the handover fails, which is specifically proposed in the following of the disclosure.

FIG. 1 is a diagram illustrating a structure of an LTE system to which the disclosure can be applied. With reference to FIG. 1, as illustrated, a radio access network of the LTE system may include evolved Node B (hereinafter, ENB, node B, or base station) 1-05, 1-10, 1-15, and 1-20, a mobility management entity (MME) 1-25, and a serving-gateway (S-GW) 1-30. A user radio node (or terminal) (User Equipment, hereinafter, referred to as a UE or radio node (or terminal)) 1-35 may access an external network through the ENBs 1-05 to 1-20 and the S-GW 1-30.

In FIG. 1, the ENBs 1-05 to 1-20 may correspond to an existing Node B of a UMTS system. The ENB may be connected to the UE 1-35 through a radio channel and perform a more complex role than that of the existing Node B. In the LTE system, because all user traffic including real-time services such as a voice over IP (VOIP) through an Internet protocol is serviced through a shared channel, a device for collecting and scheduling status information such as a buffer status, an available transmission power status, and a channel status of UEs may be required, and the ENBs 1-05 to 1-20 may be in charge of this. One ENB may usually control multiple cells. For example, in order to implement a transmission rate of 100 Mbps, the LTE system may use, for example, orthogonal frequency division multiplexing (hereinafter, referred to as OFDM) as radio access technology in a bandwidth of 20 MHZ. Further, the ENB may apply an adaptive modulation & coding (hereinafter, referred to as AMC) method that determines a modulation scheme and a channel coding rate according to the channel status of the UE. The S-GW 1-30 is a device that provides a data bearer (RLC bearer, backhaul RLC channel identifier, or backhaul RLC logical channel identifier), and may generate or remove a data bearer (RLC bearer, backhaul RLC channel identifier, or backhaul RLC logical channel identifier) under the control of the MME 1-25. The MME is a device in charge of various control functions as well as a mobility management function for the radio node (or UE), and may be connected to a plurality of base stations.

Figure 2:
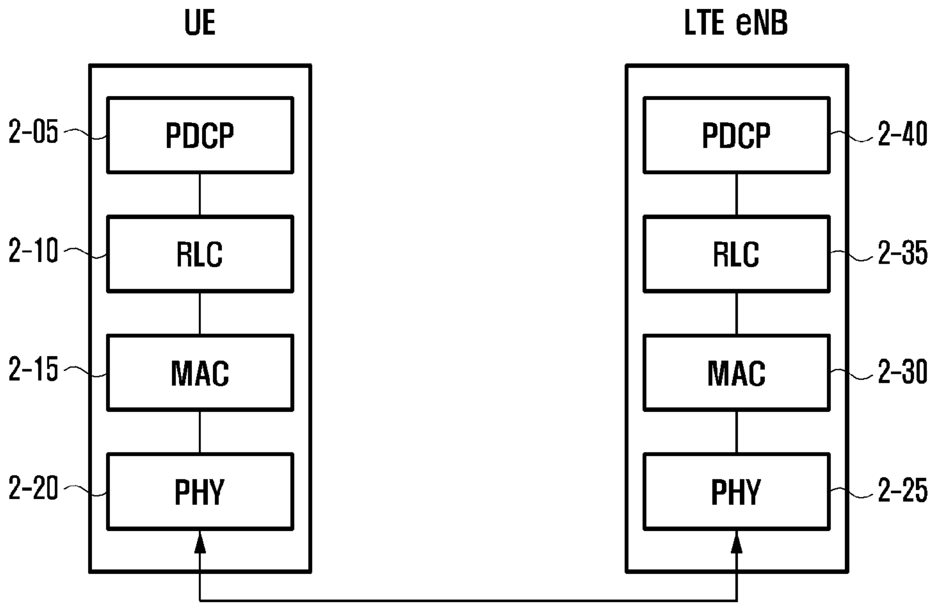
FIG. 2 is a diagram illustrating a radio protocol structure in an LTE system to which the disclosure can be applied.

FIG. 2 is a block diagram illustrating a radio protocol structure in an LTE system to which the disclosure can be applied.

With reference to FIG. 2, a radio protocol of the LTE system may include packet data convergence protocols (PDCP) 2-05 and 2-40, radio link controls (RLC) 2-10 and 2-35, and medium access controls (MAC) 2-15 and 2-30 in the radio node (or UE) and ENB, respectively. The PDCPs 2-05 and 2-40 may be in charge of operations such as IP header compression/restoration. Main functions of the PDCP may be summarized as follows.

- Header compression and decompression function: ROHC only
- Transfer function of user data
- In-sequence delivery function (In-sequence delivery of upper layer PDUs at PDCP re-establishment procedure for RLC AM)
- Reordering function (For split bearers in DC (only support for RLC AM): PDCP PDU routing for transmission and PDCP PDU reordering for reception)
- Duplication detection function (Duplicate detection of lower layer SDUs at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function
- Timer-based SDU discard function (Timer-based SDU discard in uplink)

The radio link control (hereinafter, referred to as RLC) 2-10 and 2-35 may reconfigure a PDCP packet data unit (PDU) to an appropriate size to perform an ARQ operation and the like. Main functions of the RLC may be summarized as follows.

- Data transfer function (Transfer of upper layer PDUs)
- ARQ function (Error Correction through ARQ (only for AM data transfer))
- Concatenation, segmentation and reassembly functions (Concatenation, segmentation and reassembly of RLC SDUs (only for UM and AM data transfer))
- Re-segmentation function (Re-segmentation of RLC data PDUs (only for AM data transfer))
- Reordering function (Reordering of RLC data PDUs (only for UM and AM data transfer)
- Duplication detection function (Duplicate detection (only for UM and AM data transfer))
- Error detection function (Protocol error detection (only for AM data transfer))
- RLC SDU discard function (RLC SDU discard (only for UM and AM data transfer))
- RLC re-establishment function The MACs 2-15 and 2-30 may be connected to several RLC layer entities configured in one radio node (or UE), and perform an operation of multiplexing RLC PDUs to MAC PDUs and demultiplexing RLC PDUs from MAC PDUs. Main functions of the MAC may be summarized as follows.

- Mapping function (Mapping between logical channels and transport channels)
- Multiplexing/demultiplexing functions (Multiplexing/demultiplexing of MAC SDUs belonging to one or different logical channels into/from transport blocks (TB) delivered to/from the physical layer on transport channels)
- Scheduling information reporting function
- HARQ function (Error correction through HARQ)
- Priority handling function between logical channels (Priority handling between logical channels of one UE)
- Priority handling function between radio nodes (UEs) (Priority handling between radio nodes (UEs) by means of dynamic scheduling)
- MBMS service identification function
- Transport format selection function
- Padding function The physical layers 2-20 and 2-25 may perform an operation of channel-coding and modulating upper layer data, making the upper layer data into an OFDM symbol and transmitting the OFDM symbol using a radio channel, or demodulating an OFDM symbol received through the radio channel and channel-deciphering the OFDM symbol and delivering the OFDM symbol to a higher layer.

Figure 3:
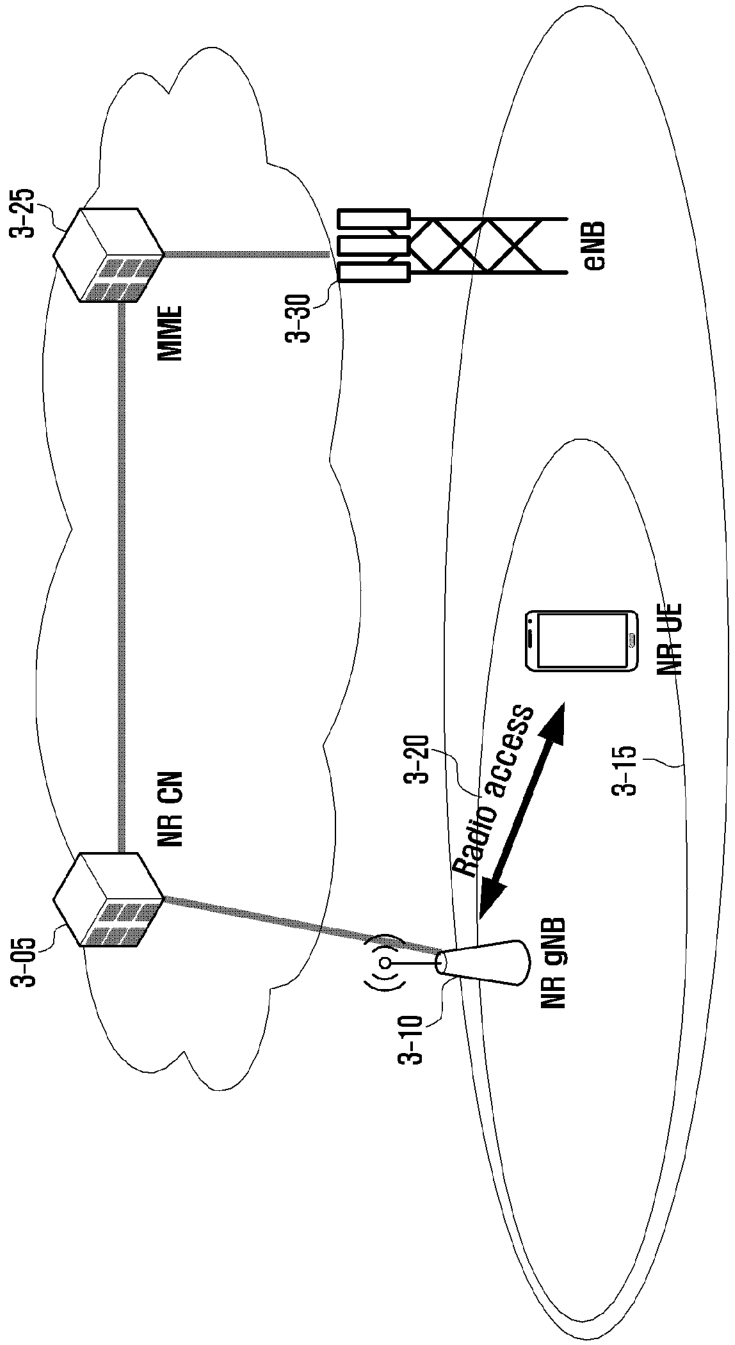
FIG. 3 is a diagram illustrating a structure of a next generation mobile communication system to which the disclosure can be applied.

FIG. 3 is a diagram illustrating a structure of a next generation mobile communication system to which the disclosure can be applied.

With reference to FIG. 3, as illustrated, a radio access network of the next generation mobile communication system (hereinafter, NR or 5G) may include a new radio node B (hereinafter, NR gNB or NR base station) 3-10 and a new radio core network (NR CN) 3-05. A new radio node (or UE) (New radio user equipment, hereinafter, NR UE or radio node (or UE)) 3-15 may access an external network through the NR gNB 3-10 and the NR CN 3-05.

In FIG. 3, the NR gNB 3-10 may correspond to an evolved node B (eNB) of the existing LTE system. The NR gNB may be connected to the NR UE 3-15 through a radio channel and provide a service superior to that of the existing Node B. In the next generation mobile communication system, because all user traffic is serviced through a shared channel, a device for collecting and scheduling status information such as a buffer status, an available transmission power status, and a channel status of UEs may be required, and the NR NB 3-10 may be in charge of this. One NR gNB may generally control multiple cells. In order to implement ultrahigh speed data transmission compared to current LTE, the NR gNB may have a maximum bandwidth greater than the existing maximum bandwidth, and additional beamforming technology may be used by using OFDM as a radio access technology. Further, an adaptive modulation & coding (AMC) scheme that determines a modulation scheme and a channel coding rate according to a channel status of the radio node (or UE) may be applied. The NR core network (CN) 3-05 may perform functions such as mobility support, bearer (RLC bearer, backhaul RLC channel identifier, or backhaul RLC logical channel identifier) configuration, quality of service (QOS) configuration, and the like. The NR CN is a device in charge of various control functions as well as a mobility management function for the radio node (or UE), and may be connected to a plurality of base stations. Further, the next generation mobile communication system may be linked with the existing LTE system, and the NR CN may be connected to an MME 3-25 through a network interface. The MME may be connected to an eNB 3-30, which is the existing base station.

Figure 4:
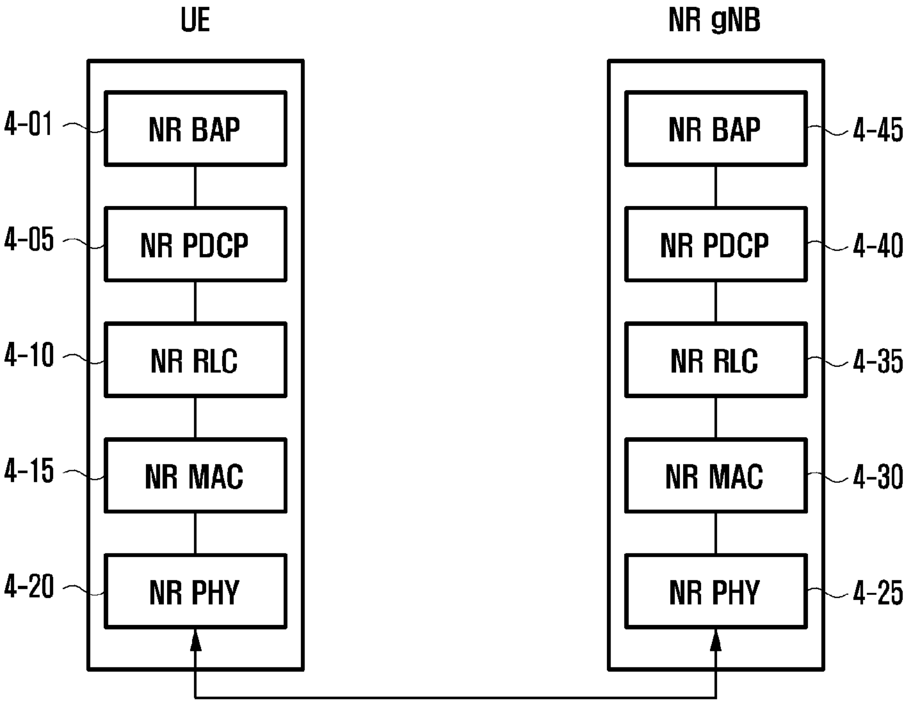
FIG. 4 is a diagram illustrating a radio protocol structure of a next generation mobile communication system to which the disclosure can be applied.
Figure 5A:
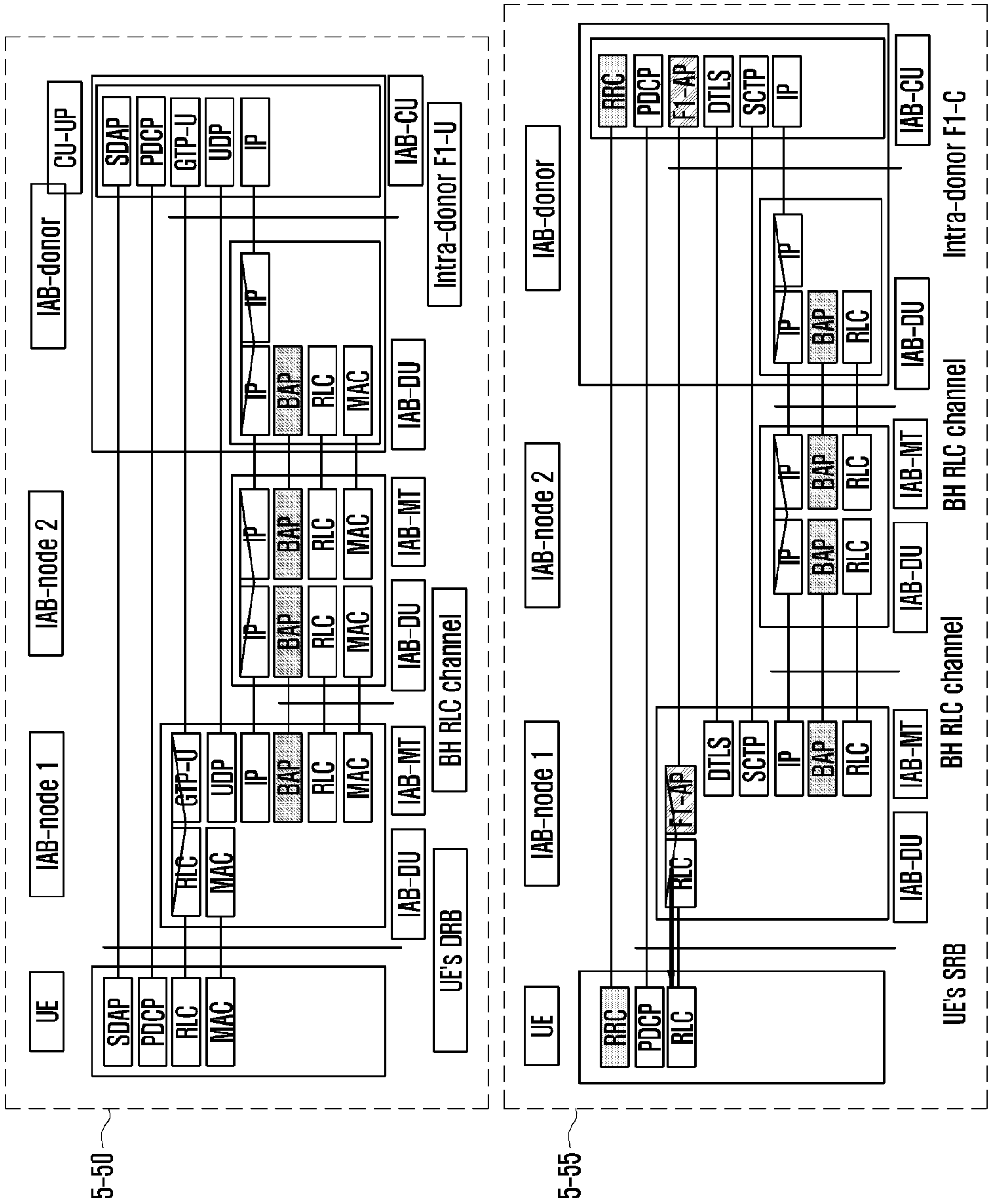
FIG. 5A is a diagram illustrating a protocol structure of a radio node related to the disclosure.
Figure 5B:
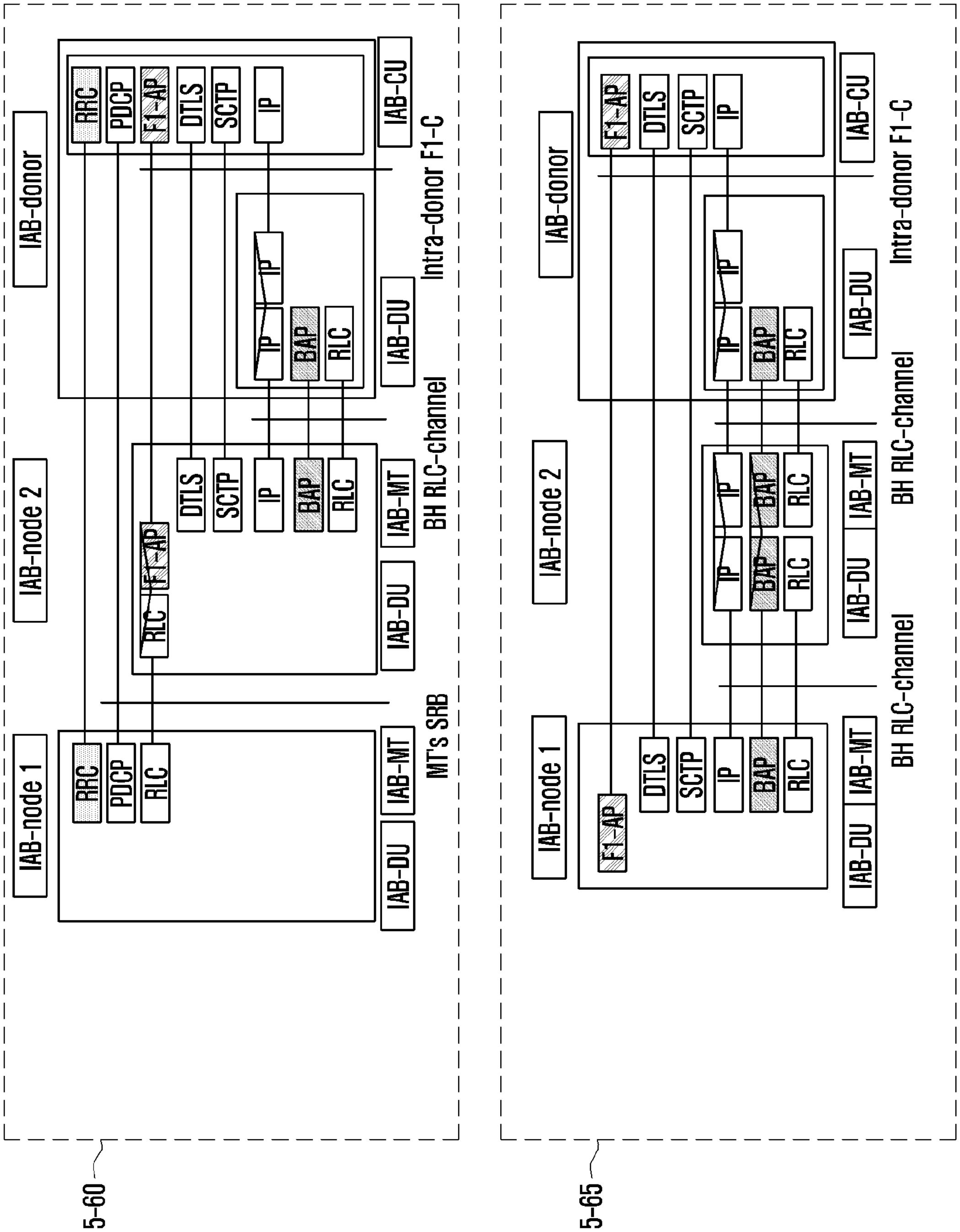
FIG. 5B is a diagram illustrating another protocol structure of a radio node related to the disclosure.

FIG. 4 is a block diagram illustrating a radio protocol structure of a next generation mobile communication system to which the disclosure can be applied.

With reference to FIG. 4, radio protocols of the next generation mobile communication system may include NR BAPs 4-01 and 4-45, NR PDCPs 4-05 and 4-40, NR RLCs 4-10 and 4-35, and NR MACs 4-15 and 4-30) in the radio node (or UE) and the NR base station, respectively.

Main functions of the NR BAPs 4-01 and 4-45 may include some of the following functions.

- Transfer function of user plane data
- Mapping function between a QoS flow (or downlink data stream, uplink data stream, egress link, or ingress link) and a data bearer (RLC bearer, backhaul RLC channel identifier, or backhaul RLC logical channel identifier) for both uplink and downlink (mapping between a QoS flow (or downlink data stream or uplink data stream or egress link or ingress link) and a DRB for both DL and UL)
- Marking function of QoS flow (or downlink data stream or uplink data stream or egress link or ingress link) ID for uplink and downlink (marking QoS flow (or downlink data stream or uplink data stream or egress link or ingress link) ID in both DL and UL packets)
- A function of mapping a reflective QoS flow (or downlink data stream or uplink data stream or egress link or ingress link) to a data bearer (RLC bearer, backhaul RLC channel identifier, or backhaul RLC logical channel identifier) for uplink BAP PDUs (reflective QoS flow (or downlink data stream or uplink data stream or egress link or ingress link) to DRB mapping for the UL BAP PDUs)

For the BAP layer entity, the radio node (or UE) may receive a configuration on whether to use a header of the BAP layer entity for each PDCP layer entity, for each bearer (RLC bearer, backhaul RLC channel identifier, or backhaul RLC logical channel identifier), or for each logical channel with an RRC message, or whether to use a function of the BAP layer entity, and in case where the BAP header (header of BAP DATA PDU) or is BAP CONTROL PDU configured, the radio node (or UE) may instruct to update or reconfigure mapping information on uplink and downlink QoS flows (or downlink data stream or uplink data stream or egress link or ingress link) and data bearer (RLC bearer, backhaul RLC channel identifier, or backhaul RLC logical channel identifier) with NAS QOS reflective configuration 1-bit indicator (NAS reflective QoS) of the BAP header (header of BAP DATA PDU) or BAP CONTROL PDU, and AS QOS reflective configuration 1-bit indicator (AS reflective QoS). The BAP header (header of BAP DATA PDU) or BAP CONTROL PDU may include QoS flow (or downlink data stream or uplink data stream or egress link or ingress link) ID information indicating a QoS. The QoS information may be used as data processing priority, scheduling information, and the like in order to support a smooth service.

Main functions of the NR PDCPs 4-05 and 4-40 may include some of the following functions.

- Header compression and decompression function: ROHC only
- Transfer function of user data
- In-sequence delivery function (In-sequence delivery of upper layer PDUs)
- Out-of-sequence delivery function (Out-of-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering functions
- Timer-based SDU discard function (Timer-based SDU discard in uplink.)

In the above, reordering of the NR PDCP device may refer to a function of reordering PDCP PDUs received from a lower layer in order based on a PDCP sequence number (SN) and may include a function of delivering data to a higher layer in the reordered order or a function of directly delivering data without considering the order, a function of recording lost PDCP PDUs by reordering the order, a function of reporting a status on the lost PDCP PDUs to the transmitting side, and a function of requesting retransmission of the lost PDCP PDUs.

Main functions of the NR RLCs 4-10 and 4-35 may include some of the following functions.

- Data transfer function (Transfer of upper layer PDUs)
- In-sequence delivery function (In-sequence delivery of upper layer PDUs)
- Out-of-sequence delivery function (Out-of-sequence delivery of upper layer PDUs)
- ARQ function (Error Correction through ARQ)
- Concatenation, segmentation and reassembly functions (Concatenation, segmentation and reassembly of RLC SDUs)
- Re-segmentation function (Re-segmentation of RLC data PDUs)
- Reordering function (Reordering of RLC data PDUs)
- Duplicate detection function
- Error detection function (Protocol error detection)
- RLC SDU discard function
- RLC re-establishment function In the above, in-sequence delivery of the NR RLC device may refer to a function of delivering RLC SDUs received from a lower layer in order to a higher layer, and in case where one RLC SDU is originally divided into several RLC SDUs and received, the in-sequence delivery of the NR RLC device may include a function of reassembling and delivering several RLC SDUs, a function of reordering the received RLC PDUs based on an RLC sequence number (SN) or PDCP SN (sequence number), a function of recording the lost RLC PDUs by reordering the order, a function of reporting a status on the lost RLC PDUs to the transmitting side, a function of requesting retransmission of the lost RLC PDUs, and a function of delivering only RLC SDUs before the lost RLC SDU in order to the upper layer in case where there is a lost RLC SDU, a function of delivering all received RLC SDUs in order to the upper layer before the start of a timer when a predetermined timer has expired, even if there is a lost RLC SDU, or a function of delivering all RLC SDUs received so far in order to the upper layer when a predetermined timer has expired, even if there is a lost RLC SDU. Further, the RLC PDUs may be processed in order in which they are received (in the order of arrival regardless of the sequence number and the order of the sequence number) to be delivered to the PDCP device with out-of sequence delivery, and segments may be stored in the buffer or segments to be received later may be received, be reconfigured into one complete RLC PDU, be processed, and delivered to the PDCP device. The NR RLC layer may not include a concatenation function, and the concatenation function may be performed in the NR MAC layer or may be replaced with a multiplexing function of the NR MAC layer.

In the above, out-of-sequence delivery of the NR RLC device may refer to a function of directly delivering RLC SDUs received from a lower layer to a higher layer regardless of the order, and in case where one RLC SDU is originally divided into several RLC SDUs and received, out-of-sequence delivery of the NR RLC device may include a function of reassembling and delivering several RLC SDUs, and a function of storing the RLC SN or PDCP SN of the received RLC PDUs, ordering the order thereof, and recording the lost RLC PDUs.

The NR MACs 4-15 and 4-30 may be connected to several NR RLC layer entities configured in one radio node (or UE), and main functions of the NR MAC may include some of the following functions.

Mapping function (Mapping between logical channels and transport channels)

Multiplexing/demultiplexing functions (Multiplexing/demultiplexing of MAC SDUs)

Scheduling information reporting function

HARQ function (Error correction through HARQ)

Priority handling function between logical channels (Priority handling between logical channels of one UE)

Priority handling function between radio nodes (or UEs) (Priority handling between UEs by means of dynamic scheduling)

MBMS service identification function

Transport format selection function

Padding function

The NR PHY layers 4-20 and 4-25 may perform an operation of channel-coding and modulating upper layer data, making the upper layer data into an OFDM symbol and transmitting the OFDM symbol using the radio channel, or demodulating and channel-deciphering the OFDM symbol received through the radio channel to deliver the OFDM symbol to the upper layer.

In FIGS. 5, 5-50, 5-55, 5-60, and 7-65 represent protocol layer entities that process and receive data, or process and transmit data, or route data, or configure BAP configuration information via an RRC message, configure BAP configuration information via a F1AP message at the UE or IAB radio node.

In 5-50, the UE or radio node (IAB-MT) may transmit or receive data through protocol layer entities of a radio node 1 (IAB-DU) or radio node 2 (IAB-DU). In addition, in 5-55, the UE may transmit or receive an RRC message to configure the highest radio node (IAB donor) with RRC connection configuration information or BAP layer entity configuration information through the radio node 1 (IAB-DU) or the radio node 2 (IAB-DU).

In 5-60, the radio node 1 (IAB-MT) may transmit or receive the RRC message and perform RRC connection configuration of the highest radio node (IAB donor) with the RRC connection configuration information through the radio node 2. In 5-65, the radio node 1 (IAB-MT or IAB-DU) may transmit or receive a F1AP (F1 application protocol) message and perform configuration of the highest radio node (IAB donor) with the BAP layer entity configuration information through the radio node 2.

Figure 6:
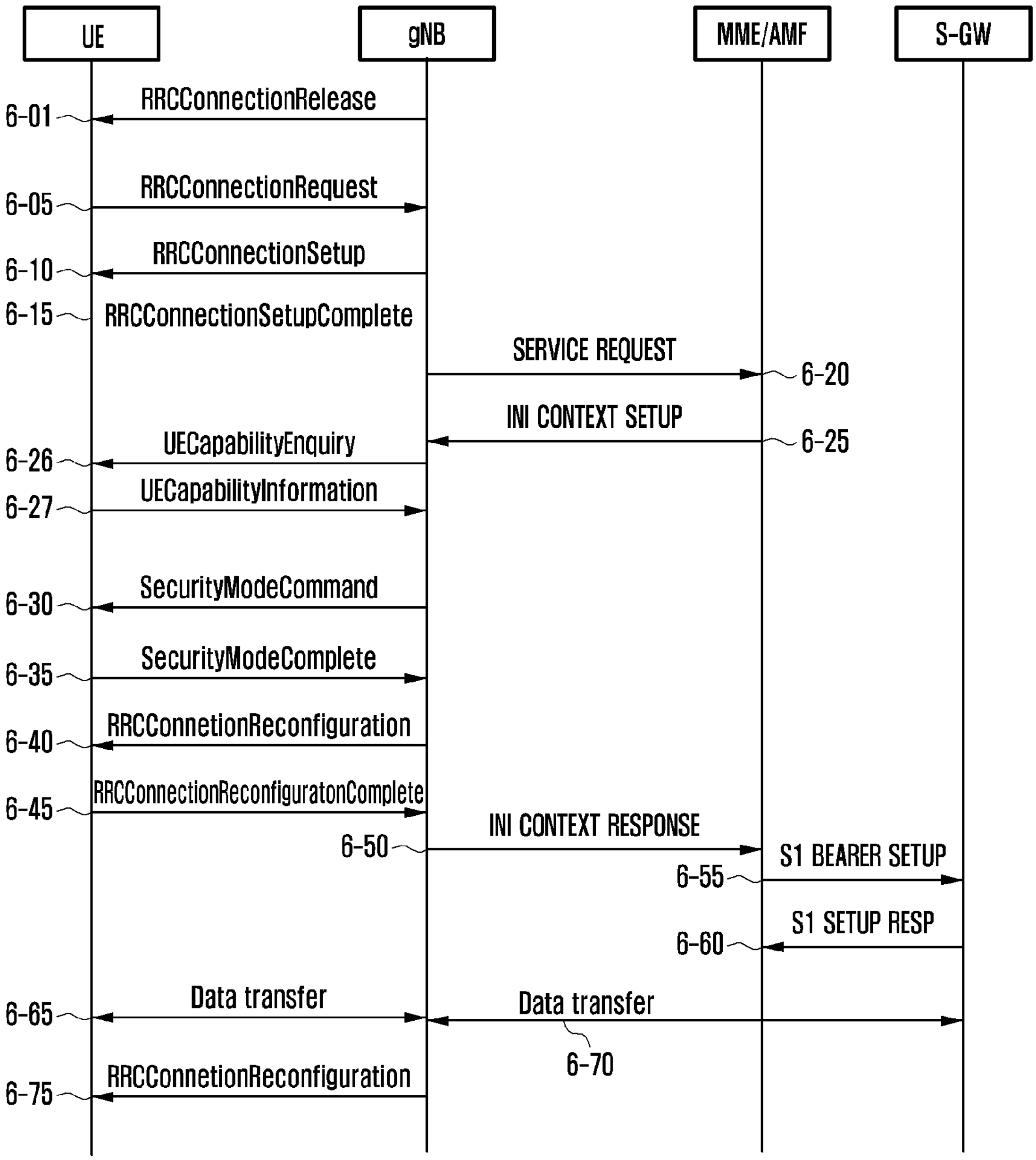
FIG. 6 is a diagram for explaining a procedure in which a radio node (or UE) switches from a radio resource control (RRC) idle mode to an RRC connected mode to establish a connection with a network in the disclosure.

FIG. 6 is a diagram illustrating a procedure in which a radio node (or UE) switches from an RRC idle mode to an RRC connected mode to establish a connection with a network in the disclosure.

In FIG. 6, the base station may transmit an RRCConnectionRelease message to the radio node (or UE) when the radio node (or UE) that transmits and receives data in the RRC connected mode does not transmit or receive data for a predetermined reason or for a certain period of time to switch a mode of the radio node (or UE) to the RRC idle mode (6-01). In the future, a radio node (or UE) in which connection is not currently established (hereinafter, idle mode UE) may perform an RRC connection establishment process with the base station when data to be transmitted occurs. The radio node (or UE) establishes reverse transmission synchronization with the base station through a random access process and transmits an RRCConnectionRequest message to the base station (6-05). The message may include an identifier of the radio node (or UE) and a reason for establishing a connection (establishmentCause). The base station transmits an RRCConnectionSetup message so that the radio node (or UE) establishes RRC connection (6-10). The message may include configuration information for each service/bearer (RLC bearer, backhaul RLC channel identifier, or backhaul RLC logical channel identifier)/each RLC device, for each logical channel, or for each bearer (RLC bearer, backhaul RLC channel identifier, or backhaul RLC logical channel identifier), whether to use robust header compression (ROHC) for each bearer (RLC bearer, backhaul RLC channel identifier, or backhaul RLC logical channel identifier)/logical channel, and ROHC configuration information (e.g., ROHC version, initial information, etc.), statusReportRequired information (information that the base station instructs a BAP status report to the radio node (or UE)), and drb-ContinueROHC information (configuration information to maintain and use the ROHC configuration information as it is) may be included in BAP layer entity configuration information (BAP-config) and transmitted. Further, the message may include RRC connection configuration information and the like. The bearer (RLC bearer, backhaul RLC channel identifier, or backhaul RLC logical channel identifier) for RRC connection is also referred to as a signaling radio bearer (SRB), and may be used for transmitting and receiving RRC messages, which are control messages between the radio node (or UE) and the base station. The radio node (or UE) that has established the RRC connection transmits an RRCConnetionSetupComplete message to the base station (6-15). The message includes a control message called SERVICE REQUEST in which the radio node (or UE) requests an MME to establish a bearer (RLC bearer, backhaul RLC channel identifier, or backhaul RLC logical channel identifier) for a predetermined service. The base station transmits a SERVICE REQUEST message included in the RRCConnetionSetupComplete message to the mobility management entity (MME) or an access and mobility management function (AMF) (6-20), and the MME or the AMF may determine whether to provide a service requested by the radio node (or UE). As a result of the determination, when the radio node (or UE) determines to provide the requested service, the MME or the AMF transmits an INITIAL CONTEXT SETUP REQUEST message to the base station (6-25). The message may include information such as quality of service (QOS) information to be applied when configuring a data radio bearer (DRB), and security related information (e.g., security key, security algorithm) to be applied to the DRB Further, in case where the base station does not receive capability information of the radio node (or UE) from the MME or the AMF, in order to identify the capability information of the radio node (or UE), the base station may transmit a radio node (or UE) capability information request message to the radio node (or UE) (6-26). Upon receiving the radio node (or UE) capability information request message, the radio node (or UE) may configure and generate a radio node (or UE) capability information message and report the radio node (or UE) capability information message to the base station (6-27). The radio node (or UE) capability information message may include what types of handover methods the radio node (or UE) supports. For example, the radio node (or UE) capability may be reported to the base station through an indicator indicating whether or not the radio node (or UE) supports the efficient handover method (dual active protocol stack (DAPS)) proposed in the disclosure. When the base station identifies the radio node (or UE) capability information, the base station may instruct the radio node (or UE) by defining an indicator for each handover method as to which handover is instructed in the handover command message when instructing handover to the radio node (or UE). For example, the efficient handover method (DAPS handover method) proposed in the disclosure may be instructed to the radio node (or UE). As another method, the DAPS handover method may be configured for each bearer (RLC bearer, backhaul RLC channel identifier, or backhaul RLC logical channel identifier) (DRB or SRB) of the radio node (or UE). In the above, when the base station configures the DAPS handover method to the radio node (or UE), other handover methods (e.g., conditional handover method (a method in which configuration of a plurality of target cells and a plurality of conditions are configured to the radio node (or UE), and when the radio node (or UE) satisfies the condition in a cell selection or reselection procedure, the radio node (or UE) performs a handover procedure to one target cell) or a handover method without random access procedure) are instructed together to prevent data loss or transmission delay that may occur during handover. The radio node (or UE) may perform a handover procedure to the target base station according to the handover method instructed in the handover command message.

In order to establish security with the radio node (or UE), the base station may exchange a Security ModeCommand message 6-30 and a Security ModeComplete message 6-35. When security establishment is completed, the base station transmits an RRCConnectionReconfiguration message to the radio node (or UE) (6-40).

The message includes configuration information for each service/bearer (RLC bearer, backhaul RLC channel identifier, or backhaul RLC logical channel identifier)/each RLC device, for each logical channel, or for each bearer (RLC bearer, backhaul RLC channel identifier, or backhaul RLC logical channel identifier), and whether to use a ROHC for each bearer (RLC bearer, backhaul RLC channel identifier, or backhaul RLC logical channel identifier)/logical channel, ROHC configuration information (e.g., ROHC version, initial information, etc.), statusReportRequired information (information that the base station instructs the radio node (or UE) to report a BAP status report), and drb-ContinueROHC information (configuration information to maintain and use the ROHC configuration information as it is) may be included in BAP layer entity configuration information (BAP-config) and transmitted. Further, the message may include RRC connection configuration information and the like. The bearer (RLC bearer, backhaul RLC channel identifier, or backhaul RLC logical channel identifier) for RRC connection is also referred to as SRB, and may be used for transmitting and receiving RRC messages, which are control messages between the radio node (or UE) and the base station.

Further, the message includes configuration information of a DRB in which user data is to be processed, and the radio node (or UE) configures the DRB by applying the information, and transmits an RRCConnectionReconfigurationComplete message to the base station (6-45). The base station that has completed a DRB configuration with the radio node (or UE) transmits an INITIAL CONTEXT SETUP COMPLETE message to the MME or AMF (6-50), and the MME or AMF that has received the INITIAL CONTEXT SETUP COMPLETE message exchanges an S1 BEARER SETUP message and an S1 BEARER SETUP RESPONSE message in order to configure the S1 bearer (RLC bearer, backhaul RLC channel identifier, or backhaul RLC logical channel identifier) with the S-GW. (6-055, 6-60). The S1 bearer (RLC bearer, backhaul RLC channel identifier, or backhaul RLC logical channel identifier) is data transmission connection established between the S-GW and the base station, and may correspond to the DRB in a one-to-one manner. When all the above processes are completed, the radio node (or UE) transmits and receives data to and from the base station through the S-GW (6-65, 6-70). In this way, a general data transmission process may be largely configured with three steps of an RRC connection configuration, a security configuration, and a DRB configuration. Further, in order to reconfigure, add, or change a configuration to the radio node (or UE) for a predetermined reason, the base station may transmit an RRC Connection Reconfiguration message to the radio node (or UE) (6-75).

In the disclosure, the bearer (RLC bearer, backhaul RLC channel identifier, or backhaul RLC logical channel identifier) may include an SRB and a DRB. The SRB is mainly used for transmitting and receiving RRC messages of the RRC layer entity, and the DRB may be mainly used for transmitting and receiving user layer data. An UM DRB means a DRB using an RLC layer entity operating in an unacknowledged mode (UM) mode, and an AM DRB means a DRB using an RLC layer entity operating in an acknowledged mode (AM).

In the disclosure, the bearer (RLC bearer, backhaul RLC channel identifier, or backhaul RLC logical channel identifier) for which the DAPS handover method is configured may mean or indicate that the identifier of the bearer (RLC bearer, backhaul RLC channel identifier, or backhaul RLC logical channel identifier) configured in the RRC message is included in the list of bearers (RLC bearers, backhaul RLC channel identifiers, or backhaul RLC logical channel identifiers) for which the DAPS handover method is configured, or that the identifier of the bearer (RLC bearer, backhaul RLC channel identifier, or backhaul RLC logical channel identifier) configured in the RRC message is not included in the list of bearers (RLC bearers, backhaul RLC channel identifiers, or backhaul RLC logical channel identifiers) for which the DAPS handover method is not configured, or that there is the DAPS handover method configuration indicator in the configuration information for each bearer (RLC bearer, backhaul RLC channel identifier, or backhaul RLC logical channel identifier), or the bearer (RLC bearer, backhaul RLC channel identifier, or backhaul RLC logical channel identifier) in which the DAPS handover method configuration indicator is configured in the BAP layer entity configuration information.

In the disclosure, the bearer (RLC bearer, backhaul RLC channel identifier, or backhaul RLC logical channel identifier) for which the DAPS handover method is not configured may mean or indicate that the identifier of the bearer (RLC bearer, backhaul RLC channel identifier, or backhaul RLC logical channel identifier) configured in the RRC message is not included in the list of bearers (RLC bearers, backhaul RLC channel identifiers, or backhaul RLC logical channel identifiers) for which the DAPS handover method is configured, or that the identifier of the bearer (RLC bearer, backhaul RLC channel identifier, or backhaul RLC logical channel identifier) configured in the RRC message is included in the list of bearers (RLC bearers, backhaul RLC channel identifiers, or backhaul RLC logical channel identifiers) for which the DAPS handover method is not configured, or that there is no DAPS handover method configuration indicator in the configuration information for each bearer (RLC bearer, backhaul RLC channel identifier, or backhaul RLC logical channel identifier), or the bearer (RLC bearer, backhaul RLC channel identifier, or backhaul RLC logical channel identifier) in which the DAPS handover method configuration indicator is not configured in the BAP layer entity configuration information.

In the disclosure, a source base station may be interpreted as a source cell (primary cell (Pcell), special cell (Spcell), or secondary cell (SCell)) or a source cell group (cell group or master cell group), and a target base station may be interpreted as a target cell. (Pcell or Spcell or SCell) or a target cell group (cell group or master cell group).

In the above, each radio node may receive configuration information (bap-config) of the BAP layer entity through an RRC message (e.g., an RRCReconfiguration message) from the highest radio node (IAB donor). The configuration information of the BAP layer entity may be configured with the BAP layer entity address (bap-address) of the radio node, an default radio node uplink routing identifier (defaultUL (Uplink)-BAP-RoutingID), a default uplink backhaul RLC channel identifier (defaultUL(Uplink)-BH-RLC channel) or a congestion control feedback type (flow control feedback type). In the above, the BAP layer entity address may be allocated for each radio node, represent a unique address of the BAP layer entity of each radio node, and be an address that may be considered together with a path identifier when routing (or forwarding) BAP layer entity data (BAP PDUs) on the uplink or downlink from the BAP layer entity to another radio node. In the above, when the uplink data is generated in the radio node, if a routing identifier or a backhaul RLC channel identifier or mapping information is not configured in the radio node, the default radio node uplink routing identifier or default uplink backhaul RLC channel identifier may be used as a default transmission path (default link) through which the uplink data is transmitted by default or which can transmit the uplink data by default. In the above, when the BAP layer entity receives BAP layer entity control data (BAP control PDU) including an indicator requesting a congestion status, the BAP layer entity may indicate whether to report the congestion status for each backhaul RLC channel or for each routing identifier.

In case where the handover procedure proposed in the disclosure is applied to a radio node in the BAP layer entity configuration information, when the BAP layer entity configuration information for the source base station is configured to the RRC message at the radio node, the base station may configure the BAP layer entity configuration information for the target base station to the UE via a handover command message (RRCReconfiguration). In the BAP layer entity configuration information for the source base station, a BAP layer entity address (bap-address) for the source base station may be configured, and in the BAP layer entity configuration information for the target base station, the BAP layer entity address for the target base station (bap-address) may be configured.

If the radio node performs the handover procedure proposed in the disclosure, the default radio node uplink routing identifier (defaultUL(Uplink)-BAP-RoutingID) or the default uplink backhaul RLC channel identifier (defaultUL (Uplink)-BH-RLC channel) may indicate a routing identifier or backhaul RLC channel for a target base station (or egress link) through the configuration information of the BAP layer entity. Alternatively, if the radio node does not perform the handover procedure proposed in the disclosure, the default radio node uplink routing identifier (defaultUL(Uplink)-BAP-RoutingID) or the default uplink backhaul RLC channel identifier (defaultUL(Uplink)-BH-RLC channel) may indicate a routing identifier or backhaul RLC channel for a source base station (or egress link) through the configuration information of the BAP layer entity. Alternatively, if the radio node performs the handover procedure proposed in the disclosure and before the radio node satisfies a first condition, the default radio node uplink routing identifier (defaultUL(Uplink)-BAP-RoutingID) or the default uplink backhaul RLC channel identifier (defaultUL(Uplink)-BH-RLC channel) may indicate a routing identifier or backhaul RLC channel for a source base station (or egress link) through the configuration information of the BAP layer entity. If the radio node performs the handover procedure proposed in the disclosure and satisfies the first condition, the default radio node uplink routing identifier (defaultUL(Uplink)-BAP-RoutingID) or the default uplink backhaul RLC channel identifier (defaultUL(Uplink)-BH-RLC channel) may indicate a routing identifier or backhaul RLC channel for a target base station (or egress link) through the configuration information of the BAP layer entity.

In addition, in the RRC message (e.g., RRCReconfiguration message), RLC backhaul channel configuration information may be configured as configuration information of a BAP layer entity, and the configuration information may be configured with a backhaul logical channel identifier (bh-LogicalchannelIdentity), a backhaul RLC channel identifier (bh-RLC-Channel ID), an RLC re-establishment indicator, or a logical channel identifier required for a logical channel prioritization (LCP) procedure (for example, priority or bitrate for priority or configuration information for logical channel selection). In the above, the backhaul logical channel identifier may be configured with a logical channel identity value or an extended logical channel identity value.

In the above, each radio node may be configured with the mapping information of the BAP layer entity address (IAB donor DU's BAP address) of the DU of the highest radio node or the BAP layer entity address of the next hop (next hop BAP address) and the transmission link of the downlink data stream (downstream egress link), or mapping information of the BAP layer entity address of the next hop (next hop BAP address) and the transmission link of the uplink data stream (upstream egress link), or mapping information of the data traffic (next hop BAP address) of the upper layer entity and the BAP routing identifier included in the header of the BAP layer entity, or the BAP routing table or entries (BAP routing entries), as the configuration information of the BAP layer entity, from the highest radio node (IAB donor) through F1 Application Protocol (F1AP) message. In the above, the transmission link and the reception link may indicate path information to be transmitted or received when data is routed between radio nodes.

Figure 7:
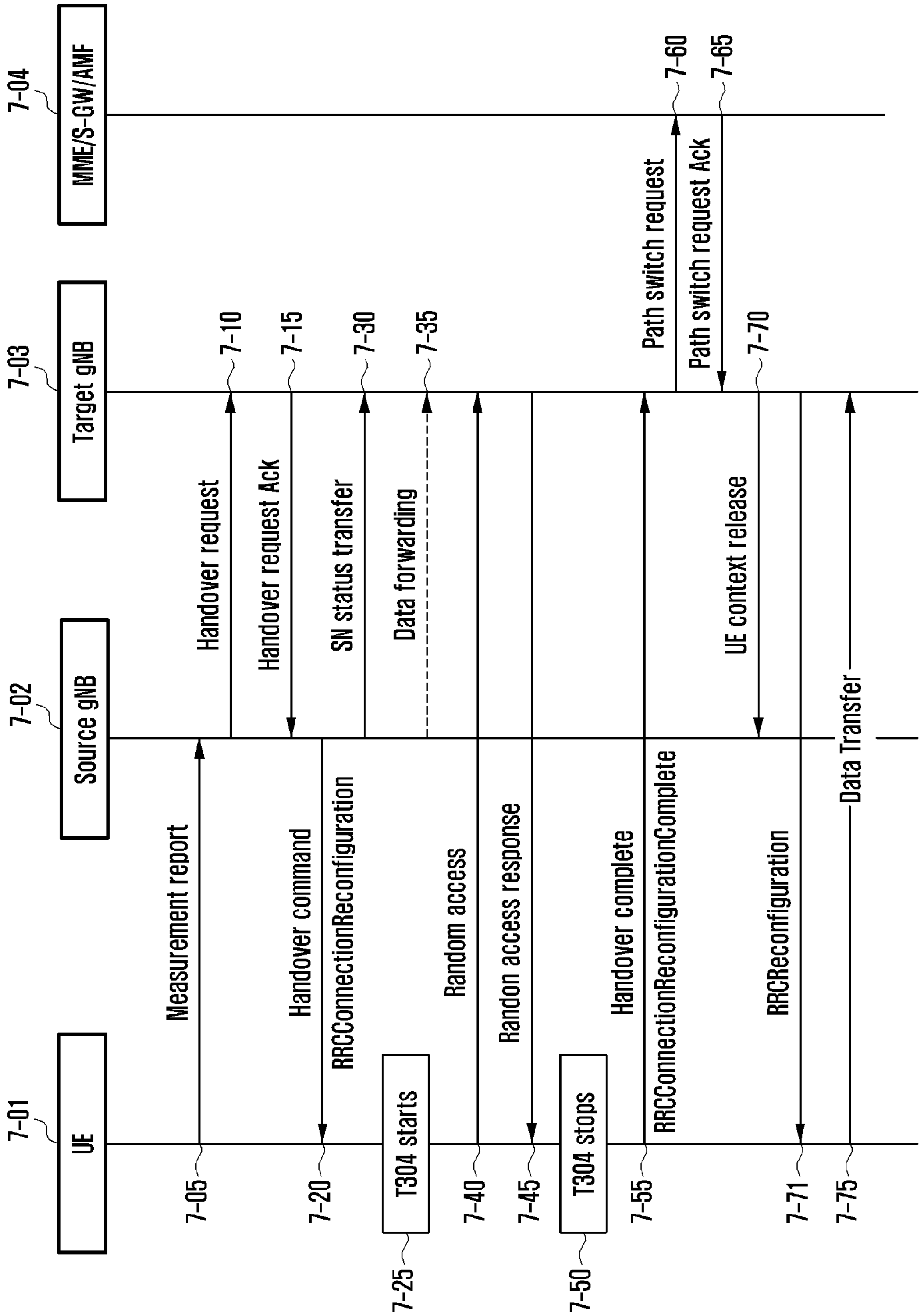
FIG. 7 is a diagram illustrating signaling procedures for performing handover proposed in the disclosure in a next generation mobile communication system.

FIG. 7 is a diagram illustrating signaling procedures for performing handover proposed in the disclosure in a next generation mobile communication system.

A radio node (or UE) 7-01 in an RRC connected mode reports cell measurement information (measurement report)

to a current source base station (source eNB) 7-02 periodically or when a specific event is satisfied (7-05). The source base station may determine whether the radio node (or UE) is to perform handover to a neighboring cell based on the measurement information. Handover is technology for changing a source base station providing a service to a radio node (or UE) in a connected mode to another base station (or another cell of the same base station). When the source base station determines handover, the source base station sends a handover (HO) request message (e.g., Handover Preparation Information message) to a new base station, that is, a target base station (target eNB) 7-03 that will provide a service to the radio node (or UE) to request handover (7-10). When the target base station accepts the handover request, the target base station transmits a HO request Ack message (e.g., Handover Command message) to the source base station (7-15). The source base station that has received the message, transmits a handover command message (HO command message, RRCReconfiguration message included in dedicated control channel (DCCH) of the HO request Ack message) to the radio node (or UE) (7-20). The HO command message is extracted by the source base station from the message received from the target base station and transmitted to the radio node (or UE) using an RRC Connection Reconfiguration message (7-20). For the IAB node, the above-described handover procedure may be applied as a migration procedure.

The disclosure proposes a method wherein, when the source base station transmits the handover preparation information message 7-10 to the target base station as described above, and when the target base station transmits the handover command message 7-15 to the source base station in response thereto, the two messages are used to determine an efficient DAPS handover method proposed in the disclosure.

The first embodiment of the above method for determining an efficient DAPS handover method (or IAB migration method or DAPS IAB migration method) proposed by the disclosure is as follows:

The first embodiment may be characterized in that the entity which determines the DAPS handover method (or IAB migration method or DAPS IAB migration method) is the source base station. The first embodiment may also be characterized in that, in case where the source base station has requested the target base station to perform a DAPS handover method, the target base station always indicates or performs the DAPS handover method.

The source base station may define a new indicator in the handover preparation information message, thereby indicating and requesting to the target base station that the source base station will perform the DAPS handover method proposed by the disclosure. The handover preparation information message may include the radio node (or UE)'s current bearer (RLC bearer, backhaul RLC channel identifier, or backhaul RLC logical channel identifier) configuration information, security key information, cell group configuration information, radio node (or UE) capability information, or the like. The source base station may share the capability of the target base station in advance, thereby identifying whether or not the target base station supports the DAPS handover method in advance. In the above, the source base station may indicate to the target base station that the source base station will perform the DAPS handover method, thereby informing the target base station that the source base station may perform data forwarding quickly or early (that is, early data forwarding), and may instruct the target base station to receive data forwarding and to be prepared for quick processing thereof. In the above, the source base station may send a request regarding the DAPS handover method for each bearer (RLC bearer, backhaul RLC channel identifier, or backhaul RLC logical channel identifier) (DRB or SRB) or for each radio node, or for each link (egress link or ingress link).

In case where the target base station has received the handover preparation information message and has identified that an indicator that requests the DAPS handover method is included, the target base station may configure an RRCReconfiguration message, which will be used to indicate a handover to the radio node (or UE), such that the RRCReconfiguration message includes an indicator that indicates the DAPS handover method (or IAB migration method or DAPS IAB migration method) and includes bearer (RLC bearer, backhaul RLC channel identifier, or backhaul RLC logical channel identifier) configuration information necessary for the radio node (or UE) to perform the DAPS handover method, bearer (RLC bearer, backhaul RLC channel identifier, or backhaul RLC logical channel identifier) configuration information, security key information, cell group configuration information, or system information. Further, the target base station may include the configured RRCReconfiguration message in the DL-DCCH message of the handover command message and may transmit the same to the source base station. In the above, the target base station may separately indicate the DAPS handover method with regard to each bearer (RLC bearer, backhaul RLC channel identifier, or backhaul RLC logical channel identifier) (DRB or SRB), each radio node, or each link (egress link or ingress link).

In the above, if the source base station receives the handover command message, the source base station may extract the RRCReconfiguration message included in the handover command message, or may transmit the RRCReconfiguration message to the radio node (or UE), thereby indicating a handover. In the above, the source base station may identify the indicated DAPS handover method with regard to each bearer (RLC bearer, backhaul RLC channel identifier, or backhaul RLC logical channel identifier), thereby performing the DAPS handover method with regard to each bearer (RLC bearer, backhaul RLC channel identifier, or backhaul RLC logical channel identifier) (DRB or SRB), each radio node, or each link (egress link or ingress link).

In the above, the second embodiment of the method for determining an efficient DAPS handover method proposed by the disclosure is as follows:

The second embodiment may be characterized in that the entity which determines the DAPS handover method is the target base station. The second embodiment may also be characterized in that, in case where the source base station has requested, by using an indicator, the target base station to perform a DAPS handover method, the target base station may reject the request, may accept the same, or may indicate another handover method to the source base station through a handover command message.

The source base station may define a new indicator in the handover preparation information message, thereby indicating and requesting to the target base station that the source base station will perform the DAPS handover method proposed by the disclosure. The handover preparation information message may include the radio node (or UE)'s current bearer (RLC bearer, backhaul RLC channel identifier, or backhaul RLC logical channel identifier) configuration information, security key information, cell group configuration information, radio node (or UE) capability information, or the like. In the above, the source base station may share the capability of the target base station in advance, thereby identifying whether or not the target base station supports the DAPS handover method in advance. In the above, the source base station may indicate to the target base station that the source base station will perform the DAPS handover method, thereby informing the target base station that the source base station may perform data forwarding early (that is, early data forwarding), and may instruct the target base station to receive data forwarding and to be prepared for quick processing thereof. In the above, the source base station may send a request regarding the DAPS handover method to each bearer (RLC bearer, backhaul RLC channel identifier, or backhaul RLC logical channel identifier) (DRB or SRB), each radio node, or each link (egress link or ingress link).

In the above, in case where the target base station has received the handover preparation information message and has identified that an indicator that requests the DAPS handover method is included, the target base station may reject or accept the request regarding the DAPA handover according to whether or not the target base station can support the DAPS handover method, the current amount of transmission resources, or the scheduling situation. Alternatively, the target base station may indicate another handover method. The target base station may include, in the handover command message, an indicator that rejects the request regarding the DAPS handover method, an indicator that accepts the request, or an indicator that indicates a different kind of handover method, and may transmit the same to the source base station. The target base station may configure an RRCReconfiguration message, which will be used to indicate a handover to the radio node (or UE), such that the RRCReconfiguration message includes an indicator that indicates the DAPS handover method in case where the DAPS handover request has been accepted, includes an indicator that indicates another handover method in case where the DAPS handover request has been rejected, and includes bearer (RLC bearer, backhaul RLC channel identifier, or backhaul RLC logical channel identifier) configuration information necessary for the radio node (or UE) to perform the DAPS handover method or another DAPS handover, bearer (RLC bearer, backhaul RLC channel identifier, or backhaul RLC logical channel identifier) configuration information, security key information, cell group configuration information, or system information. Further, the target base station may include the configured RRCReconfiguration message in the DL-DCCH message of the handover command message and may transmit the same to the source base station. In the above, the target base station may separately indicate the DAPS handover method with regard to each bearer (RLC bearer, backhaul RLC channel identifier, or backhaul RLC logical channel identifier) (DRB or SRB), each radio node, each link (egress link or ingress link).

In the above, if the source base station receives the handover command message, the source base station may identify the indicator included in the handover command message, thereby identifying whether or not the request regarding the DAPS handover method has been accepted or rejected. In case where the request has been accepted, the source base station may also perform the DAPS handover method, and may extract the RRCReconfiguration message included in the handover command message, or may transmit the RRCReconfiguration message to the radio node (or UE), thereby indicating a handover. However, if it is identified as a result of identifying the indicator included in the handover command message that the request regarding the DAPS handover method has been rejected, or if another handover method has been indicated, the source base station may also perform another handover method indicated by the target base station. In addition, the source base station may extract the RRCReconfiguration message included in the handover command message, or may transmit the RRCReconfiguration message to the radio node (or UE), thereby indicating a handover. As another method, in the above, even if the handover command message includes no separate indicator, the source base station may read the RRCReconfiguration message included in the handover command message, thereby identifying what handover method has been indicated by the target base station, and identifying whether the request regarding the DAPS handover method has been accepted or rejected. The source base station may also perform the handover method indicated in the RRCReconfiguration message (for example, DAPS handover method or another handover method). In the above, the source base station may identify the indicated DAPS handover method with regard to each bearer (RLC bearer, backhaul RLC channel identifier, or backhaul RLC logical channel identifier), thereby performing the DAPS handover method with regard to each bearer (RLC bearer, backhaul RLC channel identifier, or backhaul RLC logical channel identifier) (DRB or SRB), each radio node, or each link (egress link or ingress link).

The third embodiment of the method for determining an efficient DAPS handover method proposed by the disclosure is as follows:

The third embodiment may be characterized in that the entity which determines the DAPS handover method is the target base station. The third embodiment may also be characterized in that the target base station identifies the capability of the radio node (or UE) and determines the handover method (for example, DAPS handover method) according to whether or not the target base station can support the DAPS handover method, the current amount of transmission resources, or the scheduling situation.

The source base station may include, in the handover preparation information message, the radio node (or UE)'s current bearer (RLC bearer, backhaul RLC channel identifier, or backhaul RLC logical channel identifier) configuration information, security key information, cell group configuration information, radio node (or UE) capability information, or the like, and may transmit the message in order to request the target base station to perform a handover. In the above, the source base station may share the capability of the target base station in advance, thereby identifying whether or not the target base station supports the DAPS handover method in advance. In case where the target base station has indicated that the same will perform the DAPS handover method, the source base station may perform data forwarding quickly or early (that is, early data forwarding).

In the above, the target base station may receive the handover preparation information message and may determine the handover method (for example, DAPS handover method) according to radio node (or UE) capability information, whether or not the target base station can support the DAPS handover method, the current amount of transmission resources, or the scheduling situation. In the above, in case where the DAPS handover method has been determined, the target base station may include, in the handover command message, an indicator that indicates the DAPS handover method and may transmit the same. In the above, the target base station may configure an RRCReconfiguration message, which will be used to indicate a handover to the radio node (or UE) in case where the DAPS handover method has been determined, such that the RRCReconfiguration message includes an indicator that indicates the DAPS handover method, includes an indicator that indicates another handover method in case where another handover method other than the DAPS handover method has been determined, and includes bearer (RLC bearer, backhaul RLC channel identifier, or backhaul RLC logical channel identifier) configuration information necessary for the radio node (or UE) to perform the DAPS handover method or another handover method, bear (RLC bearer, backhaul RLC channel identifier, or backhaul RLC logical channel identifier) configuration information, security key information, cell group configuration information, or system information. Further, the target base station may include the configured RRCReconfiguration message in the DL-DCCH message of the handover command message and may transmit the same to the source base station. In the above, the target base station may separately indicate the DAPS handover method with regard to each bearer (RLC bearer, backhaul RLC channel identifier, or backhaul RLC logical channel identifier) (DRB or SRB), each radio node, or each link (egress link or ingress link).

If the source base station receives the handover command message, the source base station may identify the indicator included in the handover command message, thereby identifying whether or not the DAPS handover method has been determined. In case where the DAPS handover method is indicated, the source base station may also perform the DAPS handover method, and may extract the RRCReconfiguration message included in the handover command message, or may transmit the RRCReconfiguration message to the radio node (or UE), thereby indicating a handover. However, if it is identified as a result of identifying the indicator included in the handover command message that the DAPS handover method has not been determined, or if another handover method has been indicated, the source base station may also perform another handover method indicated by the target base station. In addition, the source base station may extract the RRCReconfiguration message included in the handover command message, or may transmit the RRCReconfiguration message to the radio node (or UE), thereby indicating a handover. As another method, even if the handover command message includes no separate indicator, the source base station may read the RRCReconfiguration message included in the handover command message, thereby identifying what handover method has been indicated by the target base station, and identifying whether or not a determination regarding the DAPS handover method has been made. In case where another handover method has been indicated, the source base station may also perform the indicated handover method. In the above, the source base station may identify the indicated DAPS handover method with regard to each bearer (RLC bearer, backhaul RLC channel identifier, or backhaul RLC logical channel identifier), thereby performing the DAPS handover method with regard to each bearer (RLC bearer, backhaul RLC channel identifier, or backhaul RLC logical channel identifier) (DRB or SRB), each radio node, or each link (egress link or ingress link).

The methods of the first, second, or third embodiment for determining an efficient DAPS handover method proposed by the disclosure may be combined and extended into a new embodiment.

The base station may indicate, through the RRCReconfiguration message, an efficient handover method (DAPS handover method) proposed by the disclosure to the radio node (or UE). As another method, the base station may configure the DAPS handover method with regard to each bearer (RLC bearer, backhaul RLC channel identifier, or backhaul RLC logical channel identifier) (DRB or SRB) of the radio node (or UE), each radio node, or each link (egress link or ingress link). For example, the source base station or the target base station may define a new indicator that indicates the efficient handover method (DAPS handover method) in bearer (RLC bearer, backhaul RLC channel identifier, or backhaul RLC logical channel identifier) configuration information, BAP configuration information, or RLC configuration information, with regard to each bearer (RLC bearer, backhaul RLC channel identifier, each backhaul RLC logical channel identifier) identifier, each logical channel identifier (LCID), each radio node, or each link (egress link or ingress link) through the RRC message, and may use the indicator so as to indicate the efficient handover method to the radio node (or UE) with regard to each bearer (RLC bearer, backhaul RLC channel identifier, or backhaul RLC logical channel identifier) or each logical channel identifier. When the base station configures the DPAS handover method for the radio node (or UE), the same may be indicated together with other handover methods (for example, conditional handover method (a plurality of target cells are configured: a plurality of conditions are configured for the radio node (or UE); and if the conditions are satisfied during a cell selection or reselection procedure by the radio node (or UE), the radio node (or UE) performs a procedure of handover to one target cell), or a handover method without random access procedure), thereby preventing data loss or transmission delay that may otherwise occur during a handover. If the message is received, the radio node (or UE) suspends data transmission/reception with the source base station according to the configured handover method, or continues to perform the same, and starts a T304 timer. T304 refers to a timer configured such that, in case where the radio node (or UE) fails to hand over to the target base station for a predetermined time (for example, in case where T304 timer has expired), the original configuration of the radio node (or UE) is restored, and the same switches to the RRC idle state. In addition, an RRC connection reestablishment procedure may be triggered based on the T304 timer. As another method, if an efficient handover method has been configured, and if connection with the source base station is valid, the radio node (or UE) may fall back, report the handover failure to the source base station. The source base station transmits a sequence number (SN) status regarding up/downlink data to each bearer (RLC bearer, backhaul RLC channel identifier, or backhaul RLC logical channel identifier) (for example, RLC UM bearer (RLC bearer, backhaul RLC channel identifier, or backhaul RLC logical channel identifier) or RLC AM bearer (RLC bearer, backhaul RLC channel identifier, or backhaul RLC logical channel identifier)) and, if downlink data or uplink exists, transmits the same to the target base station (7-30, 7-35). The radio node (or UE) attempts a random access to the target cell indicated by the source base station (7-40). The random access is both for the purpose of notifying the target cell that the radio node (or UE) is moving to the target cell through the handover and for making uplink synchronization with the target cell. For the random access, the radio node (or UE) transmits a preamble corresponding to a preamble ID received from the source base station, or a randomly selected preamble ID, to the target cell. After the preamble is transmitted, and after a specific number of subframes have passed, the radio node (or UE) monitors whether or not a random access response (RAR) message is transmitted from the target cell. The monitoring time interval is referred to as a random access response window (RAR window). If an RAR is received during the specific time (7-45), the radio node (or UE) transmits an HO complete message, as an RRC reconfiguration complete message, to the target base station (7-55). If the RAR is successfully received from the target base station in this manner, the radio node (or UE) suspends or ends the T304 timer (7-50). The target base station requests the source base station to make path modification in order to modify the path of bearers (RLC bearers, backhaul RLC channel identifiers, or backhaul RLC logical channel identifiers) that have been configured (7-60, 7-65), and notifies the source base station so as to delete the UE context of the radio node (or UE) (7-70). In addition, the target base station may transmit an RRC message (for example, RRCReconfiguration message. 7-71) to the radio node (or UE), thereby transmitting an indicator that instructs disconnection from the source base station. As another method, the target base station may transmit and indicate MAC control information, RLC control information, or BAP control information, thereby instructing disconnection from the source base station. Therefore, the radio node (or UE) attempts to receive data from the RAR window starting timepoint, with regard to the target base station. After receiving the RAR, the radio node (or UE) transmits an RRC reconfiguration complete message and receives a downlink transmission resource or uplink transmission resource, thereby starting to transmit/receive data with the target base station.

The methods that can be applied when a base station configures or instructs a radio node (or UE) the second embodiment (DAPS handover method) proposed in the disclosure using the handover command message or RRC message (e.g., RRCReconfiguration message) are as follows. In the disclosure, when a base station configures a DAPS handover method to a radio node (or UE) or when a radio node (or UE) receives a handover command message configured with a DAPS handover method from a base station, one of the following methods or a method applied with several methods may be performed.

Method 1-1: When indicating or configuring handover to the radio node (or UE), the base station (source base station, target base station, LTE base station, or NR base station) includes mobility Control Info or Reconfiguration With Sync configuration information in the RRCReconfiguration message and defines an indicator in the bearer (RLC bearer, backhaul RLC channel identifier, or backhaul RLC logical channel identifier) configuration information (Radio Resource Config Dedicated or Radio Bearer Config) of the RRCReconfiguration message, thereby indicating the DAPS handover method for each bearer (RLC bearer, backhaul RLC channel identifier, or backhaul RLC logical channel identifier) (SRB or DRB), each radio node, or each link (egress link or ingress link). As another method, in the above, the base station defines an indicator in the BAP-config, thereby indicating the DAPS handover method for each bearer (RLC bearer, backhaul RLC channel identifier, or backhaul RLC logical channel identifier), each radio node, or each link (egress link or ingress link). When the radio node (or UE) receives the handover command message (RRCReconfiguration message) configured as described above, the radio node (or UE) may perform the DAPS handover for each bearer (RLC bearer, backhaul RLC channel identifier, or backhaul RLC logical channel identifier) for which the DAPS handover method is configured for each bearer (RLC bearer, backhaul RLC channel identifier, or backhaul RLC logical channel identifier) according to the above configuration or for each radio node or for each link (egress link or ingress link) or may perform a normal handover method for each bearer (RLC bearer, backhaul RLC channel identifier, or backhaul RLC logical channel identifier) for which the DAPS handover method is not configured, or for each radio node or for each link (egress link or ingress link). In addition, in case where an indicator that indicates or configures the type of handover method (e.g., Make-Before-Break handover, Rach-skip handover, RACH-less handover or Conditional handover (CHO)) for the radio node (or UE) is included in the mobility Control Info or Reconfiguration With Sync configuration information of the handover command message, and the DAPS handover method is configured for each bearer (RLC bearer, backhaul RLC channel identifier, or backhaul RLC logical channel identifier) as described above, when performing a handover procedure for each bearer (RLC bearer, backhaul RLC channel identifier, or backhaul RLC logical channel identifier), the DAPS handover method may be applied in preference to the other types of handover methods. For example, the DAPS handover method may be performed for the bearer (RLC bearer, backhaul RLC channel identifier, or backhaul RLC logical channel identifier) for which the DAPS handover method is configured for each bearer (RLC bearer, backhaul RLC channel identifier, or backhaul RLC logical channel identifier) or for each radio node or for each link (egress link or ingress link) according to the above configuration, and the handover method configured in mobility Control Info or Reconfiguration With Sync configuration information of the handover command message according to the indicator indicating the type of handover method (e.g., Make-Before-Break handover or Rach-skip handover, RACH-less handover or Conditional handover (CHO)) for the radio node (or UE) may be performed for the bearer (RLC bearer, backhaul RLC channel identifier, or backhaul RLC logical channel identifier) for which the DAPS handover method is not configured. As another method, in order to reduce the complexity of implementing the radio node (or UE), in case where the DAPS handover method is configured for at least one bearer (RLC bearer, backhaul RLC channel identifier, or backhaul RLC logical channel identifier) or a predetermined bearer (RLC bearer, backhaul RLC channel identifier, or backhaul RLC logical channel identifier), it may prevent other handover method types (for example, Make-Before-Break handover, Rach-skip handover, RACH-less handover, or Conditional handover (CHO)) from being indicated or configured for the radio node (or UE) in the mobility Control Info or Reconfiguration With Sync configuration information of the handover command message. In addition, when the radio node (or UE) receives the handover command message (RRCReconfiguration message) configured as described above, in case where the DAPS handover method is configured for at least one bearer (RLC bearer, backhaul RLC channel identifier, or backhaul RLC logical channel identifier) for each bearer (RLC bearer, backhaul RLC channel identifier, or backhaul RLC logical channel identifier) or a predetermined bearer (RLC bearer, backhaul RLC channel identifier, or backhaul RLC logical channel identifier), an RRC layer entity, BAP layer entity, MAC layer entity, PHY layer entity, or SRB processing method for performing the DAPS handover method proposed in the disclosure may be applied. In addition, for the bearer (RLC bearer, backhaul RLC channel identifier, or backhaul RLC logical channel identifier) for which the DAPS handover method is configured for each bearer (RLC bearer, backhaul RLC channel identifier, or backhaul RLC logical channel identifier), a BAP layer entity or RLC layer entity processing method for performing the DAPS handover method proposed in the disclosure may be applied.

Method 1-2: When indicating or configuring handover to the radio node (or UE), the base station (source base station, target base station, LTE base station, or NR base station) may include mobility Control Info or Reconfiguration With Sync configuration information in the RRCReconfiguration message and define an indicator DRB-ToAddMod of DRB-ToAddModList in the bearer (RLC bearer, backhaul RLC channel identifier, or backhaul RLC logical channel identifier) configuration information (Radio Resource Config Dedicated or Radio Bearer Config) of the RRCReconfiguration message, thereby indicating the DAPS handover method for each bearer (RLC bearer, backhaul RLC channel identifier, or backhaul RLC logical channel identifier) (DRB), each radio node, or each link (egress link or ingress link), or a separate indicator for configuring the DAPS handover method is not introduced for SRBs. That is, when the radio node (or UE) receives the handover command message (RRCReconfiguration message) configured as described above, in case where the DAPS handover method is configured for at least one bearer (RLC bearer, backhaul RLC channel identifier, or backhaul RLC logical channel identifier) for each bearer (RLC bearer, backhaul RLC channel identifier, or backhaul RLC logical channel identifier) (DRB) or a predetermined bearer (RLC bearer, backhaul RLC channel identifier, or backhaul RLC logical channel identifier) (DRB), the SRB processing method for performing the DAPS handover method proposed in the disclosure can be applied. As another method, in the above, an indicator may be defined in the BAP-config, or the DAPS handover method may be indicated in the backhaul RLC channel configuration information for each bearer (RLC bearer, backhaul RLC channel identifier, or backhaul RLC logical channel identifier), for each radio node, or for each link (egress link or ingress link). When the radio node (or UE) receives the handover command message (RRCReconfiguration message) configured as described above, the radio node (or UE) may perform the DAPS handover method for the bearer (RLC bearer, backhaul RLC channel identifier, or backhaul RLC logical channel identifier) for which the DAPS handover method is configured for each bearer (RLC bearer, backhaul RLC channel identifier, or backhaul RLC logical channel identifier) according to the configuration, and for the bearer (RLC bearer, backhaul RLC channel identifier, or backhaul RLC logical channel identifier) for which the DAPS handover method is not configured, a normal handover method may be performed. In addition, in case where the mobility Control Info or Reconfiguration With Sync configuration information of the handover command message includes an indicator indicating or configuring the type of handover method (e.g., Make-Before-Break handover, Rach-skip handover, RACH-less handover, or Conditional handover (CHO)) for the radio node (or UE), and the DAPS handover method is configured for each bearer (RLC bearer, backhaul RLC channel identifier, or backhaul RLC logical channel identifier) as described above, when an over method is set, when performing a handover procedure for each bearer (RLC bearer or backhaul RLC channel identifier or backhaul RLC logical channel identifier), the DAPS handover method may be applied in preference to the other types of handover methods. For example, the DAPS handover method may be performed for the bearer (RLC bearer, backhaul RLC channel identifier, or backhaul RLC logical channel identifier) for which the DAPS handover method is configured for each bearer (RLC bearer, backhaul RLC channel identifier, or backhaul RLC logical channel identifier) according to the above configuration, and the handover method configured in mobility Control Info or Reconfiguration With Sync configuration information of the handover command message according to the indicator indicating the type of handover method (e.g., Make-Before-Break handover or Rach-skip handover, RACH-less handover or Conditional handover (CHO)) for the radio node (or UE) may be performed for the bearer (RLC bearer, backhaul RLC channel identifier, or backhaul RLC logical channel identifier) for which the DAPS handover method is not configured. As another method, in order to reduce the complexity of implementing the radio node (or UE), in case where the DAPS handover method is configured for at least one bearer (RLC bearer, backhaul RLC channel identifier, or backhaul RLC logical channel identifier) or a predetermined bearer (RLC bearer, backhaul RLC channel identifier, or backhaul RLC logical channel identifier), it may prevent other handover method types (for example, Make-Before-Break handover, Rach-skip handover, RACH-less handover, or Conditional handover (CHO)) from being indicated or configured for the radio node (or UE) in the mobility Control Info or Reconfiguration With Sync configuration information of the handover command message. In addition, when the radio node (or UE) receives the handover command message (RRCReconfiguration message) configured as described above, in case where the DAPS handover method is configured for at least one bearer (RLC bearer, backhaul RLC channel identifier, or backhaul RLC logical channel identifier) for each bearer (RLC bearer, backhaul RLC channel identifier, or backhaul RLC logical channel identifier) or a predetermined bearer (RLC bearer, backhaul RLC channel identifier, or backhaul RLC logical channel identifier), an RRC layer entity, BAP layer entity, MAC layer entity, PHY layer entity, or SRB processing method for performing the DAPS handover method proposed in the disclosure may be applied. In addition, for the bearer (RLC bearer, backhaul RLC channel identifier, or backhaul RLC logical channel identifier) for which the DAPS handover method is configured for each bearer (RLC bearer, backhaul RLC channel identifier, or backhaul RLC logical channel identifier), a BAP layer entity or RLC layer entity processing method for performing the DAPS handover method proposed in the disclosure may be applied.

Method 2-1: When indicating or configuring handover to the radio node (or UE), the base station (source base station, target base station, LTE base station, or NR base station) includes mobility Control Info or Reconfiguration With Sync configuration information in the RRCReconfiguration message, and defines and includes an indicator that indicates or configures the DAPS handover method in the mobility Control Info or Reconfiguration With Sync, thereby indicating that the DAPS handover method is configured for at least one bearer (RLC bearer, backhaul RLC channel identifier, or backhaul RLC logical channel identifier) or a predetermined bearer (RLC bearer, backhaul RLC channel identifier, or backhaul RLC logical channel identifier), and defines an indicator in SRB-ToAddMod or DRB-ToAddMod of SRB-ToAddModList or DRB-ToAddModList via the bearer (RLC bearer, backhaul RLC channel identifier, or backhaul RLC logical channel identifier) configuration information (Radio Resource Config Dedicated or Radio Bearer Config) of the RRCReconfiguration message, thereby indicating the DAPS handover method for each bearer (RLC bearer, backhaul RLC channel identifier, or backhaul RLC logical channel identifier) (SRB or DRB). As another method, in the above, the indicator is defined in the BAP-config so that the DAPS handover method can be indicated for each bearer (RLC bearer, backhaul RLC channel identifier, or backhaul RLC logical channel identifier), each radio node, or each link (egress link or ingress link).

Method 2-2: When indicating or configuring handover to the radio node (or UE), the base station (source base station, target base station, LTE base station, or NR base station) may include mobility Control Info or Reconfiguration With Sync configuration information in the RRCReconfiguration message, and define and include an indicator that indicates or configures the DAPS handover method in the mobility Control Info or Reconfiguration With Sync, thereby indicating that the DAPS handover method is configured for at least one bearer (RLC bearer, backhaul RLC channel identifier, or backhaul RLC logical channel identifier) or a predetermined bearer (RLC bearer, backhaul RLC channel identifier, or backhaul RLC logical channel identifier), and defines an indicator in DRB-ToAddMod of DRB-ToAddModList via the bearer (RLC bearer, backhaul RLC channel identifier, or backhaul RLC logical channel identifier) configuration information (Radio Resource Config Dedicated or Radio Bearer Config) of the RRCReconfiguration message, thereby indicating the DAPS handover method for each bearer (RLC bearer, backhaul RLC channel identifier, or backhaul RLC logical channel identifier) (DRB), and does not introduce a separate indicator for configuring the DAPS handover method for SRBs. That is, when the radio node (or UE) receives the handover command message (RRCReconfiguration message) configured as described above, in case where the DAPS handover method is configured for at least one bearer (RLC bearer, backhaul RLC channel identifier, or backhaul RLC logical channel identifier) for each bearer (RLC bearer, backhaul RLC channel identifier, or backhaul RLC logical channel identifier) (DRB) or a predetermined bearer (RLC bearer, backhaul RLC channel identifier, or backhaul RLC logical channel identifier) (DRB), the SRB processing method for performing the DAPS handover method proposed in the disclosure can be applied. As another method, in the above, the DAPS handover method may be indicated for each bearer (RLC bearer, backhaul RLC channel identifier, or backhaul RLC logical channel identifier) by defining an indicator in the BAP-config. When the radio node (or UE) receives the handover command message (RRCReconfiguration message) configured as described above, the radio node (or UE) may perform the DAPS handover method for the bearer (RLC bearer, backhaul RLC channel identifier, or backhaul RLC logical channel identifier) for which the DAPS handover method is configured for each bearer (RLC bearer, backhaul RLC channel identifier, or backhaul RLC logical channel identifier) according to the configuration, and for the bearer (RLC bearer, backhaul RLC channel identifier, or backhaul RLC logical channel identifier) for which the DAPS handover method is not configured, a normal handover method may be performed.

Method 3-1: When indicating or configuring handover to the radio node (or UE), the base station (source base station, target base station, LTE base station, or NR base station) includes mobility Control Info or Reconfiguration With Sync configuration information in the RRCReconfiguration message, and defines and includes an indicator that indicates or configures the DAPS handover method in the mobility Control Info or Reconfiguration With Sync, thereby indicating that the DAPS handover method is configured for at least one bearer (RLC bearer, backhaul RLC channel identifier, or backhaul RLC logical channel identifier) or a predetermined bearer (RLC bearer, backhaul RLC channel identifier, or backhaul RLC logical channel identifier). In addition, the base station constitutes and includes a list of bearers (RLC bearers, backhaul RLC channel identifiers, or backhaul RLC logical channel identifiers) for which the DAPS handover method is configured, and includes the identifiers (SRB or DRB) of the bearer (RLC bearer, backhaul RLC channel identifier, or backhaul RLC logical channel identifier) for which the DAPS handover method is configured in the list of bearers (RLC bearer, backhaul RLC channel identifier, or backhaul RLC logical channel identifier), thereby indicating whether to configure the DAPS handover method for each bearer (RLC bearers, backhaul RLC channel identifiers, or backhaul RLC logical channel identifiers). In another method, in the above, the base station constitutes and includes a list of bearers (RLC bearers, backhaul RLC channel identifiers, or backhaul RLC logical channel identifiers) for which the DAPS handover method is not configured, and includes the identifiers (SRB or DRB) of the bearer (RLC bearer, backhaul RLC channel identifier, or backhaul RLC logical channel identifier) for which the DAPS handover method is not configured in the list of bearers (RLC bearer, backhaul RLC channel identifier, or backhaul RLC logical channel identifier), thereby indicating whether to configure the DAPS handover method for each bearer (RLC bearers, backhaul RLC channel identifiers, or backhaul RLC logical channel identifiers). When the radio node (or UE) receives the handover command message (RRCReconfiguration message) configured as described above, the radio node (or UE) may perform the DAPS handover method for the bearer (RLC bearer, backhaul RLC channel identifier, or backhaul RLC logical channel identifier) for which the DAPS handover method is configured for each bearer (RLC bearer, backhaul RLC channel identifier, or backhaul RLC logical channel identifier) according to the above configuration, or for a bearer (RLC bearer, backhaul RLC channel identifier, or backhaul RLC logical channel identifier) whose identifier is included in the list of bearers (RLC bearers, backhaul RLC channel identifiers, or backhaul RLC logical channel identifiers) for which the DAPS handover method is configured, or for a bearer (RLC bearer, backhaul RLC channel identifier, or backhaul RLC logical channel identifier) whose identifier is not included in the list of bearers (RLC bearers, backhaul RLC channel identifiers, or backhaul RLC logical channel identifiers) for which the DAPS handover method is not configured. Further, the radio node (or UE) may perform a normal handover method for the bearer (RLC bearer, backhaul RLC channel identifier, or backhaul RLC logical channel identifier) for which the DAPS handover method is not configured, or for a bearer (RLC bearer, backhaul RLC channel identifier, or backhaul RLC logical channel identifier) whose identifier is not included in the list of bearers (RLC bearers, backhaul RLC channel identifiers, or backhaul RLC logical channel identifiers) for which the DAPS handover method is configured, or for a bearer (RLC bearer, backhaul RLC channel identifier, or backhaul RLC logical channel identifier) whose identifier is included in the list of bearers (RLC bearers, backhaul RLC channel identifiers, or backhaul RLC logical channel identifiers) for which the DAPS handover method is not configured.

Method 3-2: When indicating or configuring handover to the radio node (or UE), the base station (source base station, target base station, LTE base station, or NR base station) includes mobility Control Info or Reconfiguration With Sync configuration information in the RRCReconfiguration message, and defines and includes an indicator that indicates or configures the DAPS handover method in the mobility Control Info or Reconfiguration With Sync, thereby indicating that the DAPS handover method is configured for at least one bearer (RLC bearer, backhaul RLC channel identifier, or backhaul RLC logical channel identifier) or a predetermined bearer (RLC bearer, backhaul RLC channel identifier, or backhaul RLC logical channel identifier). In addition, the base station constitutes and includes a list of bearers (RLC bearers, backhaul RLC channel identifiers, or backhaul RLC logical channel identifiers) for which the DAPS handover method is configured, and includes the identifiers (SRB or DRB) of the bearer (RLC bearer, backhaul RLC channel identifier, or backhaul RLC logical channel identifier) for which the DAPS handover method is configured in the list of bearers (RLC bearer, backhaul RLC channel identifier, or backhaul RLC logical channel identifier), thereby indicating whether to configure the DAPS handover method for each bearer (RLC bearers, backhaul RLC channel identifiers, or backhaul RLC logical channel identifiers). In another method, in the above, the base station constitutes and includes a list of bearers (RLC bearers, backhaul RLC channel identifiers, or backhaul RLC logical channel identifiers) for which the DAPS handover method is not configured, and includes the identifiers (SRB or DRB) of the bearer (RLC bearer, backhaul RLC channel identifier, or backhaul RLC logical channel identifier) for which the DAPS handover method is not configured in the list of bearers (RLC bearer, backhaul RLC channel identifier, or backhaul RLC logical channel identifier), thereby indicating whether to configure the DAPS handover method for each bearer (RLC bearers, backhaul RLC channel identifiers, or backhaul RLC logical channel identifiers). In addition, a separate indicator for configuring the DAPS handover method may be not introduced for SRBs. That is, when the radio node (or UE) receives the handover command message (RRCReconfiguration message) configured as described above, in case where the DAPS handover method is configured for at least one bearer (RLC bearer, backhaul RLC channel identifier, or backhaul RLC logical channel identifier) (DRB) for each bearer (RLC bearer, backhaul RLC channel identifier, or backhaul RLC logical channel identifier) or a predetermined bearer (RLC bearer, backhaul RLC channel identifier, or backhaul RLC logical channel identifier) (DRB), the SRB processing method for performing the DAPS handover method proposed in the disclosure can be applied. When the radio node (or UE) receives the handover command message (RRCReconfiguration message) configured as described above, the radio node (or UE) may perform the DAPS handover method for the bearer (RLC bearer, backhaul RLC channel identifier, or backhaul RLC logical channel identifier) for which the DAPS handover method is configured for each bearer (RLC bearer, backhaul RLC channel identifier, or backhaul RLC logical channel identifier) according to the above configuration, or for a bearer (RLC bearer, backhaul RLC channel identifier, or backhaul RLC logical channel identifier) whose identifier is included in the list of bearers (RLC bearers, backhaul RLC channel identifiers, or backhaul RLC logical channel identifiers) for which the DAPS handover method is configured, or for a bearer (RLC bearer, backhaul RLC channel identifier, or backhaul RLC logical channel identifier) whose identifier is not included in the list of bearers (RLC bearers, backhaul RLC channel identifiers, or backhaul RLC logical channel identifiers) for which the DAPS handover method is not configured. Further, the radio node (or UE) may perform a normal handover method for the bearer (RLC bearer, backhaul RLC channel identifier, or backhaul RLC logical channel identifier) for which the DAPS handover method is not configured, or for a bearer (RLC bearer, backhaul RLC channel identifier, or backhaul RLC logical channel identifier) whose identifier is not included in the list of bearers (RLC bearers, backhaul RLC channel identifiers, or backhaul RLC logical channel identifiers) for which the DAPS handover method is configured, or for a bearer (RLC bearer, backhaul RLC channel identifier, or backhaul RLC logical channel identifier) whose identifier is included in the list of bearers (RLC bearers, backhaul RLC channel identifiers, or backhaul RLC logical channel identifiers) for which the DAPS handover method is not configured.

The disclosure proposes seamless handover methods wherein, in a next-generation mobile communication system, data interruption time resulting from a handover can be minimized or reduced to 0 ms.

The radio node (or UE) may configure a first plurality of bearers (RLC bearers, backhaul RLC channel identifiers, or backhaul RLC logical channel identifiers) with the source base station and may transmit/receive data (transmit and receive uplink or downlink data) through respective protocol layer entities (PHY layer entity, MAC layer entity, RLC layer entity, or BAP layer entity) of each bearer (RLC bearer, backhaul RLC channel identifier, or backhaul RLC logical channel identifier). However, it will be assumed in the following description and in the drawings, for convenience of description, that the radio node (or UE) has one bearer.

Figure 8:
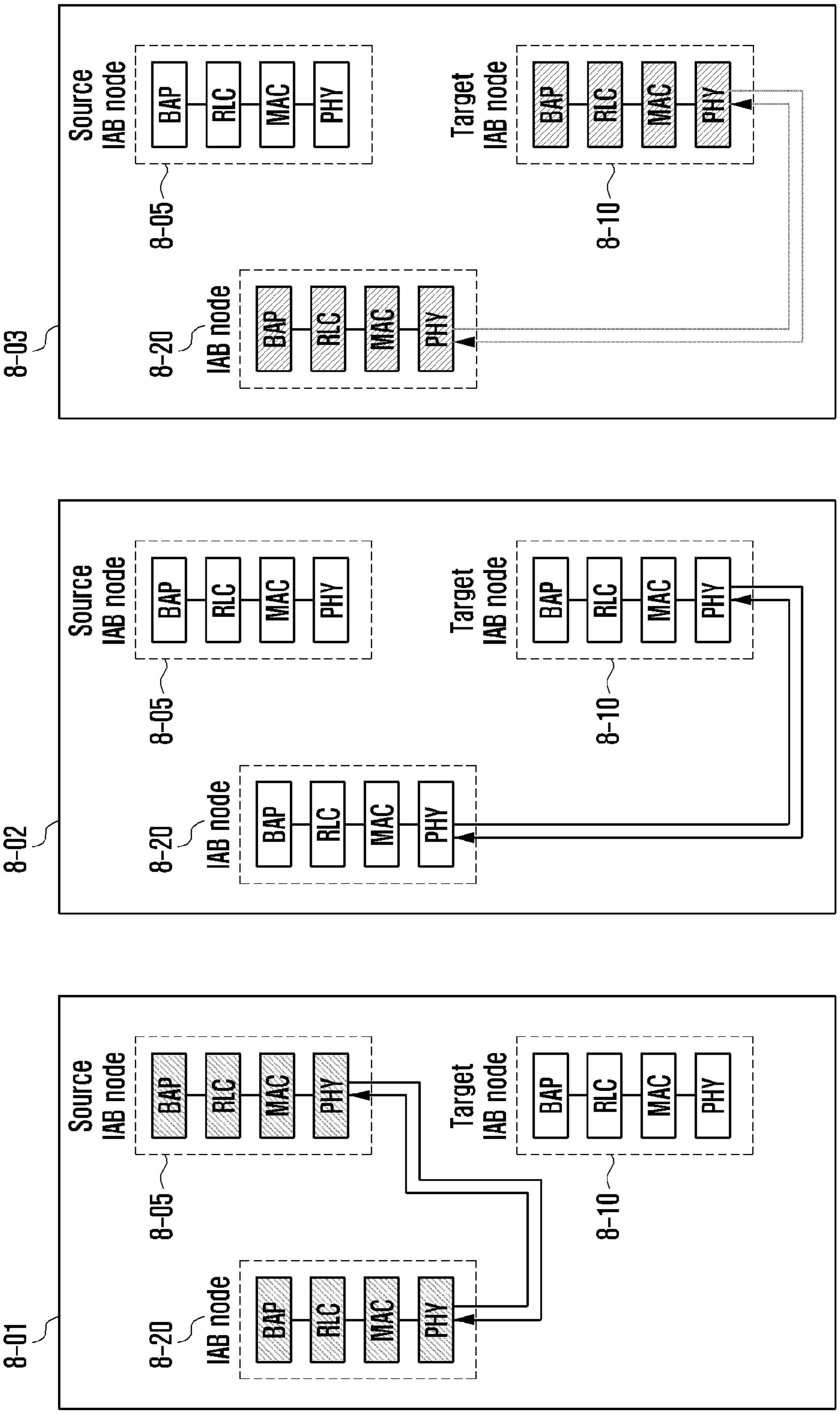
FIG. 8 is a diagram illustrating specific steps of a first embodiment of an efficient handover method for minimizing a data interruption time due to handover in the disclosure.

FIG. 8 illustrates detailed steps of the first embodiment of an efficient handover method for minimizing data interruption time resulting from a handover in the disclosure.

In the first embodiment of the efficient handover method in FIG. 8, the radio node (or UE) 8-20) may transmit/receive data with the source base station 8-05 in the first step 8-01. If a handover command message is received from the source base station, the radio node (or UE) may disconnect from the source base station when the handover command message is received according to the handover method indicated by the handover command message (for example, RRCReconfiguration message), may perform a procedure of random access to the target base station, and may perform a handover procedure. The radio node (or UE) may continuously transmit/receive data with the source base station in order to minimize the data interruption time occurring during a handover according to the handover method indicated according to another method.

The first embodiment of the efficient handover method in FIG. 8 may be characterized in that the radio node (or UE) 8-20 suspends transmitting/receiving data (transmitting uplink data and receiving downlink data) with the source base station when the radio node (or UE) performs a procedure of random access to the target base station 8-10 according to the handover method indicated by the handover command message in the second step 8-02, when the radio node (or UE) transmits a preamble, or when the radio node (or UE) first transmits data with an uplink transmission resource by using a physical uplink control channel (PUCCH) or physical uplink shared channel (PUSCH) transmission resource.

The first embodiment of the efficient handover method in FIG. 8 is characterized in that the radio node (or UE) 8-20 completes the procedure of random access to the target base station in the third step 8-03, transmits a handover completion message to the target base station, and starts transmitting/receiving data (transmitting uplink data and receiving downlink data) with the target base station.

The first embodiment of the efficient handover method of the disclosure may explain a handover method performed in case where a DAPS handover method is not configured.

Figure 9:
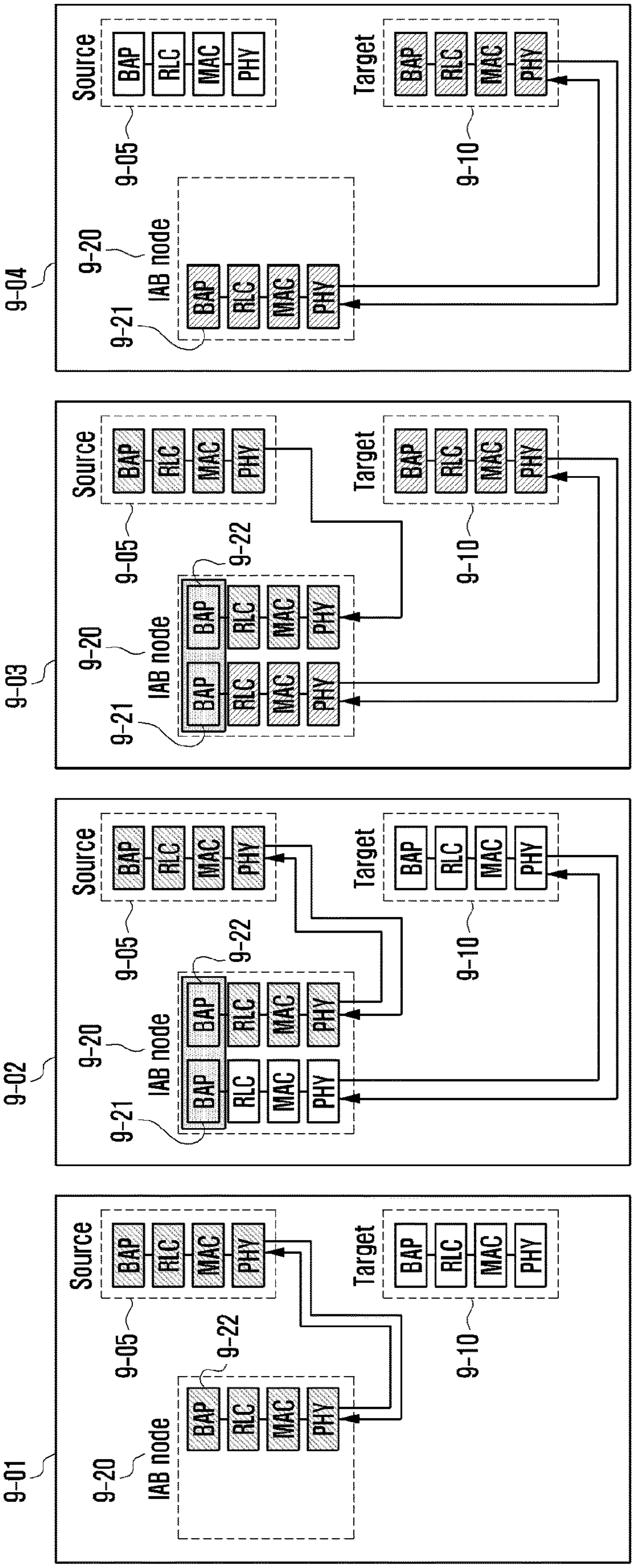
FIG. 9 is a diagram illustrating specific steps of a second embodiment of an efficient handover method for minimizing a data interruption time due to handover in the disclosure.

FIG. 9 illustrates detailed steps of the second embodiment of an efficient handover method for minimizing data interruption time resulting from a handover in the disclosure.

According to the second embodiment of the efficient handover method in FIG. 9, the radio node (or UE) 9-20 may transmit/receive data with the source base station 9-05 in the first step 9-01. When a handover command message is received from the source base station, and in case where the handover command message has indicated the second embodiment of efficient handover method (for example, DAPS handover method) proposed in the disclosure or has indicated the same for each bearer (RLC bearer, backhaul RLC channel identifier, or backhaul RLC logical channel identifier), the radio node (or UE) may continuously transmit/receive data with the source base station through the protocol layer entities 9-22 of the first bearer (RLC bearer, backhaul RLC channel identifier, or backhaul RLC logical channel identifier), in order to minimize the data interruption time that occurs during a handover, although the handover command message has been received. In addition, in case where the radio node (or UE) has identified an indication regarding the second embodiment of the efficient handover method proposed in the disclosure (for example, DAPS handover method) from the handover command message included in the RRC layer entity, or in case where the radio node (or UE) has identified an indicator regarding the DAPS handover method with regard to each bearer (RLC bearer, backhaul RLC channel identifier, or backhaul RLC logical channel identifier), the RRC layer entity may transmit the indicator to the BAP layer entity corresponding to each bearer (RLC bearer, backhaul RLC channel identifier, or backhaul RLC logical channel identifier) or to the bearer (RLC bearer, backhaul RLC channel identifier, or backhaul RLC logical channel identifier) for which the DAPS handover method is indicated, and the BAP layer entity switches from the first BAP layer entity structure 10-11 or 10-12 to the second BAP layer entity structure 10-20 if the indicator is received. In the above, the first step may refer to a step in which the radio node (or UE) receives a handover command message (RRCReconfiguration message) from the base station. In addition, according to the configuration included in the handover command message received by the radio node (or UE), the radio node (or UE) may, when switching to the second BAP layer entity structure, preconfigure or establish protocol layer entities (PHY layer entity, MAC layer entity, RLC layer entity, or BAP layer entity) 9-21 of the second bearer (RLC bearer, backhaul RLC channel identifier, or backhaul RLC logical channel identifier) for the target base station. In addition, in case where the radio node (or UE) has received a handover command message, the handover command message has indicated the DAPS handover method proposed by the disclosure, or the DAPS handover method has been indicated with regard to specific bearers (RLC bearers, backhaul RLC channel identifiers, or backhaul RLC logical channel identifiers), when switching from the first BAP layer entity structure or function 10-11 or 10-12 to the second BAP layer entity structure or function 10-20 proposed by the disclosure with regard to each bearer (RLC bearer, backhaul RLC channel identifier, or backhaul RLC logical channel identifier) or with regard to the bearer (RLC bearer, backhaul RLC channel identifier, or backhaul RLC logical channel identifier) for which the DAPS handover method is indicated, the radio node (or UE) may apply the BAP layer entity configuration information included in the RRC message. In addition, in the above, when the radio node (or UE) has received a handover command message (for example, RRCReconfiguration message), the RRC layer entity of the radio node (or UE) may start the first timer (for example, T304). In addition, the first timer may be suspended if the radio node (or UE) performs a procedure of random access to the target base station order to perform a hand over, and if the random access procedure is successfully completed (for example, the first condition proposed by the disclosure is satisfied). If the handover fails, and if the first timer expires, the radio node (or UE) may fall back in case where the connection with the source base station is valid, may report the handover failure to the source base station, and may attempt connection recovery. In case where the connection with the source base station is invalid, the radio node (or UE) may perform an RRC connection reestablishment procedure.

In the above, the handover command message may be configured and established such that the second bearer (RLC bearer, backhaul RLC channel identifier, or backhaul RLC logical channel identifier) has the same bearer (RLC bearer, backhaul RLC channel identifier, or backhaul RLC logical channel identifier) identifier as the first bearer (RLC bearer, backhaul RLC channel identifier, or backhaul RLC logical channel identifier), thereby guaranteeing that no data interruption time occurs for each bearer (RLC bearer, backhaul RLC channel identifier, or backhaul RLC logical channel identifier). In addition, the second embodiment may be characterized in that the BAP layer entity of the first bearer (RLC bearer, backhaul RLC channel identifier, or backhaul RLC logical channel identifier) and the BAP layer entity of the second bearer (RLC bearer, backhaul RLC channel identifier, or backhaul RLC logical channel identifier) operate as a logically single BAP layer entity. A more detailed operating method will be described with reference to FIG. 10. In addition, in connection with the second embodiment, in case where the radio node (or UE) is configured to be able to transmit uplink data both to the source base station and the target base station, uplink data may be transmitted to only one of the source base station and the target base station in the second embodiment, in order to avoid the problem of coverage reduction due to lacking transmission power of the radio node (or UE), or the problem of having to determine to which base station a transmission resource request for uplink data is to be sent and then uplink data is to be transmitted (link selection). Specifically, if the radio node (or UE) in the second embodiment has no capability (dual uplink transmission) of simultaneously transmitting uplink data to different base stations at different frequencies or at the same frequency, uplink data may be transmitted, in a single time unit, to only one of the source base station and the target base station. Accordingly, the radio node (or UE) may send a scheduling request to only one of the source base station and the target base station, may transmit a report on the size of data to be transmitted by the BAP layer entity (for example, buffer status report) to only one of the source base station and the target base station, may receive an uplink transmission resource, and may transmit uplink data to only one base station. In addition, even if a handover command message is received from the source base station, the radio node (or UE) may not initialize the MAC layer entity of the first bearer (RLC bearer, backhaul RLC channel identifier, or backhaul RLC logical channel identifier), in order to prevent data loss due to continued transmission and reception of data resulting from HARQ retransmission. In addition, in the case of an AM-mode RLC layer entity, RLC retransmission can be continuously performed. As another method, in case where the handover command message indicates the second embodiment of the efficient handover method proposed by the disclosure (DAPS handover method) with regard to each bearer (RLC bearer, backhaul RLC channel identifier, or backhaul RLC logical channel identifier), the radio node (or UE) may continuously transmit or receive data with the source base station with regard to only the bearer (RLC bearer, backhaul RLC channel identifier, or backhaul RLC logical channel identifier) for which the second embodiment (DAPS handover method) is indicated through the handover command message, with regard to only the BAP layer entity corresponding to the logical channel identifier, with regard to only the RLC layer entity or MAC layer entity, or with regard to only data corresponding to the bearer (RLC bearer, backhaul RLC channel identifier, or backhaul RLC logical channel identifier) or logical channel identifier. In addition, even in case where the first condition proposed by the disclosure is satisfied (for example, uplink data transmission is switched to the target base station), the radio node (or UE) may continuously transmit or receive RLC control data (RLC status report), BAP control data (ROHC feedback or BAP status report), or HARQ retransmission with the source base station with regard to only the bearer (RLC bearer, backhaul RLC channel identifier, or backhaul RLC logical channel identifier) for which the second embodiment (DAPS handover method) is indicated through the handover command message, with regard to only the BAP layer entity corresponding to the logical channel identifier, or with regard to only the RLC layer entity or MAC layer entity. In addition, the handover command message indicates or has indicated the second embodiment of the efficient handover method proposed by the disclosure (DAPS handover method) for each bearer (RLC bearer, backhaul RLC channel identifier, or backhaul RLC logical channel identifier), the radio node (or UE) may suspend transmitting or receiving data with the source base station with regard to a bearer (RLC bearer, backhaul RLC channel identifier, or backhaul RLC logical channel identifier) for which the second embodiment (DAPS handover method) has not been indicated through the handover command message, with regard to the BAP layer entity corresponding to the logical channel identifier, or with regard to the RLC layer entity or MAC layer entity. In addition, in the above, in case where the radio node (or UE) receives the handover command message and indicates the DAPS handover method proposed in the disclosure in the handover command message, or in case where the DAPS handover method is indicated for specific bearers (RLC bearers, backhaul RLC channel identifiers, or backhaul RLC logical channel identifier), or in case where the DAPS handover method is configured for at least one bearer (RLC bearer, backhaul RLC channel identifier, or backhaul RLC logical channel identifier), or in case where the DAPS handover method is configured for the bearer (RLC bearer, backhaul RLC channel identifier, or backhaul RLC logical channel identifier), or in case where the mapping information of QoS flow (or downlink data stream or uplink data stream or egress link or ingress link) and a bearer (RLC bearer, backhaul RLC channel identifier, or backhaul RLC logical channel identifier) is newly established, the radio node (or UE) may be switched from the structure or function 11-10 of the first BAP layer entity to the structure or function 11-20 of the second BAP layer entity proposed in the disclosure with respect to each bearer (RLC Bearer, backhaul RLC channel identifier, or backhaul RLC logical channel identifier) or bearer (RLC Bearer, backhaul RLC channel identifier, or backhaul RLC logical channel identifier) for which the DAPS handover method is indicated. In addition, the structure of the second BAP layer entity may be characterized in that the existing first mapping information of QoS flow (or downlink data stream or uplink data stream or egress link or ingress link) for the source base station and a bearer (RLC bearer, backhaul RLC channel identifier, or backhaul RLC logical channel identifier) may be maintained to process uplink data to be transmitted to the source base station and downlink data to be received from the source base station, and the second mapping information of the QoS flow (or downlink data stream or uplink data stream or egress link or ingress link) and a bearer (RLC bearer, backhaul RLC channel identifier, or backhaul RLC logical channel identifier), which is newly configured in the handover command message, is configured for the target base station and used to process uplink data to be transmitted to the target base station and downlink data to be received from the target base station. That is, the device structure of the second BAP layer proposed in the disclosure may be characterized in that the first mapping information of QoS flow (or downlink data stream or uplink data stream or egress link or ingress link) and the bearer (RLC bearer, backhaul RLC channel identifier, or backhaul RLC logical channel identifier) for the source base station or the second mapping information of QoS flow (or downlink data stream or uplink data stream or egress link or ingress link) and a bearer (RLC bearer, backhaul RLC channel identifier, or backhaul RLC logical channel identifier) may be maintained to separately process data for the source base station and data for the target base station. In the structure of the second BAP layer entity, the BAP layer entity can distinguish whether data received from a lower layer is data received from the source base station or data received from the target base station through a 1-bit indicator of BAP header (header of a BAP DATA PDU) or BAP CONTROL PDU, a 1-bit indicator of a BAP header (header of a BAP DATA PDU) or BAP CONTROL PDU, or information indicated by the BAP layer entity. In addition, in the above, in case where the base station indicates to the radio node (or UE) the DAPS handover method for each bearer (RLC bearer, backhaul RLC channel identifier, or backhaul RLC logical channel identifier) through the handover command message, the DAPS handover method is always indicated for the default bearer (RLC bearer, backhaul RLC channel identifier, or backhaul RLC logical channel identifier) (default DRB). Thus, in case where data is generated in a new QoS flow (or downlink data stream or uplink data stream or egress link or ingress link) that does not correspond to the mapping information of QoS flow (or downlink data stream or uplink data stream or egress link or ingress link) and a bearer (RLC bearer, backhaul RLC channel identifier, or backhaul RLC logical channel identifier), uplink data can always be transmitted through the default bearer (RLC bearer, backhaul RLC channel identifier, or backhaul RLC logical channel identifier). If the DAPS handover method is not configured for the default bearer (RLC bearer, backhaul RLC channel identifier, or backhaul RLC logical channel identifier), data interruption time may occur because uplink data transmission for a new QoS flow (or downlink data stream or uplink data stream or egress link or ingress link) generated during handover is not possible. In another method, in the above, in case where the handover command message (for example, an RRCReconfiguration message) is received and the second embodiment (DAPS handover method) is indicated, and BAP layer entity configuration information or the second mapping information of QoS flow (or downlink data stream or uplink data stream or egress link or ingress link) and a bearer (RLC bearer, backhaul RLC channel identifier, or backhaul RLC logical channel identifier) is configured in the RRC message for the target base station, the radio node (or UE) may apply the BAP layer entity configuration information or the second mapping information of QoS flow (or downlink data stream or uplink data stream or egress link or ingress link) and a bearer (RLC bearer or backhaul RLC channel identifier or backhaul RLC logical channel identifier) when the first condition proposed in the disclosure is satisfied. In addition, in the above, if the second embodiment (DAPS handover method) is indicated for each bearer (RLC bearer, backhaul RLC channel identifier, or backhaul RLC logical channel identifier) in the handover command message, when the first mapping information of QoS flow (or downlink data stream or uplink data stream or egress link or ingress link) and the bearer (RLC bearer, backhaul RLC channel identifier, or backhaul RLC logical channel identifier) for the source base station is maintained, the radio node (or UE) may maintain and apply only the first mapping information of the QoS flow (or downlink data stream or uplink data stream or egress link or ingress link) corresponding to the bearer (RLC bearer, backhaul RLC channel identifier, or backhaul RLC logical channel identifier) to which the second embodiment is indicated and a bearer (RLC bearer, backhaul RLC channel identifier, or backhaul RLC logical channel identifier). In the above, the first mapping information of the QoS flow (or downlink data stream or uplink data stream or egress link or ingress link) corresponding to the bearer to which the second embodiment is not indicated and the bearer (RLC bearer, backhaul RLC channel identifier, or backhaul RLC logical channel identifier) may be released or not applied, and in case where in the RRC message, BAP layer entity configuration information for the target base station or the second mapping information of QoS flow (or downlink data stream or uplink data stream or egress link or ingress link) and a bearer (RLC bearer, backhaul RLC channel identifier, or backhaul RLC logical channel identifier) is configured in the RRC message, the radio node (or UE) applies the BAP layer entity configuration information or the second mapping information of QoS flow (or downlink data stream or uplink data stream or egress link or ingress link) and a bearer (RLC bearer, backhaul RLC channel identifier, or backhaul RLC logical channel identifier) for data transmission or reception with the target base station when the first condition proposed in the disclosure is satisfied.

In addition, in the disclosure, when the handover procedure proposed in the disclosure is performed in a radio node, methods for transmitting BAP control data (flow control feedback, flow control polling, or backhaul channel radio connection failure indicator (BH RLF indication)) in a BAP layer entity are proposed as follows. The BAP layer entity may perform one of the following methods.

1> A first BAP control data transmission method:

2> When the radio node performs the handover procedure proposed in the disclosure, the BAP layer entity may transmit or route the BAP control data to the backhaul RLC channel in case where the BAP control data for the source base station is triggered (or generated) or in case where the backhaul RLC channel of the link of the source base station that is indicated to transmit the BAP control data is configured (a case where an RRC message or an F1AP message is configured). In case where the BAP control data for the source base station is triggered (or generated) in the above, in case where the backhaul RLC channel of the link of the source base station that is indicated to transmit the BAP control data is not configured, the BAP layer entity may transmit or route the BAP control data to any backhaul RLC channel of the link of the source base station.

2> When the radio node performs the handover procedure proposed in the disclosure, the BAP layer entity may transmit or route the BAP control data to the backhaul RLC channel in case where the BAP control data for the target base station is triggered (or generated) or in case where the backhaul RLC channel of the link of the target base station that is instructed to transmit the BAP control data is configured (a case where an RRC message or an F1AP message is configured). In case where the BAP control data for the target base station is triggered (or generated) in the above, in case where the backhaul RLC channel of the link of the target base station that is instructed to transmit the BAP control data is not configured, the BAP layer entity may transmit or route the BAP control data to any backhaul RLC channel of the link of the source base station.

1> A second BAP control data transmission method:

2> When the radio node performs the handover procedure proposed in the disclosure, in case where the BAP control data is triggered (or generated), or in case where the backhaul RLC channel that is instructed to transmit the BAP control data is configured (a case where an RRC message or an F1AP message is configured), the BAP layer entity may transmit or route the BAP control data to the backhaul RLC channel of the link of the source base station if the first condition is not satisfied, or the BAP layer entity may transmit or route the BAP control data to the backhaul RLC channel of the link of the target base station if the first condition is satisfied, in case where the BAP control data is triggered (or generated), or in case where the backhaul RLC channel that is instructed to transmit the BAP control data is not configured, the BAP layer entity may transmit or route the BAP control data to the backhaul RLC channel of the link of the source base station if the first condition is not satisfied, or the BAP layer entity may transmit or route the BAP control data to the backhaul RLC channel of the link of the target base station if the first condition is satisfied.

In the second embodiment of the efficient handover method in FIG. 9, even when the radio node (or UE) 9-20 performs a procedure of random access to the target base station 9-10 indicated by the handover command message in the second step 9-02 through protocol layer entities of the second bearer (RLC bearer, backhaul RLC channel identifier, or backhaul RLC logical channel identifier), the radio node (or UE) may continuously transmit or receive data (transmit uplink data or receive downlink data) with the source base station through the protocol layer entities of the first bearer (RLC bearer, backhaul RLC channel identifier, or backhaul RLC logical channel identifier). In the above, the second step may refer to a step in which the radio node (or UE) performs a cell selection or reselection procedure, and performs a random access procedure with regard to the target cell indicated by the handover command message (RRCReconfiguration message) received from the source base station.

The second embodiment of the efficient handover method in FIG. 9 is characterized in that, if the first condition is satisfied in the third step 9-03, the radio node (or UE) 9-20 suspends transmitting uplink data to the source base station through the protocol layer entities 9-22 of the first bearer (RLC bearer, backhaul RLC channel identifier, or backhaul RLC logical channel identifier) for the bearer (RLC bearer, backhaul RLC channel identifier, or backhaul RLC logical channel identifier) for which the DAPS handover method is configured, and transmits uplink data to the target base station through the protocol layer entities 9-21 of the second bearer (RLC bearer, backhaul RLC channel identifier, or backhaul RLC logical channel identifier). In addition, the radio node (or UE) may continuously receive downlink data from the source base station and the target base station through the protocol layer entities of the first bearer (RLC bearer, backhaul RLC channel identifier, or backhaul RLC logical channel identifier) and the second bearer (RLC bearer, backhaul RLC channel identifier, or backhaul RLC logical channel identifier). In the above, the third step refers to a step in which the first condition is satisfied, and the radio node (or UE) thus switches uplink transmission from the source base station to the target base station. To be specific, until the first condition is satisfied, the radio node (or UE) transmits uplink data to the source base station through the first bearer (RLC bearer, backhaul RLC channel identifier, or backhaul RLC logical channel identifier). If the first condition is satisfied, the radio node (or UE) suspends transmitting uplink data to the source base station through the first bearer (RLC bearer, backhaul RLC channel identifier, or backhaul RLC logical channel identifier), and starts transmitting uplink data to the target base station through a second bearer (RLC bearer, backhaul RLC channel identifier, or backhaul RLC logical channel identifier). Specifically, in the above, for the bearer (RLC bearer, backhaul RLC channel identifier, or backhaul RLC logical channel identifier) for which the DAPS handover method is configured, in the second BAP layer entity structure proposed by the disclosure, if the first condition is satisfied, the BAP layer entity, which has been transmitting uplink data through the first bearer (RLC bearer, backhaul RLC channel identifier, or backhaul RLC logical channel identifier), then receives an indicator from the lower layer entity (a case where a random access procedure from the MAC layer entity to the target base station has succeeded) or from the upper layer entity (a case where the first timer in the RRC layer entity has expired). Then, the BAP layer entity may suspend transmitting uplink data through the first bearer (RLC bearer, backhaul RLC channel identifier, or backhaul RLC logical channel identifier) and may switch so as to start transmitting uplink data through the second bearer (RLC bearer, backhaul RLC channel identifier, or backhaul RLC logical channel identifier). Furthermore, as in the BAP layer entity structure proposed in FIG. 10, the receiving BAP layer entity 9-21 of the second bearer (RLC bearer, backhaul RLC channel identifier, or backhaul RLC logical channel identifier) is driven integrally with the receiving BAP layer entity 9-22 of the first bearer (RLC bearer, backhaul RLC channel identifier, or backhaul RLC logical channel identifier), and may continuously perform seamless data reception from the source base station or the target base station by using information such as stored transmission/reception data, sequence number information, header compression and decompression context, and the like. The first condition may be one of the following conditions. The first condition proposed below provides an uplink data transmission switching timepoint configured such that transmission resources can be used most efficiently, and the data interruption time can be minimized to the largest extent.

It may be determined that the first condition is satisfied if the radio node (or UE) has successfully completed a procedure of random access to the target base station through layer entities (for example, MAC layer entity) of the second bearer (RLC bearer, backhaul RLC channel identifier, or backhaul RLC logical channel identifier), if the radio node (or UE) has successfully completed a procedure of random access to the target base station through layer entities (for example, MAC layer entity) of the second bearer (RLC bearer, backhaul RLC channel identifier, or backhaul RLC logical channel identifier) and has received the first uplink transmission resource assigned thereto from the target base station, or if an uplink transmission resource has first been indicated to the radio node (or UE).

For example, more particularly, if the radio node (or UE) has received a handover command message from the source base station, if the radio node (or UE) has been indicated to make a random access to the target base station, and if the instructed random access is a contention-free random access (CFRA) (for example, if a predesignated preamble or a radio node (or UE) cell identifier (for example, C-RNTI has been assigned thereto).

It may be considered that the random access procedure has been successfully completed when the radio node (or UE) has transmitted a predesignated preamble to a cell of the target base station and has received a random access response (RAR) message. Therefore, it may be determined that the first condition is satisfied if the radio node (or UE) has received the first uplink transmission resource assigned, included, or indicated by the RAR message. As another method, it may be determined that the first condition is satisfied if an uplink transmission resource is first received after the RAR is received.

If the radio node (or UE) has received a handover command message from the source base station, if the radio node (or UE) has been indicated to make a random access to the target base station, and if the indicated random access is a contention-based random access (CBRA) (for example, if a predesignated preamble or a radio node (or UE) cell identifier (for example, C-RNTI has not been assigned thereto).

It may be considered that the radio node (or UE) has successfully completed the procedure of random access to the target base station if the radio node (or UE) has transmitted a preamble (for example, any preamble) to a cell of the target base station, has received a random access response (RAR) message, has transmitted message 3 (for example, handover completion message) by using an uplink transmission resource assigned, included, or indicated by the RAR message, and has received a MAC CE indicating that contention has been resolved, through message 4, from the target base station, or has received an uplink transmission resource through a PDCCH corresponding to the C-RNTI of the radio node (or UE). Therefore, it may be determined that the first condition is satisfied if the radio node (or UE) first thereafter monitors the PDCCH and first receives (or first receives indication of) an uplink transmission resource through the PDCCH corresponding to the C-RNTI of the radio node (or UE). As another method, in case where the uplink transmission resource assigned through the RAR message has such a sufficient size that, after message 3 is transmitted, the radio node (or UE) can additionally transmit uplink data, it may be determined that the first uplink transmission resource is received, and that the first condition is satisfied. That is, it may be determined, if the RAR is received, that the first uplink transmission resource is received, and that the first condition is satisfied.

In case where the handover command message received by the radio node (or UE) also indicates a handover method requiring no random access procedure (RACH-less handover).

If the handover command message includes an uplink transmission resource regarding the target base station.

The radio node (or UE) may determine that the random access procedure has been successfully completed, and that the first condition is satisfied, if the radio node (or UE) transmits message 3 (for example, handover completion message or RRCReconfigurationComplete message) by using the uplink transmission resource of the target base station, and if the radio node (or UE) receives a radio node (or UE) identify confirmation MAC CE from the base station through message 4, or if the radio node (or UE) receives an uplink transmission resource through a PDCCH corresponding to the C-RNTI of the radio node (or UE). As another method, the radio node (or UE) may determine that the first condition is satisfied, if the first uplink transmission resource is received through the PDCCH corresponding to the C-RNTI of the radio node (or UE) as a result of PDCCH monitoring after the random access procedure is successfully completed.

If the handover command message includes no uplink transmission resource regarding the target base station.

The radio node (or UE) may determine that the random access procedure has been successfully completed, and that the first condition is satisfied, if an uplink transmission resource is received through the PDCCH corresponding to the C-RNTI of the radio node (or UE) as a result of PDCCH monitoring regarding the target base station (or cell), if the radio node (or UE) transmits message 3 (for example, handover completion message or RRCReconfigurationComplete message) by using the uplink transmission resource and receives a UE identify confirmation MAC CE from the base station, or if the radio node (or UE) receives an uplink transmission resource through the PDCCH corresponding to the C-RNTI of the radio node (or UE). As another method, the radio node (or UE) may determine that the first condition is satisfied, if the first uplink transmission resource is received through the PDCCH corresponding to the C-RNTI of the radio node (or UE) as a result of PDCCH monitoring after the random access procedure is successfully completed.

1> In case were the DAPS handover method is indicated to the radio node (or UE) through a handover command message, and a 2-step random access procedure is configured or indicated through the handover command message (e.g., RRCReconfiguration message).

1> or in case where the radio node (or UE) supports 2-step random access in the radio node (or UE) capability even if 2-step random access is not configured or indicated in the handover command message, and in case where 2-step random access is supported in system information of the target cell, and information (e.g., random access resource, threshold value for determination of whether to perform or not perform 2-step random access, or the like) for 2-step random access is broadcasted in system information, or in case where the radio node (or UE) receives the system information, and the radio node (or UE) performs 2-step random access for the target cell due to a signal strength that is sufficient or is greater than the threshold value broadcast in the system information, 2> when 2-step random access is successfully completed in the above, the radio node (or UE) may determine that the first condition is satisfied.

2> The 2-step random access may be performed specifically by one of contention-based random access (CBRA) or contention-free random access (CFRA).

3> In case where the radio node (or UE) performs CBRA-based 2-step random access, 4> the radio node (or UE) may transmit a preamble in a transmission resource (e.g., PRACH occasion, transmission resource configured by the base station via the RRC message, or transmission resource broadcast in the system information) for 2-step random access, and may transmit data (e.g., MsgA MAC PDU) in a transmission resource (e.g., PUSCH occasion) for data transmission. The data may include MAC control information (C-RNTI MAC CE) including a radio node (or UE) identifier (C-RNTI) or an RRC message (RRCReconfigurationComplete message or handover completion message).

4> In the above, the radio node (or UE) may monitor PDCCH scrambled with the radio node (or UE) identifier (C-RNTI) or with a first identifier (MsgB-RNTI) derived by a time or frequency at which the preamble is transmitted.

4> If the radio node (or UE) receives PDCCH scrambled with the radio node (or UE) identifier, receives an allocation of a downlink transmission resource via the PDCCH, or receives MAC control information (timing advance command MAC CE) for timing adjustment in the downlink transmission resource, 5> the radio node (or UE) may determine that the 2-step random access has been successfully completed, and may determine that the first condition is satisfied.

4> If the radio node (or UE) receives PDCCH scrambled with the first identifier (MsgB-RNTI), if the radio node (or UE) receives an allocation of a downlink transmission resource via the PDCCH, or if a fallback random access response for the preamble transmitted by the radio node (or UE) is received in the downlink transmission resource, (that is, in case where the base station has received the preamble but has failed to receive MsgA, if a fallback RAR indicating to transmit MsgA via another transmission resource is received), 5> the radio node (or UE) may transmit data (MsgA MAC PDU) via the transmission resource indicated in the fallback random access response.

5> The radio node (or UE) may monitor PDCCH scrambled with the radio node (or UE) identifier (C-RNTI).

5> If the radio node (or UE) receives PDCCH scrambled with the radio node (or UE) identifier, or receives an allocation of an uplink transmission resource via the PDCCH, the radio node (or UE) may determine that the 2-step random access has been successfully completed, and may determine that the first condition is satisfied.

3> In case where the radio node (or UE) performs CFRA-based 2-step random access, 4> the radio node (or UE) may transmit a preamble in a transmission resource (e.g., PRACH occasion, or transmission resource designated by the base station via the RRC message) for 2-step random access, and may transmit data (e.g., MsgA MAC PDU) in a transmission resource (e.g., PUSCH occasion) for data transmission. The data may include MAC control information (C-RNTI MAC CE) including a radio node (or UE) identifier (C-RNTI) or an RRC message (RRCReconfigurationComplete message or handover completion message).

4> The radio node (or UE) may monitor PDCCH scrambled with the radio node (or UE) identifier (C-RNTI) or with the first identifier (MsgB-RNTI) derived by a time or frequency at which the preamble is transmitted.

4> If the radio node (or UE) receives PDCCH scrambled with the radio node (or UE) identifier, receives an allocation of a downlink transmission resource via the PDCCH, or receives MAC control information (timing advance command MAC CE) for timing adjustment in the downlink transmission resource, 5> the radio node (or UE) may determine that the 2-step random access has been successfully completed, and may determine that the first condition is satisfied.

4> If the radio node (or UE) receives PDCCH scrambled with the first identifier (MsgB-RNTI), if the radio node (or UE) receives an allocation of a downlink transmission resource via the PDCCH, or if a fallback random access response for the preamble transmitted by the radio node (or UE) is received in the downlink transmission resource, (that is, in case where the base station has received the preamble but has failed to receive MsgA, if a fallback RAR indicating to transmit MsgA via another transmission resource is received).

5> the radio node (or UE) may determine that the 2-step random access has been successfully completed, and may determine that the first condition is satisfied.

5> The radio node (or UE) may transmit data (MsgA MAC PDU) via the transmission resource indicated in the fallback random access response.

1> As another method, if the DAPS handover method is indicated to the radio node (or UE) through the handover command message, in case where a 2-step random access procedure is configured or indicated through the handover command message (e.g., RRCReconfiguration message), the radio node (or UE) may determine that the first condition is satisfied. For example, in the above case, the radio node (or UE) may determine that the first condition is satisfied before starting the 2-step random access procedure.

1> As another method, if the DAPS handover method is indicated to the radio node (or UE) through the handover command message, a 2-step random access procedure is configured or indicated through the handover command message (e.g., RRCReconfiguration message), if a transmission resource (for example, PUSCH), which is configured for data transmission in the 2-step random access procedure, has a value greater than the first threshold value, or if the timing advance value for time timing adjustment is included in the RRC message, the radio node (or UE) may determine that the first condition is satisfied. In the above, the first threshold value may be configured by the base station through the RRC message (for example, RRCReconfiguration), may be broadcast through system information, or may be configured as the size of data to be transmitted from the radio node (or UE). For example, in the above case, the radio node (or UE) may determine that the first condition is satisfied before starting the 2-step random access procedure. As another method, if a timing advance value for time timing adjustment is included in the RRC message or if a 2-step random access procedure is configured, the radio node (or UE) may directly transmit data via configured transmission resources (e.g., transmission resources configured through the RRC message or transmission resources in which the radio node (or UE) monitors a PDCCH of the target base station and indicated via the PDCCH) without transmitting a preamble. Accordingly, in the above case, the radio node (or UE) may determine that the first condition has been satisfied before starting the 2-step random access procedure or when transmitting or before transmitting the data. As another method, if a timing advance value for time timing adjustment is included in the RRC message, or if a 2-step random access procedure is configured in the RRC message, the radio node (or UE) may directly transmit data via configured transmission resources (e.g., transmission resources configured through the RRC message or transmission resources for which the radio node (or UE) monitors the PDCCH of the target base station and indicated via the PDCCH) without transmitting the preamble. In the above case, if the configured transmission resource (PUSCH) (e.g., transmission resources configured through the RRC message or transmission resources for which the radio node (or UE) monitors the PDCCH of the target base station and indicated via the PDCCH) has a value greater than the first threshold value, or if the timing advance value for time timing adjustment is included in the RRC message, the radio node (or UE) may determine that the first condition is satisfied before starting the 2-step random access procedure or when transmitting or before transmitting the data.

Hereinafter, a method for efficiently switching uplink data from the source base station to the target base station will be proposed in connection with the DAPS handover method proposed by the disclosure. In the above, whether or not the first condition is satisfied may be identified or detected by a MAC layer entity or an RRC layer entity for the target base station corresponding to the second bearer (RLC bearer, backhaul RLC channel identifier, or backhaul RLC logical channel identifier) according to one of the following methods, which may be combined and extended into a new method.

First method: for example, in case where the RRCReconfiguration message received by the radio node (or UE) indicates a DAPS handover, the radio node (or UE) may configure a MAC layer entity for the target base station corresponding to the second bearer (RLC bearer, backhaul RLC channel identifier, or backhaul RLC logical channel identifier), and the MAC layer entity may perform a random access procedure and may identify whether or not the first condition is satisfied. In addition, if the first condition is satisfied, the MAC layer entity may transmit, to an upper layer entity (e.g., a BAP layer entity) of a bearer (RLC bearer, backhaul RLC channel identifier, or backhaul RLC logical channel identifier) for which the DAPS handover method is configured, an indicator indicating switching of uplink data transmission to the target base station through the second bearer (RLC bearer, backhaul RLC channel identifier, or backhaul RLC logical channel identifier) from the source base station through the first bearer (RLC bearer, backhaul RLC channel identifier, or backhaul RLC logical channel identifier) in the DAPS handover method disclosed in the disclosure.

Second method: as another method, for example, in case where the RRCReconfiguration message received by the radio node (or UE) indicates a DAPS handover, the radio node (or UE) may configure a MAC layer entity for the target base station corresponding to the second bearer (RLC bearer, backhaul RLC channel identifier, or backhaul RLC logical channel identifier), and the MAC layer entity may perform a random access procedure and may identify whether or not the first condition is satisfied. In addition, if the first condition is satisfied, the MAC layer entity may indicate, to the upper layer entity (for example, RRC layer entity), that the first condition is satisfied. In addition, the upper layer entity (for example, RRC layer entity) may transmit, to a lower layer entity (e.g., BAP layer entity) of a bearer (RLC bearer, backhaul RLC channel identifier, or backhaul RLC logical channel identifier) for which the DAPS handover method is configured, an indicator indicating switching of uplink data transmission to the target base station through the second bearer (RLC bearer, backhaul RLC channel identifier, or backhaul RLC logical channel identifier) from the source base station through the first bearer (RLC bearer, backhaul RLC channel identifier, or backhaul RLC logical channel identifier) in the DAPS handover method of the disclosure. In the above, since the upper layer entity (for example, RRC layer entity) suspends the first timer in case where the first condition is satisfied, or in case where the random access procedure to the target base station is successfully performed, the RRC layer entity may indicate the BAP layer entity of the bearer (RLC bearer, backhaul RLC channel identifier, or backhaul RLC logical channel identifier) for which the DAPS handover method is configured to switch by using the indicator in case where the first timer is interrupted.

Third method: in case where the RRCReconfiguration message received by the radio node (or UE) indicates a DAPS handover, the radio node (or UE) may configure a MAC layer entity for the target base station corresponding to the second bearer (RLC bearer, backhaul RLC channel identifier, or backhaul RLC logical channel identifier), and if the RRC layer entity of the radio node (or UE) transmits an indicator indicating that the RRC layer entity performs DAPS handover to a lower layer entity (e.g., MAC layer entity), the MAC layer entity may perform a random access procedure and may identify whether or not the first condition is satisfied. In addition, if the first condition is satisfied, the MAC layer entity may transmit, to an upper layer entity (e.g., a BAP layer entity) of a bearer (RLC bearer, backhaul RLC channel identifier, or backhaul RLC logical channel identifier) for which the DAPS handover method is configured, an indicator indicating switching of uplink data transmission to the target base station through the second bearer (RLC bearer, backhaul RLC channel identifier, or backhaul RLC logical channel identifier) from the source base station through the first bearer (RLC bearer, backhaul RLC channel identifier, or backhaul RLC logical channel identifier) in the DAPS handover method proposed in the disclosure.

Fourth method: In another method, in case where DAPS handover is indicated in the RRCReconfiguration message received by the radio node (or UE), the radio node (or UE) configures a MAC layer entity for the target base station corresponding to the second bearer (RLC bearer, backhaul RLC channel identifier, or backhaul RLC logical channel identifier), and if the RRC layer entity of the radio node (or UE) transmits an indicator indicating that the RRC layer entity performs DAPS handover to a lower layer entity (e.g., MAC layer entity), the MAC layer entity may perform a random access procedure and identify whether the first condition is satisfied. In addition, if the first condition is satisfied, the MAC layer entity may transmit, to an upper layer entity (e.g., an RRC layer entity), an indication that the first condition is satisfied. When identifying the indicator, the upper layer entity (e.g., the RRC layer entity) suspends the first timer in case where the first condition described in the disclosure is satisfied or in case where the procedure of random access to the target base station is successfully performed, so that the first timer may be interrupted. In addition, the upper layer entity (e.g., the RRC layer entity) may transmit, to a lower layer entity (e.g., a BAP layer entity) of a bearer (RLC bearer, backhaul RLC channel identifier, or backhaul RLC logical channel identifier) for which the DAPS handover method is configured, an indicator indicating switching of uplink data transmission to the target base station through the second bearer (RLC bearer, backhaul RLC channel identifier, or backhaul RLC logical channel identifier) from the source base station through the first bearer (RLC bearer, backhaul RLC channel identifier, or backhaul RLC logical channel identifier) in the DAPS handover method proposed in the disclosure.

According to the first, second, third, or fourth method, if the BAP layer entity receives an indicator indicating that the first condition is satisfied, or an indicator indicating uplink data transmission from the source base station to the target base station, from the upper layer entity (for example, RRC layer entity) or from the lower layer entity (for example, MAC layer entity) (for example, in case where the DAPS handover method is indicated), the BAP layer entity may perform the following protocol layer entity operation, in order to effectively switch uplink data transmission, and may perform one or a plurality of the following operations, in order to prevent data loss caused by uplink data transmission. The following operations may be applied to a BAP layer entity connected to an AM DRB or UM DRB (an RLC layer entity operating in the AM mode, or an RLC layer entity operating in the UM mode). In the above, if there is data to be transmitted in its buffer before the first condition is satisfied, or before an indicator indicating that the first condition is satisfied is received, the BAP layer entity may indicate the size or amount of the data to be transmitted (for example, BAP data volume) to the MAC layer entity of the first bearer (RLC bearer, backhaul RLC channel identifier, or backhaul RLC logical channel identifier) for the source base station, thereby informing that there is data to be transmitted, and may transmit uplink data to the source base station. The MAC layer entity of the first bearer (RLC bearer, backhaul RLC channel identifier, or backhaul RLC logical channel identifier) for the source base station may then perform a scheduling request or buffer status report procedure in order to receive an uplink transmission resource assigned thereto from the source base station. However, if the first condition is satisfied, or if an indicator indicating that the first condition is satisfied is received, uplink data transmission switching to the target base station for the bearer (RLC bearer, backhaul RLC channel identifier, or backhaul RLC logical channel identifier) for which the DAPS handover method is configured may be performed as follows. In another method, upon receiving an indicator indicating that the second condition is satisfied, the following procedure may be performed.

In the above, the BAP layer entity may indicate that the size or amount of data to be transmitted to the MAC layer entity of the first bearer (RLC bearer, backhaul RLC channel identifier, or backhaul RLC logical channel identifier) for the source base station is zero (or there is none), in order to switch uplink data transmission from the first bearer (RLC bearer, backhaul RLC channel identifier, or backhaul RLC logical channel identifier) for the source base station to the second bearer (RLC bearer, backhaul RLC channel identifier, or backhaul RLC logical channel identifier) for the target base station. That is, the BAP layer entity may indicate, to the MAC layer entity of the first bearer (RLC bearer, backhaul RLC channel identifier, or backhaul RLC logical channel identifier), that the BAP data volume is zero, thereby informing that there is no more data to be transmitted (even if there is actually data to be transmitted in the buffer, the BAP layer entity may indicate that there is no data to be transmitted to the MAC layer entity of the first bearer (RLC bearer, backhaul RLC channel identifier, or backhaul RLC logical channel identifier) for the source base station, in order to switch uplink data transmission).

However, in case where the handover method of the second embodiment of the disclosure (DAPS handover method) is indicated as proposed by the disclosure, or in the case of a bearer (RLC bearer, backhaul RLC channel identifier, or backhaul RLC logical channel identifier) for which the handover method of the second embodiment of the disclosure (DAPS handover method) is indicated, or in case where the first condition is satisfied, or in case where RLC control data (RLC status report) or BAP control data (BAP status report or ROCH feedback) for the source base station is generated, the BAP layer entity of the bearer (RLC bearer, backhaul RLC channel identifier, or backhaul RLC logical channel identifier) may indicate, to a MAC layer entity for a source base station, a data volume corresponding to RLC control data or BAP control data, and may perform data transmission to the source base station or an RLC layer entity for the source base station. However, as proposed in the disclosure, in case where the handover method (DAPS handover method) of the second embodiment of the disclosure is indicated or in case of the bearer (RLC bearer, backhaul RLC channel identifier, or backhaul RLC logical channel identifier) to which the handover method (DAPS handover method) of the second embodiment of the disclosure is indicated, in case where the first condition is satisfied, or in case where RLC control data (RLC status report) or BAP control data (BAP status report or ROHC feedback) for the target base station is generated, the BAP layer entity of the bearer (RLC bearer, backhaul RLC channel identifier, or backhaul RLC logical channel identifier) may indicate, to a MAC layer entity for a target base station, a data volume corresponding to RLC control data or BAP control data, and may perform data transmission to the target base station or an RLC layer entity for the target base station. If the first condition is not satisfied, the BAP layer entity may indicate, to the MAC layer entity for the source base station, the generated data (BAP data PDU or BAP control PDU) and a data volume corresponding to the data, and may perform data transmission to the source base station or the RLC layer entity for the source base station. Therefore, in the above, upon receiving an indicator indicating that the first condition has been satisfied in the structure of the second BAP layer entity proposed for the bearer (RLC bearer, backhaul RLC channel identifier, or backhaul RLC logical channel identifier) for which the DAPS handover method is configured, when indicating the data volume to the MAC layer entity for the target base station, the second BAP layer entity may indicate, to the MAC layer entity for the target base station, BAP control data, RLC control data, or the data volume excluding the size of the data, which are to be transmitted to the bearer (RLC bearer, backhaul RLC channel identifier, or backhaul RLC logical channel identifier) for the source base station or the MAC layer entity for the source base station.

In the above, the BAP layer entity, which is connected to the AM DRB (RLC layer entity operating in the AM mode), may transmit data (BAP SDUs or BAP PDUs in the buffer) to the lower layer entity (the RLC layer entity of the second bearer (RLC bearer, backhaul RLC channel identifier, or backhaul RLC logical channel identifier) for the target base station) in order based on the configuration information (for example, configuration information configured in an RRC message or a F1AP message) of the BAP layer entity for the target base station before satisfying the first condition from the first data (e.g., BAP SDU or BAP PDU) for which successful transmission from lower layers (e.g., RLC layer entity corresponding to the first bearer (RLC bearer, backhaul RLC channel identifier, or backhaul RLC logical channel identifier) for the source base station) is not identified or before receiving the indicator indicating that the first condition is satisfied, and perform retransmission or transmission or routing, or re-routing. That is, the BAP layer entity performs cumulative retransmission, routing, or re-routing from the first data that has not been successfully transmitted. As another method, when performing the retransmission above, the BAP layer entity may perform retransmission, routing, or re-routing only for data for which successful transmission from lower layers (e.g., RLC layer entities of the first bearer (RLC bearer, backhaul RLC channel identifier, or backhaul RLC logical channel identifier) for the source base station) has not been identified. More specifically, the BAP layer entity, which is connected to the AM DRB (RLC layer entity operating in the AM mode) (all the stored BAP PDUs are discarded in order to transmit the same to the source base station through the first protocol layer entity connected to the BAP layer entity (e.g., the BAP SDUs are not discarded in order to prevent loss of original data)), transmits only the data (e.g., BAP SDU or BAP PDU) for which successful transmission is not identified from lower layers (e.g., RLC layer entities), which is the first protocol layer entity for the source base station to the lower layer entity, which is the second protocol layer entity for transmission to the target base station, in order based on the configuration information of the BAP layer entity corresponding to the target base station, and performs retransmission, transmission, routing, or re-routing. That is, in order to prevent a waste of transmission resources, the BAP layer entity may perform selective retransmission, routing, or re-routing only for data for which successful transmission has not been identified. As another method, the transmission or retransmission operation may be performed by releasing lower layers (e.g., a transmitting or receiving RLC layer entity or a MAC layer entity), which are first protocol layer entities for transmitting data to a source base station. If the transmission or retransmission procedure is extended to UM DRB, the BAP layer entity, which is connected to the RLC layer entity operating in the UM mode, may regard, as data received from upper layer entities or newly received data, data that has not yet been transmitted to the lower layer entity, data for which the BAP discard timer has not expired, or pieces of data that have already been assigned a RLC serial number, and perform transmission, retransmission, routing, or re-routing based on the configuration information of the BAP layer entity for the target base station. In the method proposed above, when the BAP layer entity performs transmission, retransmission, routing, or re-routing, routing or re-routing is performed based on the configuration information of the BAP layer entity (the BAP layer entity configuration information configured in an RRC message or a F1AP message) for the source base station before the first condition is satisfied, and if the first condition is satisfied, routing or re-routing may be performed based on the BAP layer entity configuration information for the target base station if the first condition is satisfied. As another method, in the method proposed above, when the BAP layer entity performs transmission, retransmission, routing, or re-routing, routing or re-routing is performed based on the BAP layer entity configuration information (BAP layer entity configuration information configured in an RRC message or a F1AP message) before the second condition is satisfied), or routing or rerouting is performed based on the BAP layer entity configuration information for the target base station if the second condition is satisfied.

In the above, if there is data to be transmitted in the buffer, the BAP layer entity may indicate the size or amount of data to be transmitted (for example, BAP data volume) to the MAC layer entity of the second bearer (RLC bearer, backhaul RLC channel identifier, or backhaul RLC logical channel identifier) for the target base station, thereby informing that there is data to be transmitted, and may perform uplink data transmission switching to the target base station. The MAC layer entity of the second bearer (RLC bearer, backhaul RLC channel identifier, or backhaul RLC logical channel identifier) for the target base station may then perform a scheduling request or buffer status report procedure in order to receive an uplink transmission resource assigned from the target base station.

In the above, for a bearer (RLC bearer, backhaul RLC channel identifier, or backhaul RLC logical channel identifier) for which the second embodiment (or DAPS handover method) is indicated (or configured), when the first condition is satisfied, the radio node (or UE) may release configuration information or context for the data compression protocol (for the source base station) (for example, uplink data compression protocol). Alternatively, when the first condition is satisfied, the upper layer entity (e.g., RRC layer entity) of the radio node (or UE) may indicate the BAP layer entity to release configuration information or context for the data compression protocol (e.g., uplink data compression protocol) or reconfigure the same. However, for a bearer (RLC bearer, backhaul RLC channel identifier, or backhaul RLC logical channel identifier) for which the second embodiment (or DAPS handover method) is not indicated (or configured), when the handover command message is received, the radio node (or UE) may release configuration information or context for a data compression protocol (e.g., uplink data compression (UDC) protocol). Alternatively, when a handover command message is received, the upper layer entity (e.g., RRC layer entity) of the radio node (or UE) may indicate the BAP layer entity to release configuration information or context for the data compression protocol (e.g., uplink data compression protocol) (for the source base station) or reconfigure the same. This is because, for a bearer (RLC bearer, backhaul RLC channel identifier, or backhaul RLC logical channel identifier) for which the DAPS handover method is configured, data needs to be compressed by using the context or configuration information for the data compression protocol for the source base station until the first condition is satisfied and transmitted to the source base station.

In case where a DAPS handover method is configured for at least one bearer (RLC bearer, backhaul RLC channel identifier, or backhaul RLC logical channel identifier) among bearers (RLC bearer, backhaul RLC channel identifier, or backhaul RLC logical channel identifier) configured for the radio node (or UE), or a DAPS handover method is configured for a predetermined bearer (RLC bearer, backhaul RLC channel identifier, or backhaul RLC logical channel identifier), if the first condition is satisfied or if an indicator indicating that the first condition is satisfied is received, the radio node (or UE) may perform one of the following methods for a bearer (RLC bearer, backhaul RLC channel identifier, or backhaul RLC logical channel identifier) for which the DAPS handover method is not configured.

First method: In case where the first condition is satisfied, the upper layer entity (for example, RRC layer entity) of the radio node (or UE) may trigger or request a BAP re-establishment procedure for a bearer (RLC bearer, backhaul RLC channel identifier, or backhaul RLC logical channel identifier) or bearers (RLC bearers, backhaul RLC channel identifiers, or backhaul RLC logical channel identifiers) for which the DAPS handover method is not configured (even if the target base station configures the BAP re-establishment procedure for the bearer (RLC bearer, backhaul RLC channel identifier, or backhaul RLC logical channel identifier) in the handover command message, the procedure may be performed when the first condition is satisfied). The BAP layer entity, which has received the request for the BAP re-establishment or reconfiguration procedure, may perform different BAP re-establishment or reconfiguration procedures for each bearer (RLC bearer, backhaul RLC channel identifier, or backhaul RLC logical channel identifier). For example, configuration information of the BAP layer entity for the source base station may be reconfigured to configuration information of the BAP layer entity for the target base station. In the present disclosure, the BAP re-establishment procedure or reconfiguration procedure may refer to re-establishing or reconfiguring the configuration information of the BAP layer entity for the source base station to the configuration information of the BAP layer entity for the target base station, or the configuration information of the BAP layer entity for the target base station to the configuration information of the BAP layer entity for the source station. Therefore, when the radio node (or UE) performs the DAPS handover method, for a bearer (RLC bearer, backhaul RLC channel identifier, or backhaul RLC logical channel identifier) for which the DAPS handover method is not configured, the BAP re-establishment or reconfiguration procedure is not triggered or performed when the handover command message is received, or the target base station does not configure the BAP re-establishment or reconfiguration procedure for the bearers (RLC bearer, backhaul RLC channel identifier, or backhaul RLC logical channel identifier) in the handover command message, the BAP re-establishment or reconfiguration procedure may be triggered or performed when the first condition is satisfied. In addition, for the bearer (RLC bearer, backhaul RLC channel identifier, or backhaul RLC logical channel identifier) for which DAPS handover method is configured, the BAP re-establishment or reconfiguration procedure is not performed.

Second method: When a handover command message is received, the upper layer entity (for example, RRC layer entity) of the radio node (or UE) may trigger or request a BAP re-establishment or reconfiguration procedure for bearer(s) (RLC bearers, backhaul RLC channel identifiers, or backhaul RLC logical channel identifiers) for which the DAPS handover method is not configured. The BAP layer entity, which has received the request for the BAP re-establishment or reconfiguration procedure, may perform different BAP re-establishment or reconfiguration procedures for respective bearers (RLC bearers, backhaul RLC channel identifiers, or backhaul RLC logical channel identifiers).

According to the second embodiment (for example, the DAPS handover method) of the efficient handover method of the disclosure, a radio node (or UE) can continuously receive downlink data from the source base station or the target base station through protocol layer entities of the first bearer (RLC bearer, backhaul RLC channel identifier, or backhaul RLC logical channel identifier) for the source base station or the second bearer (RLC bearer, backhaul RLC channel identifier, or backhaul RLC logical channel identifier) for the target base station, even after the radio node (or UE) receives a handover command message (for example, an RRCReconfiguration message). In addition, in order to smoothly receive downlink data from the source base station (or target base station) or to smoothly transmit the downlink data by the source base station (or target base station), the radio node (or UE) may allow, with respect to AM bearers (RLC bearers, backhaul RLC channel identifiers, or backhaul RLC logical channel identifiers), the RLC status report other than data to be continuously transmitted via uplink transmission to the source base station (or target base station) via uplink transmission through protocol layer entities of the first bearer (RLC bearer, backhaul RLC channel identifier, or backhaul RLC logical channel identifier) (or second bearer (RLC bearer, backhaul RLC channel identifier, or backhaul RLC logical channel identifier)). That is, even if the radio node (or UE) switches uplink data transmission to the target base station by satisfying the first condition in the above, in case where transmission of RLC status report, HARQ ACK, NACK, or BAP control data (Congestion control feedback, congestion control polling indicator or backhaul channel radio connection failure indicator (BH RLF, Backhaul radio link failure) or BAP status report) to the source base station is required, data transmission may be allowed to be transmitted through a first bearer (RLC bearer, backhaul RLC channel identifier, or backhaul RLC logical channel identifier) for the source base station. This is because it is necessary to continuously perform congestion control or identification of radio connection failure in connection with the source base station. Specifically, in the second embodiment of the efficient handover method of FIG. 9, even if the radio node (or UE) 9-20 suspends transmission of uplink data to the source base station through the protocol layer entities 9-22 of the first bearer (RLC bearer, backhaul RLC channel identifier, or backhaul RLC logical channel identifier) and switches to start transmission of uplink data to the target base station through the protocol layer entities 9-21 of the second bearer (RLC bearer, backhaul RLC channel identifier, or backhaul RLC logical channel identifier) because the first condition is satisfied in a third step 9-03, the radio node (or UE) may enable continuous transmission of HARQ ACK or HARQ NACK information, RLC status report (ACK or NACK information), or BAP control data through the protocol layer entities of the first bearer (RLC bearer, backhaul RLC channel identifier, or backhaul RLC logical channel identifier) (or the second bearer (RLC bearer, backhaul RLC channel identifier, or backhaul RLC logical channel identifier)) so as to smoothly receive downlink data from the source base station (or target base station) or to enable the source base station (or target base station) to smoothly transmit downlink data. In addition, in the second embodiment of the efficient handover method of FIG. 9, even if the radio node (or UE) 9-20 suspends transmission of uplink data to the source base station through the protocol layer entities 9-22 of the first bearer (RLC bearer, backhaul RLC channel identifier, or backhaul RLC logical channel identifier) and switches to start transmission of uplink data to the target base station through the protocol layer entities 9-21 of the second bearer (RLC bearer, backhaul RLC channel identifier, or backhaul RLC logical channel identifier) because the first condition is satisfied in the third step 9-03, the radio node (or UE) may continuously perform data transmission due to HARQ retransmission of the MAC layer entity or data transmission due to retransmission of RLC layer entity in the AM mode in order to prevent data loss to the source base station. In the above, in the second embodiment of the efficient handover method of FIG. 9, if the radio node (or UE) 9-20 stops transmission of uplink data to the source base station through the protocol layer entities 9-22 of the first bearer (RLC bearer, backhaul RLC channel identifier, or backhaul RLC logical channel identifier) and switches to start transmission of uplink data to the target base station through the protocol layer entities 9-21 of the second bearer (RLC bearer, backhaul RLC channel identifier, or backhaul RLC logical channel identifier) because the first condition is satisfied in the third step 9-03, the source base station or the target base station may divide time and accordingly allocate transmission resources to the radio node (or UE) so that the uplink transmission resource for the target base station and the uplink transmission resource for the source base station do not collide. If the uplink transmission resource for the target base station and the uplink transmission resource for the source base station collide and overlap, the radio node (or UE) may prioritize the uplink transmission resource for the source base station and perform data transmission to the source base station in order to maintain the downlink data transmission from the source base station or continuously receive the uplink transmission resource from the source base station without problems. As another method, if the uplink transmission resource for the target base station and the uplink transmission resource for the source base station collide and overlap, the radio node (or UE) may prioritize the uplink transmission resource for the target base station and perform data transmission to the target base station in order to maintain the downlink data transmission from the target base station.

Specifically, when a handover (for example, a DAPS handover) corresponding to the second embodiment of the disclosure is indicated in case where the radio node (or UE) receives a handover command message, or in case where the handover is indicated for each bearer (RLC bearer, backhaul RLC channel identifier, or backhaul RLC logical channel identifier), the radio node (or UE) or the bearer (RLC bearer, backhaul RLC channel identifier, or backhaul RLC logical channel identifier) for which the DAPS handover is indicated may perform a scheduling request through the first protocol layer entity and transmit a buffer status report to the source base station, before the first condition is satisfied, to receive uplink transmission resources and transmit uplink data, and receive downlink data from the source base station. However, if the first condition is satisfied, the radio node (or UE) no longer transmits data to the source base station and switches the uplink to perform a scheduling request through the second protocol layer entity, and may transmit a buffer status report to the target base station, receive uplink transmission resources, and transmit uplink data to the target base station. However, the radio node (or UE) may continuously receive downlink data from the source base station, and even after uplink transmission switching, may continuously transmit HARQ ACK. HARQ NACK, RLC status report, or BAP control data (e.g., BAP status report or ROHC feedback information) corresponding to the downlink data. In addition, even if the first condition is satisfied, the radio node (or UE) may continue to receive downlink data from the source base station or the target base station.

The second embodiment of the efficient handover method in FIG. 9 may be characterized in that, if a second condition is satisfied, the radio node (or UE) 9-20 stops receiving downlink data from the source base station 9-05 through the protocol layer entities 9-22 of the first bearer (RLC bearer, backhaul RLC channel identifier, or backhaul RLC logical channel identifier), or disconnects from the source base station, in the fourth step 9-04. In the above, the second condition may be one of the following conditions. In addition, the BAP layer entity 9-21 of the second bearer (RLC bearer, backhaul RLC channel identifier, or backhaul RLC logical channel identifier) may continue seamless data transmission or reception with the target base station by using information such as transmission or reception data, sequence number information, header compression and decompression context, and the like, stored in the BAP layer entity 9-22 of the first bearer (RLC bearer, backhaul RLC channel identifier, or backhaul RLC logical channel identifier).

It may be determined that the second condition is satisfied if the radio node (or UE) has performed a procedure of random access to the target base station through the layer entities 9-21 of the second bearer (RLC bearer, backhaul RLC channel identifier, or backhaul RLC logical channel identifier) and has receive a random access response.

It may be determined that the second condition is satisfied if the radio node (or UE) has performed a procedure of random access to the target base station through the layer entities of the second bearer (RLC bearer, backhaul RLC channel identifier, or backhaul RLC logical channel identifier), has received a random access response, has constituted a handover completion message, and has transmitted the same to the target base station.

It may be determined that the second condition is satisfied if the radio node (or UE) has completed a procedure of random access to the target base station through the layer entities of the second bearer (RLC bearer, backhaul RLC channel identifier, or backhaul RLC logical channel identifier) and has first transmitted data by using a PUCCH or PUSCH uplink transmission resource, or has first received the PUCCH or PUSCH uplink transmission resource.

It may be determined that the second condition is satisfied if the base station has configured a separate timer for the radio node (or UE) through an RRC message, and if the timer has expired.

The timer may be started if the radio node (or UE) has received a handover command message from the source base station, if the radio node (or UE) has started a random access to the target base station (has transmitted a preamble), if the radio node (or UE) has received a random access response from the target base station, if the radio node (or UE) has transmitted a handover completion message to the target base station, or if the radio node (or UE) has first transmitted data by using a PUCCH or PUSCH uplink transmission resource.

It may be determined that the second condition is satisfied if the radio node (or UE) has performed a procedure of random access to the target base station through the layer entities of the second bearer (RLC bearer, backhaul RLC channel identifier, or backhaul RLC logical channel identifier), has received a random access response, has constituted a handover completion message, and has transmitted the same to the target base station, and if successful delivery of the handover completion message has been identified by the MAC layer entity (HARQ ACK) or RLC layer entity (RLC ACK).

It may be determined that the second condition is satisfied if the radio node (or UE) has performed a procedure of random access to the target base station through the layer entities of the second bearer (RLC bearer, backhaul RLC channel identifier, or backhaul RLC logical channel identifier) and has received a random access response, or has constituted a handover completion message, has transmitted the same to the target base station, and has first received an uplink transmission resource assigned from the target base station, or if the uplink transmission resource has first been indicated.

When the source base station performs the efficient handover proposed by the disclosure, it may determine when to stop transmitting downlink data to the radio node (or UE) or when to disconnect from the radio node (or UE). For example, this may be determined in a predetermined method (for example, when a predetermined timer has expired (timer may start after handover is indicated), or when the source base station has received, from the target base station, an indication that the radio node (or UE) has successfully handed over to the target base station). In addition, the radio node (or UE) may determine that the second condition is satisfied if no downlink data is received form the source base station for a predetermined time, may determine that the connection with the source base station is disconnected, and may disconnect therefrom.

It may be determined that the second condition is satisfied if the radio node (or UE) has received, from the target base station, an indicator (for example, RRC message (for example, RRCReconfiguration message), MAC CE, RLC control PDU, or BAP control PDU) indicating the disconnection from the source base station.

It may be determined that the second condition is satisfied if the radio node (or UE) fails to receive downlink data from the source base station for a predetermined time.

It may be determined that the second condition is satisfied if the radio node (or UE) has successfully completed a procedure of random access to the target base station through layer entities (for example, MAC layer entity) of the second bearer (RLC bearer, backhaul RLC channel identifier, or backhaul RLC logical channel identifier), if the radio node (or UE) has successfully completed a procedure of random access to the target base station through layer entities of the second bearer (RLC bearer, backhaul RLC channel identifier, or backhaul RLC logical channel identifier) and has received the first uplink transmission resource assigned from the target base station, or if the uplink transmission resource has first been indicated to the radio node (or UE).

For example, more specifically, if the radio node (or UE) has received a handover command message from the source base station, if the radio node (or UE) has been indicated to make a random access to the target base station, and if the indicated random access is a contention-free random access (CFRA) (for example, if a predesignated preamble or a radio node (or UE) cell identifier (for example, C-RNTI) has been assigned thereto)

It may be considered that the random access procedure has been successfully completed when the radio node (or UE) has transmitted a predesignated preamble to a cell of the target base station and has received a random access response (RAR) message. Therefore, it may be determined that the second condition is satisfied if the radio node (or UE) has received the first uplink transmission resource assigned, included, or indicated by the RAR message. As another method, it may be determined that the second condition is satisfied if an uplink transmission resource is first received after the RAR is received.

If the radio node (or UE) has received a handover command message from the source base station, if the radio node (or UE) has been indicated to make a random access to the target base station, and if the indicated random access is a contention-based random access (CBRA) (for example, if a predesignated preamble or a radio node (or UE) cell identifier (for example, C-RNTI) has not been assigned thereto).

It may be considered that the radio node (or UE) has successfully completed the procedure of random access to the target base station if the radio node (or UE) has transmitted a preamble (for example, any preamble) to a cell of the target base station, has received a random access response (RAR) message, has transmitted message 3 (for example, handover completion message) by using an uplink transmission resource assigned, included, or indicated by the random access response message, and has received a MAC CE indicating that contention has been resolved (contention resolution MAC CE), through message 4, from the target base station, or has received an uplink transmission resource through a PDCCH corresponding to the C-RNTI of the radio node (or UE). Therefore, it may be determined that the second condition is satisfied if the radio node (or UE) first thereafter monitors the PDCCH and first receives (or first receives indication of) an uplink transmission resource through the PDCCH corresponding to the C-RNTI of the radio node (or UE). As another method, in case where the uplink transmission resource assigned through the random access response message has such a sufficient size that, after message 3 is transmitted, the radio node (or UE) can additionally transmit uplink data, it may be determined that the uplink transmission resource is first received, and that the second condition is satisfied. That is, it may be determined, if the RAR is received, that the uplink transmission resource is first received, and that the second condition is satisfied.

In case where the handover command message received by the radio node (or UE) also indicates a handover method requiring no random access procedure (RACH-less handover).

If the handover command message includes an uplink transmission resource regarding the target base station.

The radio node (or UE) may determine that the random access procedure has been successfully completed, and that the second condition is satisfied, if the radio node (or UE) transmits message 3 (for example, handover completion message or RRCReconfigurationComplete message) by using the uplink transmission resource of the target base station, and if the radio node (or UE) receives a radio node (or UE) identify confirmation MAC CE from the target base station through message 4, or if the radio node (or UE) receives an uplink transmission resource through a PDCCH corresponding to the C-RNTI of the radio node (or UE). As another method, the radio node (or UE) may determine that the second condition is satisfied, if the first uplink transmission resource is received through the PDCCH corresponding to the C-RNTI of the radio node (or UE) as a result of PDCCH monitoring after the random access procedure is successfully completed.

If the handover command message includes no uplink transmission resource regarding the target base station.

The radio node (or UE) may determine that the random access procedure has been successfully completed, and that the second condition is satisfied, if an uplink transmission resource is received through the PDCCH corresponding to the C-RNTI of the radio node (or UE) as a result of PDCCH monitoring regarding the target base station (or cell), if the radio node (or UE) transmits message 3 (for example, handover completion message or RRCReconfigurationComplete message) by using the uplink transmission resource and receives a radio node (or UE) identify confirmation MAC CE from the target base station, or if the radio node (or UE) receives an uplink transmission resource through the PDCCH corresponding to the C-RNTI of the radio node (or UE). As another method, the radio node (or UE) may determine that the second condition is satisfied, if the first uplink transmission resource is received through the PDCCH corresponding to the C-RNTI of the radio node (or UE) as a result of PDCCH monitoring after the random access procedure is successfully completed.

In the above, when the radio node (or UE) performs the second embodiment of the efficient handover method proposed by the disclosure (DAPS handover method), if the RRC layer entity, MAC layer entity, or RLC layer entity of the first bearer (RLC bearer, backhaul RLC channel identifier, or backhaul RLC logical channel identifier) for the source base station of the radio node (or UE) or the RRC layer entity, MAC layer entity, or RLC layer entity of the second bearer (RLC bearer, backhaul RLC channel identifier, or backhaul RLC logical channel identifier) for the target base station identifies that the second condition proposed by the disclosure is satisfied, an indicator indicating that the second condition is satisfied may be sent to the BAP layer entity of the radio node (or UE) or bearer (RLC bearer, backhaul RLC channel identifier, or backhaul RLC logical channel identifier) performing the DAPS handover method. If the BAP layer entity of the radio node (or UE) receives, from a lower or upper layer entity, an indicator indicating that the second condition is satisfied, or if the second condition has been satisfied, one or a plurality of the following procedures may be performed for a bearer (RLC bearer, backhaul RLC channel identifier, or backhaul RLC logical channel identifier) or the radio node (or UE) for which DAPS handover method is configured, to successfully complete the second embodiment of the efficient handover method of the disclosure.

The radio node (or UE) may release the first bearer (RLC bearer, backhaul RLC channel identifier, or backhaul RLC logical channel identifier) for the source base station and release the connection with the source base station. In addition, before releasing the first bearer (RLC bearer, backhaul RLC channel identifier, or backhaul RLC logical channel identifier) for the source base station, the radio node (or UE) may perform an RLC re-establishment procedure for an RLC layer entity corresponding to the first bearer (RLC bearer, backhaul RLC channel identifier, or backhaul RLC logical channel identifier) for the source base station (for example, if the reordering timer is running, the timer is suspended or initialized, and if the received data is stored in the buffer, the stored data may be processed and transmitted to the upper layer entity, and in case where the data to be transmitted is in the buffer, data may be discarded) or the MAC layer entity may be initialized.

When the radio node (or UE) disconnects from the source base station, the radio node (or UE) may trigger a BAP status reporting procedure and constitute a BAP status report to transmit the BAP status report to the target base station, in order to report the reception status of downlink data, received from the source base station, to the target base station.

In case where the second condition is satisfied, the radio node (or UE) may switch the structure or function 10-20 of the second BAP layer entity to the structure or function 10-11 or 10-12 of the first BAP layer entity of the disclosure for each bearer (RLC bearer, backhaul RLC channel identifier, or backhaul RLC logical channel identifier) or for a bearer (RLC bearer, backhaul RLC channel identifier, or backhaul RLC logical channel identifier) for which the DAPS handover method is indicated, may initialize variables for realignment, and may suspend and initialize a reordering timer. In addition, the radio node (or UE) may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In addition, the radio node (or UE) may transmit the processed data to the upper layer in ascending order. That is, in the above case, in case where the second condition is satisfied, the radio node (or UE) may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In another method, in case where the second condition is satisfied, the radio node (or UE) may switch the structure or function 10-20 of the second BAP layer entity to the structure or function 10-30 of the third BAP layer entity proposed by the disclosure for each bearer (RLC bearer, backhaul RLC channel identifier, or backhaul RLC logical channel identifier) or for a bearer (RLC bearer, backhaul RLC channel identifier, or backhaul RLC logical channel identifier) for which the DAPS handover method is indicated, and may use variables for realignment and a reordering timer as they are without suspending and initializing. However, the radio node (or UE) may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In addition, the radio node (or UE) may transmit the processed data to the upper layer in ascending order. That is, in the above case, in case where the second condition is satisfied, the radio node (or UE) may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In the above, the radio node (or UE) may release QoS mapping information of the BAP layer entity for the source base station, the security key information for the source base station of the BAP layer entity, the header (or data) compression context information for the source base station, or the RLC layer entity or MAC layer entity for the source base station. In the above, switching the structure or function 10-20 of the second BAP layer entity to the structure or function of the first BAP layer entity of the disclosure for each bearer (RLC bearer, backhaul RLC channel identifier, or backhaul RLC logical channel identifier) or for a bearer (RLC bearer, backhaul RLC channel identifier, or backhaul RLC logical channel identifier) for which the DAPS handover method is indicated may mean that the BAP layer entity is reconfigured, and may be performed when a reconfiguration indicator of the BAP layer entity is received from an upper layer entity (e.g., an RRC layer entity). For example, the radio node (or UE) receives the handover command message and the upper layer entity (for example, the RRC layer entity) transmits the BAP layer entity reconfiguration indicator to the BAP layer entity of the bearer (RLC bearer, backhaul RLC channel identifier, or backhaul RLC logical channel identifier) for the bearer (RLC bearer, backhaul RLC channel identifier, or backhaul RLC logical channel identifier) for which the DAPS handover method is configured, and thus the structure or function of the first BAP layer entity may be reconfigured to the structure or function of the second BAP layer entity. If the second condition is satisfied, the upper layer entity (e.g., RRC layer entity) may transmit the BAP layer entity reconfiguration indicator to the BAP layer entity of the bearer (RLC bearer, backhaul RLC channel identifier, or backhaul RLC logical channel identifier) to reconfigure the structure or function of the second BAP layer entity to be the structure or function of the first BAP layer entity. For example, whenever the BAP layer entity reconfiguration indicator is received from an upper layer entity (for example, an RRC layer entity) by using a toggle scheme, the BAP layer entity of the bearer (RLC bearer, backhaul RLC channel identifier, or backhaul RLC logical channel identifier) may reconfigure the structure or function of the first BAP layer entity to be the structure or function of the second BAP layer entity, or may reconfigure the structure or function of the second BAP layer entity to be the structure or function of the first BAP layer entity.

In case where the second condition described in this disclosure is satisfied while performing the DAPS handover method of the disclosure, the radio node (or UE) may release the first bearer (RLC bearer, backhaul RLC channel identifier, or backhaul RLC logical channel identifier) for the source base station and switch the structure and function 11-20 of the second BAP layer entity, which is being applied to each bearer (RLC bearer, backhaul RLC channel identifier, or backhaul RLC logical channel identifier) or a bearer (RLC bearer, backhaul RLC channel identifier, or backhaul RLC logical channel identifier) for which the DAPS handover method is indicated, to the structure and function 11-10 of the first BAP layer entity and apply the same. In addition, in case where the second condition is satisfied, the radio node (or UE) may switch the structure or function 11-20 of the second BAP layer entity to the structure or function 11-10 of the first BAP layer entity of the disclosure for each bearer (RLC bearer, backhaul RLC channel identifier, or backhaul RLC logical channel identifier) or for a bearer (RLC bearer, backhaul RLC channel identifier, or backhaul RLC logical channel identifier) for which the DAPS handover method is indicated, and may maintain the second mapping information between QoS flow (or downlink data stream or uplink data stream or egress link or ingress link) and a bearer (RLC bearer, backhaul RLC channel identifier, or backhaul RLC logical channel identifier) or a second bearer (RLC bearer, backhaul RLC channel identifier, or backhaul RLC logical channel identifier) for the target base station. In addition, the radio node (or UE) may release the first mapping information of QoS flow (or downlink data stream or uplink data stream or egress link or ingress link) and a bearer (RLC bearer, backhaul RLC channel identifier, or backhaul RLC logical channel identifier) or a first bearer (RLC bearer, backhaul RLC channel identifier, or backhaul RLC logical channel identifier) after completing data processing by applying the first mapping information of QoS flow (or downlink data stream or uplink data stream or egress link or ingress link) and a bearer (RLC bearer, backhaul RLC channel identifier, or backhaul RLC logical channel identifier) to pieces of data received from the source base station (for example, all pieces of data received from the source base station) before releasing the first mapping information of QoS flow (or downlink data stream or uplink data stream or egress link or ingress link) and a bearer (RLC bearer, backhaul RLC channel identifier, or backhaul RLC logical channel identifier) or the first bearer (RLC bearer, backhaul RLC channel identifier, or backhaul RLC logical channel identifier) for the source base station. In addition, the radio node (or UE) may transmit the processed data to an upper layer in ascending order. That is, in the above, in case where the second condition is satisfied, the radio node (or UE) may process pieces of data stored in the buffer (for example, all pieces of data received from the source base station) by applying the first mapping information of QoS flow (or downlink data stream or uplink data stream or egress link or ingress link) and a bearer (RLC bearer, backhaul RLC channel identifier, or backhaul RLC logical channel identifier) for the source base station (e.g., a procedure of reading BAP header (header of BAP DATA PUD) or BAP CONTROL PDU information and updating mapping information, constituting BAP header (header of BAP DATA PUD) or BAP CONTROL PDU, or routing or transmitting to a suitable upper layer entity or lower layer entity based on the first mapping information of QoS flow (or downlink data stream or uplink data stream or egress link or ingress link) and a bearer (RLC bearer, backhaul RLC channel identifier, or backhaul RLC logical channel identifier)), and then may discard the first mapping information of QoS flow (or downlink data stream or uplink data stream or egress link or ingress link) and a bearer (RLC bearer, backhaul RLC channel identifier, or backhaul RLC logical channel identifier) for the source base station. In the above, the BAP layer entity may define and apply a 1-bit indicator of a new BAP header (header of BAP DATA PDU), a 1-bit indicator of BAP CONTROL PDU, a 1-bit indicator of BAP header (header of BAP DATA PDU) or BAP CONTROL PDU, or BAP control data (for example, a downlink end marker), or information indicated by a BAP layer entity, and may identify last data received from the source base station based on the defined information. Therefore, after performing data processing by applying the first mapping information of QOS flow (or downlink data stream or uplink data stream or egress link or ingress link) and the bearer (RLC bearer, backhaul RLC channel identifier, or backhaul RLC logical channel identifier) for the source base station to the last data received from the source base station, the radio node (or UE) may discard the first mapping information between QoS flow (or downlink data stream or uplink data stream or egress link or ingress link) and the bearer (RLC bearer, backhaul RLC channel identifier, or backhaul RLC logical channel identifier) for the source base station. In addition, in the above, the BAP layer entity may continuously maintain the second mapping information between QoS flow (or downlink data stream or uplink data stream or egress link or ingress link) and the bearer (RLC bearer, backhaul RLC channel identifier, or backhaul RLC logical channel identifier) and process uplink data or downlink data transmission to the target base station based on the mapping information.

The radio node (or UE) may initialize the MAC layer entity for the source base station, and may perform an RLC layer entity re-establishment procedure or a release procedure for the RLC layer entity for the source base station in the second BAP layer entity structure when converting the second BAP layer entity structure of the bearer (RLC bearer, backhaul RLC channel identifier, or backhaul RLC logical channel identifier) for which the DAPS handover method is configured to the first BAP layer entity structure.

In the disclosure, when the second condition is satisfied or an indicator indicating that the second condition is satisfied has been received from an upper layer entity (e.g., an RRC layer entity) or a lower layer entity (e.g., a MAC layer entity), the procedure for re-establishing or releasing the RLC layer entity of the first bearer (RLC bearer, backhaul RLC channel identifier, or backhaul RLC logical channel identifier) for the source base station may follow one of the following methods in detail.

First method: If an RLC layer entity of a first bearer (RLC bearer, backhaul RLC channel identifier, or backhaul RLC logical channel identifier) for the source base station is an LTE RLC layer entity for a bearer (RLC bearer, backhaul RLC channel identifier, or backhaul RLC logical channel identifier) for which the DAPS handover method is configured in the above, an upper layer entity (for example, an RRC layer entity) may indicate the LTE RLC layer entity to perform a re-establishment procedure. Specifically, if the reordering timer is running, the LTE RLC layer entity may suspend or initialize the timer, and if there is stored data, the LTE RLC layer entity may process the stored data and transmit the processed data to an upper layer entity, to reduce transmission delay due to the reordering timer. In addition, the RLC layer entity may initialize variables and discard pieces of data for transmission. Then, the upper layer entity (e.g., the RRC layer entity) may indicate to release the LTE RLC layer entity. However, if the RLC layer entity of the first bearer (RLC bearer, backhaul RLC channel identifier, or backhaul RLC logical channel identifier) for the source base station is an NR RLC layer entity, the upper layer entity (e.g., the RRC layer entity) may indicate to release the NR RLC layer entity directly without re-establishing the same. This is because the NR RLC layer entity always performs out-of-sequence transmission and thus there is no stored data, and even if there is stored data, the data is divided data and thus there is no problem even if it is discarded as it is. Different procedures may be applied according to an RLC layer entity configured for each bearer (RLC bearer, backhaul RLC channel identifier, or backhaul RLC logical channel identifier) as described above.

Second method: If an RLC layer entity of a first bearer (RLC bearer, backhaul RLC channel identifier, or backhaul RLC logical channel identifier) for the source base station is an LTE RLC layer entity for a bearer (RLC bearer, backhaul RLC channel identifier, or backhaul RLC logical channel identifier) for which the DAPS handover method is configured in the above, an upper layer entity (for example, an RRC layer entity) may indicate the LTE RLC layer entity to perform a re-establishment procedure. Specifically, if the reordering timer is running, the LTE RLC layer entity may suspend or initialize the timer, and if there is stored data, the LTE RLC layer entity may process the stored data and transmit the processed data to an upper layer entity, to reduce transmission delay due to the reordering timer. In addition, variables may be initialized and data for transmission may be discarded. Alternatively, the upper layer entity (e.g., the RRC layer entity) may release the LTE RLC layer entity. However, if the RLC layer entity of the first bearer (RLC bearer, backhaul RLC channel identifier, or backhaul RLC logical channel identifier) for the source base station is an NR RLC layer entity, the upper layer entity (e.g., the RRC layer entity) may indicate to release the NR RLC layer entity directly without re-establishing the same. This is because the NR RLC layer entity always performs out-of-sequence transmission and thus there is no stored data, and even if there is stored data, the data is divided data and thus there is no problem even if it is discarded as it is. Different procedures may be applied according to an RLC layer entity configured for each bearer (RLC bearer, backhaul RLC channel identifier, or backhaul RLC logical channel identifier) as described above.

Third method: If an RLC layer entity of a first bearer (RLC bearer, backhaul RLC channel identifier, or backhaul RLC logical channel identifier) for the source base station is an LTE RLC layer entity for a bearer (RLC bearer, backhaul RLC channel identifier, or backhaul RLC logical channel identifier) for which the DAPS handover method is configured in the above, a target base station may, when transmitting an RRC message (e.g., RRCReconfiguration) including an indicator to release the connection with the source base station or the first bearer (RLC bearer, backhaul RLC channel identifier, or backhaul RLC logical channel identifier) for the base station to the radio node (or UE), include an indicator (e.g., reestablishRLC) indicating re-establishment of the LTE RLC layer entity in configuration information (e.g., RLC-config) of the LTE RLC layer entity for the bearer (RLC bearer, backhaul RLC channel identifier, or backhaul RLC logical channel identifier) in the RRC message and transmit the same (or may include an indicator to release the LTE RLC layer entity). Therefore, upon receiving an indication to release the connection with the source base station or satisfying the second condition, the upper layer entity (for example, the RRC layer entity) may read the RRC message, and may indicate to perform a re-establishment procedure for the LTE RLC layer entity according to the indication of the LTE RLC re-establishment procedure (or release). Specifically, if the reordering timer is running, the LTE RLC layer entity may stop or initialize the timer, and if there is stored data, the LTE RLC layer entity may process the stored data and transmit the processed data to an upper layer entity, to reduce transmission delay due to the reordering timer. In addition, the LTE RLC layer entity may initialize variables and discard pieces of data for transmission. Then, the upper layer entity (for example, the RRC layer entity) may release the LTE RLC layer entity. If an RLC layer entity of a first bearer (RLC bearer, backhaul RLC channel identifier, or backhaul RLC logical channel identifier) for the source base station is an LTE RLC layer entity for a bearer (RLC bearer, backhaul RLC channel identifier, or backhaul RLC logical channel identifier) for which the DAPS handover method is configured in the above, the target base station may, when transmitting an RRC message (e.g., RRCReconfiguration) including an indicator to release the connection with the source base station or the first bearer (RLC bearer, backhaul RLC channel identifier, or backhaul RLC logical channel identifier) for the source base station to the radio node (or UE), include an indicator indicating release of the NR RLC layer entity in configuration information (e.g., RLC-config) of the NR RLC layer entity for the bearer (RLC bearer, backhaul RLC channel identifier, or backhaul RLC logical channel identifier) in the RRC message and transmit the same. As described above, the target base station may indicate different procedures according to an RLC layer entity configured for each bearer (RLC bearer, backhaul RLC channel identifier, or backhaul RLC logical channel identifier) through the RRC message, and accordingly, the radio node (or UE) may apply a procedure to each bearer (RLC bearer, backhaul RLC channel identifier, or backhaul RLC logical channel identifier).

Fourth method: If an RLC layer entity of a first bearer (RLC bearer, backhaul RLC channel identifier, or backhaul RLC logical channel identifier) for the source base station is an LTE RLC layer entity for a bearer (RLC bearer, backhaul RLC channel identifier, or backhaul RLC logical channel identifier) for which the DAPS handover method is configured in the above, a target base station may, when transmitting an RRC message (e.g., RRCReconfiguration) including an indicator to release the connection with the source base station or the first bearer (RLC bearer, backhaul RLC channel identifier, or backhaul RLC logical channel identifier) for the base station to the radio node (or UE), include an indicator (e.g., reestablishRLC) indicating re-establishment of the LTE RLC layer entity in configuration information (e.g., RLC-config) of the LTE RLC layer entity for the bearer (RLC bearer, backhaul RLC channel identifier, or backhaul RLC logical channel identifier) in the RRC message and transmit the same (or may include an indicator to release the LTE RLC layer entity). Therefore, upon receiving an indication to release the connection with the source base station or satisfying the second condition, the upper layer entity (for example, the RRC layer entity) may read the RRC message, and may indicate to perform a re-establishment procedure for the LTE RLC layer entity according to the indication of the LTE RLC re-establishment procedure (or release). Specifically, if the reordering timer is running, the LTE RLC layer entity may suspend or initialize the timer, and if there is stored data, the LTE RLC layer entity may process the stored data and transmit the processed data to an upper layer entity, to reduce transmission delay due to the reordering timer. In addition, the RLC layer entity may initialize variables and discard pieces of data for transmission. Alternatively, the upper layer entity (e.g., the RRC layer entity) may release the LTE RLC layer entity. If an RLC layer entity of a first bearer (RLC bearer, backhaul RLC channel identifier, or backhaul RLC logical channel identifier) for the source base station is an NR RLC layer entity for a bearer (RLC bearer, backhaul RLC channel identifier, or backhaul RLC logical channel identifier) for which the DAPS handover method is configured in the above, the target base station may, when transmitting an RRC message (e.g., RRCReconfiguration) including an indicator to release the connection with the source base station or the first bearer (RLC bearer, backhaul RLC channel identifier, or backhaul RLC logical channel identifier) for the source base station to the radio node (or UE), include an indicator indicating release of the NR RLC layer entity for the bearer (RLC bearer, backhaul RLC channel identifier, or backhaul RLC logical channel identifier) or re-establishment of the NR RLC layer entity in the RRC message and transmit the same. As described above, the target base station may indicate different procedures according to an RLC layer entity configured for each bearer (RLC bearer, backhaul RLC channel identifier, or backhaul RLC logical channel identifier) through the RRC message, and accordingly, the radio node (or UE) may apply a procedure to each bearer (RLC bearer, backhaul RLC channel identifier, or backhaul RLC logical channel identifier).

The receiving BAP layer entity may process or store the data received due to the re-establishment procedure of the lower layer entity (e.g., RLC layer entity), and for UM DRBs, a routing or re-routing procedure may be performed on the stored data (received from the source base station) or all stored data, based on the configuration information of the BAP layer entity for the target base station (or the source base station).

The receiving BAP layer entity may process or store the data received due to the re-establishment procedure of the lower layer entity (e.g., RLC layer entity), and for AM DRBs, a routing or re-routing procedure may be performed on the stored data (received from the source base station) or all stored data, based on the configuration information of the BAP layer entity for the target base station (or the source base station).

As another method, the receiving BAP layer entity may process or store the data received due to the re-establishment procedure of the lower layer entity (e.g., the RLC layer entity), and for UM DRBs or AM DRBs, in case where an indicator (drb-Continue ROHC or drb-Continue Ethernet header compression (EHC)) indicating that continued use of the header compression context is not configured, a header decompression procedure may be performed on the stored data (received from the source base station) or all stored data, based on header compression context (ROHC or Ethernet header compression (EHC)).

After performing the above procedure, the transmitting or receiving BAP layer entity may release the BAP layer entity configuration information from the source base station. As another method, if the first condition is satisfied, the transmitting or receiving BAP layer entity may also release the BAP layer entity configuration information from the source base station.

In FIG. 7 of the disclosure, when transmitting a handover command message 7-20 to the radio node (or UE), the base station may define indicators for the embodiments of the disclosure in the handover command message (e.g., RRCReconfiguration message), and may indicate, to the radio node (or UE), whether to trigger a handover procedure corresponding to an embodiment. In addition, the radio node (or UE) may perform a handover procedure according to a handover method indicated through the handover command message, and, for example, the radio node (or UE) may perform the second embodiment of the efficient handover method (DAPS handover method) of the disclosure, so as to perform a handover to a target base station while minimizing a data interruption time. As another method, the base station may define an indicator, for the embodiments of the disclosure, for each bearer (RLC bearer, backhaul RLC channel identifier, or backhaul RLC logical channel identifier), through the handover command message, and may more specifically indicate a bearer (RLC bearer, backhaul RLC channel identifier, or backhaul RLC logical channel identifier) to which an embodiment is applied during a handover. For example, the base station may indicate to apply the second embodiment of the disclosure to an AM bearer (RLC bearer, backhaul RLC channel identifier, or backhaul RLC logical channel identifier) only in which an RLC layer entity operating in the AM mode operates, or an indication may be extended and applied to a UM bearer (RLC bearer, backhaul RLC channel identifier, or backhaul RLC logical channel identifier) in which an RLC layer entity operating in the UM mode operates. In addition, it is assumed that the embodiments of the disclosure are applied to DRB. However, if necessary (for example, in a case where the radio node (or UE) maintains the SRB for the source base station and fails to handover to the target base station, and thus may report or restore the handover failure message to the SRB for the source base station), the embodiments of the disclosure may be extended and applied to the SRB.

According to embodiments of the disclosure, when the radio node (or UE) transmits/receives data with the source base station through protocol layer entities of the first bearer (RLC bearer, backhaul RLC channel identifier, or backhaul RLC logical channel identifier) and transmits/receives data with the target base station through protocol layer entities of the second bearer (RLC bearer, backhaul RLC channel identifier, or backhaul RLC logical channel identifier), the MAC layer entity of the first bearer (RLC bearer, backhaul RLC channel identifier, or backhaul RLC logical channel identifier) and the MAC layer entity of the second bearer (RLC bearer, backhaul RLC channel identifier, or backhaul RLC logical channel identifier) may apply separate discontinuous reception (DRX) cycles, respectively, thereby reducing radio node (or UE) battery consumption. That is, the radio node (or UE) may continuously apply the DRX cycle of the MAC layer entity, applied when transmitting or receiving data through the protocol layer entities of the first bearer (RLC bearer, backhaul RLC channel identifier, or backhaul RLC logical channel identifier), even after receiving the handover command message, and may suspend the DRX cycle according to the first condition or the second condition of the disclosure. In addition, the radio node (or UE) may separately apply the DRX cycle to the MAC layer entity of the second bearer (RLC bearer, backhaul RLC channel identifier, or backhaul RLC logical channel identifier) according to the instruction of the target base station.

In addition, the description that the radio node (or UE) in the disclosure suspends uplink transmission to the source base station through protocol layer entities of the first bearer (RLC bearer, backhaul RLC channel identifier, or backhaul RLC logical channel identifier) and suspends downlink data reception from the source base station means that the radio node (or UE) reestablishes, initializes, or releases the protocol layer entities (PHY layer entities, MAC layer entities, RLC layer entities, or BAP layer entities) of the first bearer (RLC bearer, backhaul RLC channel identifier, or backhaul RLC logical channel identifier).

It has been assumed in the above description of embodiments of the disclosure, for convenience of description, that a first bearer (RLC bearer, backhaul RLC channel identifier, or backhaul RLC logical channel identifier) for the source base station or a second bearer (RLC bearer, backhaul RLC channel identifier, or backhaul RLC logical channel identifier) for the target base station is configured for the radio node (or UE), but the description may be easily extended and equally applied to a case in which a plurality of first bearers (RLC bearers, backhaul RLC channel identifiers, or backhaul RLC logical channel identifiers) for the source base station or a plurality of second bearers (RLC bearers, backhaul RLC channel identifiers, or backhaul RLC logical channel identifiers) for the target base station are configured for the radio node (or UE). As another method, the description may be easily extended and equally applied to a case in which a plurality of bearers (RLC bearers, backhaul RLC channel identifiers, or backhaul RLC logical channel identifiers) are configured for a plurality of target base stations. For example, second bearers (RLC bearers, backhaul RLC channel identifiers, or backhaul RLC logical channel identifiers) may be configured while performing a procedure of handover to a first target base station. In case where the handover fails, second bearers (RLC bearers, backhaul RLC channel identifiers, or backhaul RLC logical channel identifiers) may be configured while performing a procedure of handover to a second target base station. Accordingly, the radio node (or UE) may independently search for a cell satisfying a predetermined condition (for example, a predetermined signal intensity or higher) among the plurality of target base stations, may determine a single cell, and may perform a handover procedure.

Figure 10:
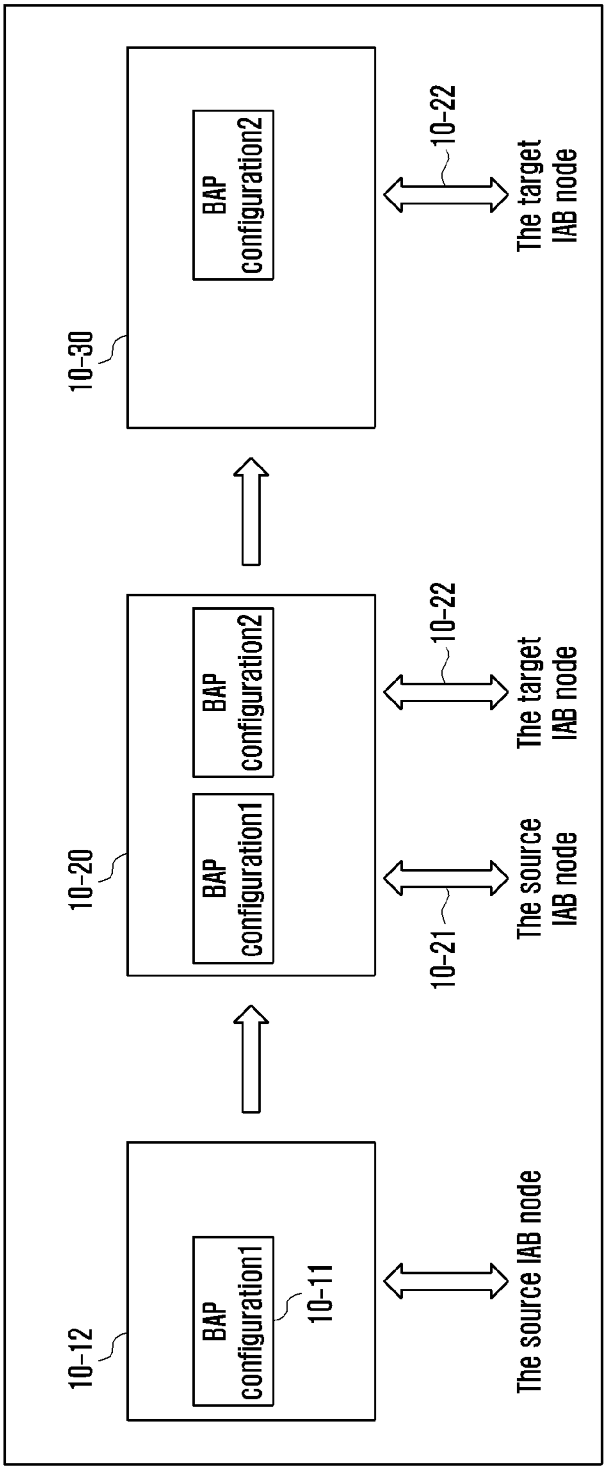
FIG. 10 is a diagram illustrating structures of an efficient backhaul adaptation protocol (BAP) layer entity applied in a dual active protocol stack (DAPS) handover method, which is a second embodiment of an efficient handover method proposed in the disclosure, and a method for applying the structures.

FIG. 10 illustrates a diagram illustrating structures of an efficient BAP layer entity applied in a DAPS handover method, which is the second embodiment of the efficient handover method proposed by the disclosure, and a method for applying the structures.

FIG. 10 proposes detailed structures and functions of an efficient BAP layer entity applied in a DAPS handover method, which is the second embodiment of the efficient handover method proposed by the disclosure, and is characterized in that, while performing a DAPS handover procedure, different structure of the BAP layer entity proposed below may be applied at different occasions with regard to each bearer (RLC bearer, backhaul RLC channel identifier, or backhaul RLC logical channel identifier).

For example, before a handover command message is received from a base station, the radio node (or UE) may apply structures and functions 10-11 or 10-12 of the first BAP layer entity proposed by the disclosure with regard to each bearer (RLC bearer, backhaul RLC channel identifier, or backhaul RLC logical channel identifier), thereby processing data and transmitting or receiving the same (10-01).

However, in case where the radio node (or UE) has received a handover command message from the base station, and the handover command message indicates the DAPS handover method proposed by the disclosure, or in case where the handover command message indicates the DAPS handover method with regard to specific bearers (RLC bearers, backhaul RLC channel identifiers, or backhaul RLC logical channel identifiers), the radio node (or UE) may apply structures and functions 10-20 of the second BAP layer entity proposed by the disclosure with regard to respective bearers (RLC bearers, backhaul RLC channel identifiers, or backhaul RLC logical channel identifiers) or with regard to the bearers (RLC bearers, backhaul RLC channel identifiers, or backhaul RLC logical channel identifiers) for which the DAPS handover method is indicated, thereby processing data and transmitting or receiving the same (10-02). That is, in case where the radio node (or UE) has received a handover command message, and the handover command message indicates the DAPS handover method proposed by the disclosure, or in case where the handover command message indicates the DAPS handover method with regard to specific bearers (RLC bearers, backhaul RLC channel identifiers, or backhaul RLC logical channel identifiers), the radio node (or UE) may switch from the structure or function 10-11 or 10-12 of the first BAP layer entity that has been used by each bearer (RLC bearer, backhaul RLC channel identifier, or backhaul RLC logical channel identifier) to the structure or function 10-20 of the second BAP layer entity proposed by the disclosure, with regard to each bearer (RLC bearer, backhaul RLC channel identifier, or backhaul RLC logical channel identifier) or with regard to the bearer (RLC bearer, backhaul RLC channel identifier, or backhaul RLC logical channel identifier) for which the DAPS handover method is indicated. As another method, the radio node (or UE) may switch, if the first condition proposed by the disclosure is satisfied, from the structure or function 10-11 or 10-12 of the first BAP layer entity that has been used by each bearer (RLC bearer, backhaul RLC channel identifier, or backhaul RLC logical channel identifier) to the structure or function 10-20 of the second BAP layer entity proposed by the disclosure, with regard to each bearer (RLC bearer, backhaul RLC channel identifier, or backhaul RLC logical channel identifier) or with regard to the bearer (RLC bearer, backhaul RLC channel identifier, or backhaul RLC logical channel identifier) for which the DAPS handover method is indicated (10-02).

In addition, in case where the second condition proposed by the disclosure is satisfied while the radio node (or UE) performs the DAPS handover method proposed by the disclosure, the radio node (or UE) may release the structure and function 10-20 of the second BAP layer entity that has been applied with regard to each bearer (RLC bearer, backhaul RLC channel identifier, or backhaul RLC logical channel identifier) or with regard to the bearer (RLC bearer, backhaul RLC channel identifier, or backhaul RLC logical channel identifier) for which the DAPS handover method is indicated, from the first bearers (RLC bearers, backhaul RLC channel identifiers, or backhaul RLC logical channel identifiers) for the source base station, may switch back to the structure and function 10-11 or 10-12, 10-30 of the first BAP layer entity, and may apply the same.

As suggested in FIG. 1*i* of the disclosure above, when the radio node (or UE) performs handover by applying the structure and function 10-11 or 10-12 of the first BAP layer entity or the structure and function 10-20 of the second BAP layer entity, which are different for each bearer (RLC bearer, backhaul RLC channel identifier, or backhaul RLC logical channel identifier) at different occasions, there is no data loss and a data interruption time can be minimized.

The structure of the second BAP layer entity proposed by the disclosure proposes a structure in which the BAP layer entity configuration information for a source base station or the BAP layer entity configuration information for a target base station can be configured or used together in one BAP layer entity. The structure of the second BAP layer entity may be extended to a structure in which, in two BAP layer entities, the first BAP layer entity configures the BAP layer entity configuration information for the source base station and establishes a connection with the first bearers, and the second BAP layer entity configures the BAP layer entity configuration information for the target base station and establishes a connection of the second bearers.

In the second BAP layer entity structure, a method for applying the BAP layer entity configuration information (configuration information configured in the RRC message or F1AP message proposed above by the disclosure) when a BAP layer entity transmits, receives, routes, or reroutes data is proposed as follows. One of the following methods may be applied to perform the operation of the BAP layer entity in the handover procedure proposed by the disclosure.

First method: When the BAP layer entity configuration information for the target base station is received or configured in an RRC message or F1AP message, the BAP layer entity immediately applies the BAP layer entity configuration information for the target base station, and may perform data transmission, reception, routing, or re-routing procedure for downlink data or uplink data based on the BAP layer entity configuration information for the target base station.

Second method: When the BAP layer entity configuration information for the target base station is received in an RRC message or F1AP message, the BAP layer entity may store the BAP layer entity configuration information for the target base station together with the BAP layer entity configuration information for the source base station. In addition, before the first condition is satisfied, the BAP layer entity applies the BAP layer entity configuration information for the source base station, and may perform data transmission, reception, routing, or re-routing procedure for downlink data or uplink data based on the BAP layer entity configuration information for the source base station. In addition, if the first condition is satisfied, the BAP layer entity applies the BAP layer entity configuration information for the target base station, and may perform data transmission, reception, routing, or re-routing procedure for downlink data or uplink data based on the BAP layer entity configuration information for the target base station.

Third method: When the BAP layer entity configuration information for the target base station is received in an RRC message or F1AP message, the BAP layer entity receives may store the BAP layer entity configuration information for the target base station together with the BAP layer entity configuration information for the source base station. In addition, before the second condition is satisfied, the BAP layer entity applies the BAP layer entity configuration information for the source base station and may perform data transmission, reception, routing, or re-routing procedure for downlink data or uplink data based on the BAP layer entity configuration information for the source base station. In addition, if the second condition is satisfied, the BAP layer entity applies the BAP layer entity configuration information for the target base station, and may perform data transmission, reception, routing, or re-routing procedure for downlink data or uplink data based on the BAP layer entity configuration information for the target base station.

Fourth method: When the BAP layer entity configuration information for the target base station is received in an RRC message or F1AP message, the BAP layer entity receives may store the BAP layer entity configuration information for the target base station together with the BAP layer entity configuration information for the source base station. In addition, before the first condition is satisfied, the BAP layer entity applies the BAP layer entity configuration information for the source base station and may perform data transmission, reception, routing, or re-routing procedure for downlink data or uplink data based on the BAP layer entity configuration information for the source base station. In addition, if the first condition is satisfied, the BAP layer entity applies the BAP layer entity configuration information for the source base station for the downlink data received from the source base station, and may perform data transmission, reception, routing, or re-routing procedure for downlink data received from the target base station by applying the BAP layer entity configuration information for the target base station. In addition, if the first condition is satisfied, the BAP layer entity may perform data transmission, reception, routing, or re-routing procedure for uplink data by applying the BAP layer entity configuration information for the target base station. In the above, if the second condition is satisfied, the BAP layer entity may release the BAP layer entity configuration information for the source base station.

When distinguishing between layer entities of the first bearer (RLC bearer, backhaul RLC channel identifier, or backhaul RLC logical channel identifier) and layer entities of the second bearer (RLC bearer, backhaul RLC channel identifier, or backhaul RLC logical channel identifier), the one BAP layer entity considers that the layer entities are connected to different MAC layer entities or have different logical channel identifiers or are different RLC layer entities that are connected to different MAC layer entities or use different BAP layer entity configuration information, and distinguishes the layer entities (or first RLC layer entities) of the first bearer (RLC bearer, backhaul RLC channel identifier, or backhaul RLC logical channel identifier) and the layer entities (or second RLC layer entities) of the second bearer (RLC bearer, backhaul RLC channel identifier, or backhaul RLC logical channel identifier), so that different BAP layer entity configuration information (e.g., BAP layer entity configuration information for a source base station or BAP layer entity configuration information for a target base station) is applied to uplink data and downlink data. For example, the one BAP layer entity may apply the BAP layer entity configuration information for a source base station to uplink or downlink data for the first bearer, or the BAP layer entity configuration information for a target base station to uplink or downlink data for the second bearer.

The second BAP layer entity structure may perform the procedure of transmitting, receiving, routing, or re-routing data received from RLC layer entities of the first bearer (RLC bearer, backhaul RLC channel identifier, or backhaul RLC logical channel identifier) for each source base station and data received from RLC layer entities of the second bearer (RLC bearer, backhaul RLC channel identifier, or backhaul RLC logical channel identifier) for each target base station. In addition, an indicator for each data may be defined to distinguish data received from the RLC layer entities of the first bearer (RLC bearer, backhaul RLC channel identifier, or backhaul RLC logical channel identifier) for each source base station from the RLC layer entities of the second bearer (RLC bearer, backhaul RLC channel identifier, or backhaul RLC logical channel identifier) for each target base station, so that it is possible to distinguish whether data is received from a source base station or data received from a target base station. As another method, a 1-bit indicator of the BAP header (header of the BAP DATA PDU), BAP CONTROL PDU, BAP header (header of BAP DATA PDU), BAP CONTROL PDU, RLC header may be defined to determine whether the data is received from the source base station or the data is received from the target base station. In addition, the 1-bit indicator of the BAP header (header of the BAP DATA PDU) or BAP CONTROL PDU may indicate to apply the BAP layer entity configuration information for the source base station (for example, a value of 0 or 1) or to apply the BAP layer entity configuration information (for example, a value of 0 or 1) for the target base station. The 1-bit indicator of the BAP header (header of BAP DATA PDU) or BAP CONTROL PDU may be configured for downlink data in the highest radio node. DU of the highest radio node, or a wireless node. As another method, the 1-bit indicator of the BAP header (header of BAP DATA PDU) or BAP CONTROL PDU may be configured for uplink data in a radio node performing the handover procedure proposed by the disclosure (e.g., the 1-bit indicator of the BAP header (header of BAP DATA PDU) or BAP CONTROL PDU may indicate that the BAP layer entity configuration information for the source base station has been applied (e.g., a value of 0 or 1) or the BAP layer entity configuration information for the target base station has been applied (e.g., a value of 0 or 1)). In the above, when the BAP layer entity satisfies the first condition for the downlink data to be received or to be routed when performing the handover procedure proposed by the disclosure, the BAP layer entity may read, interpret, consider a new bit value of the BAP header (header of BAP DATA PDU) or BAP CONTROL PDU, and may perform a transmission, reception, routing, or re-routing procedure. In addition, when the BAP layer entity performs the handover procedure proposed by the disclosure, or satisfies the second condition, the BAP layer entity may not read or interpret, or may ignore a new bit value of the BAP header (header of BAP DATA PDU) or BAP CONTROL PDU, and may perform a transmission, reception, routing or re-routing procedure. In the above, when the BAP layer entity satisfies the first condition for uplink data to be transmitted or routed when performing the handover procedure proposed by the disclosure, the BAP layer entity may configure or indicate a new bit value of the BAP header (header of BAP DATA PDU) or BAP CONTROL PDU, and may perform a transmission, routing, or re-routing procedure. In addition, when the BAP layer entity performs the handover procedure proposed by the disclosure, or satisfies the second condition, the BAP layer entity may not configure or indicate a new bit value of the BAP header (header of BAP DATA PDU) or BAP CONTROL PDU, and may perform a transmission, reception, routing or re-routing procedure. In addition, the BAP layer entity may perform a transmission, reception, routing, or re-routing procedure for both the data received from the RLC layer entities of the first bearer (RLC bearer, backhaul RLC channel identifier, or backhaul RLC logical channel identifier) for the source base station and data received from the RLC layer entities of the second bearer (RLC bearer, backhaul RLC channel identifier, or backhaul RLC logical channel identifier) for the target base station. In the above, one BAP layer entity may receive data from different base stations, that is, may receive data from the first bearer (RLC bearer, backhaul RLC channel identifier, or backhaul RLC logical channel identifier) or the second bearer (RLC bearer, backhaul RLC channel identifier, or backhaul RLC logical channel identifier) regardless of order, and may perform a transmission or reception or routing or rerouting procedure in the received order.

When distinguishing between the layer entities of the first bearer (RLC bearer, backhaul RLC channel identifier, or backhaul RLC logical channel identifier) and the layer entities of the second bearer (RLC bearer, backhaul RLC channel identifier, or backhaul RLC logical channel identifier), the one BAP layer entity considers that the layer entities are connected to different MAC layer entities, or have different logical channel identifiers, or are different RLC layer entities connected to different MAC layer entities, or use different encryption keys, so as to distinguish the layer entities (or first RLC layer entities) of the first bearer (RLC bearer, backhaul RLC channel identifier, or backhaul RLC logical channel identifier) from the layer entities (or second RLC layer entities) of the second bearer (RLC bearer, backhaul RLC channel identifier, or backhaul RLC logical channel identifier), so that the BAP layer entity may perform a transmission, reception, routing, or re-routing procedure by applying different BAP layer entity configuration information for uplink data and downlink data.

In the disclosure, when the radio node (or UE) receives the handover command message in FIG. 1F and applies the bearer (RLC bearer, backhaul RLC channel identifier, or backhaul RLC logical channel identifier) configuration information included in the handover command message, applying the bearer (RLC bearer, backhaul RLC channel identifier, or backhaul RLC logical channel identifier) configuration information in different ways according to the handover type indicated in the handover command message is proposed.

When the radio node (or UE) receives the handover command message and the first handover method (for example, the first embodiment of the disclosure or a normal handover method) is indicated in the handover command message. ReconfigWithSync information, or Mobility ControlInfo information, when the second embodiment (DAPS handover method) proposed by the disclosure is not configured, or when no bearer (RLC bearer, backhaul RLC channel identifier, or backhaul RLC logical channel identifier) is configured in the bearer (RLC bearer, backhaul RLC channel identifier, or backhaul RLC logical channel identifier) configuration information in the second embodiment (DAPS handover method) proposed by the disclosure.

in case where the default bearer (RLC bearer, backhaul RLC channel identifier, or backhaul RLC logical channel identifier) is configured in the BAP layer entity configuration information configured in the handover command message, the default bearer (RLC bearer, backhaul RLC channel identifier, or backhaul RLC logical channel identifier) for the source base station may be configured as the default bearer (RLC bearer, backhaul RLC channel identifier, or backhaul RLC logical channel identifier) for the target base station indicated in the configuration information.

In case where the second mapping information between the QoS flow (or downlink data stream, or uplink data stream, or egress link, or ingress link) and the bearer (RLC bearer, backhaul RLC channel identifier, or backhaul RLC logical channel identifier) is configured in the BAP layer entity configuration information configured in the handover command message, the first mapping information between the QoS flow (or downlink data stream, or uplink data stream, or egress link, or ingress link) and the bearer (RLC bearer, backhaul RLC channel identifier, or backhaul RLC logical channel identifier) applied for the source base station may be released, and the second mapping information between the QoS flow (or downlink data stream, or uplink data stream, or egress link, or ingress link) and the bearer (RLC bearer, backhaul RLC channel identifier, or backhaul RLC logical channel identifier) may be applied. As another method, the first mapping information between the QoS flow (or downlink data stream, or uplink data stream, or egress link, or ingress link) and the bearer (RLC bearer, backhaul RLC channel identifier, or backhaul RLC logical channel identifier) applied for the source base station may be replaced with the second mapping information between the QoS flow (or downlink data stream, or uplink data stream, or egress link, or ingress link) and the bearer (RLC bearer, backhaul RLC channel identifier, or backhaul RLC logical channel identifier).

In case where a data discard timer value is configured in the BAP layer entity configuration information configured in the handover command message, the discard timer value may be directly applied to the BAP layer entity corresponding to the bearer (RLC bearer, backhaul RLC channel identifier, or backhaul RLC logical channel identifier) identifier of the configuration information.

In case where a drb-ContinueROHC indicator is configured to False in the BAP layer entity configuration information configured in the handover command message, the header compression or decompression protocol context may be initialized in the BAP layer entity corresponding to the bearer (RLC bearer, backhaul RLC channel identifier, or backhaul RLC logical channel identifier) identifier of the configuration information. In case where the drb-ContinueROHC indicator is configured to True, the header compression or decompression protocol context is not initialized in the BAP layer entity corresponding to the bearer (RLC bearer, backhaul RLC channel identifier, or backhaul RLC logical channel identifier) identifier of the configuration information.

In case where a reordering timer value is configured in the BAP layer entity configuration information configured in the handover command message, the reordering timer value may be directly applied to the BAP layer entity corresponding to the bearer (RLC bearer, backhaul RLC channel identifier, or backhaul RLC logical channel identifier) identifier of the configuration information.

When the handover command message is received, the BAP layer entity may be re-established. For example, window state variables may be initialized for SRB and the stored data (BAP SDU or BAP PDU) may be discarded. Window state variables for UM DRB may be initialized, and the transmission or retransmission may be performed by performing compression, ciphering, or integrity protection on data that has not yet been transmitted to the lower layer entity or data for which the BAP discard timer has not expired, in ascending order of count values, based on the header (or data) compression context or security key of the target base station. When the reordering timer is running, the reordering timer is stopped and initialized. The received data (BAP SDU or BAP PDU) may be processed in sequence and transmitted to the upper layer entity. For AM DRB, window state variables are not initialized, and the transmission or retransmission may be performed by performing compression, ciphering, or integrity protection based on the header (or data) compression context or security key in ascending order of BAP sequence number or count value from the first data (BAP SDU or BAP PDU) for which successful delivery is not identified from the lower layer entity.

In case where the security key-related configuration information or security algorithm is configured in the security configuration information configured in the handover command message, a new security key or security configuration information may be derived by using the configuration information, and the existing security key or security configuration information may be released. Also, the existing security key or security configuration information may be replaced with the new security key or security configuration information.

In case where a new logical channel identifier is configured in the RLC layer device configuration information configured in the handover command message, the existing logical channel identifier corresponding to the bearer (RLC bearer, backhaul RLC channel identifier, or backhaul RLC logical channel identifier) identifier indicated in the RLC layer entity configuration information may be released. Also, the existing logical channel identifier may be replaced with the new logical channel identifier.

In case where the RLC re-establishment procedure is configured in the RLC layer entity configuration information configured in the handover command message, the RLC re-establishment procedure may be performed on the RLC layer entity corresponding to the bearer (RLC bearer, backhaul RLC channel identifier, or backhaul RLC logical channel identifier) identifier indicated in the RLC layer entity configuration information. That is, specifically, an RLC re-establishment procedure may be performed, so that the transmitting RLC layer entity may perform a procedure for discarding all stored data. Also, in case where the reordering timer is running, the receiving RLC layer entity may suspend and initialize the reordering timer, may process all stored data, and may transmit the processed data to the upper layer entity. Also, the MAC layer entity may be initialized. Also, the MAC layer entity for the source base station may be initialized and used for the target base station.

In the above, the MAC layer entity may be initialized, and data transmission or reception may be suspended for the source base station and each bearer (RLC bearer, backhaul RLC channel identifier, or backhaul RLC logical channel identifier). In addition, the MAC layer entity may stop monitoring the PDCCH for the first radio node (or UE) identifier (C-RNTI) allocated from the source base station. In addition, the MAC layer entity may stop a procedure of requesting scheduling from a source base station or may release transmission resources for scheduling. In addition, the PHY or MAC layer entity may perform a procedure of random access to the target base station. The PHY or MAC layer entity may resume data transmission or reception to or from the target base station if the procedure of handover to the target base station is successfully completed, and may start monitoring the PDCCH for the second UE identifier (C-RNTI) allocated from the target base station. In addition, the PHY or MAC layer entity may receive a system frame number from the target base station and perform synchronization. In addition, the PHY or MAC layer entity may initiate or perform a procedure of requesting scheduling from the target base station.

In the above, the PHY layer entity may perform channel measurement for the source base station, perform a channel measurement report, or stop a procedure of transmitting HARQ ACK or NACK. Then, the PHY layer entity may perform a downlink synchronization procedure for the target base station. In addition, the PHY layer entity may configure configuration information for the target base station (or Spcell or Pcell), received through the handover command message, in a lower layer entity or a PHY layer entity. The PHY layer entity may start transmission of or may transmit HARQ ACK or NACK information to the target base station if the procedure of handover to the target base station is successfully completed. In addition, the PHY or MAC layer entity may receive a system frame number from the target base station and perform synchronization. In addition, the PHY or MAC layer entity may initiate or perform a procedure of requesting scheduling from the target base station.

In case where the RLC layer entity configuration information configured through the handover command message is newly configured, an RLC re-establishment procedure may be performed for an RLC layer entity corresponding to a bearer (RLC bearer, backhaul RLC channel identifier, or backhaul RLC logical channel identifier) identifier indicated in the RLC layer entity configuration information.

In case where the second priority for the logical channel is newly configured in the MAC layer entity configuration information configured through the handover command message, the first priority corresponding to the logical channel identifier indicated in the configuration information is released, or the first priority corresponding to the logical channel identifier may be replaced and configured to be the newly configured second priority.

In case where the second prioritized bit rate (prioritisedBitRate, PBR) for a logical channel is newly configured in the MAC layer entity configuration information configured through the handover command message, the first PBR corresponding to the logical channel identifier indicated in the configuration information may be released, or the first PBR corresponding to the logical channel identifier may be replaced and configured to be the newly configured second PBR. In the above, the prioritized bit rate is a value that increases for each logical channel for a predetermined time (for example, every TTI), when an uplink transmission resource is received, a logical channel prioritization (LCP) procedure is performed, data for the logical channel may be transmitted by considering the priority and the prioritized bit rate, and the higher the priority or the greater the value of the prioritized bit rate, the more data may be transmitted.

In case where a second bucket size (bucketSizeDuration) for a logical channel is newly configured in the MAC layer entity configuration information configured through the handover command message, a first bucket size (bucketSizeDuration) corresponding to the logical channel identifier indicated in the configuration information may be released, or the first bucket size (bucketSizeDuration) corresponding to the logical channel identifier may be replaced and configured to be the newly configured second bucket size (bucketSizeDuration). The bucket size indicates a maximum value that the prioritized bit rate may have when the prioritized bit rate is accumulated.

If second allowed SCell information, allowed subcarrier spacing information, a maximum PUSCH period, or logical channel group configuration information are configured in the MAC layer entity configuration information configured through the handover command message, the previously configured first allowed SCell information, allowed subcarrier spacing information, a maximum PUSCH period, or logical channel group configuration information are released, or the previously configured first allowed SCell information, allowed subcarrier spacing information, maximum PUSCH period, or logical channel group configuration information may be replaced and configured to be the newly configured second allowed SCell information, allowed subcarrier spacing information, maximum PUSCH period, or logical channel group configuration information.

When the radio node (or UE) receives the handover command message, if the handover command message or ReconfigWithSync information and mobility Control Info information indicate or configure the second handover method (for example, the second embodiment or the DAPS handover method of the disclosure), if the DAPS handover method is indicated or configured for each bearer (RLC bearer, backhaul RLC channel identifier, or backhaul RLC logical channel identifier) identifier, if the second embodiment (DAPS handover method) of the disclosure is configured for a predetermined bearer (RLC bearer, backhaul RLC channel identifier, or backhaul RLC logical channel identifier) through the bearer (RLC bearer, backhaul RLC channel identifier, or backhaul RLC logical channel identifier) configuration information, or the second embodiment (DAPS handover method) of the disclosure is configured for at least one bearer (RLC bearer, backhaul RLC channel identifier, or backhaul RLC logical channel identifier) through the bearer (RLC bearer, backhaul RLC channel identifier, or backhaul RLC logical channel identifier) configuration information.

In case where a default bearer (RLC bearer, backhaul RLC channel identifier, or backhaul RLC logical channel identifier) is configured in the BAP layer entity configuration information configured through the handover command message, the DAPS handover method of the disclosure is performed, and by applying the second BAP layer entity structure, a default bearer (RLC bearer, backhaul RLC channel identifier, or backhaul RLC logical channel identifier) for the existing source base station may be maintained and default bearer (RLC bearer, backhaul RLC channel identifier, or backhaul RLC logical channel identifier) information indicated in the configuration information may be configured as a default bearer for the target base station. As another method, when the first condition described in the disclosure is satisfied, the default bearer (RLC bearer, backhaul RLC channel identifier, or backhaul RLC logical channel identifier) for the existing source base station may be switched to the default bearer (RLC bearer, backhaul RLC channel identifier, or backhaul RLC logical channel identifier) for the target base station indicated in the configuration information. In the above, the BAP layer entity may transmit, route, or re-route uplink data to the default bearer when receiving the RRC message or when satisfying the first condition or satisfying the second condition.

In case where second mapping information of QoS flow (or downlink data stream or uplink data stream or egress link or ingress link) and a bearer (RLC bearer, backhaul RLC channel identifier, or backhaul RLC logical channel identifier) is configured in the BAP layer entity configuration information configured through the handover command message, the DAPS handover method of the disclosure is performed, and by applying the second BAP layer entity structure, the first mapping information of QoS flow (or downlink data stream or uplink data stream or egress link or ingress link) and a bearer (RLC bearer, backhaul RLC channel identifier, or backhaul RLC logical channel identifier) that has been applied for the source base station may be maintained and the second mapping information of QoS flow (or downlink data stream or uplink data stream or egress link or ingress link) and a bearer (RLC bearer, backhaul RLC channel identifier, or backhaul RLC logical channel identifier) may be applied to data for the target base station. As another method, in case where the first condition described in the disclosure is satisfied, the second mapping information of QoS flow (or downlink data stream or uplink data stream or egress link or ingress link) and bearer (RLC bearer, backhaul RLC channel identifier, or backhaul RLC logical channel identifier) for the target base station may be applied.

In case where a data discard timer value is configured in the BAP layer entity configuration information configured through the handover command message, the DAPS handover method described above of the disclosure is performed, and by applying a second BAP layer entity structure, the discard timer value may be applied directly to the BAP layer entity corresponding to the bearer (RLC bearer, backhaul RLC channel identifier, or backhaul RLC logical channel identifier) identifier of the configuration information.

The PDCP layer entity in which the DAPS handover method is indicated or configured through the handover command message may not be re-established, and the following procedures may be performed. For example, for SRB, window state variables may be initialized (initialization of variables may be omitted in order to perform fall back when DAPS handover fails). Specifically, in case where the count value or the window state variable value is initialized, in order to solve the security issue (the risk of exposure of security keys caused by transmitting different pieces of data by using the same security key and same count value when the DAPS handover fallback procedure is performed), which occurs from reusing the same count value from the beginning when the DAPS handover fallback procedure is performed, the count value, a transmission window state variable (TX NEXT), or a reception window state variable (RX NEXT and RX DELIV) may not be initialized and the values of the existing variables may be continuously used or maintained: or stored data (PDCP SDU) may be discarded. In addition, for UM DRB, window state variables may not be initialized and data that has not yet been transmitted to the lower layer entity or data for which the PDCP discard timer has not expired may continue to transmit or receive data to or from the source base station. Alternatively, for AM DRB, window state variables may not be initialized and continue to transmit or receive data to or from the source base station. In addition, with regard to the procedure for the SRBs, the SRBs for the source base station are suspended, or in the case of the SRBs for the target base station, in order to solve the security issue that occurs from reusing the same count value from the beginning when the DAPS handover fallback procedure is performed, the existing count value of the SRBs for the source base station or the values of transmission or reception window variables are applied to the SRBs established for the target base station and maintained to be used (or by configuring the count value of the SRBs of the source base station or the values of transmission or reception window variables as the count value of SRBs of the target base station or values of transmission or reception window variables). In addition, for the SRBs for the target base station, the security key for the target base station may be derived or the derived security key may be applied, and the PDCP layer entity of the SRBs may perform ciphering, deciphering, integrity protection, or verification procedures by applying the security key for the target base station. In addition, for SRBs for the source base station, old data (e.g., RRC message for the source base station) may be discarded. The procedure for the SRB for the target base station may be defined as a new procedure (e.g., a DAPS SRB establishment or PDCP layer entity re-establishment procedure) and indicated, triggered, or performed, and the procedure for the SRB may be extended and applied to UM DRB or AM DRB for which the DAPS handover method is not configured.

A PDCP layer entity for which a DAPS handover method is not indicated or not configured through the handover command message may be re-established. For example, for SRB, window state variables may be initialized, and stored data (PDCP SDU or PDCP PDU) may be discarded. For UM DRB, window state variables are initialized, and data that have not yet been transmitted to lower layer entities or data for which the PDCP discard timer has not expired may be compressed or ciphered based on the header (or data) compression context or security key of the target base station in ascending order of the count value, or integrity protection thereof is performed to be transmitted or retransmitted. In addition, if the reordering timer is running, the reordering timer is suspended and initialized, and received data (PDCP SDU or PDCP PDU) may be processed in sequence and transmitted to the upper layer entity. For AM DRB, window state variables are not initialized, and compression or ciphering is performed starting from first data (PDCP SDU or PDCP PDU) that has not been successfully transmitted from the lower layer entity based on the header (or data) compression context or security key of the target base station in ascending order of the PDCP serial number or count value, or integrity protection thereof is performed to be transmitted or retransmitted. In addition, the RLC layer entity may perform a re-establishment procedure.

In case where a reordering timer value is configured through the configuration information of the BAP layer entity in which the DAPS handover method is indicated or configured through the handover command message, the DAPS handover method of the disclosure is performed, and by applying the second BAP layer entity structure, the reordering timer value may be directly applied to the BAP layer entity corresponding to the bearer (RLC bearer, backhaul RLC channel identifier, or backhaul RLC logical channel identifier) identifier of the configuration information.

In case where a new logical channel identifier is configured in the RLC layer entity configuration information of a bearer (RLC bearer, backhaul RLC channel identifier, or backhaul RLC logical channel identifier) for which the DAPS handover method is indicated or configured through the handover command message, the DAPS handover method of the disclosure may be performed. In addition, by applying the second BAP layer entity structure, for the RLC layer entity or MAC layer entity of a first bearer (RLC bearer, backhaul RLC channel identifier, or backhaul RLC logical channel identifier) for a source base station corresponding to a bearer (RLC bearer, backhaul RLC channel identifier, or backhaul RLC logical channel identifier) identifier indicated in the RLC layer entity configuration information, the existing logical channel identifier is maintained, and the RLC layer entity or the MAC layer entity of a second bearer (RLC bearer, backhaul RLC channel identifier, or backhaul RLC logical channel identifier) for the target base station may be configured as a new logical channel identifier indicated in the configuration information.

The RLC re-establishment procedure may not be performed for the RLC layer entity for the source base station in the RLC layer entity configuration information of a bearer (RLC bearer, backhaul RLC channel identifier, or backhaul RLC logical channel identifier) for which the DAPS handover method is indicated or configured through the handover command message. Specifically, without performing the RLC re-establishment procedure, the transmitting RLC layer entity continues to transmit the stored data, and the receiving RLC layer entity continues to process the stored data together with the received data to avoid occurrence of a data interruption. However, in case where the first condition described in the disclosure is satisfied, with respect to the AM bearer (RLC bearer, backhaul RLC channel identifier, or backhaul RLC logical channel identifier) or UM bearer (RLC bearer, backhaul RLC channel identifier, or backhaul RLC logical channel identifier), the BAP layer entity in which the DAPS handover method is configured may transmit a data discard indicator for BAP user data (BAP Data PDU) in order to indicate discarding of data (BAP Data PDU) to the RLC layer entity for the source base station according to the method of this disclosure. Accordingly, the RLC layer entity for the source base station discards the BAP data PDU, but may perform transmission without discarding the BAP control PDU.

The RLC re-establishment procedure may be performed for the RLC layer entity of a bearer (RLC bearer, backhaul RLC channel identifier, or backhaul RLC logical channel identifier) for which the DAPS handover method configured in the handover command message is not indicated or not configured, or may perform the RLC re-establishment procedure in case where the RLC re-establishment procedure is configured. That is, specifically, by performing the RLC re-establishment procedure, the transmitting RLC layer entity may perform a procedure of discarding all stored data (BAP data PDU or BAP control PDU). In addition, in case where the reordering timer is running, the receiving RLC layer entity may interrupt and initialize the reordering timer, process all stored data, and transmit the processed data to an upper layer entity.

In case where RLC layer entity configuration information of a bearer (RLC bearer, backhaul RLC channel identifier, or backhaul RLC logical channel identifier) for which the DAPS handover method is indicated or configured through the handover command message is newly configured, the DAPS handover method of the disclosure is performed, and by applying the second BAP layer entity structure, the existing RLC configuration information is maintained for an RLC layer entity of a first bearer (RLC bearer, backhaul RLC channel identifier, or backhaul RLC logical channel identifier) for the source base station corresponding to a bearer (RLC bearer, backhaul RLC channel identifier, or backhaul RLC logical channel identifier) identifier indicated in the RLC layer entity configuration information, and an RLC layer entity of a second bearer (RLC bearer, backhaul RLC channel identifier, or backhaul RLC logical channel identifier) for the target base station may be configured via new RLC layer entity configuration information indicated in the configuration information.

Method 1. Method 2, or Method 3 for configuring the MAC layer entity proposed in FIG. 11 of the disclosure may be performed.

Figure 11:
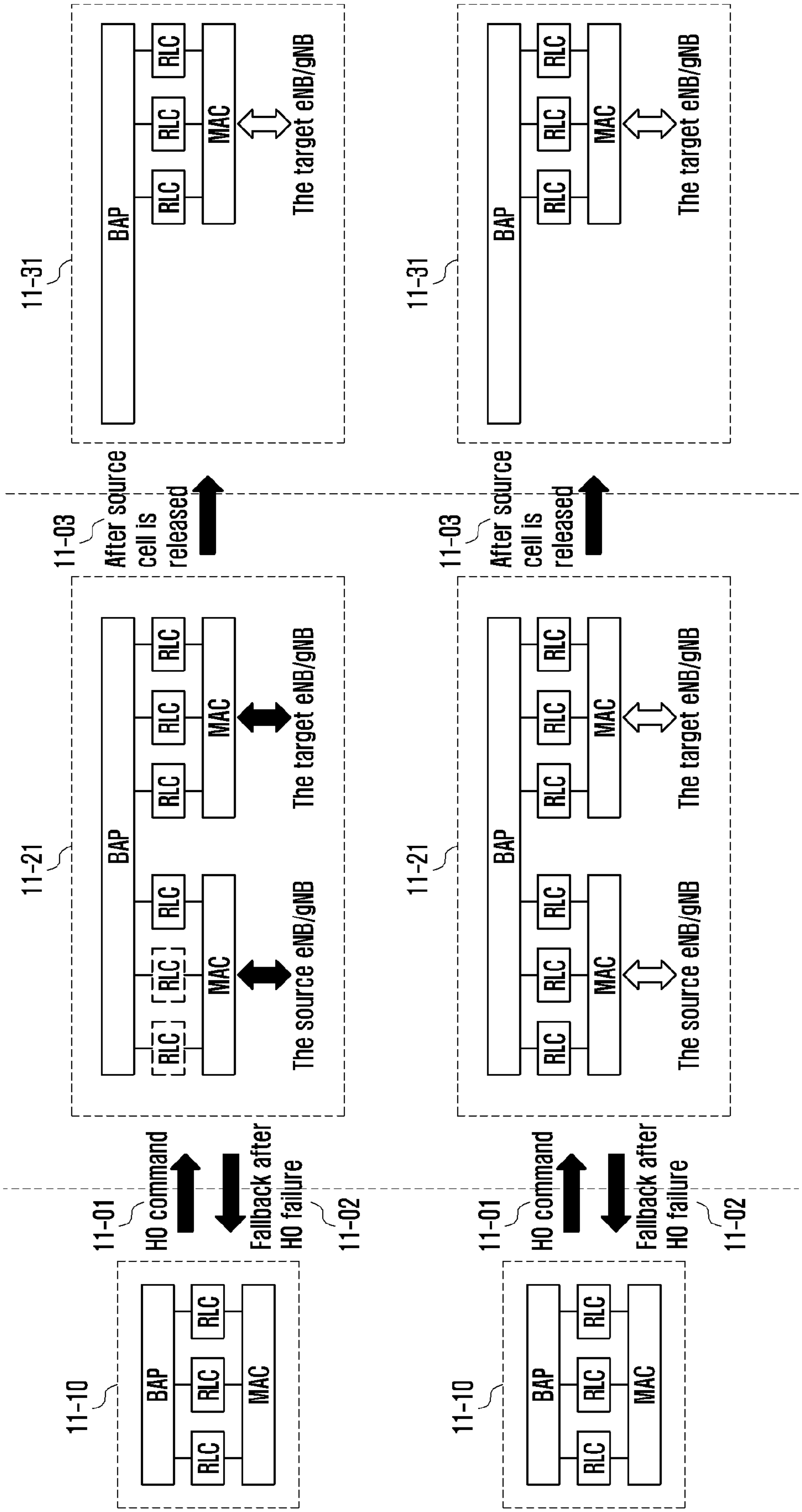
FIG. 11 is a diagram illustrating a method for applying configuration information for each bearer (radio link control (RLC) bearer or backhaul RLC channel identifier or backhaul RLC logical channel identifier) when a DAPS handover method is configured in the disclosure.

Method 1 method 2, or method 3 for configuring the MAC layer entity of FIG. 11 may be performed, and data transmission or reception may be continuously performed for bearers (RLC bearers, backhaul RLC channel identifiers, or backhaul RLC logical channel identifiers) for which the DAPS handover method is indicated or configured in the MAC layer entity, the MAC layer entity is not initialized, and data transmission or reception may be suspended for bearers (RLC bearers, backhaul RLC channel identifiers, or backhaul RLC logical channel identifiers) for which the DAPS handover method is not indicated or not configured.

In the above, the MAC layer entity for the source base station is not initialized, and monitoring the PDCCH for the first radio node (or UE) identifier (C-RNTI) allocated from the source base station may be continuously performed. In addition, the MAC layer entity for the source base station may continue to perform a procedure of requesting scheduling from the source base station. In addition, the PHY or MAC layer entity for the target base station may apply configuration by using configuration information to be received through the handover command message and perform a procedure of random access to the target base station. The PHY or MAC layer entity for the target base station may start data transmission or reception to or from the target base station if the procedure of handover to the target base station is successfully completed, and may start monitoring the PDCCH for the second radio node (or UE) identifier (C-RNTI) allocated from the target base station. In addition, the PHY or MAC layer entity may receive a system frame number from the target base station and perform synchronization. In addition, the PHY or MAC layer entity for the target base station may initiate or perform a procedure of requesting scheduling from the target base station. The radio node (or UE) may monitor the PDCCH for the first radio node (or UE) identifier allocated from the source base station in the PHY or MAC layer entity for the source base station until the connection with the source base station is released or the second condition described in this disclosure is satisfied, and may monitor the PDCCH for the second radio node (or UE) identifier allocated from the target base station in the PHY or MAC layer entity for the target base station. In the above, if the connection with the source base station is released or the second condition described in the disclosure is satisfied, the radio node (or UE) may stop monitoring the PDCCH for the first radio node (or UE) identifier allocated from the source base station in the PHY or MAC layer entity for the source base station, or may release a transmission resource for a scheduling request.

The PHY layer entity for the source base station may maintain configuration information, perform a channel measurement for the source base station, perform a channel measurement report, or continue to perform a procedure of transmitting HARQ ACK or NACK. In addition, the PHY or MAC layer entity for the target base station performs a downlink synchronization procedure for the target base station. In addition, configuration information for the target base station (or Spcell or Pcell), received through the handover command message, may be configured in a lower layer entity or a PHY layer entity for the target base station. The PHY or MAC layer entity for the target base station may start transmission of HARQ ACK or NACK information to the target base station or may perform transmission thereof, if the procedure of handover to the target base station is successfully completed. In addition, the PHY or MAC layer entity for the target base station may receive a system frame number from the target base station and perform synchronization. In addition, the PHY or MAC layer entity for the target base station may initiate or perform a procedure of requesting scheduling from the target base station, a procedure of performing channel measurement, or a procedure of reporting a result of channel measurement. The radio node (or UE) may monitor the PDCCH for the first radio node (or UE) identifier allocated from the source base station in the PHY or MAC layer entity for the source base station until the connection with the source base station is released or the second condition described in the disclosure is satisfied, and may monitor the PDCCH for the second radio node (or UE) identifier allocated from the target base station in the PHY or MAC layer entity for the target base station. In the above, if the connection with the source base station is released or the second condition described in the disclosure is satisfied, the radio node (or UE) stops monitoring the PDCCH for the first radio node (or UE) identifier allocated from the source base station in the PHY or MAC layer entity for the source base station, or may release a transmission resource for a scheduling request.

Method 1, method 2, or method 3 for configuring or processing the SRB of FIG. 11 of the disclosure may be performed.

In case where a second priority for a logical channel is newly configured in the MAC layer entity configuration information configured through the handover command message, the DAPS handover method of the disclosure may be performed. In addition, the second BAP layer entity structure is applied, the existing configuration information is maintained for the MAC layer entity of the first bearer (RLC bearer, backhaul RLC channel identifier, or backhaul RLC logical channel identifier) for the source base station corresponding to the bearer (RLC bearer, backhaul RLC channel identifier, or backhaul RLC logical channel identifier) identifier indicated above, and a new logical channel identifier, which is indicated in the configuration information may be configured for the MAC layer entity of the second bearer (RLC bearer, backhaul RLC channel identifier, or backhaul RLC logical channel identifier) for the target base station and a newly configured second priority corresponding to the logical channel identifier indicated in the configuration information may be applied thereto. As another method, when the first condition described in the disclosure is satisfied, the priority may be applied to the MAC layer entity of the second bearer (RLC bearer, backhaul RLC channel identifier, or backhaul RLC logical channel identifier) for the target base station for each logical channel identifier.

In case where the second prioritized bit rate (prioritisedBitRate. PBR) for a logical channel is newly configured in the MAC layer entity configuration information configured through the handover command message, the DAPS handover method of the disclosure may be performed. In addition, the second BAP layer entity structure is applied, the existing configuration information is maintained for the MAC layer entity of the first bearer (RLC bearer, backhaul RLC channel identifier, or backhaul RLC logical channel identifier) for the source base station corresponding to the bearer (RLC bearer, backhaul RLC channel identifier, or backhaul RLC logical channel identifier) identifier indicated above, and a new logical channel identifier, which is indicated in the configuration information may be configured for the MAC layer entity of the second bearer (RLC bearer, backhaul RLC channel identifier, or backhaul RLC logical channel identifier) for the target base station and a newly configured second prioritized bit rate corresponding to the logical channel identifier indicated in the configuration information may be applied thereto. As another method, the second prioritized bit rate may be started to be applied to the logical channel identifier in the MAC layer entity of the second bearer (RLC bearer, backhaul RLC channel identifier, or backhaul RLC logical channel identifier) for the target base station from the time when the first condition described in the disclosure is satisfied (Accordingly, when different handover methods are indicated for each bearer (RLC bearer, backhaul RLC channel identifier, or backhaul RLC logical channel identifier), uplink transmission resources can be fairly distributed). The prioritized bit rate is a value that increases for each logical channel for a predetermined time (for example, every TTI) when starting to be applied to each logical channel identifier, and when an uplink transmission resource is received, a logical channel prioritization (LCP) procedure is performed, data for the logical channel may be transmitted by considering the priority and the prioritized bit rate, and the higher the priority or the greater the value of the prioritized bit rate, the more data may be transmitted.

In addition, when applying the DAPS handover method above, if the radio node (or UE) needs to transmit uplink data through the first bearer (RLC bearer, backhaul RLC channel identifier, or backhaul RLC logical channel identifier) for the source base station because the first condition described in the disclosure is not yet satisfied, the MAC layer entity of the first bearer (RLC bearer, backhaul RLC channel identifier, or backhaul RLC logical channel identifier) or second bearer (RLC bearer, backhaul RLC channel identifier, or backhaul RLC logical channel identifier) selects, as a target of the LCP procedure, only bearer (RLC bearer, backhaul RLC channel identifier, or backhaul RLC logical channel identifier) or logical channel identifiers for which the DAPS handover method (or a handover method for continuing data transmission to the source base station even after receiving the handover command message) is indicated during the LCP procedure, and performs the LCP procedure thereof. Bearers (RLC bearers, backhaul RLC channel identifiers, or backhaul RLC logical channel identifiers) or logical channel identifiers for which the DAPS handover method is not applied should not be selected as a target of the LCP procedure because uplink data cannot be transmitted to the source base station or target base station upon receiving the handover command message.

In case where a second bucket size (bucketSizeDuration) for a logical channel is newly configured in the MAC layer entity configuration information configured through the handover command message, the DAPS handover method of the disclosure is performed, the second BAP layer entity structure is applied, the existing configuration information is maintained for the MAC layer entity of the first bearer (RLC bearer, backhaul RLC channel identifier, or backhaul RLC logical channel identifier) for the source base station corresponding to the bearer (RLC bearer, backhaul RLC channel identifier, or backhaul RLC logical channel identifier) identifier indicated above, a new logical channel identifier indicated by the configuration information may be configured for the MAC layer entity of the second bearer (RLC bearer, backhaul RLC channel identifier, or backhaul RLC logical channel identifier) for the target base station, and the newly configured second bucket size corresponding to the logical channel identifier indicated by the configuration information may be configured. As another method, the second bucket size can be started to be applied to the logical channel identifier in the MAC layer entity of the second bearer (RLC bearer, backhaul RLC channel identifier, or backhaul RLC logical channel identifier) for the target base station from the time when the first condition described in the disclosure is satisfied (Accordingly, in case where different handover methods are indicated for each bearer (RLC bearer, backhaul RLC channel identifier, or backhaul RLC logical channel identifier), uplink transmission resources can be fairly distributed). The bucket size indicates a maximum value that the prioritized bit rate may have when the prioritized bit rate is accumulated.

If second allowed SCell information, allowed subcarrier spacing information, a maximum PUSCH period, or logical channel group configuration information are configured in the MAC layer entity configuration information configured through the handover command message, the DAPS handover method described above in this disclosure is performed. In addition, the second BAP layer entity structure is applied, the existing configuration information is maintained for the MAC layer entity of the first bearer (RLC bearer, backhaul RLC channel identifier, or backhaul RLC logical channel identifier) for the source base station corresponding to the bearer (RLC bearer, backhaul RLC channel identifier, or backhaul RLC logical channel identifier) identifier indicated above, and the second allowed SCell information, allowed subcarrier spacing information, maximum PUSCH period, or logical channel group configuration information, which are indicated in the configuration information may be configured for the MAC layer entity of the second bearer (RLC bearer, backhaul RLC channel identifier, or backhaul RLC logical channel identifier) for the target base station.

FIG. 11 is a diagram illustrating a method for applying configuration information for each bearer (RLC bearer, backhaul RLC channel identifier, or backhaul RLC logical channel identifier) when a DAPS handover method is configured in the disclosure.

In FIG. 11, as proposed by the disclosure, when the radio node (or UE) receives a handover command message (11-01), if a second handover method (for example, the second embodiment or DAPS handover method of the disclosure) is indicated through ReconfigWithSync information, if the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier), the radio node (or UE) may generate or establish a MAC layer entity for the target base station (or a target cell) at a time when the handover command message is received, and the radio node (or UE) may continue to transmit or receive data to or from a source base station with respect to only bearers (RLC bearers, backhaul RLC channel identifiers, or backhaul RLC logical channel identifiers) (AM bearer (RLC bearer, backhaul RLC channel identifier, or backhaul RLC logical channel identifier) or UM bearer (RLC bearer, backhaul RLC channel identifier, or backhaul RLC logical channel identifier)) for which the DAPS handover method is indicated, through an MAC layer entity for the source base station (or source cell), until the first condition described in this disclosure is satisfied from the time when the handover command message is received. In addition, the radio node (or UE) may, when the first condition is satisfied, switch uplink data to a target base station, and may receive downlink data from the source base station until the connection with the source base station is released. However, for bearers (RLC bearers, backhaul RLC channel identifiers, or backhaul RLC logical channel identifiers) for which the DAPS handover method is not indicated above, the radio node (or UE) may not transmit or receive data to or from the source base station until the first condition described in the disclosure is satisfied from the time when the handover command message is received or may no longer continue to transmit or receive data to or from the source base station. Accordingly, the following method may be applied to the radio node (or UE) to perform the operation of the disclosure, and may be modeled as shown in reference numeral 11-21 or 11-22. In addition, if the second condition described in the disclosure is satisfied and thus the source base station is released, the method may be modeled as shown in reference numeral 11-31 or 11-32.

As suggested in the disclosure, when the radio node (or UE) receives a handover command message, if a second handover method (for example, the second embodiment or DAPS handover method of the disclosure) is indicated through ReconfigWithSync information, if the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier), the radio node (or UE) may suspend SRBs configured for the MAC layer entity for the source base station. In addition, an upper layer entity (for example, an RRC layer entity) of the radio node (or UE) may instruct the MAC layer entity for the source base station to perform reconfiguration (MAC reconfiguration) by using configuration information, which is obtained by excluding configuration information related to the bearer (RLC bearer, backhaul RLC channel identifier, or backhaul RLC logical channel identifier) for which the DAPS handover method is not indicated through the handover command message from the configuration information of the current MAC layer entity. As another method, the upper layer entity (for example, the RRC layer entity) of the radio node (or UE) may instruct the MAC layer entity for the source base station to perform reconfiguration (MAC reconfiguration) by using configuration information, which is obtained by including only configuration information related to the bearer (RLC bearer, backhaul RLC channel identifier, or backhaul RLC logical channel identifier) for which the DAPS handover method is indicated through the handover command message in the configuration information of the current MAC layer entity. In the above, if the radio node (or UE) reconfigures the MAC layer entity for the source base station, the MAC layer entity for the source base station of the radio node (or UE) may maintain logical channel identifiers for which the DAPS handover method is indicated or a prioritized bit rate or bucket size corresponding to the logical channel identifiers, and may release, or no longer use or apply logical channel identifiers corresponding to bearers (RLC bearers, backhaul RLC channel identifiers, or backhaul RLC logical channel identifiers) for which the DAPS handover method is not indicated or a prioritized bit rate or bucket size corresponding to the logical channel identifiers. In addition, the upper layer entity (for example, the RRC layer entity) of the radio node (or UE) may perform, for a bearer (RLC bearer, backhaul RLC channel identifier, or backhaul RLC logical channel identifier) for which the DAPS handover method is not indicated above, a BAP re-establishment or reconfiguration procedure or an RLC re-establishment procedure; may apply BAP configuration information or RLC configuration information configured through the handover message or suspend the bearer (RLC bearer, backhaul RLC channel identifier, or backhaul RLC logical channel identifier); may suspend the bearer (RLC bearer, backhaul RLC channel identifier, or backhaul RLC logical channel identifier) in the MAC layer entity for the source base station; may configure the BAP configuration information or RLC configuration information in the MAC layer entity for the target base station (when the first condition is satisfied, the BAP configuration information or RLC configuration information may be configured in the MAC layer entity for the target base station); may indicate the MAC layer entity for the target base station to configure or apply bearer (RLC bearer, backhaul RLC channel identifier, or backhaul RLC logical channel identifier) configuration information, such as a logical channel identifier or prioritized bit rate or bucket size configured for the target base station to the MAC layer entity for the target base station with respect to a bearer (RLC bearer, backhaul RLC channel identifier, or backhaul RLC logical channel identifier) for which the DAPS handover method is not indicated through the handover command message: and may switch the connection of the BAP layer entity or the RLC layer entity with the MAC layer entity for the source base station, the BAP layer entity or the RLC layer entity corresponding to a bearer (RLC bearer, backhaul RLC channel identifier, or backhaul RLC logical channel identifier) for which the DAPS handover method is not indicated, to the connection of the BAP layer entity or the RLC layer entity with the MAC layer entity for the target base station. Then, for example, from that time point, when a logical channel prioritization (LCP) procedure for data transmission is performed, the MAC layer entity for the source base station of the radio node (or UE) may select, as a candidate group, only logical channel identifiers corresponding to the bearer (RLC bearer, backhaul RLC channel identifier, or backhaul RLC logical channel identifier) for which the DAPS handover method is indicated and perform the LCP procedure thereof. In the above, a procedure of reconfiguring the MAC layer entity for the source base station by the upper layer entity (for example, the RRC layer entity) enables partial initialization of the MAC layer entity (partial MAC reset) for the source base station to perform the same procedure. For example, the configuration information of the MAC layer entity for a bearer (RLC bearer, backhaul RLC channel identifier, or backhaul RLC logical channel identifier) for which the DAPS handover method is not indicated above may be initialized, released, or application thereof may be suspended. In addition, data transmission or reception to or from the source base station may be performed until the first condition described in the disclosure is satisfied. For the logical channel identifier corresponding to the bearer (RLC bearer, backhaul RLC channel identifier, or backhaul RLC logical channel identifier) for which the DAPS handover method is not indicated above, the MAC layer entity for the source base station may initialize the prioritized bit rate and release or suspend the bearer (RLC bearer, backhaul RLC channel identifier, or backhaul RLC logical channel identifier) without further applying a procedure of calculating the prioritized bit rate accumulation. In addition, for a logical channel identifier corresponding to a bearer (RLC bearer, backhaul RLC channel identifier, or backhaul RLC logical channel identifier) for which the DAPS handover method is indicated, the MAC layer entity for the source base station may continue to maintain the prioritized bit rate and perform the accumulation calculation procedure. If the first condition is satisfied, data transmission is switched to the target base station, and the MAC layer entity for the target base station may initialize the prioritized bit rate for newly configured logical channel identifiers (logical channel identifies corresponding to a bearer (RLC bearer, backhaul RLC channel identifier, or backhaul RLC logical channel identifier) in which a DAPS handover method is indicated or a bearer (RLC bearer, backhaul RLC channel identifier, or backhaul RLC logical channel identifier) in which the DAPS handover method is not indicated), or may start accumulation calculation (in another way, when a handover command message is received for the MAC layer entity for the target base station, the prioritized bit rate is initialized and accumulation calculation may start). If bearers (RLC bearers, backhaul RLC channel identifiers, or backhaul RLC logical channel identifiers) for which the DAPS handover method is not indicated in the above are configured or suspended, the MAC layer entity for the target base station may configure or resume the bearers (RLC bearers, backhaul RLC channel identifiers, or backhaul RLC logical channel identifiers) to perform data transmission or reception to or from the target base station, and may initialize the prioritized bit rate or start accumulation calculations. In addition, until the second condition described in the disclosure is satisfied, data reception from the source base station or the target base station is performed, and when the second condition is satisfied (11-03), the MAC layer entity for the source base station is initialized, the RLC layer entity, BAP layer entity, or bearer (RLC bearer, backhaul RLC channel identifier, or backhaul RLC logical channel identifier) configuration information corresponding to a bearer (RLC bearer, backhaul RLC channel identifier, or backhaul RLC logical channel identifier) for which the DAPS handover method is not indicated may be released from the MAC layer entity for the source base station, and the RLC layer entity or bearer (RLC bearer, backhaul RLC channel identifier, or backhaul RLC logical channel identifier) configuration information corresponding to the bearer (RLC bearer, backhaul RLC channel identifier, or backhaul RLC logical channel identifier) for which the DAPS handover method is indicated may be released from the structure of the second BAP layer entity or the MAC layer entity for the source base station (11-31 or 11-32). If the handover procedure fails and the connection with the source base station is valid, as described herein below in the disclosure, the radio node (or UE) may perform a procedure of fallback to the source base station (11-02), may resume the SRB configured in the MAC layer entity of the source base station and report the handover failure, may apply the existing bearer (RLC bearer, backhaul RLC channel identifier, or backhaul RLC logical channel identifier) configuration information of the source base station before receiving the handover command message again and apply the configuration information of the original MAC layer entity (for example, the RRC layer entity may reconfigure MAC layer entity configuration information used before receiving the handover command message), and may resume data transmission or reception to or from the source base station for each bearer (RLC bearer, backhaul RLC channel identifier, or backhaul RLC logical channel identifier) (11-10). As another method, the upper layer entity (for example, the RRC layer entity) of the radio node (or UE) may indicate the RLC re-establishment procedure for the bearer (RLC bearer, backhaul RLC channel identifier, or backhaul RLC logical channel identifier) for which the DAPS handover method is indicated or the bearer (RLC bearer, backhaul RLC channel identifier, or backhaul RLC logical channel identifier) in which the DAPS handover method is not indicated. As another method, in the above, configuration information of the MAC layer entity for the source base station, to be applied when the source base station performs the DAPS handover method, may be configured through an RRC message.

In the methods of the disclosure, when the radio node (or UE) receives a handover command message, if a second handover method (for example, the second embodiment or DAPS handover method of the disclosure) is indicated through ReconfigWithSync information, if the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier), the radio node (or UE) may apply SRBs, which are configured in the MAC layer entity for the source base station, by using one method or a plurality of methods among the following methods.

When the radio node (or UE) receives a handover command message, if a second handover method (for example, the second embodiment or DAPS handover method of the disclosure) is indicated through ReconfigWithSync information, if the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier).

Method 1: SRB may be suspended in the MAC layer entity for the source base station. Alternatively, window state variables may be initialized by performing the re-establishment procedure of the RLC layer entity of the SRBs or the re-establishment procedure of the PDCP layer entity, and stored data (PDCP SDU, PDCP PDU, RLC SDU, or RLC PDU) may be discarded. Alternatively, SRBs may be configured in the MAC layer entity for the target base station according to the configuration received through the handover message. Alternatively, the SRBs of the MAC layer entity for the source base station may be configured according to the configuration received through the handover message, and may be switched and connected to the MAC layer entity for the target base station. If the radio node (or UE) fails the handover procedure and performs the fallback procedure, the SRBs, which are suspended in the MAC layer entity for the source base station, may be resumed or the SRBs configured for the target base station may be reconfigured by the existing configuration for the source base station and switched and connected to the MAC layer entity for the source base station to be resumed.

Method 2: The SRB may be suspended in the MAC layer entity for the source base station. Alternatively, the re-establishment procedure of the RLC layer entity of the SRBs or the re-establishment procedure of the PDCP layer entity may be suspended without performing thereof. Alternatively, SRBs may be configured in the MAC layer entity for the target base station according to the configuration received through the handover message. As another method, the SRBs of the MAC layer entity for the source base station may be configured according to the configuration received through the handover message, and may be switched and connected to the MAC layer entity for the target base station. If the radio node (or UE) fails a handover procedure and performs a fallback procedure, SRBs suspended in the MAC layer entity for the source base station may be resumed or SRBs configured for the target base station may be reconfigured using the existing configuration for the source base station, and switched and connected to the MAC layer entity for the source base station to be resumed.

Method 3: The SRB may be suspended in the MAC layer entity for the source base station. Alternatively, the re-establishment procedure of the RLC layer entity of the SRBs or the re-establishment procedure of the PDCP layer entity may not be performed, and window state variables are not initialized but stored data (PDCP SDU, PDCP PDU, RLC SDU, or RLC PDU) may be discarded (in order to prevent RRC messages, which are not transmitted, from being transmitted unnecessarily later). Alternatively, SRBs may be configured in the MAC layer entity for the target base station according to the configuration received through the handover message. As another method, the SRBs of the MAC layer entity for the source base station may be configured according to the configuration received through the handover message, and may be switched and connected to the MAC layer entity for the target base station. If the radio node (or UE) fails a handover procedure and performs a fallback procedure, the SRBs suspended in the MAC layer entity for the source base station may be resumed or the SRBs configured for the target base station may be reconfigured using the existing configuration for the source base station, and may be switched and connected to the MAC layer entity for the source base station to be resumed. In addition, according to the procedure for the SRBs, specifically, SRBs for the source base station are allowed to be suspended or SRBs configured for the target base station are enabled such that, in order to solve the security issue occurring by reusing the same count value from the beginning when performing the DAPS handover fallback procedure as described above, the existing count value of the SRBs for the source base station or transmission or reception window variable values thereof are applied or maintained for the SRBs established for the target base station (or the count value of the SRBs of the source base station or transmission or reception window variable values thereof may be configured as a count value of SRBs of the target base station or a transmission or reception window variable values thereof). In addition, for the SRBs for the target base station, the security key for the target base station may be derived or the derived security key may be applied, and the PDCP layer entity of the SRBs may apply the security key for the target base station to perform ciphering or deciphering, or an integrity protection or verification procedure. In addition, for SRBs for the source base station, old data (e.g., RRC messages for the source base station) may be discarded. The procedure for the SRB for the target base station may be defined as a new procedure (for example, DAPS SRB establishment or PDCP layer entity re-establishment procedure) and indicated, triggered, or performed, and the procedure for the SRB may be extended and applied in the same manner as that of a UM DRB or AM DRB in which the DAPS handover method is not configured. More specifically, if the radio node (or UE) fails a handover procedure and performs a fallback procedure, and SRBs for the source base station may be resumed or SRBs for the target base station may be released. As another method, the target base station is enabled such that, in order to solve the security issue occurring by using the same count value from the beginning, the existing count value of SRBs for the target base station or the transmission or reception window variable values thereof are applied or maintained for SRBs for the source base station (alternatively, the count value of the SRBs of the target base station or the transmission or reception window variable values thereof may be configured as the count value of the SRBs of the source base station or the transmission or reception window variable values thereof), and the SRBs for the target base station may be released. In addition, the security key for the source base station may be applied to the SRBs for the source base station, and the PDCP layer entity of the SRBs applies the security key for the source base station to perform ciphering or deciphering, or an integrity protection or verification procedure. In addition, for SRBs for the source base station, old data (for example, RRC message for the source base station) may be discarded. The procedure for the SRB may be extended and applied in the same manner as that of an UM DRB or AM DRB in which the DAPS handover method is not configured.

Herein below in the disclosure, when the radio node (or UE) performs the second embodiment (DAPS handover method) of the efficient handover method of the disclosure, if the radio node (or UE) fails in handover, a method is provided for quickly falling back to the source base station and re-establishing a connection by using the characteristics of the DAPS handover method of the above. In the above, the characteristics of the DAPS handover method of the disclosure specifically refers to performing data transmission or reception by maintaining a connection with the source base station even when performing a handover procedure. In addition, in the following of the disclosure, a handover method is provided for performing fallback by using a wireless connection established with the existing source base station even if the handover fails.

In the second embodiment (DAPS handover method) of the efficient handover method as described in FIG. 9 of the disclosure, even if the handover command message is received from the source base station, a procedure of handover to the target base station is performed while maintaining data transmission or reception to or from the source base station of reference numeral 9-02. In addition, the disclosure proposes, in case where the procedure of handover to the target base station fails in the above, a procedure for falling back to the source base station.

In case where the radio node (or UE) fails the procedure of handover to the target base station as suggested above, in order to fall back to the source base station, a method for identifying whether a wireless connection between the radio node (or UE) and the source base station is valid is needed. This is because if the radio node (or UE) fails to handover and performs a fallback to the source base station in case where the wireless connection between the radio node (or UE) and the source base station is not valid, the fallback procedure to the source base station also fails, resulting in a very-long data interruption time, leading to a significant data loss. In addition, in case where the wireless connection between the radio node (or UE) and the source base station is valid, the SRB configured in the radio node (or UE) and the source base station needs to be maintained.

First, the disclosure proposes new timers applicable to the handover method, and proposes specific operations of each timer. In addition, specific operations of the timer may include performing different operations according to the type of handover method indicated through the handover command message by the base station. In addition, a method for releasing or maintaining connection with the source base station or SRB configuration according to the handover method is proposed.

The disclosure introduces, in order to efficiently perform a handover procedure, a first timer (for example, T304), a second timer (for example, T310), a third timer (for example, T312), or a fourth timer (for example, a timer for fallback), and runs and applies the timers in the handover procedure. The first timer (for example, T304), the second timer (for example, T310), the third timer (for example, T312), or the fourth timer (for example, a timer for fallback) of the disclosure perform different operations as follows according to the type of handover method indicated through the handover command message. In the above, the first timer (for example, T304) is a timer for determining whether the handover has been successfully performed, the second timer (for example, T310) is a timer for determining whether the wireless connection is valid, and the third timer (for example, T312) is an auxiliary timer for determining whether the wireless connection is valid and is a timer for triggering a frequency measurement procedure and reporting a frequency measurement result. In addition, the fourth timer (for example, a timer for fallback) is a timer for, in case where handover fails while performing the second embodiment (DAPS handover method) of the efficient handover method of the disclosure, determining whether the fallback procedure has been successfully performed or has failed after performing a fallback procedure to the source base station and transmitting a message indicating that handover failure has been performed to the source base station.

Specific operations of the first timer (for example, T304), the second timer (for example, T310), the third timer (for example, T312), or the fourth timer (for example, a timer for fallback) of order to support an efficient handover method in the disclosure are described as follows according to the indicated handover method.

1> If the radio node (or UE) receives, from a lower layer entity (e.g., a MAC layer entity or a PHY layer entity), an indicator (out-of-sync indication) indicating that wireless connection signals are not synchronized a predetermined number of times (for example, the base station configures the same), and thus detects that a problem exists in the physical layer entity, the radio node (or UE) may start the second timer (for example, T310) in case where the first timer is not running. In addition, when the radio node (or UE) receives an indicator (in-sync indication) indicating that wireless connection signals are synchronizing well from the lower layer entity a predetermined number of times (for example, the base station configures the same), when the handover procedure is triggered (started), or when an RRC connection re-establishment procedure is started, the second timer is suspended. If the second timer expires, the radio node (or UE) triggers or starts an RRC connection re-establishment procedure. Alternatively, the radio node (or UE) transitions to an RRC idle mode, and triggers or starts the RRC connection re-establishment procedure.

1> When the second timer is running, the radio node (or UE) starts the third timer when a frequency measurement procedure is triggered for a frequency measurement identifier for which the third timer is configured. In addition, when the radio node (or UE) receives an indicator (in-sync indication) that the wireless connection signals are synchronizing well from the lower layer entity a predetermined number of times (for example, the base station may configure the same), when the handover procedure is triggered (when the handover procedure is started), or when the RRC connection re-establishment procedure is started, the radio node (or UE) may suspend the third timer. If the third timer expires, the radio node (or UE) triggers or starts an RRC connection re-establishment procedure. Alternatively, the radio node (or UE) transitions to the RRC idle mode and triggers or starts an RRC connection re-establishment procedure.

1> In case where the radio node (or UE) indicates a first handover method (for example, the first embodiment of the disclosure or normal handover method) through a handover command message (a message including a mobility indication (Mobility Control info or ReconfigurationWithSync) or a handover indication in the RRCReconfiguration message), which is received from a base station, when the radio node (or UE) receives the handover command message, the first handover method (for example, the first embodiment of the disclosure or normal handover method) is indicated through the handover command message, ReconfigWithSync information, or Mobility ControlInfo information, if the second embodiment (DAPS handover method) of this disclosure is not configured, or the second embodiment (DAPS handover method) of this disclosure is not configured for a predetermined bearer (RLC bearer, backhaul RLC channel identifier, or backhaul RLC logical channel identifier) through the bearer (RLC bearer, backhaul RLC channel identifier, or backhaul RLC logical channel identifier) configuration information, 2> In the disclosure, upon receiving a handover command message (a message including mobility indication (mobility control info or ReconfigurationWithSync) or handover indication in the RRCReconfiguration message), the radio node (or UE) triggers a handover procedure and starts a first timer.

2> When triggering the handover procedure in the above, the radio node (or UE) releases an SRB (for example, SRB1) configured for the source base station, and configures an SRB for the target base station (for example, SRB1) based on the configuration information configured in the handover command message.

2> When triggering the handover procedure in the above, the radio node (or UE) may suspend the second timer if the second timer is running. In addition, when the first timer is running, a second timer is not started even when the condition of starting the second timer (when an asynchronous indicator of a wireless connection signal is received from a lower layer a predetermined number of times) is satisfied. That is, when the first timer is running, the second timer is not used.

2> When triggering the handover procedure in the above, the radio node (or UE) may suspend a third timer if the third timer is running. In addition, the third timer is started when the condition of starting the third timer only when the second timer is running (when a frequency measurement procedure is triggered for a frequency measurement identifier for which the third timer is configured) is satisfied. That is, since the second timer is not used when the first timer is running, the third timer is also not used.

2> In the above, if the procedure of handover to the target base station or the random access procedure is successfully completed, the radio node (or UE) suspends the first timer.

2> If the first timer expires in the above (for example, if the procedure of handover to the target base station fails), the radio node (or UE) performs an RRC connection re-establishment procedure (may release the connection with the base station, and perform the RRC connection procedure from the beginning again, that is, perform a cell selection or reselection procedure, perform a random access procedure, and transmit an RRC connection re-establishment request message).

1> In a case where the radio node (or UE) indicates a second handover method (for example, the second embodiment or the DAPS handover method) through a handover command message (a message including a mobility indication (Mobility Control info or ReconfigurationWithSync) or a handover indication in the RRCReconfiguration message), which is received from a base station, (or may be extended and applied to a case where the radio node (or UE) indicates a conditional handover method together); if the radio node (or UE) receives the handover command message, the second embodiment (the DAPS handover method) of the disclosure is configured through the handover command message. ReconfigWithSync information, or Mobility ControlInfo information: if the second embodiment (DAPS handover method) of this disclosure is configured for a predetermined bearer (RLC bearer, backhaul RLC channel identifier, or backhaul RLC logical channel identifier) through bearer (RLC bearer, backhaul RLC channel identifier, or backhaul RLC logical channel identifier) configuration information: or if the second embodiment (DAPS handover method) of the disclosure is configured for at least one bearer (RLC bearer, backhaul RLC channel identifier, or backhaul RLC logical channel identifier) through the bearer (RLC bearer, backhaul RLC channel identifier, or backhaul RLC logical channel identifier) configuration information.

2> In the disclosure, the radio node (or UE) triggers a handover procedure and starts a first timer upon receiving a handover command message (a message including a mobility indication (MobilityControl info or ReconfigurationWithSync) or a handover indication in the RRCReconfiguration message). If the conditional handover method is indicated together, the radio node (or UE) may start the first timer when selecting one cell among a plurality of target cells and starting a handover procedure or performing a random access procedure.

2> If the DAPS handover method is started when triggering the handover procedure in the above, the radio node (or UE) maintains or suspends the SRB (e.g., SRB1) configured for the source base station, and configures the SRB (for example, SRB1) for the target base station based on the configuration information configured in the handover command message. As another method, if the DAPS handover method is started when triggering the handover procedure in the above, the radio node (or UE); may maintain or suspend an SRB (e.g., SRB1) configured for the source base station, and for the SRB for the source base station, re-establish a BAP layer entity or re-establish an RLC layer entity to initialize a window state variable or suspend a timer; may indicate to discard stored data (BAP SDU or BAP PDU) (that may be performed when the fallback procedure of this disclosure is triggered); and may configure an SRB (for example, SRB1) for the target base station based on the configuration information configured through the handover command message. As another method, the radio node (or UE) may configure a first bearer (RLC bearer, backhaul RLC channel identifier, or backhaul RLC logical channel identifier) for a source base station and a second bearer (RLC bearer, backhaul RLC channel identifier, or backhaul RLC logical channel identifier) for a target base station by applying the second BAP layer entity structure of the disclosure to the SRB. As another method, when the second BAP layer entity structure is applied to the SRB, the radio node (or UE) may re-establish the BAP layer entity for the first bearer (RLC bearer, backhaul RLC channel identifier, or backhaul RLC logical channel identifier) or re-establish the RLC layer entity to initialize the window state variable, suspend the timer, and indicate to discard stored data (BAP SDU or BAP PDU) (that may be performed when the fallback procedure of the disclosure is triggered). That is, as another method, when the fallback procedure of the disclosure is triggered, the radio node (or UE) may perform a procedure of discarding data (e.g., old RRC messages) remaining in the SRB for the source base station or stored in a buffer, or may trigger or instruct the upper layer entity (e.g., RRC layer entity) of the radio node (or UE) to discard data (e.g., old RRC messages) remaining in the BAP layer entity for the SRB or stored in a buffer. This is because old RRC messages should be prevented from being transmitted to the source base station.

2> If the DAPS handover method is triggered when triggering the handover procedure in the above, the radio node (or UE) may not suspend the second timer for the source base station even if the second timer for the source base station is running. In addition, when the condition of starting the second timer even when the first timer is running (or when the first timer is not running) is satisfied (when an asynchronous indicator of a wireless connection signal is received from a lower layer a predetermined number of times), the radio node (or UE) starts the second timer. The second timer may operate for wireless connection between the radio node (or UE) and the source base station. As another method, two second timers are operated, one second timer is operated for the wireless connection between the radio node (or UE) and the source base station, and another second timer is operated for the wireless connection between the radio node (or UE) and the target base station. That is, even when the first timer is running, the second timer may be used for wireless connection with the source base station or the target base station. However, even when the second timer expires, if the first timer does not expire and is running, the radio node (or UE) may not trigger an RRC connection re-establishment procedure. That is, specifically, even if the second timer for the source base station expires or a radio connection failure (RLF) occurs in the above, if the first timer is not expired and is running, a procedure of random access to the target base station is being performed, or a procedure of handover to the target base station is being performed, the radio node (or UE) may release the radio connection with the source base station without triggering the RRC connection re-establishment procedure. In addition, the radio node (or UE) may not release RRC configuration information (e.g., bearer (RLC bearer, backhaul RLC channel identifier, or backhaul RLC logical channel identifier) configuration information, etc.) configured by the source base station and may reuse the same if the RRC connection re-establishment procedure is triggered later. In addition, even if the second timer expires, if the first timer does not expire and is running, the radio node (or UE) does not trigger the RRC connection re-establishment procedure, and may transmit a report indicating that the wireless connection with the source base station has failed to the source base station or target base station, or the radio node (or UE) may release the connection with the source base station (e.g., first bearers (RLC bearers, backhaul RLC channel identifiers, or backhaul RLC logical channel identifiers) for the source base station may be released) or suspends the first bearers (RLC bearers, backhaul RLC channel identifiers, or backhaul RLC logical channel identifiers) for the source base station. However, when the second timer expires, if the first timer expires or has been suspended, or if the first timer is not driven because it is not started, the radio node (or UE) may trigger the RRC connection re-establishment procedure. The reason for operating the second timer even when the handover procedure is performed is to enable the fallback procedure to be performed in a case where the wireless connection with the source base station or the target base station is valid when a handover failure occurs as a result of monitoring the wireless connection between the radio node (or UE) and the source base station. In addition, when the second timer for the target base station in the above expires or when the wireless connection with the target base station fails, if the first timer has expired, has been suspended, or has not started and thus is not running, or a procedure of random access to the target base station has been successfully performed, the radio node (or UE) may trigger an RRC connection re-establishment procedure.

2> If the DAPS handover method is triggered when triggering the handover procedure in the above, the radio node (or UE) does not suspend the third timer for the source base station even if the third timer is running. In addition, when the condition of starting the third timer only when the second timer is running is satisfied (when the frequency measurement procedure is triggered for the frequency measurement identifier for which the third timer is configured), the third timer is started. That is, since the second timer is used even when the first timer is running, the third timer may also be used. The third timer may operate for wireless connection between the radio node (or UE) and the source base station. In another method, two third timers are operated, one third timer may operate for the wireless connection between the radio node (or UE) and the source base station, and another third timer may operate for the wireless connection between the radio node (or UE) and the target base station. That is, even when the first timer is running, the third timer may be used for wireless connection with the source base station or the target base station. However, if the first timer does not expire and is running even if the third timer expires, the radio node (or UE) may not trigger an RRC connection re-establishment procedure. In addition, if the first timer does not expire and is running even if the third timer expires, the radio node (or UE) does not trigger the RRC connection re-establishment procedure, and may transmit, to the source base station or target base station, a report indicating that the connection with the source base station has failed, and release the connection with the source base station (for example, first bearers (RLC bearers, backhaul RLC channel identifiers, or backhaul RLC logical channel identifiers) for the source base station may be released) or suspend the first bearers (RLC bearers, backhaul RLC channel identifiers, or backhaul RLC logical channel identifiers) for the source base station. However, if the first timer expires or is suspended when the third timer expires, or if the first timer is not driven because it is not started, the radio node (or UE) may trigger the RRC connection re-establishment procedure. The reason for operating the third timer even when performing the handover procedure in the above is to enable the fallback procedure to be performed in a case where the wireless connection with the source base station is valid when a handover failure occurs as a result of monitoring the wireless connection between the radio node (or UE) and the source base station, and is to enable a result of frequency measurement to be reported in the fallback procedure.

2> In the above, if the procedure of handover to the target base station is successfully completed, the radio node (or UE) suspends the first timer.

2> In the above, if the first timer expires (for example, if the procedure of handover to the target base station has failed); if the number of retransmissions to the target base station in the RLC layer entity exceeds the maximum number of retransmissions: when a handover command message is received in the above, if the radio node (or UE) fails the handover because the configuration information of the handover command message has a value exceeding the radio node (or UE) capability or an error occurs in the application of the configuration information; if a problem in performing random access to the target base station occurs, and the handover procedure fails because the first timer expires although the radio node (or UE) continues to attempt the random access procedure: or in case where the second timer or the third timer is driven for the target base station above, if the second timer or the third timer expires before the handover procedure is completed, the T304 timer is suspended or expired, and if it is determined that the handover procedure has failed.

3> If the second timer or the third timer for the wireless connection between the radio node (or UE) and the source base station in the above has not expired (or the second timer or the third timer for the wireless connection between the radio node (or UE) and the source base station is not started or is running), or if the wireless connection between the radio node (or UE) and the source base station is valid.

4> The radio node (or UE) may determine that the wireless connection between the radio node (or UE) and the source base station is valid and perform the fallback procedure of this disclosure.

4> In the above, if the SRB (e.g., SRB1, or MAC, RLC, or BAP layer entity of SRB1), which is configured for the source base station, is suspended when starting the fallback procedure, the radio node (or UE) resumes or newly configures the SRB and perform a procedure of fallback to the SRB (for example, SRB1). As another method, if the second BAP layer entity structure of the disclosure is applied to the SRB, the radio node (or UE) may perform a fallback procedure through the first bearer (RLC bearer, backhaul RLC channel identifier, or backhaul RLC logical channel identifier) for the source base station, and may release the second bearer (RLC bearer, backhaul RLC channel identifier, or backhaul RLC logical channel identifier) for the target base station. For example, the radio node (or UE) may switch uplink data transmission to the first bearer (RLC bearer, backhaul RLC channel identifier, or backhaul RLC logical channel identifier) for the source base station, indicate that there is data to be transmitted to the RLC layer entity or the MAC layer entity of the first bearer (RLC bearer, backhaul RLC channel identifier, or backhaul RLC logical channel identifier), and transmit a message for reporting failure of a handover for the fallback procedure through the first bearer (RLC bearer, backhaul RLC channel identifier, or backhaul RLC logical channel identifier). In addition, when the fallback procedure is triggered in the above, the radio node (or UE) performs a procedure of discarding data (e.g., old RRC messages) remaining in the SRB for the source base station or stored in the buffer, or may trigger or instruct the upper layer entity (e.g., RRC layer entity) of the radio node (or UE) to discard data (e.g., old RRC messages) remaining in the BAP layer entity for the SRB or stored in a buffer. This is because old RRC messages should be prevented from being transmitted to the source base station.

4> In the above, the fallback procedure is to report the handover failure to the source base station by constituting a report message indicating that the handover has failed through the SRB (for example, SRB1) configured with the source base station. In the above, when the radio node (or UE) transmits, to the source base station, the report message indicating that the handover has failed, a result of frequency measurement measured by the radio node (or UE) is also reported, thereby helping to quickly recover the connection with the source base station. As another method, the radio node (or UE) may define and transmit MAC control information (for example, the radio node (or UE) may indicate that the handover has failed by indicating that there is new MAC control information or data to be transmitted for buffer status report or by defining and indicating a special value), RLC control information, or BAP control information so as to transmit an indication that the handover has failed to the source base station. As another method, the radio node (or UE) may transmit the RRC connection re-establishment request message to the SRB (e.g., SRB0 or SRB1) for the source base station in the above. As another method, the fallback procedure in the above may be a procedure of releasing the second bearer (RLC bearer, backhaul RLC channel identifier, or backhaul RLC logical channel identifier) for the target base station for each bearer (RLC bearer, backhaul RLC channel identifier, or backhaul RLC logical channel identifier) or in the second BAP layer entity structure of a bearer (RLC bearer, backhaul RLC channel identifier, or backhaul RLC logical channel identifier) in which the DAPS handover method is configured when the handover fails, or resuming data transmission or reception through the first bearer (RLC bearer, backhaul RLC channel identifier, or backhaul RLC logical channel identifier) for the source base station by the radio node (or UE) after switching to the first BAP layer entity structure. The radio node (or UE) may transmit an indication indicating that there is data to be transmitted to the MAC layer entity of the first bearer (RLC bearer, backhaul RLC channel identifier, or backhaul RLC logical channel identifier), request scheduling from the source base station or report, to the source base station, that there is data to be transmitted (e.g., buffer status report), or transmit new MAC CE, RLC control data, or BAP control data to fall back to the source base station and thus transmit an indication indicating that data transmission is to be started again to the source base station. In addition, the radio node (or UE) may newly configure or resume the SRB for the source base station. In addition, the fallback procedure in the above has been previously configured for each bearer (RLC bearer, backhaul RLC channel identifier, or backhaul RLC logical channel identifier) when the handover fails or bearers (RLC bearers, backhaul RLC channel identifiers, or backhaul RLC logical channel identifiers) for which the DAPS handover method is not configured because the bearers (RLC bearers, backhaul RLC channel identifiers, or backhaul RLC logical channel identifiers) do not have a second BAP layer entity structure, and the radio node (or UE) may release the BAP layer entity, RLC layer entity, bearer (RLC bearer, backhaul RLC channel identifier, or backhaul RLC logical channel identifier) configuration information, or logical channel identifier information, reconfigured through the configuration information of the handover command message, from the MAC layer entity for the target base station, and may switch and connect to the MAC layer entity for the source base station to resume data transmission or reception for each bearer (RLC bearer, backhaul RLC channel identifier, or backhaul RLC logical channel identifier) to or from the source base station. This is because, for a bearer (RLC bearer, backhaul RLC channel identifier, or backhaul RLC logical channel identifier) in which the DAPS handover method is not indicated when receiving the handover command message, the radio node (or UE) may apply the bearer (RLC bearer, backhaul RLC channel identifier, or backhaul RLC logical channel identifier) configuration information configured in the handover command message to the MAC layer entity for the target base station, and may switch the connection of the MAC layer entity for the source base station with the BAP layer entity or the RLC layer entity corresponding to the bearer (RLC bearer, backhaul RLC channel identifier, or backhaul RLC logical channel identifier) in which the DAPS handover method is not indicated to the connection of the MAC layer entity for the target base station with the BAP layer entity or the RLC layer entity. For example, when receiving the handover command message, the upper layer entity (for example, the RRC layer entity) of the radio node (or UE) may instruct the MAC layer entity for the source base station to perform reconfiguration (MAC reconfiguration) by using configuration information, which excludes the configuration information related to the bearer (RLC bearer, backhaul RLC channel identifier, or backhaul RLC logical channel identifier) for which the DAPS handover method is not indicated through the handover command message from the configuration information of the current MAC layer entity. Alternatively, the upper layer entity (for example, the RRC layer entity) of the radio node (or UE) may instruct the MAC layer entity for the source base station to perform reconfiguration (MAC reconfiguration) by using configuration information, which includes only configuration information related to the bearer (RLC bearer, backhaul RLC channel identifier, or backhaul RLC logical channel identifier) for which the DAPS handover method is indicated through the handover command message in the configuration information of the current MAC layer entity. That is, when the handover command message is received, since the configuration information of the BAP layer entity, RLC layer entity, or MAC layer entity of a bearer (RLC bearer, backhaul RLC channel identifier, or backhaul RLC logical channel identifier) for which the DAPS handover method is not indicated may be released from the MAC layer entity for the source base station, and the configuration information may be applied or connected to the MAC layer entity for the target base station according to the bearer (RLC bearer, backhaul RLC channel identifier, or backhaul RLC logical channel identifier) configuration for the target base station, if the fallback procedure is performed, the bearer (RLC bearer, backhaul RLC channel identifier, or backhaul RLC logical channel identifier) for which the DAPS handover method is not configured is reconfigured in the MAC layer entity for the source base station. For example, when performing a fallback procedure, the upper layer entity (e.g., RRC layer entity) of the radio node (or UE) may instruct the MAC layer entity for the source base station to perform reconfiguration (MAC reconfiguration) by using the configuration information of the current MAC layer entity, the configuration information related to the bearer (RLC bearer, backhaul RLC channel identifier, or backhaul RLC logical channel identifier) for which the DAPS handover method is not indicated through the handover command message, and the bearer (RLC bearer, backhaul RLC channel identifier, or backhaul RLC logical channel identifier) configuration information in which the DAPS handover method is indicated. Alternatively, when the fallback procedure is performed, the radio node (or UE) may reconfigure or reconstruct bearer (RLC bearer, backhaul RLC channel identifier, or backhaul RLC logical channel identifier) configuration (for example, BAP layer entity configuration information, RLC layer entity configuration information, MAC layer entity configuration information, or PHY layer entity configuration information) prior to reception of the handover command message and apply the reconfigured or reconstructed bearer (RLC bearer, backhaul RLC channel identifier, or backhaul RLC logical channel identifier) configuration to the bearers (RLC bearers, backhaul RLC channel identifiers, or backhaul RLC logical channel identifiers) for the source base station (BAP layer entity configuration information, RLC layer entity configuration information, or MAC layer entity configuration information of SRB. AM DRB, or UM DRB, or PHY layer entities).

4> In the fallback procedure, when the radio node (or UE) transmits a report message indicating that the handover has failed to the source base station (for example, the RRC message, MAC CE, RLC control data, or BAP control data described above), the radio node (or UE) may start the fourth timer. When receiving an instruction or message from the source base station in response to a report message indicating that the handover has failed, the radio node (or UE) may suspend a fourth timer. However, if the fourth timer expires or if the response message is not received until the expiration, the radio node (or UE) performs an RRC connection re-establishment procedure (may release the connection with the base station and perform the RRC connection procedure again from the beginning, that is, perform a cell selection or reselection procedure, perform a random access procedure, and transmit an RRC connection re-establishment request message). In addition, if the RRC connection re-establishment procedure is triggered due to the expiration of the fourth timer, the second timer or the third timer may be suspended if it is running.

3> If the second timer or the third timer for wireless connection between the radio node (or UE) and the source base station or the target base station in the above has expired, or if the wireless connection between the radio node (or UE) and the source base station or target base station is not valid 4> The radio node (or UE) performs the RRC connection re-establishment procedure (may release the connection with the base station and perform the RRC connection procedure again from the beginning, that is, perform a cell selection or reselection procedure, perform a random access procedure, and transmit an RRC connection re-establishment request message).

2> If the radio node (or UE) satisfies the second condition described in the disclosure when performing the DAPS handover procedure in the above, the radio node (or UE) may release the connection with the source base station or release the SRB for the source base station, and may suspend and initialize the second timer or the third timer for the source base station if it is running. In the above, it is possible to prevent unnecessary RRC connection re-establishment procedures due to expiration of the second timer or the third timer only when the second timer or the third timer is suspended. Since satisfaction of the second condition may mean that the handover procedure has been successfully performed, and the first timer is thus suspended and expiration of the second timer or the third timer may trigger an unnecessary RRC connection re-establishment procedure. As another method, in case where the first condition described in the disclosure is satisfied or the handover procedure is successfully completed, the SRB for the source base station is released, or the second timer or the third timer for the source base station may be suspended and initialized if it is running. In the above, it is possible to prevent unnecessary RRC connection re-establishment procedures due to expiration of the second timer or the third timer only when the second timer or the third timer is suspended. Since satisfaction of the first condition may mean that the handover procedure has been successfully performed, the first timer is thus suspended and expiration of the second timer or the third timer may trigger an unnecessary RRC connection re-establishment procedure.

When the radio node (or UE) determines that a handover failure has occurred according to the method of the disclosure and performs a fallback procedure by satisfying the condition described above, the radio node (or UE) may include, in an RRC message (for example, a ULInformationTransferMRDC message or a FailureInformation message), information indicating that a handover failure has occurred, and transmit the RRC message to SRB1 or SRB1 to which the second BAP layer entity structure is applied, to enable the source base station to identify the handover failure of the radio node (or UE). In the above, when the source base station detects the handover failure of the radio node (or UE), the source base station may configure an RRC message (for example, an RRCReconfiguration message or an RRCRelease message) in response thereto and transmit the RRC message to the radio node (or UE). In the above, in case of receiving an RRCReconfiguration message (SRB1 to which the second BAP layer entity structure is applied, or an RRC message received through SRB1) through a response RRC message with respect to the handover failure report, the radio node (or UE) may complete the application of the configuration information thereof and in response thereto, transmit an RRCReconfigurationComplete message again to the source base station through SRB1 or SRB1 to which the second BAP layer entity structure is applied: and in case where the handover or access to another cell is indicated through the RRCReconfiguration, the radio node (or UE) may complete a procedure of random access to the cell and transmit the RRCReconfigurationComplete message through SRB1. However, in case where the radio node (or UE) receives the RRCRelease message as a response RRC message with respect to the handover failure report in the above, the radio node (or UE) may transition to the RRC idle mode or to the RRC deactivation mode according to the configuration information indicated through the RRCRelease message, and may no longer transmit an additional response RRC message with respect to the RRC message to the base station.

Figure 12:
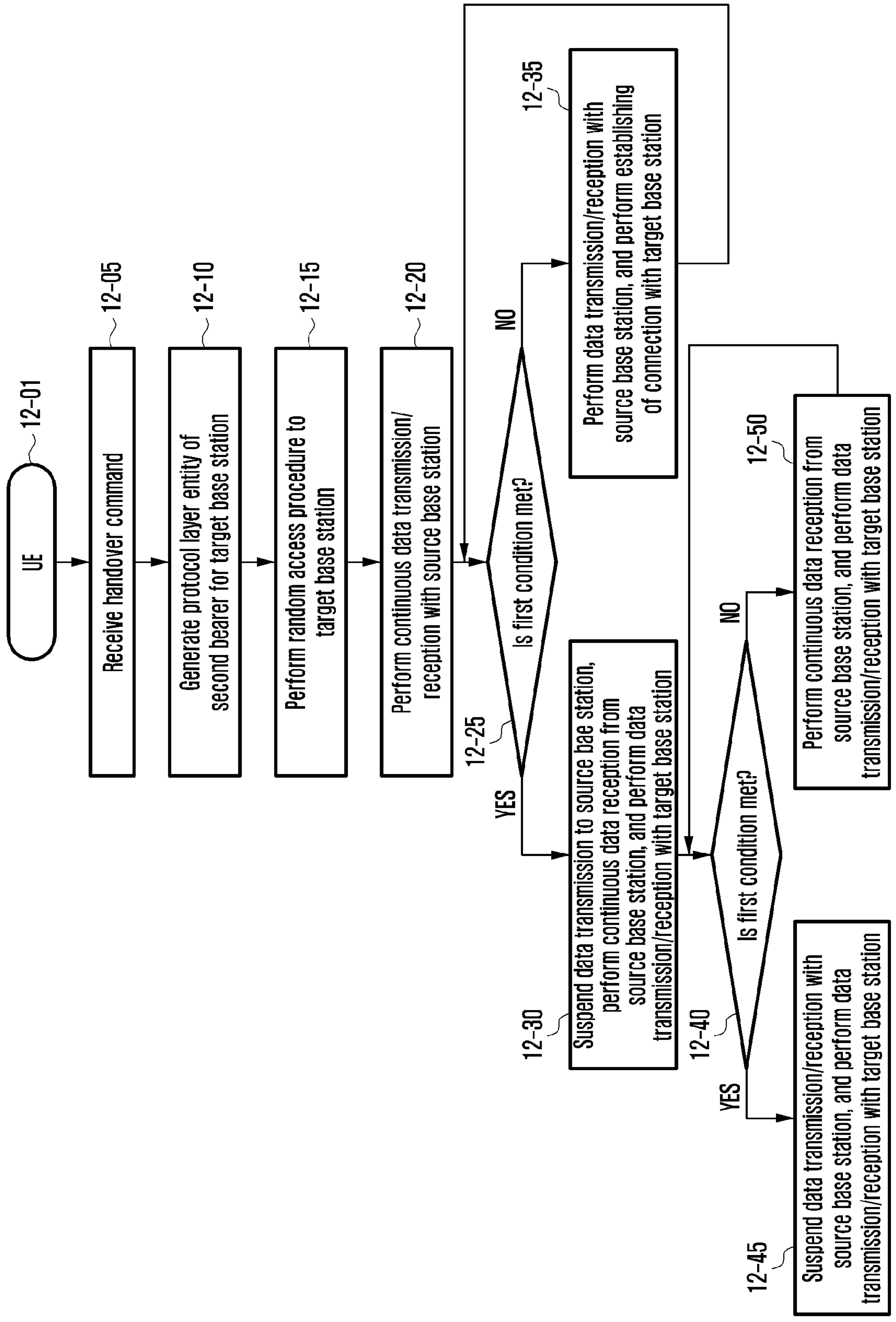
FIG. 12 is a diagram illustrating an operation of a radio node (or UE) that can be applied to embodiments proposed in the disclosure.

FIG. 12 is a diagram illustrating operations of a radio node (or UE) to which embodiments of the disclosure can be applied.

In FIG. 12, a radio node (or UE) 12-05 may transmit or receive data to or from the source base station through the first BAP layer entity structure for each bearer (RLC bearer, backhaul RLC channel identifier, or backhaul RLC logical channel identifier). However, in case that a handover command message is received and the DAPS handover method of the second embodiment of the disclosure is indicated through the handover command message, or in case that the DAPS handover method is indicated for each bearer (RLC bearer, backhaul RLC channel identifier, or backhaul RLC logical channel identifier), the radio node (or UE) may switch the target base station indicated through the message to the structure of the second BAP layer entity for each bearer (RLC bearer, backhaul RLC channel identifier, or backhaul RLC logical channel identifier) or the bearer (RLC bearer, backhaul RLC channel identifier, or backhaul RLC logical channel identifier)s for which the DAPS handover method is indicated, and even when the protocol layer entities of the second bearer (RLC bearer, backhaul RLC channel identifier, or backhaul RLC logical channel identifier) are configured and established and a procedure of random access to the target base station is performed through the established protocol layer entities (12-10 and 12-15), the radio node (or UE) continue to transmit or receive data (uplink data transmission and downlink data reception) to or from the source base station through protocol layer entities of the first bearer (RLC bearer, backhaul RLC channel identifier, or backhaul RLC logical channel identifier) (12-20)).

If the first condition is satisfied (12-25), the radio node (or UE) suspends transmission of uplink data to the source base station through the protocol layer entities of the first bearer (RLC bearer, backhaul RLC channel identifier, or backhaul RLC logical channel identifier), and switches the uplink data transmission to transmit the uplink data to the target base station through the protocol layer entities of the second bearer (RLC bearer, backhaul RLC channel identifier, or backhaul RLC logical channel identifier), wherein the radio node (or UE) may continuously receive downlink data from the source base station and the target base station through the protocol layer entities of the first bearer (RLC bearer, backhaul RLC channel identifier, or backhaul RLC logical channel identifier) and the second bearer (RLC bearer, backhaul RLC channel identifier, or backhaul RLC logical channel identifier) (12-30). In addition, the BAP layer entity of the second bearer (RLC bearer, backhaul RLC channel identifier, or backhaul RLC logical channel identifier) may continue to perform seamless data transmission or reception to or from the target base station by using transmission or reception data, serial number information, or information such as header compression and decompression context, which are stored in the BAP layer entity of the first bearer (RLC bearer, backhaul RLC channel identifier, or backhaul RLC logical channel identifier). In the above, if the first condition is not satisfied, the radio node (or UE) may continue to identify the first condition while continuing the procedure previously performed (12-35).

In addition, if the second condition is satisfied in the above, the radio node (or UE) may suspend receiving downlink data from the source base station through the protocol layer entities of the first bearer (RLC bearer, backhaul RLC channel identifier, or backhaul RLC logical channel identifier) (12-45). In addition, the BAP layer entity of the second bearer (RLC bearer, backhaul RLC channel identifier, or backhaul RLC logical channel identifier) may continue to perform seamless data transmission or reception to or from the target base station by using transmission or reception data, serial number information, or information such as header compression and decompression context stored in the BAP layer entity of the first bearer (RLC bearer, backhaul RLC channel identifier, or backhaul RLC logical channel identifier).

If the second condition is not satisfied in the above, the radio node (or UE) may continue to identify the second condition while continuing to perform the existing procedure (12-50)).

Herein below in the disclosure, a radio node (or radio node (or UE)) operation for specifically performing the techniques described above is provided. Specifically, the disclosure proposes, when the DAPS handover method, which is the second embodiment of the efficient handover method of the disclosure, is indicated to each bearer (RLC bearer, backhaul RLC channel identifier, or backhaul RLC logical channel identifier) through an RRCReconfiguration message or an RRCConnectionReconfiguration message, a method for driving, by the UE having received the message, different bearer (RLC bearer, backhaul RLC channel identifier, or backhaul RLC logical channel identifier)-specific protocol layer entities with respect to a SRB, a bearer (RLC bearer, backhaul RLC channel identifier, or backhaul RLC logical channel identifier) for which the DAPS handover method is configured, or a bearer (RLC bearer, backhaul RLC channel identifier, or backhaul RLC logical channel identifier) for which the DAPS handover method is not configured.

In the disclosure, in case where the DAPS handover method is configured to each bearer (RLC bearer, backhaul RLC channel identifier, or backhaul RLC logical channel identifier) through an RRC message (e.g., RRCReconfiguration message or an RRCConnectionReconfiguration message), which is received by the radio (or UE), the radio node (or UE) drives different bearer (RLC bearer, backhaul RLC channel identifier, or backhaul RLC logical channel identifier)-specific protocol layer entities with respect to an SRB, a bearer (RLC bearer, backhaul RLC channel identifier, or backhaul RLC logical channel identifier) for which the DAPS handover method is configured, or a bearer (RLC bearer, backhaul RLC channel identifier, or backhaul RLC logical channel identifier) for which the DAPS handover method is not configured, and the detailed first embodiment is as follows.

1> If the radio node (or UE) receives a handover command message (e.g., RRCReconfiguration message) or receives ReconfigWithSync information (in case of NR base station) or Mobility ControlInfo information (in case of LTE base station) through the RRCReconfiguration message, if the radio node (or UE) can follow the configuration information of the RRC message, the radio node (or UE) can perform one or a plurality of the following operations.

2> The radio node (or UE) starts the first timer of the disclosure.

2> If the second handover method (for example, the second embodiment of the disclosure or the DAPS handover method) is not indicated above, if the DAPS handover method is not indicated for each bearer (RLC bearer, backhaul RLC channel identifier, or backhaul RLC logical channel identifier) identifier or logical channel identifier, if the DAPS handover method is not configured for at least one bearer (RLC bearer, backhaul RLC channel identifier, or backhaul RLC logical channel identifier), or if the DAPS handover method is not configured for a predetermined bearer (RLC bearer, backhaul RLC channel identifier, or backhaul RLC logical channel identifier), 3> the radio node (or UE) may suspend the second timer if the second timer for the source base station of the disclosure is running 3> the radio node (or UE) may suspend the third timer if the third timer for the source base station of the disclosure is running.

2> In the above, if the second handover method (for example, the second embodiment of the disclosure or the DAPS handover method) is indicated (or configured), or the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier), one or a plurality of the following operations may be performed for a bearer (RLC bearer, backhaul RLC channel identifier, or backhaul RLC logical channel identifier) for which the DAPS handover method is configured.

3> Even if the second timer for the source base station of this disclosure is running, the radio node (or UE) does not suspend the second timer.

3> The radio node (or UE) may generate or establish a MAC layer entity for the target base station. For example, the radio node (or UE) may apply the configuration of the target Pcell with the same configuration of the source PCell.

3> The radio node (or UE) may apply a new radio node (or UE) identifier (e.g., C-RNTI) in the MAC or PHY layer entity with respect to the target base station or for the target base station.

3> The radio node (or UE) may reconfigure the MAC layer entity for the source Pcell. Specifically, the radio node (or UE) may reconfigure the MAC layer entity for the source Pcell by using MAC layer entity configuration information, obtained by excluding configuration information about a logical channel or a bearer (RLC bearer, backhaul RLC channel identifier, or backhaul RLC logical channel identifier) for which a DAPS handover method is not configured. Alternatively, the radio node (or UE) may reconfigure the MAC layer entity for the source Pcell by using MAC layer entity configuration information including configuration information about a logical channel or a bearer (RLC bearer, backhaul RLC channel identifier, or backhaul RLC logical channel identifier) for which the DAPS handover method is configured. In addition, the configuration information may include mapping information between a logical channel and a SCell, or the like.

3> The radio node (or UE) may deactivate all SCells configured in the MAC layer entity for the source base station. However, the source PCell is maintained as it is and data transmission or reception may be continuously performed.

3> There may be a DRB for which each DAPS handover method is configured, or may be a list of DRBs for DAPS handover. With regard to a DRB having an identifier included in the list of DRBs for which the DAPS handover method is configured, or with regard to all DRBs in case where there is no list of DRBs for a DAPS handover, 4> An RLC layer entity and a dedicated control channel (DCCH) logical channel for a target Pcell may be configured or established. For example, the target Pcell may be applied with the same configuration as that of the source PCell.

4> The first BAP layer entity structure (or a normal BAP layer entity) may be reconfigured to be or switched to the second BAP layer entity structure (or a DAPS BAP layer entity). Alternatively, the received BAP layer entity configuration information may be applied to the second BAP layer entity structure.

3> There is a DRB for which each DAPS handover method is not configured or a list of DRBs for DAPS handover, and for a DRB, the identifier of which is not included in a list of DRBs for which the DAPS handover method is configured, 4> The BAP layer entity may be re-established. As described in the disclosure, a security key or ROHC context for a target Pcell may be applied, or data (e.g., BAP PDU) is generated based on the applied security key or ROHC context for the target Pcell and transmitted or retransmitted. In addition, when the BAP layer entity is re-established in the above, the BAP status report is triggered for the AM DRB or UM DRB to enable the BAP status report to be transmitted to the target base station, and enable the target base station to receive the BAP status report from the radio node (or UE). As a result, data transmission or reception may be continuously performed without interruption 4> The RLC layer entity may be re-established and the RLC layer entity or the connected DTCH may be connected to the target Pcell (or the MAC layer entity of the target Pcell).

3> With regard to each SRB,

4> SRBs for a target Pcell are configured or established. Specifically, a BAP layer entity for the target PCell may be configured or established. In addition, an RLC layer entity and a dedicated control channel (DCCH) logical channel for a target Pcell may be configured or established. For example, the configuration of the target Pcell may be applied with the same configuration as the configuration for the source PCell.

4> SRBs for the source PCell are suspended. Alternatively, if there are data or RRC messages stored in SRBs (for example, SRB1, SRB2, SRB3, or SRB4) for the source Pcell, the data or RRC messages may be discarded. Alternatively, if there are data or RRC messages stored in the BAP layer entity of the SRBs (for example, SRB1, SRB2, SRB3, or SRB4) for the source Pcell, the data or RRC messages may be discarded. Alternatively, the RLC layer entity of the SRBs may be re-established. This is because an error may occur when old data or RRC messages are transmitted.

2> Otherwise, or if the second handover method (for example, the second embodiment of the disclosure or the DAPS handover method) is not indicated (or is not configured), if the DAPS handover method is not indicated (or is not configured) for each bearer (RLC bearer, backhaul RLC channel identifier, or backhaul RLC logical channel identifier) identifier or logical channel identifier, if the DAPS handover method is not configured for at least one bearer (RLC bearer, backhaul RLC channel identifier, or backhaul RLC logical channel identifier), or if the DAPS handover method is not configured for a predetermined bearer (RLC bearer, backhaul RLC channel identifier, or backhaul RLC logical channel identifier), one or a plurality of the following operations may be performed.

3> If the DAPS handover method is configured, the MCG MAC layer entity or SCG MAC layer entity is initialized.

3> If the DAPS handover method is configured, the configuration or context for the uplink compressed data method is released.

3> The BAP layer entity may be re-established for all bearers (RLC bearers, backhaul RLC channel identifiers, or backhaul RLC logical channel identifiers) (e.g., DRBs or SRBs) for which the BAP layer entity is established or configured.

3> MCG RLC or SCG RLC layer entity may be re-established for all bearers (RLC bearers, backhaul RLC channel identifiers, or backhaul RLC logical channel identifiers) (e.g., DRBs or SRBs) for which the RLC layer entity is established or configured.

1> If the MAC layer entity successfully completes the random access procedure (or the first condition described in this disclosure is satisfied)

1> Alternatively, if an indicator (for example, rach-Skip) indicating skipping of the random access procedure is configured, and the MAC layer entity indicates successful reception of the PDCCH transmission corresponding to the radio node (or UE) identifier (C-RNTI).

2> The first timer (for example, T304) is suspended.

2> If the second handover method (for example, the second embodiment of the disclosure or DAPS handover method) is configured as above, if the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier).

3> The second timer (for example, T310) is suspended if the second timer is running.

3> The third timer (for example, T312) is suspended if the third timer is running.

3> Uplink data switching may be triggered or indicated for each bearer (RLC bearer, backhaul RLC channel identifier, or backhaul RLC logical channel identifier) for which the second handover method or the DAPS handover method is configured or each bearer (RLC bearer, backhaul RLC channel identifier, or backhaul RLC logical channel identifier) (or lower layer entity or BAP layer entity) for which a DAPS BAP layer entity is configured. In addition, when the uplink data switching is indicated in the above, the BAP status report is triggered for the AM DRB or UM DRB to enable the BAP status report to be transmitted to the target base station, and enable the target base station to receive the BAP status report from the radio node (or UE). As a result, data transmission or reception may be continuously performed without interruption.

3> MCG configuration information may be released. The MCG configuration information may include configuration information of each bearer (RLC bearer, backhaul RLC channel identifier, or backhaul RLC logical channel identifier) or BAP, BAP, RLC, MAC, or PHY layer entity information, radio node (or UE) identifier information, or security information.

3> If there is SCG configuration information, the SCG configuration information may be released. The SCG configuration information may include configuration information of each bearer (RLC bearer, backhaul RLC channel identifier, or backhaul RLC logical channel identifier) or BAP, BAP, RLC, MAC, or PHY layer entity information, radio node (or UE) identifier information, or security information.

2> System information may be read from the target PCell.

1> If the first timer of this disclosure has expired (for example, if the handover procedure has failed), 2> If the first timer for handover (for example, T304) has expired or if handover has failed.

3> If random access-related configuration information is configured, designated preamble information is released.

3> If the second handover method (e.g., the second embodiment of the disclosure or the DAPS handover method) is not configured (or not indicated), the DAPS handover method is not configured (or not indicated) for each bearer (RLC bearer, backhaul RLC channel identifier, or backhaul RLC logical channel identifier) identifier or logical channel identifier, if the DAPS handover method is not configured for at least one bearer (RLC bearer, backhaul RLC channel identifier, or backhaul RLC logical channel identifier), or if DAPS handover method is not configured for a predetermined bearer (RLC bearer, backhaul RLC channel identifier, or backhaul RLC logical channel identifier), 3> Alternatively, if the second handover method (for example, the second embodiment of the disclosure or the DAPS handover method) is configured (or indicated), if the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier), and if the wireless connection between the source base station and the radio node (or UE) fails (or radio link failure (RLF) is detected), or if the wireless connection between the source Pcell and the radio node (or UE) has failed (or if the second timer or the third timer has expired), if there is a problem in random access, if the number of retransmissions has reached the maximum number of retransmissions, or if an indication indicating out-of-synchronization is received more than a predetermined number of times), 4> It is possible to perform fall back, return, or recovery by using configuration information used in the source Pcell, excluding physical layer entity configuration information, MAC layer entity configuration information, or transmission resource information 4> The measured frequency or cell information is configured and prepared to be reported, and the same is reported to a cell or base station to be accessed.

4> RRC connection re-establishment procedure may be performed.

3> In the above, if the second handover method (for example, the second embodiment of the disclosure or the DAPS handover method) is configured (or indicated), if the DAPS handover method is configured (or indicated) for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), if the DAPS handover method is configured for a predetermined bearer (RLC bearer, backhaul RLC channel identifier, or backhaul RLC logical channel identifier), and if the radio connection between the source base station and the radio node (or UE) has not failed (or if radio link failure (RLF) is not detected (e.g., if the second or third timer has not expired, if a random access problem has not occurred, if the number of retransmissions has not reached the maximum number of retransmissions, or if an indication indicating out-of-synchronization is not received more than a predetermined number of times), or if the wireless connection between the source Pcell and the radio node (or UE) has not failed (or if the second timer or the third timer has not expired).

4> the MAC layer entity for the target PCell may be initialized or released.

4> In case where there may be a DRB for which a DAPS handover method is configured, or may be a list of DRBs for which the DAPS handover method is configured, with regard to DRBs included in the list, or with regard to all DRBs in case where there is no list of DRBs for which the DAPS handover method is configured.

5> The RLC layer entity for the target Pcell may be re-established and released, or an associated DTCH logical channel may be released.

5> The BAP layer entity (e.g., DAPS BAP layer entity or the second BAP layer entity structure) may be reconfigured to be a normal BAP layer entity (e.g., normal BAP layer entity or the first BAP layer entity structure). In addition, when the BAP layer entity is reconfigured in the above, the BAP status report is triggered for the AM DRB or UM DRB, the BAP status report is enabled to be transmitted to the source base station, and the source base station is enabled to receive the BAP status report from the radio node (or UE). As a result, data transmission or reception may be performed continuously without interruption.

4> With regard to a DRB for which the DAPS handover method is not configured, or in case where there is a list for which the DAPS handover method is configured, or with regard to DRBs not included in the list.

5> The BAP layer entity may be re-established. Alternatively, an upper layer entity (e.g., an RRC layer entity) may indicate a BAP layer entity re-establishment procedure for the bearer (RLC bearer, backhaul RLC channel identifier, or backhaul RLC logical channel identifier). Alternatively, the radio node (or UE) may transmit a message indicating that the DAPS handover has failed through the SRB for the source base station to the source base station, and then may receive an RRC message (e.g., RRCReconfiguration message) from the base station as a response message thereto. In addition, the radio node (or UE) may perform a BAP re-establishment or reconfiguration procedure for each bearer (RLC bearer, backhaul RLC channel identifier, or backhaul RLC logical channel identifier) including an indicator indicating re-establishment of the BAP layer entity according to the indication of the RRC message. Alternatively, the radio node (or UE) may receive the RRC message from an upper layer entity (e.g., an RRC layer entity), identify the indicator, and indicate a BAP layer entity re-establishment procedure for the bearer (RLC bearer, backhaul RLC channel identifier, or backhaul RLC logical channel identifier). As described in the disclosure, a security key or ROHC context for the source Pcell may be applied, or data (for example, BAP PDU) may be generated based on the applied security key or ROHC context (or data compression context) for the source Pcell to perform transmission or retransmission. In the disclosure, when the radio node (or UE) receives a handover command message or an RRC message indicating a DAPS handover method, the radio node (or UE) performs BAP layer entity re-establishment procedure based on a security key or an ROHC context for a target Pcell, with respect to a bearer (RLC bearer, backhaul RLC channel identifier, or backhaul RLC logical channel identifier) for which the DAPS handover method is not configured, so that data for the target base station may be generated for the AM DRB or UM DRB and thus the data generated for the target base station should be discarded. This is because an error occurs when data for the target base station is transmitted when falling back to the source base station. Therefore, when falling back to the source base station, the re-establishment procedure of the BAP layer entity may be performed in order to update the security configuration information, ROHC context, data compression configuration information for the target PCell, or the like with the security configuration information, ROHC context, or data compression configuration information for the source PCell. In addition, when the BAP layer entity is re-established in the above, the BAP status report is triggered for the AM DRB or UM DRB, to enable the BAP status report to be transmitted to the source base station, and enable the source base station to receive the BAP status report from the radio node (or UE). As a result, data transmission or reception may be continuously performed without interruption.

5> The RLC layer entity may be re-established and the RLC layer entity or the connected DTCH channel may be connected to the source Pcell (or the MAC layer entity of the source Pcell).

4> Suspended SRBs, which are configured in the MAC layer entity for the source base station or with respect to the source base station (or source PCell), are resumed.

4> The MAC layer entity for the source Pcell may be reconfigured. Specifically, the MAC layer entity for the source Pcell may be reconfigured using original MAC layer entity configuration information (for example, configuration information before receiving the handover command message) including information on the bearer (RLC bearer, backhaul RLC channel identifier, or backhaul RLC logical channel identifier) for which the DAPS handover method is not configured or the logical channel again. In addition, the configuration information may include mapping information between a logical channel and a SCell.

4> The BAP layer entity for the target Pcell may be re-established or released.

4> The RLC layer entity for the target PCell may be re-established or released, or an associated DTCH logical channel may be released.

4> When resuming the SRBs for the source Pcell, if there are data or RRC messages stored in the SRBs (for example, SRB1, SRB2, SRB3, or SRB4) for the source Pcell, the data or RRC messages may be discarded. Alternatively, if there are data or RRC messages stored in the BAP layer entity of the SRBs (for example, SRB1, SRB2, SRB3, or SRB4) for the source Pcell, the data or RRC messages may be discarded. Alternatively, the RLC layer entity of the SRBs may be re-established. This is because an error may occur when old data or RRC messages are transmitted.

4> In order to fall back to the source base station, a procedure of re-acquiring necessary system information from the source PCell may be performed.

4> A handover failure message may be configured through the resumed SRBs and transmitted to the source base station. Alternatively, DRBs may be resumed and data transmission or reception may be resumed. Alternatively, because the handover procedure has failed, SRB1 that has been configured or established for the target Pcell may be released.

1> If the radio node (or UE) detects a wireless connection problem in the physical layer entity, 2> If the second handover method (for example, the second embodiment of the disclosure or the DAPS handover method) is configured as above, if the DAPS handover method is configured for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), if the DAPS handover method is configured for a predetermined bearer (RLC bearer, backhaul RLC channel identifier, or backhaul RLC logical channel identifier), and if an indicator (out-of-sync indication) indicating that radio connection signals are out of synchronization is received, from a lower layer entity (for example, a MAC layer entity or a PHY layer entity), a predetermined number of times (for example, the base station may configure the number of times) when predetermined timers (for example, T300 (a timer for RRC connection establishment procedure). T301 (a timer for RRC connection re-establishment procedure), or T311 (a timer for RRC connection re-establishment procedure)) are not running, and a problem in the physical layer entity is detected.

3> A second timer (e.g., T310) may be started.

2> If an indicator (out-of-sync indication) indicating that radio connection signals are out of synchronization is received, from a lower layer entity (for example, a MAC layer entity or a PHY layer entity), a predetermined number of times (for example, the base station may configure the number of times) and a problem in the physical layer entity is detected, and in case where the first timer or T300. T301. T304. T311, or T319 is not running.

3> A second timer (e.g., T310) may be started. However, if the first timer is running in case where the DAPS handover method is not configured, the second timer is not started even when a problem in the physical layer detected.

1> If the second handover method (e.g., the second embodiment of the disclosure or DAPS handover method) is configured (or indicated) as above, if the DAPS handover method is configured (or indicated) for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier), and the first timer is running (or the handover procedure is in progress).

2> If the wireless connection between the source base station and the radio node (or UE) fails (or if a radio link failure (RLF) is detected (for example, or if the second timer or the third timer has expired, if there is a problem in random access, if the number of times of retransmission reaches the maximum number of retransmissions, or if an out-of-sync indication is received more than a predetermined number of times)), or if the wireless connection between the source Pcell and the radio node (or UE) fails (or if the second timer or the third timer has expired), 3> The MAC layer entity for the source PCell may be initialized or the MAC layer entity configuration information may be released.

3> In case where there is a DRB for which each DAPS handover method is configured, or there is a list of DRBs for which the DAPS handover method is configured, with regard to the DRBs included in the list, or with regard to all DRBs in case where there is no list for which the DAPS handover method is configured, 4> The RLC layer entity for the source Pcell may be re-established or released, or an associated DTCH logical channel may be released.

4> The BAP layer entity (for example, a DAPS BAP layer entity or a second BAP layer entity structure) may be reconfigured to be a normal BAP layer entity (for example, a normal BAP layer entity or first BAP layer entity structure).

3> With regard to each SRB,

4> The BAP layer entity for the source PCell may be re-established or released.

4> The RLC layer entity for the source Pcell may be re-established or released, or the associated DTCH logical channel may be released.

3> Physical layer entity configuration information for the source Pcell may be released.

3> Alternatively, when security configuration information is activated and SRBs or DRBs are configured, or in another method, all DRBs configured for the source Pcell may be suspended.

1> When receiving a handover command message (e.g., RRCReconfiguration message) or receiving ReconfigWithSync information (in case of NR base station) or Mobility ControlInfo information (in case of LTE base station) through the RRCReconfiguration message, or if the random access procedure triggered by the target base station or the MAC layer entity of a cell group is successfully completed, the RRC layer entity of the radio node (or UE)

2> suspends the first timer for the source base station, target base station, or cell group.

2> suspends the second timer if the second timer for the source base station is running (during handover). This is because when the second timer expires, an unnecessary RRC connection re-establishment procedure may be triggered.

2> If the second handover method (for example, the second embodiment of the disclosure or the DAPS handover method) is configured according to another method, or if the DAPS handover method is configured for each bearer (RLC bearer, backhaul RLC channel identifier, or backhaul RLC logical channel identifier) identifier or logical channel identifier, 3> the second timer is suspended if the second timer for the source base station is running. This is because when the second timer expires, an unnecessary RRC connection re-establishment procedure may be triggered.

2> the third timer is suspended for the source base station, target base station, or cell group.

1> When the radio node (or UE) receives an RRCReconfiguration message or RRCConnectionReconfiguration message, if ReconfigWithSync information (in case of NR base station) or Mobility ControlInfo information (in case of LTE base station) is not included in the RRC message, if the radio node (or UE) can follow the configuration information of the RRC message, or the second condition described in the disclosure is satisfied, the radio node (or UE) may perform operations as follows.

2> If the RRCReconfiguration message or RRCConnectionReconfiguration message received above includes an indicator indicating releasing of the connection of the source base station (or cell) in the DAPS handover procedure 3> The MAC layer entity for the source base station (or cell or PCell) is initialized, and the configuration of the MAC layer entity for the source PCell is released.

3> For a bearer (RLC bearer, backhaul RLC channel identifier, or backhaul RLC logical channel identifier) for which the DAPS handover method is configured or for each DRB having the second BAP layer entity structure (DAPS BAP layer entity structure), 4> The RLC layer entity for the source PCell is re-established.

4> RLC layer entity and dedicated traffic channel (DTCH) logical channel for the source PCell are released.

4> The second BAP layer entity structure (or the current BAP layer entity) is reconfigured to be or switched to the first BAP layer entity structure (or a normal BAP layer entity structure) or the third BAP layer entity structure. In addition, when the BAP layer entity is reconfigured in the above, the BAP status report is triggered for the AM DRB or UM DRB, to enable the BAP status report to be transmitted to the target base station, and enable the target base station to receive the BAP status report from the radio node (or UE). As a result, data transmission or reception may be performed continuously without interruption.

3> With regard to respective SRBs,

4> the BAP layer entity configured for the source PCell is released.

4> the RLC layer entity and dedicated traffic channel (DTCH) logical channel for the source PCell are released.

3> Configuration information for the physical channel (or physical layer entity) configured for the source PCell is released.

In the disclosure, in case where the DAPS handover method is configured for each bearer (RLC bearer, backhaul RLC channel identifier, or backhaul RLC logical channel identifier) through an RRC message (e.g., RRCReconfiguration message or an RRCConnectionReconfiguration message), which is received by the radio node (or UE), the radio node (or UE) drives different bearer (RLC bearer, backhaul RLC channel identifier, or backhaul RLC logical channel identifier)-specific protocol layer entities with respect to an SRB, bearers (RLC bearers, backhaul RLC channel identifiers, or backhaul RLC logical channel identifiers) for which the DAPS handover method is configured, or bearers (RLC bearers, backhaul RLC channel identifiers, or backhaul RLC logical channel identifiers) for which the DAPS handover method is not configured, and the detailed second embodiment is as follows.

1> If the radio node (or UE) receives a handover command message (e.g., RRCReconfiguration message) or receives ReconfigWithSync information (in case of NR base station) or Mobility ControlInfo information (in case of LTE base station) through the RRCReconfiguration message, if the radio node (or UE) can follow the configuration information of the RRC message, the radio node (or UE) can perform one or a plurality of the following operations.

2> The radio node (or UE) may start the first timer of the disclosure.

2> If the second handover method (for example, the second embodiment of the disclosure or the DAPS handover method) is not indicated above, if the DAPS handover method is not indicated for each bearer (RLC bearer, backhaul RLC channel identifier, or backhaul RLC logical channel identifier) identifier or logical channel identifier, if the DAPS handover method is not configured for at least one bearer (RLC bearer, backhaul RLC channel identifier, or backhaul RLC logical channel identifier), or if the DAPS handover method is not configured for a predetermined bearer (RLC bearer, backhaul RLC channel identifier, or backhaul RLC logical channel identifier), 3> The radio node (or UE) may suspend the second timer if the second timer for the source base station of the disclosure is running.

3> The radio node (or UE) may suspend the third timer if the third timer for the source base station of the disclosure is running.

2> In the above, if the second handover method (for example, the second embodiment of the disclosure or the DAPS handover method) is indicated (or configured), or the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier), one or a plurality of the following operations may be performed for a bearer (RLC bearer, backhaul RLC channel identifier, or backhaul RLC logical channel identifier) for which the DAPS handover method is configured.

3> The second timer is not suspended even if the second timer for the source base station of this disclosure is running.

3> A MAC layer entity for the target base station may be generated or established. For example, the target Pcell may be applied with the same configuration as that of the source PCell.

3> A new radio node (or UE) identifier (e.g., C-RNTI) may be applied in the MAC or PHY layer entity with respect to the target base station or for the target base station.

3> The MAC layer entity for the source Pcell may be reconfigured. Specifically, the MAC layer entity for the source Pcell may be reconfigured using MAC layer entity configuration information, obtained by excluding configuration information about a logical channel or a bearer (RLC bearer, backhaul RLC channel identifier, or backhaul RLC logical channel identifier) for which a DAPS handover method is not configured. Alternatively, the MAC layer entity for the source Pcell may be reconfigured using MAC layer entity configuration information including configuration information about a logical channel or a bearer (RLC bearer, backhaul RLC channel identifier, or backhaul RLC logical channel identifier) for which the DAPS handover method is configured. In addition, the configuration information may include mapping information between a logical channel and a SCell.

3> All SCells configured in the MAC layer entity for the source base station may be deactivated. However, the source PCell is maintained as it is and data transmission or reception may be continuously performed.

3> There may be a DRB for which each DAPS handover method is configured, may be a list of DRBs for DAPS handover, or may be no list of DRBs for a DAPS handover. With regard to a DRB having an identifier included in the list of DRBs for which the DAPS handover method is configured, or with regard to all DRBs in case where there is no DRB list for DAPS handover, 4> An RLC layer entity and a dedicated control channel (DCCH) logical channel for a target Pcell may be configured or established. For example, the configuration of the target Pcell may be applied with the same configuration as the configuration for the source PCell.

4> The first BAP layer entity structure (or a normal BAP layer entity) may be reconfigured to be or switched to the second BAP layer entity structure (or a DAPS BAP layer entity). Alternatively, the received BAP layer entity configuration information may be applied to the second BAP layer entity structure.

3> There is a DRB for which each DAPS handover method is not configured or a list of DRBs for DAPS handover, and for a DRB that does not include an identifier in the list of DRBs for which the DAPS handover method is configured, 4> the BAP layer entity may be re-established. As described in the disclosure, a security key or ROHC context for a target Pcell may be applied, or data (e.g., BAP PDU) is generated based on the applied security key or ROHC context for the target Pcell and transmitted or retransmitted. In addition, when the BAP layer entity is re-established in the above, the BAP status report is triggered for the AM DRB or UM DRB to enable the BAP status report to be transmitted to the target base station, and enable the target base station to receive the BAP status report from the radio node (or UE). As a result, data transmission or reception may be continuously performed without interruption.

4> The RLC layer entity may be re-established and the RLC layer entity or the connected DTCH channel may be connected to the target Pcell (or the MAC layer entity of the target Pcell).

3> With regard to each SRB,

4> SRBs for a target Pcell are configured or established. Specifically, a BAP layer entity for the target PCell may be configured or established. In addition, an RLC layer entity and a dedicated control channel (DCCH) logical channel for a target Pcell may be configured or established. For example, the configuration of the target Pcell may be applied with the same configuration as the configuration for the source PCell. In another method, a new SRB1 for the target PCell may be configured or established, other SRBs (for example, SRB2, SBR3, or SRB4) may re-establish a BAP layer entity or RLC layer entity (used for the source PCell) and the BAP layer entity or RLC layer entity may be configured or established for the target PCell.

4> SRBs for the source PCell are suspended. Alternatively, if there are data or RRC messages stored in SRBs (for example, SRB1, SRB2, SRB3, or SRB4) for the source Pcell, the data or RRC messages may be discarded. Alternatively, if there are data or RRC messages stored in the BAP layer entity of the SRBs (for example, SRB1, SRB2, SRB3, or SRB4) for the source Pcell, the data or RRC messages may be discarded. Alternatively, the RLC layer entity of the SRBs may be re-established. This is because an error may occur when old data or RRC messages are transmitted. As another method, SRB1 for the source PCell may be suspended and other SRBs (e.g., SRB2, SBR3, or SRB4) may be released.

2> Otherwise, or if the second handover method (for example, the second embodiment of the disclosure or the DAPS handover method) is not indicated (or is not configured), if the DAPS handover method is not configured (or is not indicated) for each bearer (RLC bearer, backhaul RLC channel identifier, or backhaul RLC logical channel identifier) identifier or logical channel identifier, if the DAPS handover method is not configured for at least one bearer (RLC bearer, backhaul RLC channel identifier, or backhaul RLC logical channel identifier), or if the DAPS handover method is not configured for a predetermined bearer (RLC bearer, backhaul RLC channel identifier, or backhaul RLC logical channel identifier), one or a plurality of the following operations may be performed.

3> If the DAPS handover method is configured, the MCG MAC layer entity or SCG MAC layer entity is initialized.

3> If the DAPS handover method is configured, the configuration or context for the uplink compressed data method is released.

3> The BAP layer entity may be re-established for all bearers (RLC bearers, backhaul RLC channel identifiers, or backhaul RLC logical channel identifiers) (e.g., DRBs or SRBs) for which the BAP layer entity is established or configured.

3> The MCG RLC or SCG RLC layer entity may be re-established for all bearers (RLC bearers, backhaul RLC channel identifiers, or backhaul RLC logical channel identifiers) (e.g., DRBs or SRBs) for which the RLC layer entity is established or configured.

1> If the MAC layer entity successfully completes the random access procedure (or the first condition described in this disclosure is satisfied)

1> Alternatively, if an indicator (for example, rach-Skip) indicating skipping of the random access procedure is configured, and the MAC layer entity indicates successful reception of the PDCCH transmission corresponding to the radio node (or UE) identifier (C-RNTI), 2> the first timer (for example, T304) is suspended.

2> If the second handover method (for example, the second embodiment of the disclosure or DAPS handover method) is configured as above, if the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier), 3> the second timer is suspended if the second timer (for example, T310) is running.

3> the third timer is suspended if the third timer (for example, T312) is running.

3> Uplink data switching may be triggered or indicated for each bearer (RLC bearer, backhaul RLC channel identifier, or backhaul RLC logical channel identifier) for which the second handover method or the DAPS handover method is configured or each bearer (RLC bearer, backhaul RLC channel identifier, or backhaul RLC logical channel identifier) (or lower layer entity or BAP layer entity) for which a DAPS BAP layer entity is configured. In addition, when the uplink data switching is indicated in the above, the BAP status report is triggered for the AM DRB or UM DRB to enable the BAP status report to be transmitted to the target base station, and enable the target base station to receive the BAP status report from the radio node (or UE). As a result, data transmission or reception may be continuously performed without interruption.

3> MCG configuration information may be released. The MCG configuration information may include configuration information of each bearer (RLC bearer, backhaul RLC channel identifier, or backhaul RLC logical channel identifier) or BAP, BAP, RLC, MAC, or PHY layer entity information, radio node (or UE) identifier information, or security information.

3> If there is SCG configuration information, the SCG configuration information may be released. The SCG configuration information may include configuration information of each bearer (RLC bearer, backhaul RLC channel identifier, or backhaul RLC logical channel identifier) or BAP, BAP, RLC, MAC, or PHY layer entity information, radio node (or UE) identifier information, or security information.

2> System information may be read from the target PCell.

1> If the first timer of this disclosure has expired (for example, if the handover procedure has failed), 2> If the first timer for handover (for example, T304) has expired or if handover has failed.

3> If random access-related configuration information is configured, designated preamble information is released.

3> If the second handover method (e.g., the second embodiment of the disclosure or the DAPS handover method) is not configured (or is not indicated), the DAPS handover method is not configured for each bearer (RLC bearer, backhaul RLC channel identifier, or backhaul RLC logical channel identifier) identifier or logical channel identifier (or not indicated), if DAPS handover method is not configured for at least one bearer (RLC bearer, backhaul RLC channel identifier, or backhaul RLC logical channel identifier), or if DAPS handover method is not configured for a predetermined bearer (RLC bearer, backhaul RLC channel identifier, or backhaul RLC logical channel identifier).

3> Alternatively, if the second handover method (for example, the second embodiment of the disclosure or the DAPS handover method) is configured (or indicated), if the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), if the DAPS handover method is configured for a predetermined bearer (RLC bearer, backhaul RLC channel identifier, or backhaul RLC logical channel identifier) and the wireless connection between the source base station and the radio node (or UE) fails (or radio link failure (RLF) is detected), or if the wireless connection between the source Pcell and the radio node (or UE) has failed (or if the second timer or the third timer has expired, if there is a problem in random access, if the number of retransmissions has reached the maximum number of retransmissions, or if an indication indicating out-of-synchronization is received more than a predetermined number of times).

4> It is possible to perform fall back, return, or recovery by using configuration information used in the source Pcell, excluding physical layer entity configuration information, MAC layer entity configuration information, or transmission resource information 4> the measured frequency or cell information is constituted and prepared to be reported, and the same is reported to a cell or base station to be accessed.

4> RRC connection re-establishment procedure may be performed.

3> In the above, if the second handover method (for example, the second embodiment of the disclosure or the DAPS handover method) is configured (or indicated), if the DAPS handover method is configured (or indicated) for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), if the DAPS handover method is configured for a predetermined bearer (RLC bearer, backhaul RLC channel identifier, or backhaul RLC logical channel identifier), and the wireless connection between the source base station and the radio node (or UE) has not failed (or if radio link failure (RLF) is not detected (e.g., if the second or third timer has not expired, if a random access problem has not occurred, if the number of retransmissions has not reached the maximum number of retransmissions, or if an indication indicating out-of-synchronization is not received more than a predetermined number of times)), or if the wireless connection between the source Pcell and the radio node (or UE) has not failed (or if the second timer or the third timer has not expired).

4> The MAC layer entity for the target PCell may be initialized or released.

4> With regard to a DRB for which each DAPS handover method is configured, or in case where there is a list in which the DAPS handover method is configured, with regard to all DRBs included in the list, or with regard to all DRBs in case where there is no list in which the DAPS handover method is configured.

5> the RLC layer entity for the target Pcell may be re-established and released, or an associated DTCH logical channel may be released.

5> The BAP layer entity (e.g., DAPS BAP layer entity or the second BAP layer entity structure) may be reconfigured to be a normal BAP layer entity (e.g., a normal BAP layer entity or first BAP layer entity structure). In addition, when the BAP layer entity is reconfigured in the above, the BAP status report is triggered for the AM DRB or UM DRB, the BAP status report is enabled to be transmitted to the source base station, and the source base station is enabled to receive the BAP status report from the radio node (or UE). As a result, data transmission or reception may be performed continuously without interruption.

4> For each DRB for which the DAPS handover method is not configured, or in case where there is a list for which the DAPS handover method is configured, for DRBs not included in the list, 5> The BAP layer entity may be re-established. Alternatively, an upper layer entity (e.g., an RRC layer entity) may indicate a BAP layer entity re-establishment procedure for the bearer (RLC bearer, backhaul RLC channel identifier, or backhaul RLC logical channel identifier). Alternatively, the radio node (or UE) may transmit a message indicating that the DAPS handover has failed through the SRB for the source base station to the source base station, and then may receive an RRC message (e.g., RRCReconfiguration message) from the base station as a response message thereto. In addition, the radio node (or UE) may perform a BAP re-establishment or reconfiguration procedure for each bearer (RLC bearer, backhaul RLC channel identifier, or backhaul RLC logical channel identifier) including an indicator indicating re-establishment of the BAP layer entity according to the indication of the RRC message. Alternatively, the radio node (or UE) may receive the RRC message from an upper layer entity (e.g., an RRC layer entity), identify the indicator, and indicate a BAP layer entity re-establishment procedure for the bearer (RLC bearer, backhaul RLC channel identifier, or backhaul RLC logical channel identifier). As described in the disclosure, a security key or ROHC context for the source Pcell may be applied, or data (for example, BAP PDU) may be generated based on the applied security key or ROHC context (or data compression context) for the source Pcell to perform transmission or retransmission. In the disclosure, when the radio node (or UE) receives a handover command message or an RRC message indicating a DAPS handover method, the radio node (or UE) performs BAP layer entity re-establishment procedure based on a security key or an ROHC context for a target Pcell, with respect to a bearer (RLC bearer, backhaul RLC channel identifier, or backhaul RLC logical channel identifier) for which the DAPS handover method is not configured, so that data for the target base station may be generated for the AM DRB or UM DRB and thus the data generated for the target base station should be discarded. This is because an error occurs when data for the target base station is transmitted when falling back to the source base station. Therefore, when falling back to the source base station, the re-establishment procedure of the BAP layer entity may be performed in order to update the security configuration information, ROHC context, data compression configuration information for the target PCell, or the like with the security configuration information, ROHC context, or data compression configuration information for the source PCell. In addition, when the BAP layer entity is re-established in the above, the BAP status report is triggered for the AM DRB or UM DRB, to enable the BAP status report to be transmitted to the source base station, and enable the source base station to receive the BAP status report from the radio node (or UE). As a result, data transmission or reception may be continuously performed without interruption.

5> The RLC layer entity may be re-established and the RLC layer entity or the connected DTCH channel may be connected to the source Pcell (or the MAC layer entity of the source Pcell).

5> As another method above, for each DRB in which the DAPS handover method is not configured or in case where there is a list in which the DAPS handover method is configured, the BAP layer entity or the RLC layer entities are released for the DRBs that are not included in the list. This is because it is possible to simply release the BAP re-establishment procedure or reconfiguration procedure without performing the same, and allow the base station to reconfigure the bearers (RLC bearers, backhaul RLC channel identifiers, or backhaul RLC logical channel identifiers) by using the RRC message (for example, RRCReconfiguration message).

4> Suspended SRBs, which are configured in the MAC layer entity for the source base station or with respect to the source base station (or source PCell), are resumed.

4> The MAC layer entity for the source Pcell may be reconfigured. Specifically, the MAC layer entity for the source Pcell may be reconfigured using original MAC layer entity configuration information (for example, configuration information before receiving the handover command message) including information on the bearer (RLC bearer, backhaul RLC channel identifier, or backhaul RLC logical channel identifier) for which the DAPS handover method is not configured or the logical channel again. In addition, the configuration information may include mapping information between a logical channel and a SCell.

4> The BAP layer entity for the target Pcell may be re-established or released.

4> The RLC layer entity for the target PCell may be re-established or released, or an associated DTCH logical channel may be released.

4> When resuming the SRBs for the source Pcell, if there are data or RRC messages stored in the SRBs (for example, SRB1, SRB2, SRB3, or SRB4) for the source Pcell, the data or RRC messages may be discarded. Alternatively, if there are data or RRC messages stored in the BAP layer entity of the SRBs (for example, SRB1, SRB2, SRB3, or SRB4) for the source Pcell, the data or RRC messages may be discarded. Alternatively, the RLC layer entity of the SRBs may be re-established. This is because an error may occur when old data or RRC messages are transmitted. As another method, the suspended SRB1 for the source PCell may be resumed and other SRBs (e.g., SRB2, SBR3, SRB4) may re-establish the BAP layer entity or RLC layer entity (which has been re-established or configured for the target PCell) and the BAP layer entity or RLC layer entity may be configured or established for the source PCell. Alternatively, because the handover procedure has failed, SRB1 that has been configured or established for the target Pcell may be released.

4> In order to fall back to the source base station, a procedure of re-acquiring necessary system information from the source PCell may be performed.

4> A handover failure message may be constituted through the resumed SRBs and transmitted to the source base station. Alternatively, DRBs may be resumed and data transmission or reception may be resumed.

1> If the radio node (or UE) detects a wireless connection problem in the physical layer entity 2> If the second handover method (for example, the second embodiment of the disclosure or the DAPS handover method) is configured, if the DAPS handover method is configured for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), if the DAPS handover method is configured for a predetermined bearer (RLC bearer, backhaul RLC channel identifier, or backhaul RLC logical channel identifier), and if an indicator (out-of-sync indication) indicating that wireless connection signals are out of synchronization is received, from a lower layer entity (for example, a MAC layer entity or a PHY layer entity), a predetermined number of times (for example, the base station may configure the number of times) when predetermined timers (for example, T300 (a timer for RRC connection establishment procedure), T301 (a timer for RRC connection re-establishment procedure), or T311 (a timer for RRC connection re-establishment procedure)) are not running, and a problem in the physical layer entity is detected, 3> a second timer (e.g., T310) may be started.

2> In case where an indicator (out-of-sync indication) indicating that wireless connection signals are out of synchronization is received, from a lower layer entity (for example, a MAC layer entity or a PHY layer entity), a predetermined number of times (for example, the base station may configure the number of times) and a problem in the physical layer entity is detected, and the first timer, T300, T301, T304, T311, or T319 is not running, 3> A second timer (e.g., T310) may be started. However, if the first timer is running in case where the DAPS handover method is not configured, the second timer is not started even when a problem in the physical layer detected.

1> If the second handover method (e.g., the second embodiment of the disclosure or DAPS handover method) is configured (or indicated) above, if the DAPS handover method is configured (or indicated) for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier), and the first timer is running (or the handover procedure is in progress), 2> If the wireless connection between the source base station and the radio node (or UE) fails (or the radio link failure (RLF) is detected (for example, if the second timer or the third timer has expired, if there is a problem in random access, if the number of times of retransmission reaches the maximum number of retransmissions, or if an out-of-sync indication is received more than a predetermined number of times)), or if the wireless connection between the source Pcell and the radio node (or UE) fails (or if the second timer or the third timer has expired), 3> the MAC layer entity for the source PCell may be initialized or the MAC layer entity configuration information may be released.

3> In case where there may be a DRB for which each DAPS handover method is configured, or may be a list for which the DAPS handover method is configured, with regard to DRBs included in the list, or with regard to all DRBs in case where there is no list for which the DAPS handover method is configured, 4> The RLC layer entity for the source Pcell may be re-established or released, or an associated DTCH logical channel may be released.

4> The BAP layer entity (for example, a DAPS BAP layer entity or a second BAP layer entity structure) may be reconfigured to be a normal BAP layer entity (for example, a normal BAP layer entity or first BAP layer entity structure).

3> With regard to each SRB,

4> The BAP layer entity for the source PCell may be re-established or released.

4> The RLC layer entity for the source Pcell may be re-established or released, or the associated DTCH logical channel may be released.

3> Physical layer entity configuration information for the source Pcell may be released.

3> Alternatively, in case where security configuration information is activated and SRBs or DRBs are configured, or in another method, all DRBs configured for the source Pcell may be suspended.

1> When receiving a handover command message (e.g., RRCReconfiguration message) or receiving ReconfigWithSync information (in case of NR base station) or Mobility ControlInfo information (in case of LTE base station) through the RRCReconfiguration message, or if the random access procedure triggered by the target base station or the MAC layer entity of a cell group is successfully completed, the RRC layer entity of the radio node (or UE)

2> suspends the first timer for the source base station, target base station, or cell group, 2> suspends the second timer if the second timer for the source base station is running (during handover). This is because when the second timer expires, an unnecessary RRC connection re-establishment procedure may be triggered.

2> If the second handover method (for example, the second embodiment of the disclosure or the DAPS handover method) is configured according to another method, or if the DAPS handover method is configured for each bearer (RLC bearer, backhaul RLC channel identifier, or backhaul RLC logical channel identifier) identifier or logical channel identifier, 3> the RRC layer entity of the radio node (or UE) suspends the second timer if the second timer for the source base station is running. This is because when the second timer expires, an unnecessary RRC connection re-establishment procedure may be triggered.

2> The third timer for the source base station, target base station, or cell group is suspended.

1> When the radio node (or UE) receives an RRCReconfiguration message or RRCConnectionReconfiguration message, if ReconfigWithSync information (in case of NR base station) or Mobility ControlInfo information (in case of LTE base station) is not included in the RRC message, if the radio node (or UE) can follow the configuration information of the RRC message, or the second condition described in the disclosure is satisfied, the radio node (or UE) may perform operations as follows.

2> If the RRCReconfiguration message or RRCConnectionReconfiguration message received above includes an indicator indicating releasing of the connection of the source base station (or cell) in the DAPS handover procedure, 3> The MAC layer entity for the source base station (or cell or PCell) is initialized, and the configuration of the MAC layer entity for the source PCell is released.

3> For a bearer (RLC bearer, backhaul RLC channel identifier, or backhaul RLC logical channel identifier) for which the DAPS handover method is configured or for each DRB having the second BAP layer entity structure (DAPS BAP layer entity structure), 4> The RLC layer entity for the source PCell is re-established.

4> The RLC layer entity and the dedicated traffic channel (DTCH) logical channel for the source PCell are released.

4> The second BAP layer entity structure (or the current BAP layer entity) is reconfigured to be or switched to the first BAP layer entity structure (or a normal BAP layer entity structure) or the third BAP layer entity structure. In addition, when the BAP layer entity is reconfigured in the above, the BAP status report is triggered for the AM DRB or UM DRB, to enable the BAP status report to be transmitted to the target base station, and enable the target base station to receive the BAP status report from the radio node (or UE). As a result, data transmission or reception may be performed continuously without interruption.

3> With regard to respective SRBs,

4> the BAP layer entity configured for the source PCell is released.

4> RLC layer entity and dedicated traffic channel (DTCH) logical channel for the source PCell are released.

3> Configuration information for the physical channel (or physical layer entity) configured for the source PCell is released.

In the disclosure, in case where the DAPS handover method is indicated to each bearer (RLC bearer, backhaul RLC channel identifier, or backhaul RLC logical channel identifier) through an RRC message (e.g., RRCReconfiguration message or an RRCConnectionReconfiguration message), which is received by the radio node (or UE), the radio node (or UE) drives different bearer (RLC bearer, backhaul RLC channel identifier, or backhaul RLC logical channel identifier)-specific protocol layer entities with respect to an SRB, bearers (RLC bearers, backhaul RLC channel identifiers, or backhaul RLC logical channel identifiers) for which the DAPS handover method is configured, or bearers (RLC bearers, backhaul RLC channel identifiers, or backhaul RLC logical channel identifiers) for which the DAPS handover method is not configured, and the detailed third embodiment is as follows.

1> If the radio node (or UE) receives a handover command message (e.g., RRCReconfiguration message) or receives ReconfigWithSync information (in case of NR base station) or Mobility ControlInfo information (in case of LTE base station) through the RRCReconfiguration message, if the radio node (or UE) can follow the configuration information of the RRC message, the radio node (or UE) can perform one or a plurality of the following operations.

2> The radio node (or UE) may start the first timer of the disclosure.

2> If the second handover method (for example, the second embodiment of the disclosure or the DAPS handover method) is not indicated above, if the DAPS handover method is not indicated for each bearer (RLC bearer, backhaul RLC channel identifier, or backhaul RLC logical channel identifier) identifier or logical channel identifier, if the DAPS handover method is not configured for at least one bearer (RLC bearer, backhaul RLC channel identifier, or backhaul RLC logical channel identifier), or if the DAPS handover method is not configured for a predetermined bearer (RLC bearer, backhaul RLC channel identifier, or backhaul RLC logical channel identifier).

3> the radio node (or UE) may suspend the second timer if the second timer for the source base station of the disclosure is running.

3> the radio node (or UE) may suspend the third timer if the third timer for the source base station of the disclosure is running.

2> In the above, if the second handover method (for example, the second embodiment of the disclosure or the DAPS handover method) is indicated (or configured), or the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier), one or a plurality of the following operations may be performed for a bearer (RLC bearer, backhaul RLC channel identifier, or backhaul RLC logical channel identifier) for which the DAPS handover method is configured.

3> Even if the second timer for the source base station of this disclosure is running, the radio node (or UE) does not suspend the second timer.

3> The radio node (or UE) may generate or establish a MAC layer entity for the target base station. For example, the radio node (or UE) may apply the target Pcell with the same configuration as that of the source PCell.

3> The radio node (or UE) may apply a new radio node (or UE) identifier (e.g., C-RNTI) in the MAC or PHY layer entity with respect to the target base station or for the target base station.

3> The radio node (or UE) may reconfigure a MAC layer entity for the source Pcell. Specifically, the radio node (or UE) may reconfigure the MAC layer entity for the source Pcell by using MAC layer entity configuration information, obtained by excluding configuration information about a bearer (RLC bearer, backhaul RLC channel identifier, or backhaul RLC logical channel identifier) for which a DAPS handover method is not configured or configuration information about a logical channel. Alternatively, the radio node (or UE) may reconfigure the MAC layer entity for the source Pcell by using MAC layer entity configuration information including configuration information about a bearer (RLC bearer, backhaul RLC channel identifier, or backhaul RLC logical channel identifier) for which the DAPS handover method is configured or configuration information about a logical channel. In addition, the configuration information may include mapping information between a logical channel and a SCell.

3> All SCells configured in the MAC layer entity for the source base station may be deactivated. However, the source PCell is maintained as it is and data transmission or reception may be continuously performed.

3> There may be a DRB for which each DAPS handover method is configured, may be a list of DRBs for DAPS handover, or with regard to a DRB having an identifier included in the list of DRBs for which the DAPS handover method is configured, or there may be no list of DRBs for a DAPS handover, with regard to all DRBs.

4> an RLC layer entity and a dedicated control channel (DCCH) logical channel for a target Pcell may be configured or established. For example, the configuration of the target Pcell may be applied with the same configuration as the configuration for the source PCell.

4> The first BAP layer entity structure (or a normal BAP layer entity) may be reconfigured to be or switched to the second BAP layer entity structure (or a DAPS BAP layer entity). Alternatively, the received BAP layer entity configuration information may be applied to the second BAP layer entity structure.

3> There is a DRB for which each DAPS handover method is not configured or a list of DRBs for DAPS handover, and for a DRB that does not include an identifier in the list of DRBs for which the DAPS handover method is configured.

4> The DRBs may be suspended. That is. UM DRBs or AM DRBs for which the DAPS handover methods are not indicated may be suspended.

4> Alternatively, for the UM DRBs or AM DRBs, a BAP layer entity suspend procedure (BAP layer entity suspend) may be triggered or indicated for a lower layer entity or a BAP layer entity. As another method, only some of the following procedures may be triggered or indicated. As another method, the following procedures or some of the following procedures may be performed on bearers (RLC bearers, backhaul RLC channel identifiers, or backhaul RLC logical channel identifiers) (UM DRB or AM DRB) for which the DAPS handover method is not configured when the DAPS handover procedure fails and the fallback procedure is performed.

5> In the above, the procedures performed in the BAP layer entity of the UM DRB or AM DRB may be embodied as follows, and some or all of the following procedures may be performed.

6> In case of initializing the count value or the window state variable value, in order to solve a security issue caused by reusing the same count value from the beginning when performing the DAPS handover fallback procedure (when performing the DAPS handover fallback procedure, the risk of exposure of security keys caused by transmitting different data with the same security key and the same count value), the count value, the transmission window state variable (TX_NEXT), or the receiving window state variable (RX_NEXT and RX_DELIV) is not initialized and the existing variable values are continuously used or maintained.

6> In order to discard old data for efficient buffer operation, data stored in the transmitting BAP layer entity (e.g., BAP PDU or BAP SDU) may be discarded. As another method, when discarding the stored data above, only the BAP PDUs are discarded, and the BAP SDUs, which are original data, are stored or maintained as they are in order to prevent data loss, or the BAP SDUs may be processed again through a BAP re-establishment or reconfiguration procedure or bearer (RLC bearer, backhaul RLC channel identifier, or backhaul RLC logical channel identifier) resumption procedure in the future and transmitted.

6> In order to quickly transmit the stored data (BAP SDU or BAP PDU) to an upper layer entity while a BAP reordering timer is running, the BAP reordering timer is suspended and initialized if the BAP reordering timer is running, and the header on the stored data may be decompressed if the header on the stored data is compressed and may be transmitted to the upper layer in ascending order of count values.

6> If the receiving BAP layer entity receives pieces of data from the lower layer entity (RLC layer entity) through the RLC re-establishment procedure, the received pieces of data are also decoded and integrity verification thereof is performed if necessary. In addition, if necessary, header decompression is performed, the BAP reordering timer is suspended and initialized, and thus when transmitting pieces of data to an upper layer, the data may be ordered and transmitted in ascending order of count value (this is a useful operation in a case of EN-DC (connected to the LTE base station and NR base station) or in a case of using the NR BAP layer entity by the LTE base station, that is, when the NR BAP layer entity is connected to the LTE RLC layer entity and the LTE RLC layer entity is re-established).

6> As another method, the count value used for the security key is initialized, and the transmission window state variable (TX_NEXT) may be initialized to be the initial value so that variable synchronization with the base station is possible when reconnecting to the network later. In addition, the count value used for the security key is initialized, and the receiving window state variables (RX_NEXT and RX_DELIV) may be initialized to be the initial values so that variable synchronization with the base station is possible when reconnecting to the network later.

4> In case where an RLC re-establishment procedure is indicated for the UM DRBs or AM DRBs, an RLC layer entity re-establishment procedure may be performed. According to the above RLC layer entity re-establishment procedure, if there are pieces of received data, in case where the pieces of data are processed and transmitted to an upper layer entity or the transmission or reception window state variables are initialized, or pieces of transmission data are not yet transmitted, a procedure of discarding stored data (RLC SDU or RLC PDU) may be performed.

3> With regard to each SRB,

4> SRBs for a target Pcell are configured or established. Specifically, a BAP layer entity for the target PCell may be configured or established. In addition, an RLC layer entity and a dedicated control channel (DCCH) logical channel for a target Pcell may be configured or established. For example, the target Pcell may be applied with the same configuration as the configuration of the source PCell. As another method, new SRB1 for the target PCell may be configured or established, and other SRBs (e.g., SRB2 or SBR3 or SRB4) may be suspended. As another method, new SRB1 for the target PCell may be configured or established when the first condition described in the disclosure is satisfied.

4> SRBs for the source PCell are suspended. Alternatively, if there are data or RRC messages stored in SRBs (for example, SRB1, SRB2, SRB3, or SRB4) for the source Pcell, the data or RRC messages may be discarded. Alternatively, if there are data or RRC messages stored in the BAP layer entity of the SRBs (for example, SRB1, SRB2, SRB3, or SRB4) for the source Pcell, the data or RRC messages may be discarded. Alternatively, the RLC layer entity of the SRBs may be re-established. This is because an error may occur when old data or RRC messages are transmitted.

2> Otherwise, or if the second handover method (for example, the second embodiment of the disclosure or the DAPS handover method) is not indicated (or is not configured) above, if the DAPS handover method is not indicated (or is not configured) for each bearer (RLC bearer, backhaul RLC channel identifier, or backhaul RLC logical channel identifier) identifier or logical channel identifier, if the DAPS handover method is not configured for at least one bearer (RLC bearer, backhaul RLC channel identifier, or backhaul RLC logical channel identifier), or if the DAPS handover method is not configured for a predetermined bearer (RLC bearer, backhaul RLC channel identifier, or backhaul RLC logical channel identifier), one or a plurality of the following operations may be performed.

3> If the DAPS handover method is configured, the MCG MAC layer entity or SCG MAC layer entity is initialized.

3> If the DAPS handover method is configured, the configuration or context for the uplink compressed data method is released.

3> The BAP layer entity may be re-established for all bearers (RLC bearers, backhaul RLC channel identifiers, or backhaul RLC logical channel identifiers) (e.g., DRBs or SRBs) for which the BAP layer entity is established or configured.

3> The MCG RLC or SCG RLC layer entity may be re-established for all bearers (RLC bearers, backhaul RLC channel identifiers, or backhaul RLC logical channel identifiers) (e.g., DRBs or SRBs) for which the RLC layer entity is established or configured.

1> If the MAC layer entity successfully completes the random access procedure (or the first condition described in this disclosure is satisfied)

1> Alternatively, if an indicator (for example, rach-Skip) indicating skipping of the random access procedure is configured, and the MAC layer entity indicates successful reception of the PDCCH transmission corresponding to the radio node (or UE) identifier (C-RNTI), 2> the first timer (for example, T304) is suspended.

2> If the second handover method (for example, the second embodiment of the disclosure or DAPS handover method) is configured as above, if the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier), 3>. the second timer (for example, T310) is suspended if the second timer is running.

3> the third timer (for example, T312) is suspended if the third timer is running.

3> Uplink data switching may be triggered or indicated for each bearer (RLC bearer, backhaul RLC channel identifier, or backhaul RLC logical channel identifier) for which the second handover method or the DAPS handover method is configured or each bearer (RLC bearer, backhaul RLC channel identifier, or backhaul RLC logical channel identifier) (or lower layer entity or BAP layer entity) for which a DAPS BAP layer entity is configured. In addition, when the uplink data switching is indicated in the above, the BAP status report is triggered for the AM DRB or UM DRB to enable the BAP status report to be transmitted to the target base station, and enable the target base station to receive the BAP status report from the radio node (or UE). As a result, data transmission or reception may be continuously performed without interruption.

3> There is a DRB for which a DAPS handover method is not configured or a list of DRBs for which DAPS handover is configured, and for a DRB, the identifier of which is not included in a list of DRBs for which the DAPS handover method is configured.

4> The BAP layer entity may be re-established. As described in the disclosure, a security key or ROHC context for a target Pcell may be applied, or data (e.g., BAP PDU) may be generated based on a security key or ROHC context for the applied target Pcell and transmitted or retransmitted. In addition, when the BAP layer entity is re-established in the above, the BAP status report is triggered for the AM DRB or UM DRB to enable the BAP status report to be transmitted to the target base station, and enable the target base station to receive the BAP status report from the radio node (or UE). As a result, data transmission or reception may be continuously performed without interruption.

4> The RLC layer entity may be re-established, and the RLC layer entity or the connected DTCH channel may be connected to the target Pcell (or the MAC layer entity of the target Pcell).

3> MCG configuration information may be released. The MCG configuration information may include configuration information of each bearer (RLC bearer, backhaul RLC channel identifier, or backhaul RLC logical channel identifier) or BAP, BAP, RLC, MAC, or PHY layer entity information, radio node (or UE) identifier information, security information, and the like.

3> If there is SCG configuration information, the SCG configuration information may be released. The SCG configuration information may include configuration information of each bearer (RLC bearer, backhaul RLC channel identifier, or backhaul RLC logical channel identifier) or BAP, BAP, RLC, MAC, or PHY layer entity information, radio node (or UE) identifier information, security information, and the like.

3> Other SRBs (for example, SRB2, SBR3, or SRB4) may re-establish a BAP layer entity or RLC layer entity (used for the source PCell) and may configure or establish the same for the target PCell. As another method, new SRB1 for the target PCell may be configured or established when the first condition described in the disclosure is satisfied.

2> System information may be read from the target PCell.

1> If the first timer of this disclosure has expired (for example, if the handover procedure has failed)

2> If the first timer (for example, T304) for handover has expired or if handover has failed 3> If random access-related configuration information is configured, designated preamble information is released.

3> If the second handover method (e.g., the second embodiment of the disclosure or the DAPS handover method) is not configured (or is not indicated), if the DAPS handover method is not configured (or not indicated) for each bearer (RLC bearer, backhaul RLC channel identifier, or backhaul RLC logical channel identifier) identifier or logical channel identifier, if the DAPS handover method is not configured for at least one bearer (RLC bearer, backhaul RLC channel identifier, or backhaul RLC logical channel identifier), or if the DAPS handover method is not configured for a predetermined bearer (RLC bearer, backhaul RLC channel identifier, or backhaul RLC logical channel identifier), 3> Alternatively, if the second handover method (for example, the second embodiment of the disclosure or the DAPS handover method) is configured (or indicated), if the DAPS handover method is indicated for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), or if the DAPS handover method is configured for a predetermined bearer (RLC bearer, backhaul RLC channel identifier, or backhaul RLC logical channel identifier) and if the wireless connection between the source base station and the radio node (or UE) fails (or radio link failure (RLF) is detected), or if the wireless connection between the source Pcell and the radio node (or UE) has failed (or if the second timer or the third timer has expired, if there is a problem in random access, if the number of retransmissions has reached the maximum number of retransmissions, or if an indication indicating out-of-synchronization is received more than a predetermined number of times), 4> it is possible to perform fall back, return, or recovery by using configuration information used in the source Pcell, excluding physical layer entity configuration information, MAC layer entity configuration information, or transmission resource information 4> the measured frequency or cell information is configured and prepared to be reported, and the same may be reported to a cell or base station to be accessed.

4> RRC connection re-establishment procedure may be performed.

3> In the above, if the second handover method (for example, the second embodiment of the disclosure or the DAPS handover method) is configured (or indicated), if the DAPS handover method is configured (or indicated) for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), if the DAPS handover method is configured for a predetermined bearer (RLC bearer, backhaul RLC channel identifier, or backhaul RLC logical channel identifier) and the wireless connection between the source base station and the radio node (or UE) has not failed (or if the radio link failure (RLF) is not detected (e.g., if the second or third timer has not expired, if a random access problem has not occurred, if the number of retransmissions has not reached the maximum number of retransmissions, or if an indication indicating out-of-synchronization is not received more than a predetermined number of times)), or if the wireless connection between the source Pcell and the radio node (or UE) has not failed (or if the second timer or the third timer has not expired).

4> the MAC layer entity for the target PCell may be initialized or released.

4> With regard to each DRB for which the DAPS handover method is configured, in case where there is a list of DRBs for which the DAPS handover method is configured, with regard to DRBs included in the list, or with regard to all DRBs in case where there is no list of DRBs for which the DAPS handover method is configured.

5> the RLC layer entity for the target Pcell may be re-established and released, or an associated DTCH logical channel may be released.

5> The BAP layer entity (e.g., the DAPS BAP layer entity or the second BAP layer entity structure) may be reconfigured to be a normal BAP layer entity (for example, a normal BAP layer entity or the first BAP layer entity structure). In addition, when the BAP layer entity is reconfigured in the above, the BAP status report is triggered for the AM DRB or UM DRB, the BAP status report is enabled to be transmitted to the source base station, and the source base station is enabled to receive the BAP status report from the radio node (or UE). As a result, data transmission or reception may be performed continuously without interruption.

4> For each DRB for which the DAPS handover method is not configured, or in case where there is a list of DRBs for which the DAPS handover method is configured, for DRBs not included in the list, 5> The DRBs may be resumed. Alternatively, the suspended DRBs may be resumed. In addition, the BAP status report is triggered for the AM DRB or UM DRB, the BAP status report is enabled to be transmitted to the source base station, and the source base station is enabled to receive the BAP status report from the radio node (or UE). As a result, data transmission or reception may be performed continuously without interruption.

4> Suspended SRBs, which are configured in the MAC layer entity for the source base station or with respect to the source base station (or source PCell), are resumed.

4> The MAC layer entity for the source Pcell may be reconfigured. Specifically, the MAC layer entity for the source Pcell may be reconfigured using original MAC layer entity configuration information (for example, configuration information before receiving the handover command message) including information on a bearer (RLC bearer, backhaul RLC channel identifier, or backhaul RLC logical channel identifier) for which the DAPS handover method is not configured or a logical channel again. In addition, the configuration information may include mapping information between a logical channel and a SCell.

4> The BAP layer entity for the target Pcell may be re-established or released.

4> The RLC layer entity for the target PCell may be re-established or released, or an associated DTCH logical channel may be released.

4> When resuming the SRBs for the source Pcell, if there are data or RRC messages stored in the SRBs (for example, SRB1, SRB2, SRB3, or SRB4) for the source Pcell, the data or RRC messages may be discarded. Alternatively, if there are data or RRC messages stored in the BAP layer entity of the SRBs (for example, SRB1, SRB2, SRB3, or SRB4) for the source Pcell, the data or RRC messages may be discarded. Alternatively, the RLC layer entity of the SRBs may be re-established. This is because an error may occur when old data or RRC messages are transmitted.

4> In order to fall back to the source base station, a procedure of re-acquiring necessary system information from the source PCell may be performed.

4> A handover failure message may be constituted through the resumed SRBs and transmitted to the source base station. Alternatively, DRBs may be resumed and data transmission or reception may be resumed. Alternatively, because the handover procedure has failed, SRB1 that has been configured or established for the target Pcell may be released.

1> If the radio node (or UE) detects a problem in wireless connection in a physical layer entity.

2> If the second handover method (for example, the second embodiment of the disclosure or the DAPS handover method) is configured, if the DAPS handover method is configured for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), if the DAPS handover method is configured for a predetermined bearer (RLC bearer, backhaul RLC channel identifier, or backhaul RLC logical channel identifier), and if an indicator (out-of-sync indication) indicating that radio connection signals are out of synchronization is received from a lower layer entity (for example, a MAC layer entity or a PHY layer entity) a predetermined number of times (for example, the base station may configure the number of times) in case where predetermined timers (for example, T300 (a timer for RRC connection establishment procedure). T301 (a timer for RRC connection re-establishment procedure), or T311 (a timer for RRC connection re-establishment procedure)) are not running, and thus a problem in the physical layer entity is detected.

3> A second timer (e.g., T310) may be started.

2> If an indicator (out-of-sync indication) indicating that radio connection signals are out of synchronization is received from a lower layer entity (for example, a MAC layer entity or a PHY layer entity) a predetermined number of times (for example, the base station may configure the number of times) and thus a problem in the physical layer entity is detected, and in case where the first timer. T300 timer. T301 timer. T304 timer. T311 timer, or T319 timer is not running.

3> A second timer (e.g., T310) may be started. However, if the first timer is running in case where the DAPS handover method is not configured, the second timer is not started even when a problem in the physical layer detected.

1> If the second handover method (e.g., the second embodiment of the disclosure or DAPS handover method) is configured (or indicated) above, if the DAPS handover method is configured (or indicated) for each bearer (RLC bearer, backhaul RLC channel identifier, or backhaul RLC logical channel identifier) identifier or logical channel identifier, if the DAPS handover method is configured for at least one bearer (RLC bearer, backhaul RLC channel identifier, or backhaul RLC logical channel identifier), if the DAPS handover method is configured for a predetermined bearer (RLC bearer, backhaul RLC channel identifier, or backhaul RLC logical channel identifier), and if the first timer is running (or if the handover procedure is in progress), 2> If the wireless connection between the source base station and the radio node (or UE) fails (or if a radio link failure (RLF) is detected (for example, if the second timer or the third timer has expired, if there is a problem in random access, if the number of times of retransmission reaches the maximum number of retransmissions, or if an out-of-sync indication is received more than a predetermined number of times)), or if the wireless connection between the source Pcell and the radio node (or UE) fails (or if the second timer or the third timer has expired), 3> The MAC layer entity for the source PCell may be initialized or the MAC layer entity configuration information may be released.

3> With regard to a DRB for which each DAPS handover method is configured, in case where there is a list of DRBs for which the DAPS handover method is configured, with regard to DRBs included in the list, or with regard to all DRBs in case where there is no list of DRBs for which the DAPS handover method is configured 4> The RLC layer entity for the source Pcell may be re-established or released, or an associated DTCH logical channel may be released.

4> The BAP layer entity (for example, a DAPS BAP layer entity or a second BAP layer entity structure) may be reconfigured to be a normal BAP layer entity (for example, a normal BAP layer entity or first BAP layer entity structure).

3> With regard to each DRB for which DAPS handover method is not configured, or with regard to DRBs that are not included in the list in case where there is a list of DRBs for which the DAPS handover method is configured, 4> The RLC layer entity for the source Pcell may be re-established or released, or an associated DTCH logical channel may be released.

4> The BAP layer entity for the source PCell may be re-established or released.

3> With regard to each SRB,

4> The BAP layer entity for the source PCell may be re-established or released.

4> The RLC layer entity for the source Pcell may be re-established or released, or the associated DTCH logical channel may be released.

3> Physical layer entity configuration information for the source Pcell may be released.

3> Alternatively, in case were security configuration information is activated and SRBs or DRBs are configured, or in another method, all DRBs configured for the source Pcell may be suspended.

1> Upon receiving a handover command message (e.g., RRCReconfiguration message), or upon receiving ReconfigWithSync information (in case of NR base station) or Mobility ControlInfo information (in case of LTE base station) through the RRCReconfiguration message, or if the random access procedure triggered by the target base station or the MAC layer entity of a predetermined cell group is successfully completed, the RRC layer entity of the radio node (or UE), 2> suspends the first timer for the source base station, target base station, or cell group.

2> suspends the second timer if the second timer for the source base station is running (during handover). This is because when the second timer expires, an unnecessary RRC connection re-establishment procedure may be triggered.

2> If the second handover method (for example, the second embodiment of the disclosure or the DAPS handover method) is configured according to another method, or if the DAPS handover method is configured for each bearer (RLC bearer, backhaul RLC channel identifier, or backhaul RLC logical channel identifier) identifier or logical channel identifier, 3> The second timer is suspended if the second timer for the source base station is running. This is because when the second timer expires, an unnecessary RRC connection re-establishment procedure may be triggered.

2> the third timer for the source base station, target base station, or cell group is suspended.

1> When the radio node (or UE) receives an RRCReconfiguration message or RRCConnectionReconfiguration message, if ReconfigWithSync information (in case of NR base station) or Mobility ControlInfo information (in case of LTE base station) is not included in the RRC message, if the radio node (or UE) can follow the configuration information of the RRC message, or the second condition described in the disclosure is satisfied, the radio node (or UE) may perform operations as follows.

2> If the RRCReconfiguration message or RRCConnectionReconfiguration message received above includes an indicator indicating releasing of the connection of the source base station (or cell) in the DAPS handover procedure, 3> the radio node (or UE) initializes the MAC layer entity for the source base station (or cell or PCell), and releases the configuration of the MAC layer entity for the source PCell.

3> For a bearer (RLC bearer, backhaul RLC channel identifier, or backhaul RLC logical channel identifier) for which the DAPS handover method is configured or for each DRB having the second BAP layer entity structure (DAPS BAP layer entity structure)

4> The RLC layer entity for the source PCell is re-established.

4> The RLC layer entity and dedicated traffic channel (DTCH) logical channel for the source PCell are released.

4> The second BAP layer entity structure (or the current BAP layer entity) is reconfigured to be or switched to the first BAP layer entity structure (or a normal BAP layer entity structure) or the third BAP layer entity structure. In addition, when the BAP layer entity is reconfigured in the above, the BAP status report is triggered for the AM DRB or UM DRB, to enable the BAP status report to be transmitted to the target base station, and enable the target base station to receive the BAP status report from the radio node (or UE). As a result, data transmission or reception may be performed continuously without interruption.

3> With regard to respective SRBs,

4> the BAP layer entity configured for the source PCell is released.

4> RLC layer entity and dedicated traffic channel (DTCH) logical channel for the source PCell are released.

3> Configuration information for the physical channel (or physical layer entity) configured for the source PCell is released.

In the disclosure, a base station may refer to a cell or a PCell. That is, the source base station is a term meaning a source cell or a source PCell, and the target base station is a term meaning a target cell or a target PCell.

Figure 13:
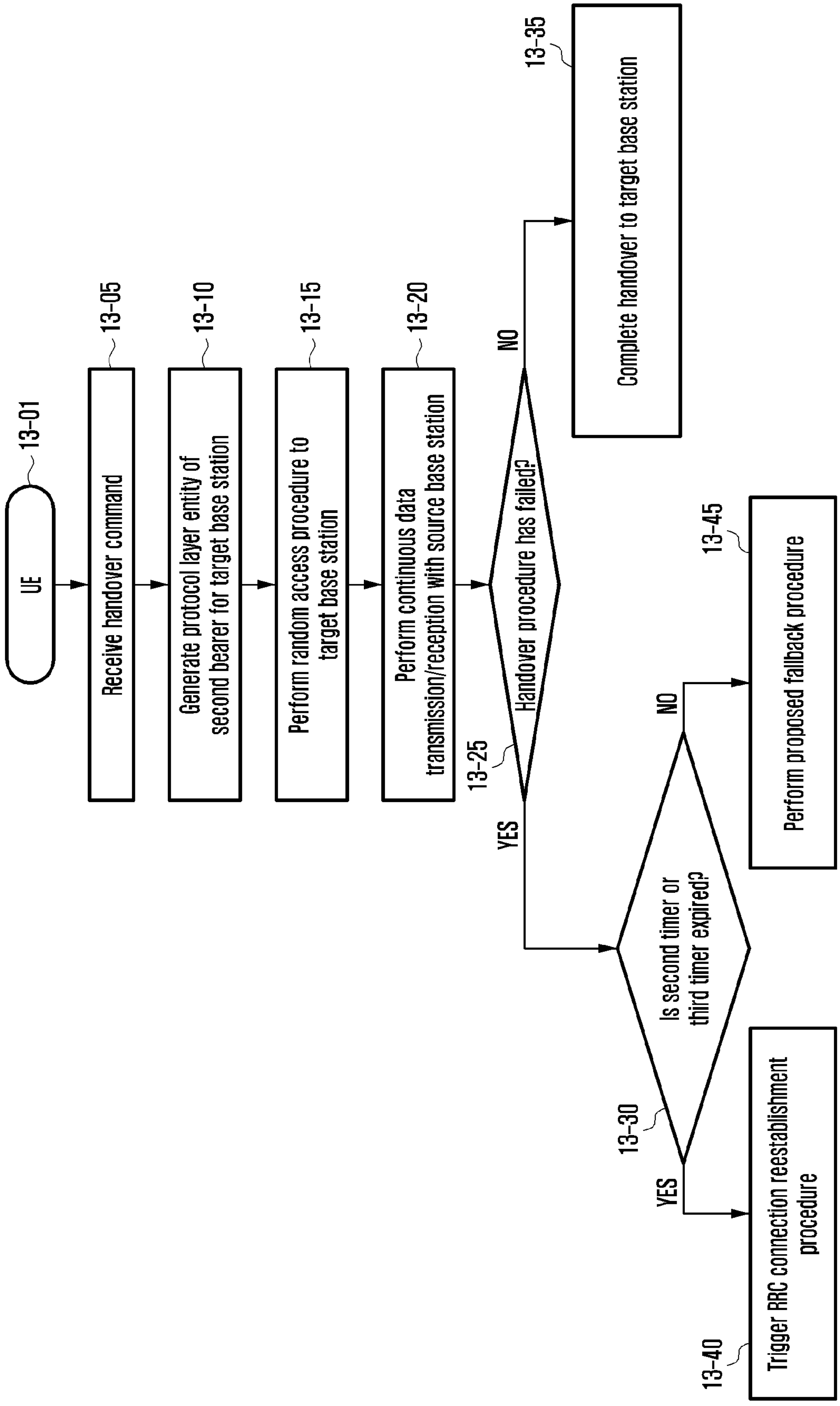
FIG. 13 is a diagram illustrating an operation of a radio node (or UE) performing a fallback procedure when handover fails in a DAPS handover method proposed in the disclosure.

FIG. 13 is a diagram illustrating an operation of a radio node (or UE) performing a fallback procedure when handover fails in a DAPS handover method proposed in the disclosure.

In FIG. 13, a radio node (or UE) 13-05 may transmit or receive data to or from a source base station through a first BAP layer entity structure for each bearer (RLC bearer, backhaul RLC channel identifier, or backhaul RLC logical channel identifier). However, in case where a handover command message is received and the DAPS handover method of the second embodiment of the disclosure is indicated through the handover command message, or in case where a DAPS handover method is indicated for each bearer (RLC bearer, backhaul RLC channel identifier, or backhaul RLC logical channel identifier), the radio node (or UE) switches, a target base station, which is indicated through the message, to the structure of the second BAP layer entity, for each bearer (RLC bearer, backhaul RLC channel identifier, or backhaul RLC logical channel identifier) or the bearers (RLC bearers, backhaul RLC channel identifiers, or backhaul RLC logical channel identifiers) for which the DAPS handover method is indicated, and configures and establishes the protocol layer entities of the second bearer (RLC bearer, backhaul RLC channel identifier, or backhaul RLC logical channel identifier). In addition, even when performing the procedure of random access to the target base station through the established protocol layer entities (13-10, 13-15), the radio node (or UE) transmits or receives data (uplink data transmission and downlink data reception) to or from the source base station through protocol layer entities of the first bearer (RLC bearer, backhaul RLC channel identifier, or backhaul RLC logical channel identifier) (13-20).

If the radio node (or UE) successfully completes the handover procedure at operation 13-25, the radio node (or UE) completes the handover procedure according to the second embodiment (DAPS handover method) of the handover method of the disclosure.

However, if the radio node (or UE) fails the handover procedure (13-25) (for example, if the first timer above has expired (for example, if the procedure of handover to the target base station fails)); if the number of times of retransmission by the RLC layer entity exceeds the maximum number of times of retransmissions: when a handover command message is received in the above, if the radio node (or UE) fails the handover because the configuration information of the handover command message has a value exceeding the UE capability or an error occurs in the application of the configuration information: if a problem in performing random access to the target base station occurs, and the handover procedure fails: in case where the second timer or the third timer is driven for the target base station above, if the second timer or the third timer expires before the handover procedure is completed. T304 timer is suspended or expired and it is determined that the handover procedure has failed); if the second timer or the third timer for the wireless connection between the radio node (or UE) and the source base station in the above has not expired (or if the second timer or the third timer for wireless connection between the UE and the source base station is not started or is running) (13-40); or if the wireless connection between the radio node (or UE) and the source base station is valid, the radio node (or UE) may determine that the wireless connection between the radio node (or UE) and the source base station is valid, and may perform the fallback procedure of the disclosure (13-45). If the second timer or the third timer for the wireless connection between the radio node (or UE) and the source base station in the above has expired, or if the wireless connection between the radio node (or UE) and the source base station is not valid (13-30), the radio node (or UE) performs an RRC connection re-establishment procedure (the connection with the base station is released and the RRC connection procedure is performed again from the beginning, that is, a cell selection or reselection procedure is performed, a random access procedure is performed, and an RRC connection re-establishment request message may be transmitted) (13-45).

Figure 14:
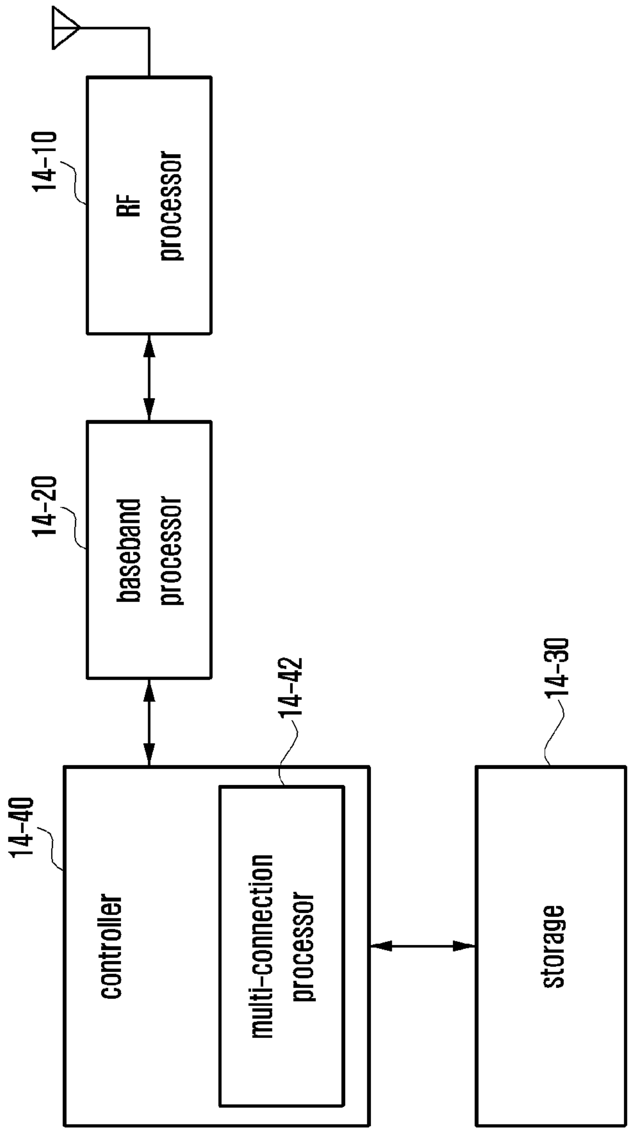
FIG. 14 is a diagram illustrating a structure of a radio node (or UE) to which an embodiment of the disclosure can be applied.

FIG. 14 is a diagram illustrating a structure of a radio node (or UE) to which an embodiment of the disclosure can be applied.

With reference to the drawing, the radio node (or UE) may include a radio frequency (RF) processor 14-10, a baseband processor 14-20, a storage 14-30, and a controller 14-40.

The RF processor 14-10 may perform a function for transmitting and receiving a signal through a radio channel, such as band conversion and amplification of a signal. That is, the RF processor 14-10 may up-convert a baseband signal provided from the baseband processor 14-20 to an RF band signal, transmits the RF band signal through an antenna, and down-convert the RF band signal received through the antenna to a baseband signal. For example, the RF processor 14-10 may include a transmission filter, a reception filter, an amplifier, a mixer, an oscillator, a digital to analog converter (DAC), an analog to digital converter (ADC), and the like. In the drawing, only one antenna is illustrated, but the radio node (or UE) may include a plurality of antennas. Further, the RF processor 14-10 may include a plurality of RF chains. Furthermore, the RF processor 14-10 may perform beamforming. For the beamforming, the RF processor 14-10 may adjust a phase and magnitude of each of signals transmitted and received through a plurality of antennas or antenna elements. Further, the RF processor may perform MIMO, and receive multiple layers when performing a MIMO operation. The RF processor 14-10 may appropriately configure a plurality of antennas or antenna elements under the control of the controller to perform receiving beam sweeping, or may adjust a direction and beam width of the receiving beam so that the receiving beam cooperates with a transmitting beam.

The baseband processor 14-20 may perform a function of converting between a baseband signal and a bit string according to a physical layer standard of a system. For example, when transmitting data, by ciphering and modulating a transmitted bit string, the baseband processor 14-20 may generate complex symbols. Further, when receiving data, by demodulating and deciphering the baseband signal provided from the RF processor 14-10, the baseband processor 14-20 may restore a received bit string. For example, according to an orthogonal frequency division multiplexing (OFDM) scheme, when transmitting data, by ciphering and modulating a transmitted bit string, the baseband processor 14-20 may generate complex symbols, map the complex symbols to subcarriers, and then configure OFDM symbols through inverse fast Fourier transform (IFFT) operation and cyclic prefix (CP) insertion. Further, when receiving data, the baseband processor 14-20 may divide the baseband signal provided from the RF processor 14-10 into OFDM symbol units, restore the signals mapped to subcarriers through a fast Fourier transform (FFT) operation, and restore the received bit string through demodulation and deciphering.

The baseband processor 14-20 and the RF processor 14-10 may transmit and receive signals, as described above. Accordingly, the baseband processor 14-20 and the RF processor 14-10 may be referred to as a transmitter, a receiver, a transceiver, or a communication unit. Furthermore, at least one of the baseband processor 14-20 and the RF processor 14-10 may include a plurality of communication modules to support a plurality of different wireless access technologies. Further, at least one of the baseband processor 14-20 and the RF processor 14-10 may include different communication modules to process signals of different frequency bands. For example, the different radio access technologies may include an LTE network, an NR network, and the like. Further, the different frequency bands may include a super high frequency (SHF) (e.g., 2.5 GHZ. 5 GHZ) band and a millimeter wave (e.g., 60 GHZ) band.

The storage 14-30 may store data such as a basic program, an application program, and configuration information for an operation of the radio node (or UE). The storage 14-30 may provide stored data according to the request of the controller 14-40.

The controller 14-40 may control overall operations of the radio node (or UE). For example, the controller 14-40 may transmit and receive signals through the baseband processor 14-20 and the RF processor 14-10. Further, the controller 14-40 writes and reads data in the storage 14-30. To this end, the controller 14-40 may include at least one processor. For example, the controller 14-40 may include a communication processor (CP) that controls for communication and an application processor (AP) that controls an upper layer such as an application program. The controller 14-40 may further include a multi-connectivity processor 14-42 for supporting multiple connectivity.

Figure 15:
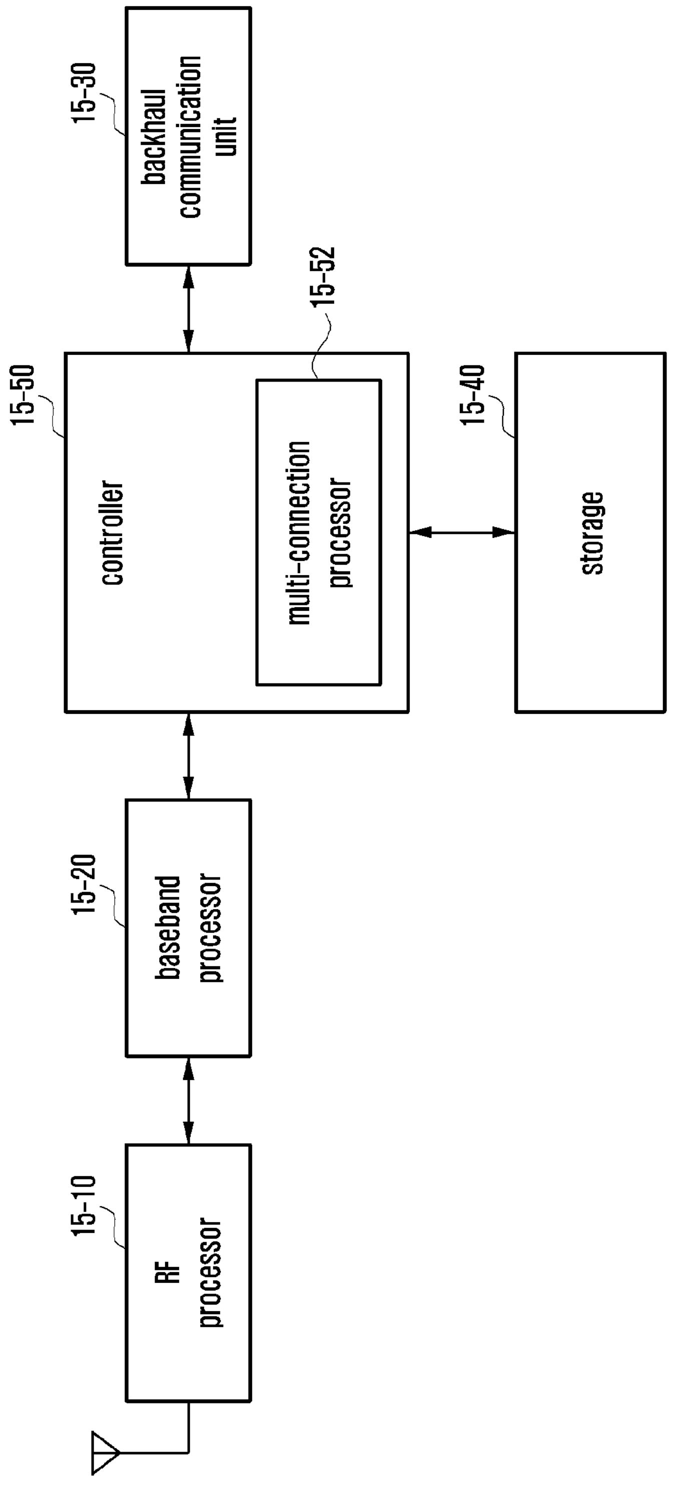
FIG. 15 is a diagram illustrating a block constitution of a transmission and reception point (TRP) in a wireless communication system to which an embodiment of the disclosure can be applied.

FIG. 15 is a diagram illustrating a block constitution of a transmission and reception point (TRP) in a wireless communication system to which an embodiment of the disclosure can be applied.

As illustrated in the drawing, the base station is constituted to include an RF processor 15-10, a baseband processor 15-20, a backhaul communication unit 15-30, a storage 15-40, and a controller 15-50.

The RF processor 15-10 performs a function for transmitting or receiving a signal through a wireless channel, such as band conversion and amplification of a signal. That is, the RF processor 15-10 up-converts a baseband signal provided from the baseband processor 15-20 into an RF band signal, transmits the converted signal through an antenna, and then down-converts the RF band signal received through the antenna into a baseband signal. For example, the RF processor 15-10 may include a transmission filter, a reception filter, an amplifier, a mixer, an oscillator, a DAC, an ADC, and the like. In the drawing, only one antenna is illustrated, but the first access node may include a plurality of antennas. In addition, the RF processor 15-10 may include a plurality of RF chains. Moreover, the RF processor 15-10 may perform beamforming. For the beamforming, the RF processor 15-10 may adjust a phase and a size of each of signals transmitted or received through the plurality of antennas or antenna elements. The RF processor may perform a downlink MIMO operation by transmitting one or more layers.

The baseband processor 15-20 performs a function of conversion between a baseband signal and a bit string according to a physical layer specification of a first radio access technology. For example, when data is transmitted, the baseband processor 15-20 generates complex symbols by encoding and modulating a transmission bit string. Further, when data is received, the baseband processor 15-20 reconstructs a reception bit string by demodulating and decoding a baseband signal provided from the RF processor 15-10. For example, in accordance with an OFDM scheme, when data is transmitted, the baseband processor 15-20 may generate complex symbols by encoding and modulating the transmission bit string, map the complex symbols to subcarriers, and then constitute OFDM symbols via an IFFT operation and CP insertion. In addition, when data is received, the baseband processor 15-20 divides a baseband signal provided from the RF processor 15-10 in units of OFDM symbols, reconstructs signals mapped with subcarriers via an FFT operation, and then reconstructs a reception bit string via demodulation and decoding. The baseband processor 15-20 and the RF processor 15-10 transmit and receive a signal as described above. Accordingly, the baseband processor 15-20 and the RF processor 15-10 may be referred to as a transmission unit, a reception unit, a transmission/reception unit, a communication unit, or a wireless communication unit.

The communication unit 15-30 provides an interface for performing communication with other nodes within the network.

The storage 15-40 stores data, such as a basic program, an application program, configuration information, and the like for the operation of the main base station. Particularly, the storage 15-40) may store information on a bearer (RLC bearer, or backhaul RLC channel identifier, or backhaul RLC logical channel identifier) assigned to a connected radio node (or UE), a measurement result reported from the connected radio node (or UE), and the like. In addition, the storage 15-40 may store information serving as a criterion for determining whether to provide the radio node (or UE) with multiple connections or to suspend multiple connections. Also, the storage 15-40 provides stored data in response to a request of the controller 15-50.

The controller 15-50 controls overall operations of the main base station. For example, the controller 15-50 transmits or receives a signal via the baseband processor 15-20 and the RF processor 15-10 or via the backhaul communication unit 15-30. In addition, the controller 15-50 records and reads data in the storage 15-40. To this end, the controller 15-50 may include at least one processor. The controller 15-50 may further include a multi-connection processor 15-52 processing a multi-connection.

The above embodiments shown in the specification and the drawings are merely specific examples that have been presented to easily explain the contents of the disclosure and help understanding of the disclosure, and are not intended to limit the scope of the disclosure.

Therefore, the scope of the disclosure should be construed to include, in addition to the embodiments disclosed herein, all changes and modifications derived on the basis of the disclosure. In addition, some of all of a specific embodiment of the above-described various embodiments may be performed in connection with some or all of one or more other embodiments, which is also apparently included in the scope of the disclosure.

The invention claimed is:

1. A method performed by an integrated access and backhaul (IAB) node in a wireless communication system, the method comprising:

receiving, from a source IAB node, a handover command message indicating a dual active protocol stack (DAPS) handover, wherein the handover command message includes target backhaul adaptation protocol (BAP) configuration information;

performing a random access procedure to a target IAB node based on the handover command message;

determining whether the random access procedure to the target IAB node is completed successfully and a first uplink resource is received from the target IAB node, based on a determination that the random access procedure to the target IAB node is completed successfully and the first uplink resource is received from the target IAB node, transmitting, to the target IAB node, uplink data based on the target BAP configuration information; and determining whether downlink data is not received from the source IAB node for a predetermined time, releasing a connection with the source IAB node based on a determination that the downlink data is not received from the source IAB node for the predetermined time.

2. The method of claim 1, wherein the IAB node includes a common BAP connected to a first bearer associated with the source IAB node and a second bearer associated with the target IAB node based on source BAP configuration information and the target BAP configuration information.

3. The method of claim 1, wherein the source IAB node and the target IAB node are parent nodes of the IAB node.

4. The method of claim 1, wherein the IAB node includes a common BAP connected to a first bearer associated with the source IAB node and a second bearer associated with the target IAB node based on source BAP configuration information and the target BAP configuration information, and wherein the source IAB node and the target IAB node are parent nodes of the IAB node.

5. A method performed by a source integrated access and backhaul (IAB) node in a wireless communication system, the method comprising:

transmitting, to an IAB node, a handover command message indicating a dual active protocol stack (DAPS) handover, wherein the handover command message includes target backhaul adaptation protocol (BAP) configuration information;

determining whether a random access procedure from the IAB node to a target IAB node is completed successfully and a first uplink resource is transmitted from the target IAB node to the IAB node, based on a determination that the random access procedure from the IAB node to the target IAB node is completed successfully and the first uplink resource is transmitted from the target IAB node to the IAB node, transmitting, to the IAB node, downlink data and stopping a reception of uplink data from the IAB node; and determining whether the downlink data is not transmitted to the IAB node for a predetermined time, releasing a connection with the IAB node based on a determination that the downlink data is not transmitted to the IAB node for the predetermined time.

6. An integrated access and backhaul (IAB) node in a wireless communication system, the IAB node comprising:

a transceiver configured to transmit or receive a signal; and a controller connected to the transceiver, wherein the controller is configured to:

receive, from a source IAB node, a handover command message indicating a dual active protocol stack (DAPS) handover, wherein the handover command message includes target backhaul adaptation protocol (BAP) configuration information, perform a random access procedure to a target IAB node based on the handover command message, determine whether the random access procedure to the target IAB node is completed successfully and a first uplink resource is received from the target IAB node, based on a determination that the random access procedure to the target IAB node is completed successfully and the first uplink resource is received from the target IAB node, transmit, to the target IAB node, uplink data based on the target BAP configuration information, and determine whether downlink data is not received from the source IAB node for a predetermined time, release a connection with the source IAB node based on a determination that the downlink data is not received from the source IAB node for the predetermined time.

7. The IAB node of claim 6, wherein the IAB node includes a common BAP connected to a first bearer associated with the source IAB node and a second bearer associated with the target IAB node based on source BAP configuration information and the target BAP configuration information.

8. The IAB node of claim 6, wherein the source IAB node and the target IAB node are parent nodes of the IAB node.

9. A source integrated access and backhaul (IAB) node in a wireless communication system, the IAB node comprising:

a transceiver configured to transmit or receive a signal; and a controller connected to the transceiver, wherein the controller is configured to:

transmit, to an IAB node, a handover command message indicating a dual active protocol stack (DAPS) handover, wherein the handover command message includes target backhaul adaptation protocol (BAP) configuration information, determine whether a random access procedure from the IAB node to a target IAB node is completed successfully and a first uplink resource is transmitted from the target IAB node to the IAB node, based on a determination that the random access procedure from the IAB node to the target IAB node is completed successfully and the first uplink resource is transmitted from the target IAB node to the IAB node, transmit, to the IAB node, downlink data and stop a reception of uplink data from the IAB node, and determine whether the downlink data is not transmitted to the IAB node for a predetermined time, release a connection with the IAB node based on a determination that the downlink data is not transmitted to the IAB node for the predetermined time.

10. The source IAB node of claim 9, wherein the IAB node includes a common BAP connected to a first bearer associated with the source IAB node and a second bearer associated with the target IAB node based on source BAP configuration information and the target BAP configuration information.

11. The source IAB node of claim 9, wherein source IAB node and the target IAB node are parent nodes of the IAB node.

* * * * *